(12) United States Patent
Chapman et al.

(10) Patent No.: US 8,090,524 B2
(45) Date of Patent: **\*Jan. 3, 2012**

(54) DETERMINING ROAD TRAFFIC CONDITIONS USING DATA FROM MULTIPLE DATA SOURCES

(75) Inventors: Craig H. Chapman, Redmond, WA (US); Kush G. Parikh, Kirkland, WA (US); Oliver B. Downs, Redmond, WA (US); Robert C. Cahn, Federal Way, WA (US); Jesse S. Hersch, Bellevue, WA (US)

(73) Assignee: Inrix, Inc., Kirkland, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/052,953
(22) Filed: Mar. 21, 2011

(65) Prior Publication Data

US 2011/0173015 A1    Jul. 14, 2011

Related U.S. Application Data

(63) Continuation of application No. 11/752,229, filed on May 22, 2007, now Pat. No. 7,912,628, which is a continuation-in-part of application No. 11/367,463, filed on Mar. 3, 2006, now Pat. No. 7,813,870, and a continuation-in-part of application No. 11/431,980, filed on May 11, 2006, now abandoned, said application No. 11/752,229 is a continuation-in-part of application No. 11/540,342, filed on Sep. 28, 2006, now Pat. No. 7,706,965.

(60) Provisional application No. 60/778,946, filed on Mar. 3, 2006, provisional application No. 60/789,741, filed on Apr. 5, 2006, provisional application No. 60/838,700, filed on Aug. 18, 2006, provisional application No. 60/838,700, filed on Aug. 18, 2006.

(51) Int. Cl.
*G08G 1/00* (2006.01)
*G06G 7/76* (2006.01)

(52) U.S. Cl. ........................................ 701/117; 701/119
(58) Field of Classification Search .......... 701/117–119, 701/213–215, 207
See application file for complete search history.

(56) References Cited

U.S. PATENT DOCUMENTS
3,582,620 A    6/1971    Noetinger ................ 235/150.24
(Continued)

FOREIGN PATENT DOCUMENTS
DE             19928082 A1    12/2000
(Continued)

OTHER PUBLICATIONS

"Dash Express Automotive Navigation System," retrieved Aug. 3, 2007, from http://www.dash.net/product.php, 1 page.

(Continued)

*Primary Examiner* — Yonel Beaulieu
(74) *Attorney, Agent, or Firm* — Seed IP Law Group PLLC

(57) ABSTRACT

Techniques are described for assessing road traffic conditions in various ways based on obtained traffic-related data, such as data samples from vehicles and other mobile data sources traveling on the roads and/or from one or more other sources (such as physical sensors near to or embedded in the roads). The road traffic conditions assessment based on obtained data samples may include various filtering and/or conditioning of the data samples, and various inferences and probabilistic determinations of traffic-related characteristics of interest from the data samples. In some situations, the inferences include repeatedly determining current traffic flow characteristics and/or predicted future traffic flow characteristics for road segments of interest during time periods of interest, such as to determine average traffic speed, traffic volume and/or occupancy, and include weighting various data samples in various ways (e.g., based on a latency of the data samples and/or a source of the data samples).

59 Claims, 45 Drawing Sheets

U.S. PATENT DOCUMENTS

| | | | | |
|---|---|---|---|---|
| 3,626,413 | A | 12/1971 | Zachmann | 343/8 |
| 4,866,438 | A | 9/1989 | Knisch | 340/936 |
| 4,985,705 | A | 1/1991 | Stammler | 342/69 |
| 5,173,691 | A | 12/1992 | Sumner | 340/905 |
| 5,182,555 | A | 1/1993 | Sumner | 340/905 |
| 5,289,183 | A | 2/1994 | Hassett et al. | 340/905 |
| 5,337,082 | A | 8/1994 | Fredericks | 342/69 |
| 5,416,711 | A | 5/1995 | Gran et al. | 364/436 |
| 5,465,289 | A | 11/1995 | Kennedy, Jr. | 379/59 |
| 5,590,217 | A | 12/1996 | Toyama | 382/104 |
| 5,610,821 | A | 3/1997 | Gazis et al. | 364/444.2 |
| 5,652,705 | A | 7/1997 | Spiess | 364/436 |
| 5,663,720 | A | 9/1997 | Weissman | 340/934 |
| 5,673,039 | A | 9/1997 | Pietzsch et al. | 340/905 |
| 5,696,502 | A | 12/1997 | Busch et al. | 340/905 |
| 5,745,865 | A | 4/1998 | Rostoker et al. | 701/117 |
| 5,774,569 | A | 6/1998 | Waldenmaier | 382/100 |
| 5,827,712 | A | 10/1998 | Yokoyama et al. | 435/193 |
| 5,884,212 | A | 3/1999 | Lion | 701/117 |
| 6,011,515 | A | 1/2000 | Radcliffe et al. | 342/453 |
| 6,092,020 | A | 7/2000 | Fastenrath et al. | 701/119 |
| 6,119,013 | A | 9/2000 | Maloney et al. | 455/456 |
| 6,150,961 | A | 11/2000 | Alewine et al. | 340/995 |
| 6,177,886 | B1 | 1/2001 | Billington et al. | 340/934 |
| 6,204,778 | B1 | 3/2001 | Bergan et al. | 340/936 |
| 6,266,608 | B1 | 7/2001 | Pertz | 701/200 |
| 6,292,742 | B1 | 9/2001 | Heimann et al. | 707/117 |
| 6,317,686 | B1 | 11/2001 | Ran | 701/201 |
| 6,401,027 | B1 | 6/2002 | Xu et al. | 701/117 |
| 6,453,230 | B1 | 9/2002 | Guerts | 701/117 |
| 6,459,365 | B2 | 10/2002 | Tamura | 340/425.5 |
| 6,463,382 | B1 | 10/2002 | Bullock | 701/117 |
| 6,466,862 | B1 | 10/2002 | DeKock et al. | 701/117 |
| 6,480,783 | B1 | 11/2002 | Myr | 701/117 |
| 6,490,519 | B1 | 12/2002 | Lapidot et al. | 701/117 |
| 6,496,773 | B1 | 12/2002 | Olsson | 701/117 |
| 6,505,114 | B2 | 1/2003 | Luciani | 701/117 |
| 6,574,548 | B2 | 6/2003 | DeKock et al. | 701/117 |
| 6,594,576 | B2 | 7/2003 | Fan et al. | 701/117 |
| 6,650,948 | B1 | 11/2003 | Atkinson et al. | 700/66 |
| 6,664,922 | B1 | 12/2003 | Fan | 342/357.1 |
| 6,728,628 | B2 | 4/2004 | Peterson | 701/117 |
| 6,781,523 | B2 | 8/2004 | Matsui et al. | 340/910 |
| 6,810,321 | B1 | 10/2004 | Cook | 701/117 |
| 6,832,140 | B2 | 12/2004 | Fan et al. | 701/33 |
| 6,842,620 | B2 | 1/2005 | Smith et al. | 455/456.1 |
| 6,862,524 | B1 | 3/2005 | Nagda et al. | 701/209 |
| 6,882,313 | B1 | 4/2005 | Fan et al. | 342/457 |
| 6,922,566 | B2 | 7/2005 | Puranik et al. | 455/456.2 |
| 6,973,319 | B2 | 12/2005 | Ormson | 455/456.1 |
| 6,989,765 | B2 | 1/2006 | Gueziec | 340/905 |
| 6,990,407 | B1 | 1/2006 | Mbekeani et al. | 701/117 |
| 7,026,958 | B2 | 4/2006 | Wainfan et al. | 340/995.13 |
| 7,027,915 | B2 | 4/2006 | Craine | 701/117 |
| 7,069,143 | B2 | 6/2006 | Peterson | 701/117 |
| 7,096,115 | B1 | 8/2006 | Groth et al. | 701/117 |
| 7,102,496 | B1 | 9/2006 | Ernst, Jr. et al. | 340/436 |
| 7,116,326 | B2 | 10/2006 | Soulchin et al. | 345/440 |
| 7,161,497 | B2 | 1/2007 | Gueziec | 340/905 |
| 7,197,500 | B1 | 3/2007 | Israni et al. | 707/100 |
| 7,221,287 | B2 | 5/2007 | Gueziec et al. | 340/905 |
| 7,375,649 | B2 | 5/2008 | Gueziec | 340/905 |
| 7,433,889 | B1 | 10/2008 | Barton | 707/104.1 |
| 7,508,321 | B2 | 3/2009 | Gueziec et al. | 340/905 |
| 7,519,564 | B2 | 4/2009 | Horvitz | 706/12 |
| 7,557,730 | B2 | 7/2009 | Gueziec | 340/905 |
| 7,610,145 | B2 | 10/2009 | Kantarjiev et al. | 701/204 |
| 7,706,965 | B2 | 4/2010 | Downs et al. | 701/117 |
| 7,912,628 | B2 * | 3/2011 | Chapman et al. | 701/117 |
| 2001/0029425 | A1 | 10/2001 | Myr | 701/200 |
| 2001/0047241 | A1 | 11/2001 | Khavakh et al. | 701/209 |
| 2002/0026278 | A1 | 2/2002 | Feldman et al. | 701/117 |
| 2002/0051464 | A1 | 5/2002 | Sin et al. | 370/466 |
| 2003/0028319 | A1 | 2/2003 | Khavakh et al. | 701/209 |
| 2003/0065805 | A1 | 4/2003 | Barnes, Jr. | 709/231 |
| 2003/0069683 | A1 | 4/2003 | Lapidot et al. | 701/117 |
| 2003/0201907 | A1 | 10/2003 | Thompson et al. | 340/917 |
| 2003/0225516 | A1 | 12/2003 | DeKock et al. | 701/214 |
| 2004/0030670 | A1 | 2/2004 | Barton | 707/1 |
| 2004/0034467 | A1 | 2/2004 | Sampedro et al. | 701/201 |
| 2004/0039516 | A1 | 2/2004 | Willenbrock | 701/117 |
| 2004/0039520 | A1 | 2/2004 | Khavakh et al. | 701/201 |
| 2004/0220728 | A1 | 11/2004 | Cayford | 701/209 |
| 2004/0249568 | A1 | 12/2004 | Endo et al. | 701/209 |
| 2004/0267440 | A1 | 12/2004 | DeKock et al. | 701/117 |
| 2005/0080555 | A1 | 4/2005 | Parupudi et al. | 701/200 |
| 2005/0131626 | A1 | 6/2005 | Ignatin | 701/117 |
| 2005/0131643 | A1 | 6/2005 | Shaffer et al. | 701/210 |
| 2005/0222751 | A1 | 10/2005 | Uyeki | 701/117 |
| 2005/0222763 | A1 | 10/2005 | Uyeki | 701/210 |
| 2005/0288856 | A1 | 12/2005 | Uyeki et al. | 701/210 |
| 2006/0041927 | A1 | 2/2006 | Stark et al. | 725/139 |
| 2006/0055565 | A1 | 3/2006 | Kawamata et al. | 340/995.13 |
| 2006/0074551 | A1 | 4/2006 | Zaitsu et al. | 701/209 |
| 2006/0103674 | A1 | 5/2006 | Horvitz et al. | 345/629 |
| 2006/0106530 | A1 | 5/2006 | Horvitz et al. | 701/117 |
| 2006/0106599 | A1 | 5/2006 | Horvitz | 704/219 |
| 2006/0106743 | A1 | 5/2006 | Horvitz | 706/21 |
| 2006/0122846 | A1 | 6/2006 | Burr et al. | 705/1 |
| 2006/0149461 | A1 | 7/2006 | Rowley et al. | 701/202 |
| 2006/0155464 | A1 | 7/2006 | Smartt | 701/208 |
| 2006/0224797 | A1 | 10/2006 | Parish et al. | 710/62 |
| 2006/0229802 | A1 | 10/2006 | Vertelney et al. | 701/200 |
| 2007/0005419 | A1 | 1/2007 | Horvitz et al. | 705/14 |
| 2007/0073477 | A1 | 3/2007 | Krumm et al. | 701/209 |
| 2007/0199050 | A1 | 8/2007 | Meier | 726/4 |
| 2007/0208492 | A1 | 9/2007 | Downs et al. | 701/117 |
| 2007/0208494 | A1 | 9/2007 | Chapman et al. | 701/117 |
| 2007/0208495 | A1 | 9/2007 | Chapman et al. | 701/117 |
| 2007/0208496 | A1 | 9/2007 | Downs et al. | 701/117 |
| 2007/0208497 | A1 | 9/2007 | Downs et al. | 701/117 |
| 2007/0208498 | A1 | 9/2007 | Barker et al. | 701/117 |
| 2007/0208501 | A1 | 9/2007 | Downs et al. | 709/119 |
| 2007/0219715 | A1 | 9/2007 | Uyeki et al. | 701/209 |
| 2008/0021791 | A1 | 1/2008 | Steelberg et al. | 705/26 |
| 2008/0046165 | A1 | 2/2008 | Downs et al. | 701/117 |
| 2008/0059115 | A1 | 3/2008 | Wilkinson | 702/179 |
| 2008/0071465 | A1 | 3/2008 | Chapman et al. | 701/117 |
| 2008/0071466 | A1 | 3/2008 | Downs et al. | 701/117 |
| 2008/0133517 | A1 | 6/2008 | Kapoor et al. | 707/6 |
| 2008/0275309 | A1 | 11/2008 | Stivoric et al. | 600/300 |
| 2008/0278328 | A1 | 11/2008 | Chand et al. | 340/572.1 |
| 2008/0303693 | A1 | 12/2008 | Link, II | 340/905 |
| 2009/0118996 | A1 | 5/2009 | Kantarjiev et al. | 701/119 |

FOREIGN PATENT DOCUMENTS

| | | |
|---|---|---|
| DE | 10063763 | 7/2002 |
| DE | 102004015880 | 11/2004 |
| JP | 2006090872 | 4/2006 |
| WO | 98/54682 | 12/1998 |
| WO | 2004/021305 | 3/2004 |
| WO | 2004/021306 | 3/2004 |
| WO | 2006/005906 | 1/2006 |

OTHER PUBLICATIONS

"Dash Navigation Unveils First Internet-Connected Auto Navigation Device," Sep. 26, 2006, Dash Navigation™, Inc., retrieved Aug. 3, 2007, from http://www.dash.net/news_pr-060925.php, 1 page.

"Inrix Advances Navigation with 'Nationwide Average Speeds'," Aug. 7, 2006, Inrix, Inc., retrieved Jul. 19, 2007, from http://www.inrix.com/news_NationwideAverageSpeeds_07Aug2006.asp, 1 page.

"INRIX Historical Traffic Improves Consumer Navigation Experience," Jul. 18, 2007, Inrix, Inc., retrieved Jul. 19, 2007, from http://www.inrix.com/news_NAS_18July2007.asp, 2 pages "LandSonar, Inc. Announces First-Ever Nationwide Traffic-Prediction Product," Jan. 22, 2006, LandSonar, Inc., retrieved Jul. 20, 2007, from http://www.landsonar.com/?p=55, 3 pages.

"NAVTEQ Launches NAVTEQ Traffic Patterns™ Database: Historic Traffic Data is the Basis for Predicting Traffic Behavior and Enhancing Routes," Jan. 5, 2007, NAVTEQ, retrieved Jul. 19, 2007, from http://www.navteq.com/webapps/NewsUserServlet?ction=ewsDetail&newsId=479, 2 pages.

"TrafficCast International and LandSonar Introduce LPS Plus," Mar. 1, 2007, LandSonar, Inc., retrieved Jul. 19, 2007, from http://www.landsonar.com/?p=117, 2 pages.

Hobeika, A.G., et al, "Traffic-Flow-Prediction Systems Based on Upstream Traffic," 1994, Vehicle Navigation and Information Systems Conference Proceedings, pp. 345-350.

"About LandSonar, Inc.," retrieved Apr. 27, 2006, from http://www.landsonar.com/?page_id=2, 2 pages.

"Award Abstract—#0349460—SBIR Phase II: Animated Real-Time Road Traffic Visualization for Broadcast and the Internet," National Science Foundation, retrieved Jul. 31, 2006, from http://www.nsf.gov/awardsearch/showAward.do?AwardNumber=0349460, 2 pages.

"Global Positioning Systems > Tracking Systems in the Yahoo! Directory," Yahoo!® Small Business Directory, retrieved Feb. 8, 2006, from http://dir.yahoo.com/Business_and_Economy/Business_to_Business/Navigation/Global_Positioning_Systems/Tracking_Systems, 8 pages.

"IntelliOne Launches Need4Speed, Two-Week Road Test of Groundbreaking Live Traffic Measurement and Reporting Technology," www.IntelliOne.com, Aug. 1, 2006, 2 pages.

"Powerful Tool Crunches Commutes," Mar. 8, 2005, National Science Foundation, retrieved Jan. 20, 2006, from http://www.beatthetraffic.com/aboutus/nsf20050308.htm, 2 pages.

"Seattle Area Traffic—Central Puget Sound Travel Times," Washington State Department of Transportation, retrieved Jan. 20, 2006, from http://www.wsdot.wa.gov/traffic/seattle/traveltimes/, 3 pages.

"Technology Overview," retrieved Apr. 27, 2006, from http://www.landsonar.com/?page_id=20, 3 pages.

BeatTheTraffic.com: The Right Traffic at the Right Time™, Homepage, retrieved Jan. 20, 2006, from http://www.beatthetraffic.com/, 1 page.

U.S. Appl. No. 60/628,267, filed Nov. 16, 2004, Horvitz.

Bluestein, G., "Traffic Jam? 2 Atlanta Companies Say Look to Your Cell Phone," The Mercury News, Nov. 5, 2006, downloaded Nov. 6, 2006, from http://www.mercury news.com/mld/mercurynews/news/breaking_news/15937597.htm, 3 pages.

Graham-Rowe, D., "Smart Traffic Forecast Offers Seven-Day Predictions," Jun. 29, 2005, NewScientist.com, retrieved Jan. 20, 2006, from http://www.newscientist.com/article.ns?id=dn7605&print=true, 2 pages.

Green, D., "Navigating by Phone," Apr. 28, 2004, Palo Alto Weekly Online Edition, retrieved Jul. 27, 2006, from http://www.paloaltoonline.com/weekly/morgue/2004/2004_04_28.zipdash28ja.shtml, 3 pages.

Slawski, W., "Ending Gridlock with Google Driving Assistance (Zipdash Re-Emerges)," Jul. 6, 2006, retrieved Jul. 27, 2006, from http://www.seobythesea.com/?p=240, 3 pages.

Smith, B. "OmniTRACS Keeps on Trucking," Dec. 1, 2005, WirelessWeek.com, retrieved Feb. 7, 2006, from http://www.wirelessweek.com/index.asp?layout=articlePrint&articleID=CA6287997, 2 pages.

Utter, D., "Google Mobilizes Traffic Data," Jul. 25, 2006, webpronews.com, retrieved Jul. 27, 2006, from http://www.webpronews.com/topnews/topnews/wpn-60-20060725GoogleMobilizesTrafficData.html, 3 pages.

* cited by examiner

Data Sample Outlier Elimination

| Excluded Sample | Speed | Data Sample Group | Data Sample Group Average Speed | Average Speed Deviation | Leave Out? |
|---|---|---|---|---|---|
| 1 | 26 | 2-10 | 25.7 | 0.02 | no |
| 2 | 31 | 1, 3-10 | 25.1 | 0.39 | no |
| 3 | 0 | 1-2, 4-10 | 28.6 | 2.44 | yes |
| 4 | 37 | 1-3, 5-10 | 24.4 | 0.88 | no |
| 5 | 33 | 1-4, 6-10 | 24.9 | 0.55 | no |
| 6 | 21 | 1-5, 7-10 | 26.2 | 0.35 | no |
| 7 | 30 | 1-6, 8-10 | 25.2 | 0.32 | no |
| 8 | 45 | 1-7, 9-10 | 23.6 | 1.61 | yes |
| 9 | 3 | 1-8, 10 | 28.2 | 2.01 | yes |
| 10 | 31 | 1-9 | 25.1 | 0.39 | no |

Average Speed for All 10 Samples = 25.7
Standard Deviation of All 10 Samples = 14.2

*Fig. 2C*

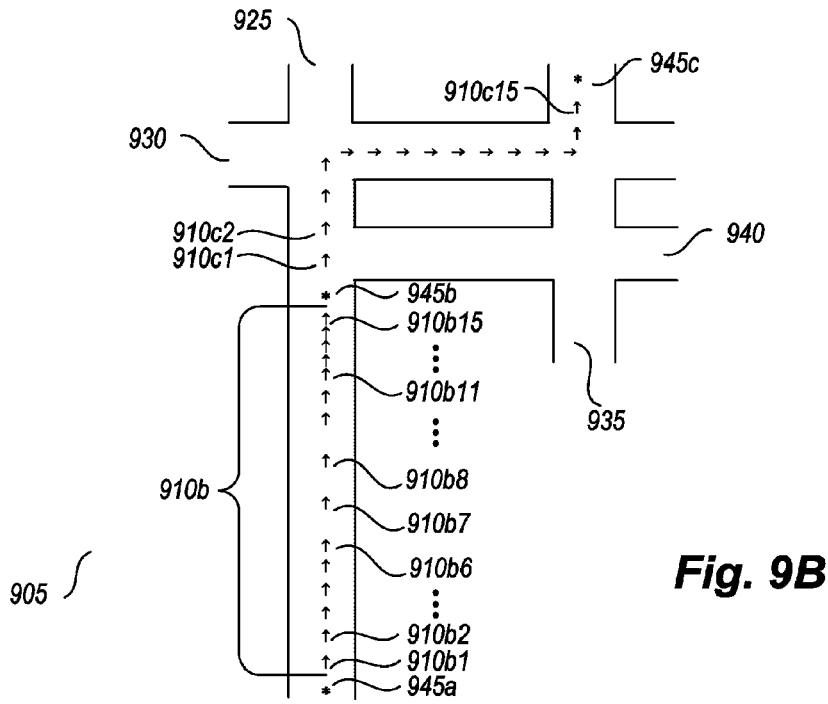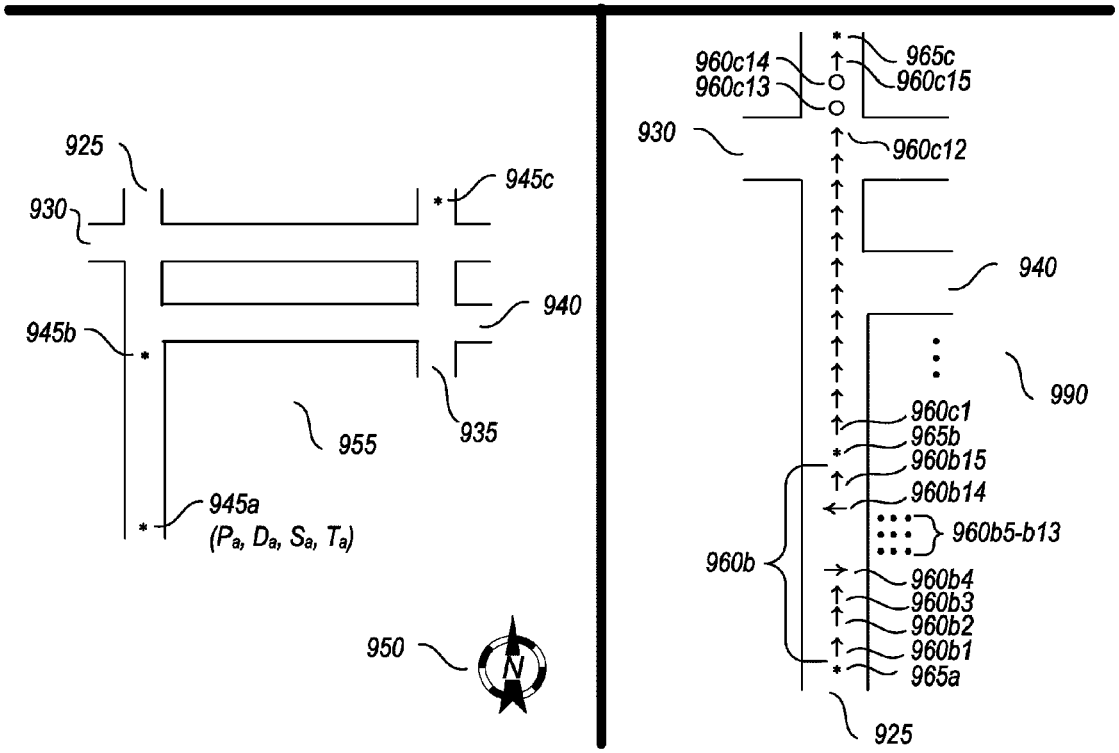
Fig. 9A  Fig. 9B  Fig. 9C

| Traffic Sensor ID | Traffic Sensor Data Reading Value | Time of Traffic Sensor Data Reading | Traffic Sensor State | ... |
|---|---|---|---|---|
| 123 | 34 mph | 10:25 AM 8/13/06 | -- | |
| 123 | 36 mph | 10:30 AM 8/13/06 | -- | |
| 123 | 42 mph | 10:35 AM 8/13/06 | -- | |
| 123 | 38 mph | 10:40 AM 8/13/06 | -- | |
| ... | | | | |
| 123 | 3 mph | 10:25 AM 8/14/06 | -- | |
| 123 | 74 mph | 10:30 AM 8/14/06 | -- | |
| 123 | 14 mph | 10:35 AM 8/14/06 | -- | |
| 123 | 63 mph | 10:40 AM 8/14/06 | -- | |
| ... | | | | |
| 129 | -- | 10:25 AM 8/13/06 | OFF | |
| 129 | -- | 10:30 AM 8/13/06 | OFF | |
| 129 | 54 mph | 10:35 AM 8/13/06 | OK | |
| ... | | | | |
| 134 | 13 mph | 10:00 AM 8/13/06 | STUCK | |
| 134 | 13 mph | 10:15 AM 8/13/06 | STUCK | |
| ... | | | | |
| 145 | 45 mph | 10:30 AM 8/13/06 | OK | |
| 145 | -- | 10:35 AM 8/13/06 | COM_DOWN | |
| 145 | -- | 10:40 AM 8/13/06 | OFF | |
| 145 | 38 mph | 10:45 AM 8/13/06 | OK | |
| ... | | | | |
| 166 | 316 cars | 10:00AM 8/14/06 | -- | |
| 166 | 389 cars | 10:02 AM 8/14/06 | -- | |
| ... | | | | |

| | Variable | Possible Values |
|---|---|---|
| 1614a | IsSchoolDay | true, false |
| 1614b | Precipitation | none, low, medium, high |
| 1614c | StadiumXEvtType | none, football, concert, soccer, other |
| 1614d | PercentBlackSegmentX-Y | [0, 1.0] |
| 1614e | BlackStartSegmentN | notblack, 0, 5, 10, 15, ..., 30 |
| 1614f | SegmentXColorY | green, yellow, red, black |
| 1614g | ... | |

Input Variables / Output Variables

| | IsSchool Day | Precip- itation | StadiumX EvtType | PercentBlack SegmentX-Y | ... | BlackStart SegmentN | Segment1 Color15 | Segment1 Color30 | ... | SegmentN Color180 |
|---|---|---|---|---|---|---|---|---|---|---|
| 1624a | true | none | soccer | 0.22 | | 0 | red | black | | yellow |
| 1624b | true | none | football | 0.05 | | notblack | green | red | | green |
| 1624c | false | low | none | 0.13 | | 15 | green | black | | black |
| 1624d | false | medium | concert | 0.07 | | 10 | yellow | yellow | | red |
| 1624e | false | high | other | 0.11 | | 5 | green | green | | yellow |
| 1624f | | | | | | notblack | green | | | |
| 1624g | true | none | none | 0.16 | | | green | green | | black |

1620

DETERMINING ROAD TRAFFIC CONDITIONS USING DATA FROM MULTIPLE DATA SOURCES

This application is a continuation of U.S. patent application Ser. No. 11/752,229, now U.S. Pat. No. 7,912,628, filed May 22, 2007 and entitled "Determining Road Traffic Conditions Using Data from Multiple Data Sources," which is hereby incorporated by reference in its entirety. U.S. patent application Ser. No. 11/752,229 is a continuation-in-part of U.S. patent application Ser. No. 11/367,463, filed Mar. 3, 2006 and entitled "Dynamic Time Series Prediction Of Future Traffic Conditions", now U.S. Pat. No. 7,813,870; is a continuation-in-part of U.S. patent application Ser. No. 11/431,980, filed May 11, 2006 and entitled "Identifying Unrepresentative Road Traffic Condition Data Obtained From Mobile Data Sources," now abandoned, which claims the benefit of provisional U.S. Patent Application No. 60/778, 946, filed Mar. 3, 2006 and entitled "Obtaining Road Traffic Condition Information From Mobile Data Sources," and the benefit of provisional U.S. Patent Application No. 60/789, 741, filed Apr. 5, 2006 and entitled "Assessing Road Traffic Conditions Using Data From Mobile Data Sources"; and is a continuation-in-part of U.S. patent application Ser. No. 11/540,342, filed Sep. 28, 2006 and entitled "Rectifying Erroneous Road Traffic Sensor Data," now U.S. Pat. No. 7,706, 965, which claims the benefit of U.S. Provisional Patent Application No. 60/838,700, filed Aug. 18, 2006 and entitled "Correcting Road Traffic Condition Data." Each of these applications is hereby incorporated by reference in its entirety.

U.S. patent application Ser. No. 11/752,229 also claims the benefit of provisional U.S. Patent Application No. 60/838, 700, filed Aug. 18, 2006 and entitled "Correcting Road Traffic Condition Data;" which is hereby incorporated by reference in its entirety.

U.S. patent application Ser. No. 11/752,229 is also related to U.S. patent application No. 11/473,861, now U.S. Pat. No. 7,912,627, filed Jun. 22, 2006 and entitled "Obtaining Road Traffic Condition Data From Mobile Data Sources"; to U.S. patent application Ser. No. 11/432,603, filed May 11, 2006 and entitled "Assessing Road Traffic Speed Using Data Obtained From Mobile Data Sources", now abandoned; to U.S. patent application Ser. No. 11/438,822, filed May 22, 2006 and entitled "Assessing Road Traffic Flow Conditions Using Data Obtained From Mobile Data Sources", now U.S. Pat. No. 7,831,380; to co-pending U.S. patent application Ser. No. 11/444,998, filed May 31, 2006 and entitled "Filtering Road Traffic Condition Data Obtained From Mobile Data Sources"; to U.S. patent application Ser. No. 11/556,648, filed Nov. 3, 2006 and entitled "Detecting Anomalous Road Traffic Conditions", now U.S. Pat. No. 7,899,611; and to U.S. patent application Ser. No. 11/556,670, filed Nov. 3, 2006 and entitled "Displaying Road Traffic Condition Information and User Controls", now abandoned; each of which is hereby incorporated by reference in its entirety.

TECHNICAL FIELD

The following disclosure relates generally to techniques for determining road traffic conditions based on data obtained from various data sources, such as by inferring current traffic-related information and/or predicting future traffic-related information for roads of interest based in part on data samples that reflect actual travel on those roads.

BACKGROUND

As road traffic has continued to increase at rates greater than increases in road capacity, the effects of increasing traffic congestion have had growing deleterious effects on business and government operations and on personal well-being. Accordingly, efforts have been made to combat the increasing traffic congestion in various ways, such as by obtaining information about current traffic conditions and providing the information to individuals and organizations. Such current traffic condition information may be provided to interested parties in various ways (e.g., via frequent radio broadcasts, an Internet Web site that displays a map of a geographical area with color-coded information about current traffic congestion on some major roads in the geographical area, information sent to cellular telephones and other portable consumer devices, etc.).

One source for obtaining information about current traffic conditions includes observations supplied by humans (e.g., traffic helicopters that provide general information about traffic, reports from drivers via cellphones, etc.), while another source in some larger metropolitan areas is networks of traffic sensors capable of measuring traffic for various roads in the area (e.g., via sensors embedded in the road pavement). While human-supplied observations may provide some value in limited situations, such information is typically limited to only a few areas at a time and typically lacks sufficient detail to be of significant use.

Traffic sensor networks can provide more detailed information about traffic conditions on some roads in some situations. However, various problems exist with respect to such information, as well as to information provided by other similar sources. For example, many roads do not have road sensors (e.g., geographic areas that do not have networks of road sensors and/or arterial roads that are not sufficiently large to have road sensors as part of a nearby network), and even roads that have road sensors may often not provide accurate data, which greatly diminishes the value of the data provided by the traffic sensors. One cause of inaccurate and/or unreliable data includes traffic sensors that are broken, and therefore provide no data, intermittent data, or data readings that are incorrect. Another cause of inaccurate and/or unreliable data includes temporary transmission problems in data from one or more sensors, resulting in intermittent delivery, delayed delivery, or no delivery of data. In addition, many traffic sensors are not configured or designed to report information about their operational status (e.g., whether they are functioning normally or not), and even if operational status information is reported it may be incorrect (e.g. reporting that they are functioning normally when in fact they are not), thus making it difficult or impossible to determine if data provided by the traffic sensors is accurate. Furthermore, some traffic-related information may be available only in raw and/or disaggregated form, and therefore may be of limited utility.

In addition, even if accurate and timely information about current traffic conditions was available, such current traffic conditions information does not indicate future traffic conditions of interest. Limited attempts have been made to generate and provide information about possible future traffic conditions, but such attempts have typically suffered from inaccuracies in the generated information, as well as various other problems. For example, some efforts to provide information about possible future traffic conditions have merely calculated and provided historical averages of accumulated data. While such historical averages may occasionally produce information for a particular place at a particular day and time that is temporarily similar to actual conditions, such historical averages cannot adapt to reflect specific current conditions that can greatly affect traffic (e.g., weather problems, traffic accidents, current road work, non-periodic events with large attendance, etc.), nor can they typically accommodate general changes over time in the amount of traffic, and thus the generated information can be of little practical use for planning purposes.

Thus, it would be beneficial to provide improved techniques for obtaining and assessing traffic-related information, such as to determine current traffic-related information and/or predicted future traffic-related information for roads of interest, as well as to provide various additional related capabilities and benefits.

BRIEF DESCRIPTION OF THE DRAWINGS

FIGS. 2A-2E illustrate examples of assessing road traffic conditions based at least in part on data obtained from vehicles and other mobile data sources.

FIGS. 9A-9C illustrate examples of actions of mobile data sources in obtaining and providing information about road traffic conditions.

FIGS. 10A-10B illustrate examples of rectifying data samples obtained from road traffic sensors.

FIGS. 16A-16J illustrate various graphical representations of predictive models for representing knowledge about traffic conditions in a given geographic area.

DETAILED DESCRIPTION

Figure 1:
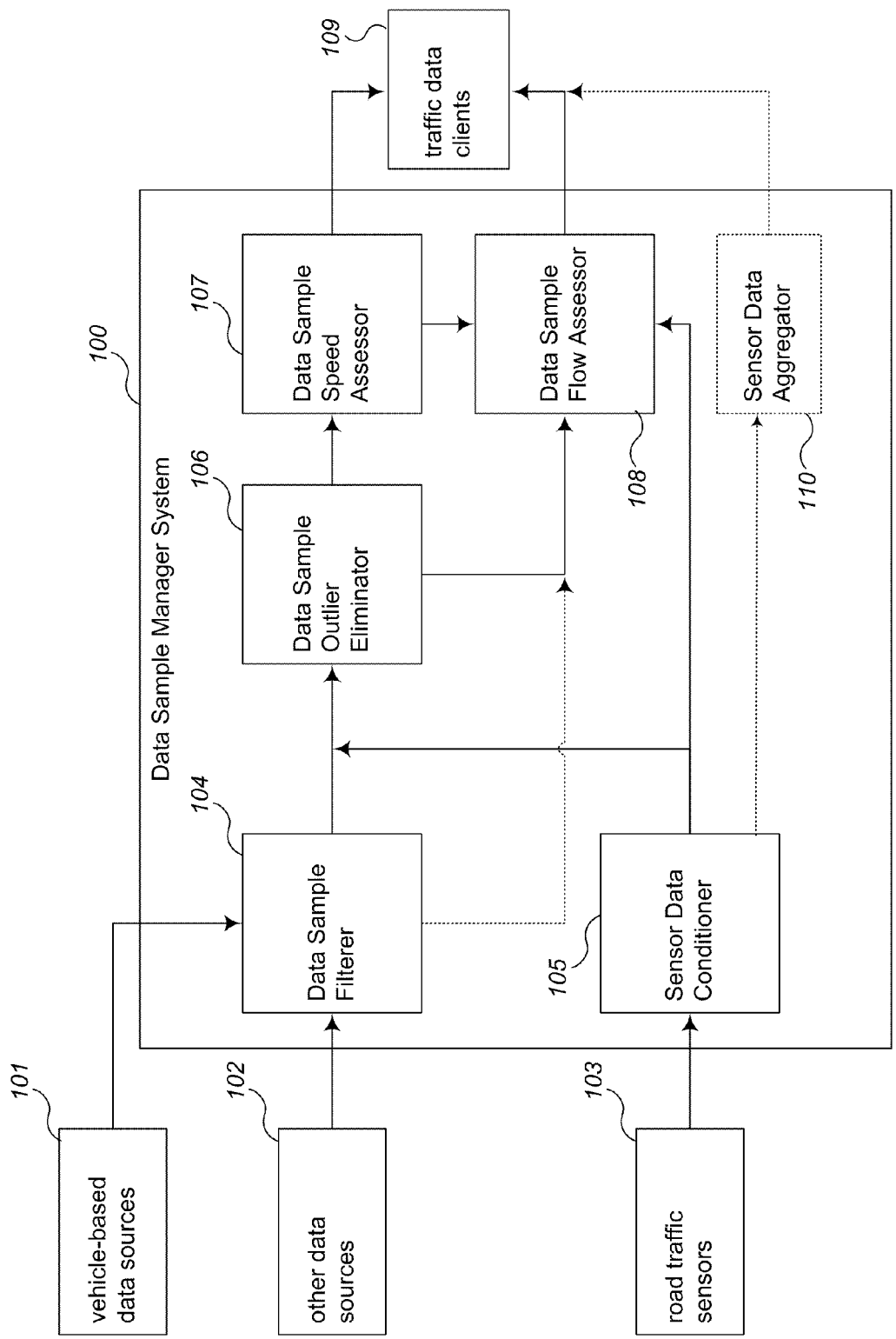
FIG. 1 is a block diagram illustrating data flow between components of an embodiment of a system for assessing road traffic conditions based at least in part on data obtained from vehicles and other mobile data sources.

Techniques are described for assessing road traffic conditions in various ways based on obtained traffic-related data, such as data samples from vehicles and other mobile data sources traveling on the roads and/or from road traffic sensors (e.g., physical sensors that are embedded in or otherwise near to the roads). The assessment of road traffic conditions based on obtained data samples (e.g., data readings from road traffic sensors, individual or aggregated data points from mobile data sources, etc.) may include various filtering and/or conditioning of the data samples, and various inferences and probabilistic determinations of traffic-related characteristics of interest.

As noted, in some embodiments obtained road traffic condition information data may include multiple data samples, including data samples provided by mobile data sources (e.g., vehicles), data readings from road-based traffic sensors (e.g., loop sensors embedded in road pavement), and data from other data sources. The data may be analyzed in various manners to facilitate determination of traffic condition characteristics of interest, such as estimated average traffic speed and estimated total volume of vehicles for particular portions of roads of interest, and to enable such traffic condition determinations to be performed in a realtime or near-realtime manner (e.g., within a few minutes of receiving the underlying data samples). For example, obtained data may be conditioned in various ways in order to detect and/or correct errors in the data. Obtained road traffic condition information data may further be filtered in various ways in various embodiments in order to remove data from consideration if it is inaccurate or otherwise unrepresentative of actual traffic condition characteristics of interest, including by identifying data samples that are not of interest based at least in part on roads with which the data samples are associated and/or data samples that are statistical outliers with respect to other data samples—in some embodiments, the filtering may further include performing the associating of the data samples with particular roads. The filtered data samples may further include data samples that otherwise reflect vehicle locations or activities that are not of interest (e.g., parked vehicles, vehicles circling in a parking lot or structure, etc.) and/or data samples that are otherwise unrepresentative of actual vehicle travel on roads of interest. Assessing obtained data may in at least some embodiments include determining traffic conditions (e.g., average traffic speed or other measurements of traffic flow) for various portions of a road network in a particular geographic area, based at least in part on obtained data samples. The assessed data may then be utilized in order to perform other functions related to analyzing, predicting, forecasting, and/or providing traffic-related information. In at least some embodiments, a data sample manager system uses at least some of the described techniques to prepare data for use by traffic data clients, such as a predictive traffic information provider system that generates multiple predictions of traffic conditions at multiple future times, as described in greater detail below.

In some embodiments, the conditioning of obtained data samples may include rectifying erroneous data samples, such as by detecting and/or correcting errors present in the data in various ways (e.g., for data readings received from road traffic sensors). In particular, techniques are described for assessing the "health" of particular data sources (e.g., road-based traffic sensors) in order to determine whether the data sources are operating correctly and reliably providing accurate data samples, such as based on analysis of the data samples provided by those data sources. For example, in some embodiments, current data readings provided by a given traffic sensor may be compared to past data readings provided by that traffic sensor (e.g., historical average data) in order to determine whether the current traffic data readings are significantly different than typical past data readings, such as may be caused by the traffic sensor operating incorrectly and/or other problems in the data, and/or may instead reflect unusual current traffic conditions. Such detection and analysis of possible errors with particular data sources and/or in current traffic data readings may be performed in various ways in various embodiments, as discussed in greater detail below, including based at least in part on classification techniques such as by using neural networks, Bayesian classifiers, decision trees, etc.

After detecting unreliable data samples, such as from broken data sources that are operating incorrectly, such unreliable data samples (as well as missing data samples) may be corrected or otherwise rectified in various ways. For example, missing and unreliable data samples for one or more data sources (e.g., traffic sensors) may be rectified in some embodiments by using one or more other sources of related information, such as via contemporaneous data samples from nearby or otherwise related traffic sensors that are operating correctly (e.g., by averaging data readings provided by adjacent traffic sensors), via predictive information related to the missing and unreliable data samples (e.g., by determining expected data readings for the one or more data sources using predicted and/or forecast traffic condition information for those data sources), via historical information for the one or more data sources (e.g., by utilizing historical average data readings), via adjustments to incorrect data samples using information about consistent bias or other types of errors causing errors that can be compensated for, etc. Additional details related to rectifying missing and unreliable data samples are included below.

In addition, techniques are described for further estimating traffic condition information in various other ways, such as in cases where currently available data may not allow rectification of data samples for a particular data source (e.g., a particular traffic sensor) to be reliably performed. For example, the presence of multiple nearby unhealthy traffic sensors that are operating incorrectly may result in there being insufficient data to assess traffic flow information with sufficient confidence for individual ones of those traffic sensors. In such cases, traffic condition information may be estimated in various other ways, including based on groups of related traffic sensors and/or other information related to the structure of a road network. For example, as described in greater detail below, each road of interest may be modeled or represented by the use of multiple road segments, each of which may have multiple associated traffic sensors and/or available data from one or more other data sources (e.g., mobile data sources). If so, road traffic condition information may be estimated for a particular road segment (or other group of multiple related traffic sensors) in various ways, such as by using traffic condition information assessed for neighboring road segments, predicted information for the particular road segment (e.g., that is generated for a limited future time period, such as three hours, based at least in part on current and recent conditions at a time of the predicting), forecast information for the particular road segment (e.g., that is generated for a longer future time period, such as two weeks or longer, in a manner that does not use some or all of the current and recent condition information used for predicting), historical average conditions for the particular road segment, etc. By utilizing such techniques, traffic condition information may be provided even in the presence of little or no current traffic condition data for one or more nearby traffic sensors or other data sources. Additional details related to such traffic condition information estimation are included below.

As previously noted, information about road traffic conditions may be obtained from mobile data sources in various manners in various embodiments. In at least some embodiments, the mobile data sources include vehicles on the road, which may each include one or more computing systems that provide data about movement of the vehicle. For example, each vehicle may include a GPS ("Global Positioning System") device and/or other geo-location device capable of determining the geographic location, speed, direction, and/or other data that characterizes or is otherwise related to the vehicle's travel, and one or more devices on the vehicle (whether the geo-location device(s) or a distinct communication device) may from time to time provide such data (e.g., by way of a wireless link) to one or more systems able to use the data (e.g., a data sample manager system, as described in more detail below). Such vehicles may include, for example, a distributed network of vehicles operated by individual unrelated users, fleets of vehicles (e.g., for delivery companies, taxi and bus companies, transportation companies, governmental bodies or agencies, vehicles of a vehicle rental service, etc.), vehicles that belong to commercial networks providing related information (e.g., the OnStar service), a group of vehicles operated in order to obtain such traffic condition information (e.g., by traveling over predefined routes, or by traveling over roads as dynamically directed, such as to obtain information about roads of interest), vehicles with on-board cellphone devices (e.g., as built-in equipment and/or in the possession of a vehicle occupant) capable of providing location information (e.g., based on GPS capabilities of the devices and/or based on geo-location capabilities provided by the cellular network), etc.

In at least some embodiments, the mobile data sources may include or be based on computing devices and other mobile devices of users who are traveling on the roads, such as users who are operators and/or passengers of vehicles on the roads. Such user devices may include devices with GPS capabilities (e.g., cellphones and other handheld devices), or location and/or movement information may instead be produced in other manners in other embodiments. For example, devices in vehicles and/or user devices may communicate with external systems that can detect and track information about devices (e.g., for devices passing by each of multiple transmitters/receivers in a network operated by the system), thus allowing location and/or movement information for the devices to be determined in various manners and with various levels of detail, or such external systems may otherwise be able to detect and track information about vehicles and/or users without interacting with devices (e.g., camera systems that can observe and identify license plates and/or users' faces). Such external systems may include, for example, cellular telephone towers and networks, other wireless networks (e.g., a network of Wi-Fi hotspots), detectors of vehicle transponders using various communication techniques (e.g., RFID, or "Radio Frequency Identification"), other detectors of vehicles and/or users (e.g., using infrared, sonar, radar or laser ranging devices to determine location and/or speed of vehicles), etc.

The road traffic condition information obtained from the mobile data sources may be used in various ways, whether alone or in combination with other road traffic condition information from one or more other sources (e.g., from road traffic sensors). In some embodiments, such road traffic condition information obtained from mobile data sources is used to provide information similar to that from road sensors but for roads that do not have functioning road sensors (e.g., for roads that lack sensors, such as for geographic areas that do not have networks of road sensors and/or for arterial roads that are not significantly large to have road sensors, for road sensors that are broken, etc.), to verify duplicative information that is received from road sensors or other sources, to identify road sensors that are providing inaccurate data (e.g., due to temporary or ongoing problems), etc. Moreover, road traffic conditions may be measured and represented in one or more of a variety of ways, whether based on data samples from mobile data sources and/or from traffic sensor data readings, such as in absolute terms (e.g., average speed; volume of traffic for an indicated period of time; average occupancy time of one or more traffic sensors or other locations on a road, such as to indicate the average percentage of time that a vehicle is over or otherwise activating a sensor; one of multiple enumerated levels of road congestion, such as measured based on one or more other traffic condition measures; etc.) and/or in relative terms (e.g., to represent a difference from typical or from maximum).

In some embodiments, some road traffic condition information may take the form of data samples provided by various data sources, such as data sources associated with vehicles to report travel characteristics of the vehicles. Individual data samples may include varying amounts of information. For example, data samples provided by mobile data sources may include one or more of a source identifier, a speed indication, an indication of a heading or direction, an indication of a location, a timestamp, and a status identifier. The source identifier may be a number or string that identifies the vehicle (or person or other device) acting as a mobile data source. In some embodiments, the mobile data source identifier may be permanently or temporarily (e.g., for the life of the mobile data source; for one hour; for a current session of use, such as to assign a new identifier each time that a vehicle or data source device is turned on; etc.) associated with the mobile data source. In at least some embodiments, source identifiers are associated with mobile data sources in such a manner as to minimize privacy concerns related to the data from the mobile data sources (whether permanently or temporarily associated), such as by creating and/or manipulating the source identifiers in a manner that prevents the mobile data source associated with an identifier from being identified based on the identifier. The speed indication may reflect the instant or average velocity of the mobile data source expressed in various ways (e.g., miles per hour). The heading may reflect a direction of travel and be an angle expressed in degrees or other measure (e.g., in compass-based headings or radians). The indication of location may reflect a physical location expressed in various ways (e.g., latitude/longitude pairs or Universal Transverse Mercator coordinates). The timestamp may denote the time at which a given data sample was recorded by the mobile data source, such as in local time or UTC ("Universal Coordinated Time") time. A status indicator may indicate the status of the mobile data source (e.g., that the vehicle is moving, stopped, stopped with engine running, etc.) and/or the status of at least some of the sensing, recording, and/or transmitting devices (e.g., low battery, poor signal strength, etc.).

In some embodiments, the network of roads in a given geographic region may be modeled or represented by the use of multiple road segments. Each road segment may be used to represent a portion of a road (or of multiple roads), such as by dividing a given physical road into multiple road segments (e.g., with each road segment being a particular length, such as a one-mile length of the road, or with road segments being selected to reflect portions of the road that share similar traffic condition characteristics)—such multiple road segments may be successive portions of the road, or may alternatively in some embodiments be overlapping or have intervening road portions that are not part of any road segments. In addition, a road segment may represent one or more lanes of travel on a given physical road. Accordingly, a particular multi-lane road that has one or more lanes for travel in each of two directions may be associated with at least two road segments, with at least one road segment associated with travel in one direction and with at least one other road segment associated with travel in the other direction. In addition, multiple lanes of a single road for travel in a single direction may be represented by multiple road segments in some situations, such as if the lanes have differing travel condition characteristics. For example, a given freeway system may have express or high occupancy vehicle ("HOV") lanes that may be beneficial to represent by way of road segments distinct from road segments representing the regular (e.g., non-HOV) lanes traveling in the same direction as the express or HOV lanes. Road segments may further be connected to or otherwise associated with other adjacent road segments, thereby forming a network of road segments.

In some embodiments, various types of information is used to generate predictions of future traffic conditions at multiple future times. In particular, in at least some embodiments, the predictions are generated using probabilistic techniques that incorporate various types of input data in order to repeatedly produce future time series predictions for each of numerous road segments, such as in a real-time manner based on changing current conditions for a network of roads in a given geographic area. Moreover, in at least some embodiments one or more predictive Bayesian or other models are automatically created for use in generating the future traffic condition predictions for each geographic area of interest, such as based on observed historical traffic conditions for those geographic areas. Predicted future traffic condition information may be used in a variety of ways to assist in travel and for other purposes, such as to plan optimal routes through a network of roads based on predictions about traffic conditions for the roads at multiple future times. In at least some embodiments, a predictive traffic information provider system uses the described techniques to generate such predictions, as described in greater detail elsewhere.

In some embodiments, the types of input data used to generate predictions of future traffic conditions may include a variety of current, past, and expected future conditions, and outputs from the prediction process include the generated predictions of the expected traffic conditions on each of multiple target road segments of interest for each of multiple future times (e.g., every 5, 15 or 60 minutes in the future) within a pre-determined time interval (e.g., three hours, or one day), as discussed in greater detail below. For example, types of input data may include the following: information about current and past amounts of traffic for various target road segments of interest in a geographic area, such as for a network of selected roads in the geographic area; information about current and recent traffic accidents; information about current, recent and future road work; information about current, past and expected future weather conditions (e.g., precipitation, temperature, wind direction, wind speed, etc.); information about at least some current, past and future scheduled events (e.g., type of event, expected start and end times of the event, and/or a venue or other location of the event, etc., such as for all events, events of indicated types, events that are sufficiently large, such as to have expected attendance above an indicated threshold (for example, 1000 or 5000 expected attendees), etc.); and information about school schedules (e.g., whether school is in session and/or the location of one or more schools). Moreover, current and predicted future traffic conditions may be measured and represented in one or more of a variety of ways, such as in absolute terms (e.g., average vehicle speed, volume of traffic for an indicated period of time; average occupancy time of one or more traffic sensors, such as to indicate the average percentage of time that a vehicle is over or otherwise activating the sensor; one of multiple enumerated levels of roadway congestion, such as measured based on one or more other traffic condition measures; etc.) and/or in relative terms (e.g., to represent a difference from typical or from maximum). In addition, while in some embodiments the multiple future times at which future traffic conditions are predicted are each points in time, in other embodiments such predictions may instead represent multiple time points (e.g., a period of time), such as by representing an average or other aggregate measure of the future traffic conditions during those multiple time points. Furthermore, some or all of the input data may be known and represented with varying degrees of certainty (e.g., expected weather), and additional information may be generated to represent degrees of confidence in and/or other metadata for the generated predictions. In addition, the prediction of future traffic conditions may be initiated for various reasons and at various times, such as in a periodic manner (e.g., every five minutes), when any or sufficient new input data is received, in response to a request from a user, etc.

Some of the same types of input data may be used to similarly generate longer-term forecasts of future traffic conditions (e.g., one week in the future, or one month in the future) in some embodiments, but such longer-term forecasts may not use some of the types of input data, such as information about current conditions at the time of the forecast generation (e.g., current traffic, weather, or other conditions). In addition, such longer-term forecasts may be generated less frequently than shorter-term predictions, and may be made so as to reflect different future time periods than for shorter-term predictions (e.g., for every hour rather than every 15 minutes).

The roads and/or road segments for which future traffic condition predictions and/or forecasts are generated may also be selected in various manners in various embodiments. In some embodiments, future traffic condition predictions and/or forecasts are generated for each of multiple geographic areas (e.g., metropolitan areas), with each geographic area having a network of multiple inter-connected roads—such geographic areas may be selected in various ways, such as based on areas in which current traffic condition information is readily available (e.g., based on networks of road sensors for at least some of the roads in the area) and/or in which traffic congestion is a significant problem. In some such embodiments, the roads for which future traffic condition predictions and/or forecasts are generated include those roads for which current traffic condition information is readily available, while in other embodiments the selection of such roads may be based at least in part on one or more other factors (e.g., based on size or capacity of the roads, such as to include freeways and major highways; based on the role the roads play in carrying traffic, such as to include arterial roads and collector roads that are primary alternatives to larger capacity roads such as freeways and major highways; based on functional class of the roads, such as is designated by the Federal Highway Administration; etc.). In other embodiments, future traffic condition predictions and/or forecasts may be made for a single road, regardless of its size and/or inter-relationship with other roads. In addition, segments of roads for which future traffic condition predictions and/or forecasts are generated may be selected in various manners, such as to treat each road sensor as a distinct segment; to group multiple road sensors together for each road segment (e.g., to reduce the number of independent predictions and/or forecasts that are made, such as by grouping specified numbers of road sensors together); to select road segments so as to reflect logically related sections of a road in which traffic conditions are typically the same or sufficiently similar (e.g., strongly correlated), such as based on traffic condition information from traffic sensors and/or from other sources (e.g., data generated from vehicles and/or users that are traveling on the roads, as discussed in greater detail below); etc.

In addition, future traffic condition prediction and/or forecast information may be used in a variety of ways in various embodiments, as discussed in greater detail below, including to provide such information to users and/or organizations at various times (e.g., in response to requests, by periodically sending the information, etc.) and in various ways (e.g., by transmitting the information to cellular telephones and/or other portable consumer devices; by displaying information to users, such as via Web browsers and/or application programs; by providing the information to other organizations and/or entities that provide at least some of the information to users, such as third parties that perform the information providing after analyzing and/or modifying the information; etc.). For example, in some embodiments, the prediction and/or forecast information is used to determine suggested travel routes and/or times, such as an optimal route between a starting location and an ending location over a network of roads and/or an optimal time to perform indicated travel, with such determinations based on predicted and/or forecast information at each of multiple future times for one or more roads and/or road segments.

FIG. 1 is a block diagram illustrating data flow between components of an embodiment of a Data Sample Manager system. The illustrated data flow diagram is intended to reflect a logical representation of data flow between data sources, components of an embodiment of a Data Sample Manager system, and traffic data clients. That is, actual data flow may occur via a variety of mechanisms including direct flows (e.g., implemented by parameter passing or network communications such as messages) and/or indirect flows via one or more database systems or other storage mechanisms, such as file systems. The illustrated Data Sample Manager system 100 includes a Data Sample Filterer component 104, a Sensor Data Conditioner component 105, a Data Sample Outlier Eliminator component 106, a Data Sample Speed Assessor component 107, a Data Sample Flow Assessor component 108, and an optional Sensor Data Aggregator component 110.

In the illustrated embodiment, the components 104-108 and 110 of the Data Sample Manager system 100 obtain data samples from various data sources, including vehicle-based data sources 101, road traffic sensors 103, and other data sources 102. Vehicle-based data sources 101 may include multiple vehicles traveling on one or more roads, which may each include one or more computing systems and/or other devices that provide data about the travel of the vehicle. As described in more detail elsewhere, each vehicle may include GPS and/or other geo-location devices capable of determining location, speed, and/or other data related to the vehicle's travel. Such data may be obtained by the components of the described Data Sample Manager system by wireless data links (e.g., satellite uplink and/or cellular network) or in other manners (e.g., via a physical wired/cabled connection that is made after a vehicle arrives at the location with the physical location, such as when a fleet vehicle returns to its home base). Road traffic sensors 102 may include multiple sensors that are installed in, at, or near various streets, highways, or other roads, such as loop sensors embedded in the pavement that are capable of measuring the number of vehicles passing above the sensor per unit time, vehicle speed, and/or other data related to traffic flow. Data may similarly be obtained from the road traffic sensors 102 via wire-based or wireless-based data links. Other data sources 103 may include a variety of other types of data sources, including map services and/or databases that provide information regarding road networks such as the connections between roads as well as traffic control information related to such roads (e.g., the existence and/or location of traffic control signals and/or speed zones).

Although the illustrated data sources 101-103 in this example provide data samples directly to various components 104-108 and 110 of the Data Sample Manager system 100, the data samples may instead be processed in various ways in other embodiments prior to their provision to those components. Such processing may include organizing and/or aggregating data samples into logical collections based on time, location, geographic region, and/or the identity of the individual data source (e.g., vehicle, traffic sensor, etc.). In addition, such processing may include merging or otherwise combining data samples into higher-order, logical data samples or other values. For example, data samples obtained from multiple geographically co-located road traffic sensors may be merged into a single, logical data sample by way of averaging or other aggregation. Furthermore, such processing may include deriving or otherwise synthesizing data samples or elements of data samples based on one or more obtained data samples. For example, in some embodiments, at least some vehicle-based data sources may each provide data samples that include only a source identifier and a geographic location, and if so groups of multiple distinct data samples provided periodically over a particular time interval or other time period can thereby be associated with one another as having been provided by a particular vehicle. Such groups of data samples may then be further processed in order to determine other travel-related information, such as a heading for each data sample (e.g. by calculating the angle between the position of a data sample and the position of a prior and/or subsequent data sample) and/or a speed for each data sample (e.g., by calculating the distance between the position of a data sample and the position of a prior and/or subsequent data sample, and by dividing the distance by the corresponding time).

The Data Sample Filterer component 104 obtains data samples from the vehicle-based data sources 101 and the other data sources 102 in the illustrated embodiment, and then filters the obtained data samples before providing them to the Data Sample Outlier Eliminator component 106 and optionally to the Data Sample Flow Assessor component 108. As discussed in greater detail elsewhere, such filtering may include associating data samples with road segments corresponding to roads in a geographic area and/or identifying data samples that do not correspond to road segments of interest or that otherwise reflect vehicle locations or activities that are not of interest. Associating data samples with road segments may include using the reported location and/or heading of each data sample to determine whether the location and heading correspond to a previously defined road segment. Identifying data samples that do not correspond to road segments of interest may include removing or otherwise identifying such data samples so that they will not be modeled, considered, or otherwise processed by other components of the Data Sample Manager system 100—such data samples to be removed may include those corresponding to roads of certain functional road classes (e.g., residential streets) that are not of interest, those corresponding to particular roads or road segments that are not of interest, those corresponding to portions or sections of roads that are not of interest (e.g., ramps and collector/distributor lanes/roads for freeways), etc. Identifying data samples that otherwise reflect vehicle locations or activities that are not of interest may include identifying data samples corresponding to vehicles that are in an idle state (e.g., parked with engine running), that are driving in a parking structure (e.g., circling at a very low speed), etc. In addition, filtering may in some embodiments include identifying road segments that are (or are not) of interest for presentation or further analysis. For example, such filtering may include analyzing variability of traffic flow and/or level of congestion of various road segments within a particular time period (e.g., hour, day, week), such as to exclude some or all road segments with low intra-time period variability and/or low congestion (e.g., for road segments for which sensor data readings are not available or whose functional road class otherwise indicates a smaller or less-traveled road) from further analysis as being of less interest than other roads and road segments.

The Sensor Data Conditioner component 105 assists in rectifying erroneous data samples, such as by detecting and correcting errors in readings obtained from the road traffic sensors 103. In some embodiments, data samples that are detected by the Sensor Data Conditioner component as being unreliable are not forwarded on to other components for use (or indications of the unreliability of particular data samples are provided so that the other components can handle those data samples accordingly), such as to the Data Sample Outlier Eliminator component 106. If so, the Data Sample Outlier Eliminator component may then determine whether sufficient reliable data samples are available, and initiate corrective action if not. Alternatively, in some embodiments and circumstances, the Sensor Data Conditioner component may further perform at least some corrections to the data samples, as discussed in greater detail below, and then provide the corrected data to the Sensor Data Aggregator component 110 (and optionally to other components such as the Data Sample Outlier Eliminator component and/or the Data Sample Flow Assessor component). Detecting erroneous data samples may use various techniques, including statistical measures that compare the distribution of current data samples reported by a given road traffic sensor to the historical distribution of data samples reported by that road traffic sensor during a corresponding time period (e.g., same day-of-week and time-of-day). The extent to which the actual and historical distributions differ may be calculated by statistical measures, such as the Kullback-Leibler divergence, which provides a convex measure of the similarity between two probability distributions, and/or by statistical information entropy. In addition, some road sensors may report indications of sensor health, and such indications may also be utilized to detect errors in obtained data samples. If errors are detected in obtained data samples, erroneous data samples may be rectified in various ways, including by replacing such data samples with averages of adjacent (e.g., neighbor) data samples from adjacent/neighbor road sensors that have not been determined to be erroneous. In addition, erroneous data samples may be rectified by instead using previously or concurrently forecasted and/or predicted values, such as may be provided by a predictive traffic information system. Additional details regarding predictive traffic information systems are provided elsewhere.

The Data Sample Outlier Eliminator component 106 obtains filtered data samples from the Data Sample Filterer component 104 and/or conditioned or otherwise rectified data samples from the Sensor Data Conditioner component 105, and then identifies and eliminates from consideration those data samples that are not representative of actual vehicle travel on the roads and road segments of interest. In the illustrated embodiment, for each road segment of interest, the component analyzes a group of data samples that were recorded during a particular time period and associated with the road segment (e.g., by the Data Sample Filterer component 104) in order to determine which, if any, should be eliminated. Such determinations of unrepresentative data samples may be performed in various ways, including based on techniques that detect data samples that are statistical outliers with respect to the other data samples in the group of data samples. Additional details regarding data sample outlier elimination are provided elsewhere.

The Data Sample Speed Assessor component 107 obtains data samples from the Data Sample Outlier Eliminator component 106, such that the obtained data samples in the illustrated embodiment are representative of actual vehicle travel on the roads and road segments of interest. The Data Sample Speed Assessor component 107 then analyzes the obtained data samples to assess one or more speeds for road segments of interest for at least one time period of interest based on a group of the data samples that have been associated with the road segment (e.g., by the Data Sample Filterer component 104, or by readings from traffic sensors that are part of the road segment) and the time period. In some embodiments, the assessed speed(s) may include an average of the speeds for multiple of the data samples of the group, possibly weighted by one or more attributes of the data samples (e.g., age, such as to give greater weight to newer data samples, and/or source or type of the data samples, such as to vary the weight for data samples from mobile data sources or from road sensors so as to give greater weight to sources with higher expected reliability or availability) or by other factors. More details regarding speed assessment from data samples are provided elsewhere.

The Data Sample Flow Assessor component 108 assesses traffic flow information for road segments of interest for at least one time period of interest, such as to assess traffic volume (e.g., expressed as a total or average number of vehicles arriving at or traversing a road segment over a particular amount of time, such as per minute or hour), to assess traffic density (e.g., expressed as an average or total number of vehicles per unit of distance, such as per mile or kilometer), to assess traffic occupancy (e.g., expressed as an average or total amount of time that vehicles occupy a particular point or region over a particular amount of time, such as per minute or hour), etc. The assessment of the traffic flow information in the illustrated embodiment is based at least in part on traffic speed-related information provided by the Data Sample Speed Assessor component 107 and the Data Sample Outlier Eliminator component 106, and optionally on traffic data sample information provided by the Sensor Data Conditioner component 105 and the Data Sample Filterer component 104. Additional details regarding data sample flow assessment are provided elsewhere.

If present, the Sensor Data Aggregator component 110 aggregates sensor-based traffic condition information provided by the Sensor Data Conditioner component 105, such as after the Sensor Data Conditioner component has removed any unreliable data samples and/or has rectified any missing and/or unreliable data samples. Alternatively, in other embodiments the Sensor Data Aggregator component may instead perform any such removal and/or correction of missing and/or unreliable data samples. In some cases, the Sensor Data Aggregator component 110 may provide traffic flow information for each of various road segments by aggregating (e.g., averaging) information provided by the multiple individual traffic sensors associated with each of those road segments. As such, when present, the Sensor Data Aggregator component 110 may provide information that is complementary to assessed traffic condition information provided by components such as the Data Sample Speed Assessor component 107 and/or the Data Sample Flow Assessor component 108, or may instead be used if data samples from mobile data sources are not available at all or in sufficient quantity of reliable data samples to allow other components such as the Data Sample Speed Assessor component 107 and Data Sample Flow Assessor component 108 to provide accurate assessed road traffic condition information.

The one or more traffic data clients 109 in the illustrated embodiment obtain assessed road traffic condition information (e.g., speed and/or flow data) provided by the Data Sample Speed Assessor component 107 and/or the Data Sample Flow Assessor component 108, and may utilize such data in various ways. For example, traffic data clients 109 may include other components and/or traffic information systems operated by the operator of the Data Sample Manager system 100, such as a predictive traffic information provider system that utilizes traffic condition information in order to generate predictions of future traffic conditions at multiple future times, and/or a realtime (or near-realtime) traffic information presentation or provider system that provides realtime (or near-realtime) traffic condition information to end-users and/or third-party clients. In addition, traffic data clients 109 may include computing systems operated by third parties in order to provide traffic information services to their customers. In addition, the one or more traffic data clients 109 may optionally in some circumstances (e.g., in instances when insufficient data is available for the Data Sample Speed Assessor component and/or Data Sample Flow Assessor component to perform accurate assessments, and/or if no data is available from vehicle-based or other data sources) obtain road traffic condition information provided by the Sensor Data Aggregator component 110, whether instead of or in addition to data from the Data Sample Speed Assessor component and/or Data Sample Flow Assessor component.

For illustrative purposes, some embodiments are described below in which specific types of road traffic conditions are assessed in specific ways, and in which such assessed traffic information is used in various specific ways. However, it will be understood that such road traffic condition assessments may be generated in other manners and using other types of input data in other embodiments, that the described techniques can be used in a wide variety of other situations, and that the invention is thus not limited to the exemplary details provided.

Figure 2A:
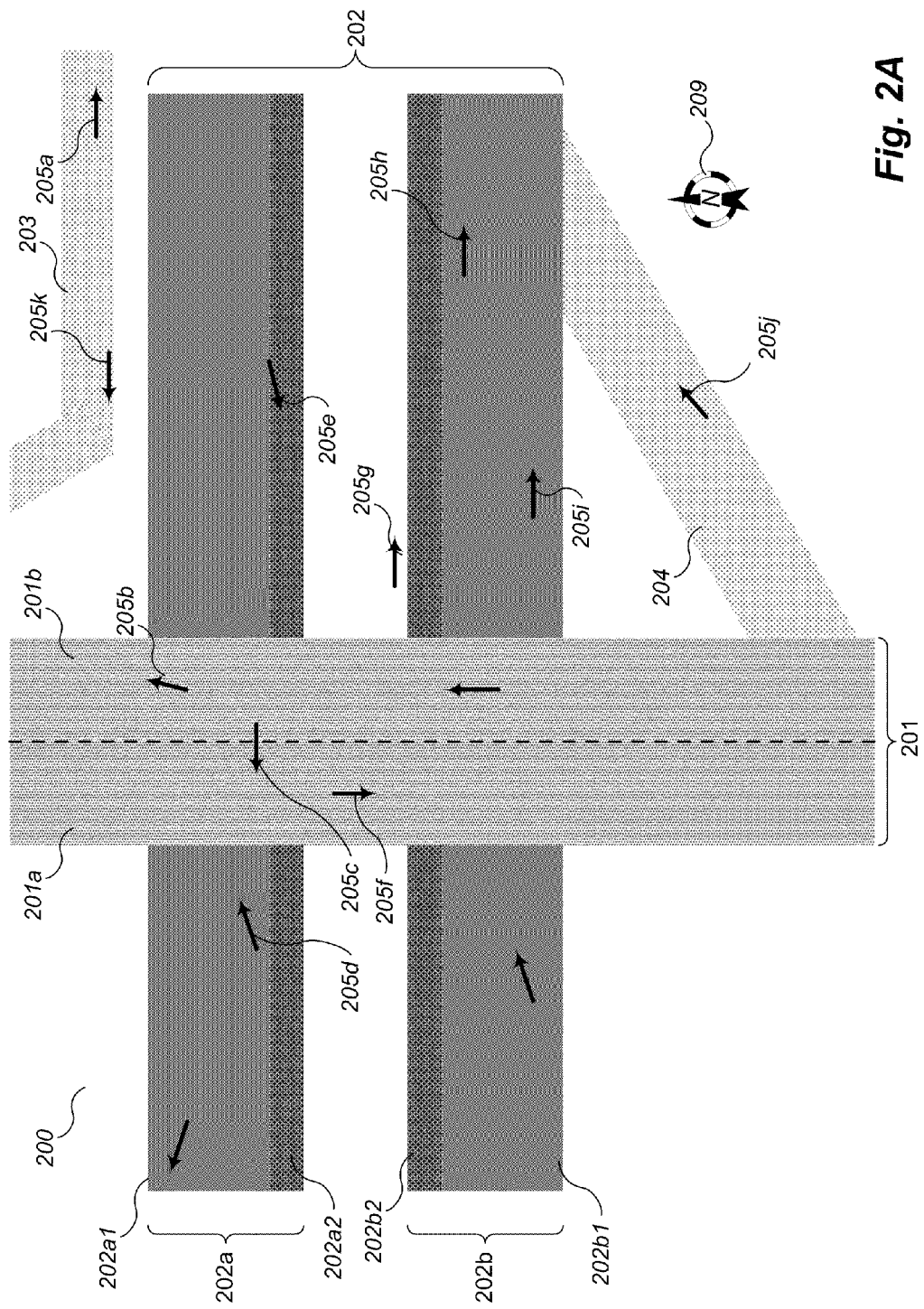

FIGS. 2A-2E illustrate examples of assessing road traffic conditions based on data obtained from vehicles and other mobile data sources, such as may be performed by an embodiment of the described Data Sample Manager system. In particular, FIG. 2A illustrates an example of data sample filtering for an example area 200 with several roads 201, 202, 203, and 204, and with a legend indication 209 indicating the direction of north. In this example, road 202 is a divided, limited access road such as a freeway or toll road, with two distinct groups of lanes 202a and 202b for vehicle travel in the west and east directions, respectively. Lane group 202a includes an HOV lane 202a2 and multiple other regular lanes 202a1, and lane group 202b similarly includes an HOV lane 202b2 and multiple other regular lanes 202b1. Road 201 is an arterial road with two lanes 201a and 201b for vehicle travel in the south and north directions, respectively. Road 201 passes over road 202 (e.g., via an overpass or bridge), and road 204 is an on-ramp that connects the northbound lane 201b of road 201 to the eastbound lane group 202b of road 202. Road 203 is a local frontage road adjoining road 202.

The roads depicted in FIG. 2A may be represented in various ways for use by the described Data Sample Manager system. For example, one or more road segments may be associated with each physical road, such as to have northbound and southbound road segments associated with the northbound lane 201b and southbound lane 201b, respectively. Similarly, at least one westbound road segment and at least one eastbound road segment may be associated with the westbound lane group 202a and the eastbound lane group 202b of road 202, respectively. For example, the portion of the eastbound lane group 202b east of road 201 may be a separate road segment from the portion of the eastbound lane group 202b west of road 201, such as based on the road traffic conditions typically or often varying between the road portions (e.g., due to a typically significant influx of vehicles to lane group 202b east of road 201 from the on-ramp 204, such as that may typically cause greater congestion in lane group 202b to the east of road 201). In addition, one or more lane groups may be decomposed into multiple road segments, such as if different lanes typically or often have differing road traffic condition characteristics (e.g., to represent any given portion of lane group 202b as a first road segment corresponding to lanes 202b1 based on those lanes sharing similar traffic condition characteristics, and as a second road segment corresponding to HOV lane 202b2 due to its differing traffic condition characteristics)—in other such situations, only a single road segment may be used for such a lane group, but some data samples (e.g., those corresponding to HOV lane 202b2) may be excluded from use (such as by a Data Sample Filterer component and/or a Data Sample Outlier Eliminator component) when assessing road traffic conditions for the lane group. Alternatively, some embodiments may represent multiple lanes of a given road as a single road segment, even if the lanes are used for travel in opposite directions, such as if the road traffic conditions are typically similar in both directions—for example, frontage road 205a may have two opposing lanes of travel, but may be represented by a single road segment. Road segments may be determined at least in part in a variety of other ways in at least some embodiments, such as to be associated with geographic information (e.g., physical dimensions and/or heading(s)) and/or traffic-related information (e.g., speed limits).

FIG. 2A further depicts multiple data samples 205a-k reported by multiple mobile data sources (e.g., vehicles, not shown) traveling in the area 200 during a particular time interval or other time period (e.g. 1 minute, 5 minutes, 10 minutes, 15 minutes, etc.). Each of the data samples 205a-k is depicted as an arrow that indicates a heading for the data sample, as reported by one of the multiple mobile data sources. The data samples 205a-k are superimposed upon the area 200 in such a manner as to reflect locations reported for each of the data samples (e.g., expressed in units of latitude and longitude, such as based on GPS readings), which may differ from the actual locations of the vehicle when that data sample was recorded (e.g., due to an inaccurate or erroneous reading, or due to a degree of variability that is inherent for the location sensing mechanism used). For example, data sample 205g shows a location that is slightly north of the road 202b, which may reflect a vehicle that was pulled over off the north side of lane 202b2 (e.g., because of a mechanical malfunction), or it instead may reflect an inaccurate location for a vehicle that was in fact traveling in the eastbound direction in lane 202b2 or other lane. In addition, a single mobile data source may be the source of more than one of the illustrated data samples, such as if both sample 205i and sample 205h were reported by a single vehicle based on its travel eastbound along road 202 during the time period (e.g., via a single transmission containing multiple data samples for multiple prior time points, such as to report data samples every 5 minutes or every 15 minutes). More details regarding storing and providing multiple acquired data samples are included below.

The described Data Sample Manager system may in some embodiments, filter the obtained data samples, such as to map data samples to predefined road segments and/or identify data samples that do not correspond to such road segments of interest. In some embodiments, a data sample will be associated with a road segment if its reported location is within a predetermined distance (e.g., 5 meters) of the location of a road and/or lane(s) corresponding to the road segment and if its heading is within a predetermined angle (e.g., plus or minus 15 degrees) of the heading of the road and/or lanes(s) corresponding to the road segment. Road segments in the illustrated embodiment are associated with sufficient location-based information (e.g., heading of the road segment, physical bounds of the road segment, etc.) to make such a determination, although in other embodiments the association of data samples to road segments may be performed before the data samples are made available to the Data Sample Manager system.

As an illustrative example, data sample 205a may be associated with a road segment corresponding to road 203, because its reported location falls within the bounds of road 203 and its heading is the same (or nearly the same) as at least one of the headings associated with road 203. In some embodiments, when a single road segment is utilized to represent multiple lanes some of which are traveling in opposite directions, the heading of a data sample may be compared to both headings of the road segment in order to determine whether the data sample may be associated with the road segment. For example, data sample 205k has a heading approximately opposite that of data sample 205a, but it may also be associated with the road segment corresponding to road 203, if that road segment is utilized to represent the two opposing lanes of road 203.

However, due to the proximity of road 203 and lane group 202a, it may also be possible that data sample 205k reflects a vehicle traveling in lane group 202a, such as if the reported location of data sample 205k is within a margin of error for locations of vehicles traveling in one or more of the lanes of lane group 202a, since the heading of data sample 205k is the same (or nearly the same) as the heading of lane group 202a. In some embodiments, such cases of multiple possible road segments for a data sample may be disambiguated based on other information associated with the data sample—for example, in this case, an analysis of the reported speed of data sample 205k may be used to assist in the disambiguation, such as if lane group 202a corresponds to a freeway with a 65 mph speed limit, road 203 is a local frontage road with a 30 mph speed limit, and a reported speed of the data sample is 75 mph (resulting in an association with the freeway lane(s) being much more likely than an association with the local frontage road). More generally, if the reported speed of data sample 205k is more similar to the observed or posted speed for road 203 than to the observed or posted speed for lane group 202a, such information may be used as part of determining to associate the data sample with road 203 and not lane group 202a. Alternatively, if the reported speed of data sample 205k is more similar to the observed or posted speed for lane group 202a than to the observed or posted speed for road 203, it may be associated with lane group 202a and not road 203. Other types of information may similarly be used as part of such disambiguation (e.g., location; heading; status; information about other related data samples, such as other recent data samples from the same mobile data source; etc.), such as part of a weighted analysis to reflect a degree of match for each type of information for a data sample to a candidate road segment.

For example, with respect to associating data sample 205b to an appropriate road segment, its reported location occurs at an overlap between lane 201b and lane group 202a, and is near lane 201a as well as other roads. However, the reported heading of the data sample (approximately northbound) matches the heading of lane 201b (northbound) much more closely than that of other candidate lanes/roads, and thus it will likely be associated with the road segment corresponding to lane 201b in this example. Similarly, data sample 205c includes a reported location that may match multiple roads/lanes (e.g., lane 201a, lane 201b, and lane group 202a), but its heading (approximately westbound) may be used to select a road segment for lane group 202a as the most appropriate road segment for the data sample.

Continuing with this example, data sample 205d may not be associated with any road segment, because its heading (approximately eastbound) is in the opposite direction as that of lane group 202a (westbound) whose position corresponds to the data sample's reported location. If there are no other appropriate candidate road segments that are near enough (e.g., within a predetermined distance) to the reported location of data sample 205d, such as if lane group 202b with a similar heading is too far way, this data sample may be excluded during filtering from subsequent use in analysis of the data samples.

Data sample 205e may be associated with a road segment corresponding to lane group 202a, such as a road segment corresponding to HOV lane 202a2, since its reported location and heading correspond to the location and heading of that lane, such as if a location-based technique used for the location of the data sample has sufficient resolution to differentiate between lanes (e.g., differential GPS, infrared, sonar, or radar ranging devices). Data samples may also be associated with a particular lane of a multi-lane road based on factors other than location-based information, such as if the lanes have differing traffic condition characteristics. For example, in some embodiments the reported speed of a data sample may be used to fit or match the data sample to a particular lane by modeling an expected distribution (e.g., a normal or Gaussian distribution) of observed speeds (or other measures of traffic flow) of data samples for each such candidate lane and determining a best fit for the data sample to the expected distributions. For example, data sample 205e may be associated with the road segment corresponding to HOV lane 202a2 because the reported speed of that data sample is closer to an observed, inferred or historical average speed of vehicles traveling in HOV lane 202a2 than to an observed, inferred or historical average speed for vehicles traveling in regular lanes 202a1, such as by determining an observed or inferred average speed based on other data samples (e.g., using data readings provided by one or more road traffic sensors) and/or analysis of other related current data.

In a similar manner, data samples 205f, 205h, 205i, and 205j may be associated with the road segments corresponding to lane 201a, lanes 202b1, lanes 202b1, and ramp 204, respectively, because their reported locations and headings correspond to the locations and headings of those roads or lanes.

Data sample 205g may be associated with a road segment corresponding to lane group 202b (e.g., a road segment for HOV lane 202b2) even though its reported location is outside of the bounds of the illustrated road, because the reported location may be within the predetermined distance (e.g., 5 meters) of the road. Alternatively, data sample 205g may not be associated with any road segment if its reported location is sufficiently far from the road. In some embodiments, different predetermined distances may be used for data samples provided by different data sources, such as to reflect a known or expected level of accuracy of the data source. For example, data samples provided by mobile data sources that utilize uncorrected GPS signals may use a relatively high (e.g., 30 meters) predetermined distance, whereas data samples provided by mobile data sources utilizing differential-corrected GPS devices may be compared using a relatively low (e.g., 1 meter) predetermined distance.

In addition, data sample filtering may include identifying data samples that do not correspond to road segments of interest and/or are unrepresentative of actual vehicle travel on the roads. For instance, some data samples may be removed from consideration because they have been associated with roads that are not being considered by the Data Sample Manager system. For example, in some embodiments, data samples associated with roads of lesser functional road classes (e.g., residential streets and/or arterials) may be filtered. Referring back to FIG. 2A, for example, data samples 205a and/or 205k may be filtered because road 203 is a local frontage road that is of a sufficiently low functional classification to not be considered by the Data Sample Manager system, or data sample 205j may be filtered because the on-ramp is too short to be of interest separate from the freeway. Filtering may further be based on other factors, such as inferred or reported activity of mobile data sources relative to the inferred or reported activity of other mobile data sources on one or more road segments. For example, a series of data samples associated with a road segment and provided by a single mobile data source that all indicate the same location likely indicates that the mobile data source has stopped. If all other data samples associated with the same road segment indicate moving mobile data sources, the data samples corresponding to the stopped mobile data source may be filtered out as being unrepresentative of actual vehicle travel on the road segment, such as due to the mobile data source being a parked vehicle. Furthermore, in some embodiments, data samples may include reported indications of the driving status of the vehicle (e.g., that the vehicle transmission is in "park" with the engine running, such as a vehicle stopped to make a delivery), and if so such indications may similarly be used to filter such data samples as being unrepresentative of actual traveling vehicles.

Figure 2B:
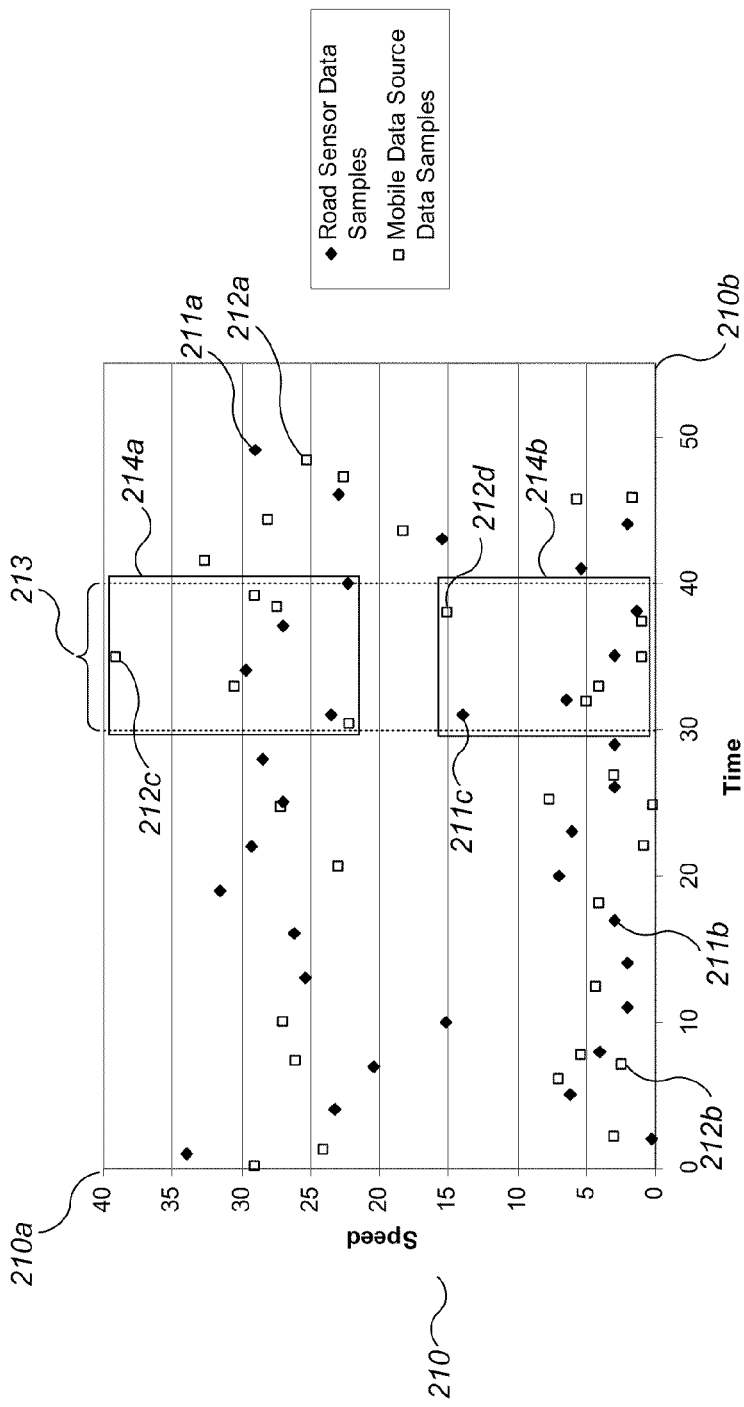

FIG. 2B illustrates a graphical view of multiple data samples associated with a single road segment obtained from multiple data sources during a particular time interval or other time period, with the data samples plotted on a graph 210 with time measured on the x-axis 210b and speed measured on the y-axis 210a. In this example, the illustrated data samples have been obtained from multiple mobile data sources as well as one or more road traffic sensors associated with the road segment, and are shown with differing shapes as illustrated in the displayed legend (i.e., with darkened diamonds ("♦") for data samples obtained from road traffic sensors, and with open squares ("□") for data samples obtained from mobile data sources). The illustrated data samples from mobile data sources may have been associated with the road segment as described with reference to FIG. 2A.

Exemplary data samples include road traffic sensor data samples 211a-c and mobile data source data samples 212a-d. The reported speed and recording time of a given data sample may be determined by its position on the graph. For example, mobile data source data sample 212d has a reported speed of 15 miles per hour (or other speed unit) and was recorded at a time of approximately 37 minutes (or other time unit) relative to some starting point. As will be described in more detail below, some embodiments may analyze or otherwise process obtained data samples within particular time windows during the time period being represented, such as time window 213. In this example, time window 213 contains data samples recorded during a 10-minute interval from time 30 minutes to time 40 minutes. In addition, some embodiments may further partition the group of data samples occurring within a particular time window into two or more groups, such as group 214a and group 214b. For example, it will be noted that the illustrated data samples appear to reflect a bi-modal distribution of reported speeds, with the bulk of the data samples reporting speeds in the range of 25-30 miles per hour or in the range of 0-8 miles per hour. Such a bi-modal or other multi-modal distribution of speeds may occur, for example, because the underlying traffic flow patterns are non-uniform, such as due to a traffic control signal that causes traffic to flow in a stop-and-go pattern, or to the road segment including multiple lanes of traffic that are moving at different speeds (e.g., an HOV or express lane with relatively higher speeds than other non-HOV lanes). In the presence of such multi-modal distributions of speed data, some embodiments may partition the data samples into two or more groups for further processing, such as to produce improved accuracy or resolution of processing (e.g., by calculating distinct average speeds that more accurately reflect the speeds of various traffic flows) as well as additional information of interest (e.g., the speed differential between HOV traffic and non-HOV traffic), or to identify a group of data samples to exclude (e.g., to not include HOV traffic as part of a subsequent analysis). While not illustrated here, such distinct groups of data samples may be identified in various ways, including by modeling a distinct distribution (e.g., a normal or Gaussian distribution) for the observed speeds of each group.

FIG. 2C illustrates an example of performing data sample outlier elimination to filter or otherwise exclude from consideration those data samples that are unrepresentative of vehicles traveling on a particular road segment, which in this example is based on the reported speed for the data samples (although in other embodiments one or more other attributes of the data samples could instead be used as part of the analysis, whether instead of or in addition to the reported speeds). In particular, FIG. 2C shows a table 220 that illustrates data sample outlier elimination being performed on an example group of ten data samples (in actual use, the numbers of data samples being analyzed may be much larger). The illustrated data samples may, for example, be all of the data samples occurring within a particular time window (such as time window 213 of FIG. 2B), or alternatively may include only a subset of the data samples of a particular time window (such as those included in group 214a or 214b of FIG. 2B) or may include all data samples available for a larger time period.

In the present example, unrepresentative data samples are identified as being statistical outliers with respect to other data samples in a determined group of data samples by determining the deviation of the speed of each data sample in a group of data samples from the average speed of the other data samples in the group. The deviation of each data sample may be measured, for example, in terms of the number of standard deviations difference from the average speed of the other data samples in the group, with data samples whose deviations are greater than a predetermined threshold (e.g., 2 standard deviations) being identified as outliers and being excluded from further processing (e.g., by being discarded).

Table 220 includes a heading row 222 that describes the contents of multiple columns 221a-f. Each row 223a-j of table 220 illustrates a data sample outlier elimination analysis for a distinct one of the ten data samples, with column 221a indicating the data sample being analyzed for each row—as each data sample is analyzed, it is excluded from the other samples of the group to determine the difference that results. The data sample of row 223a may be referred to as the first data sample, the data sample of row 223b may be referred to as the second data sample, and so on. Column 221b contains the reported speed of each of the data samples, measured in miles per hour. Column 221c lists the other data samples in the group against which the data sample of a given row will be compared, and column 221d lists the approximate average speed of the group of data samples indicated by column 221c. Column 221e contains the approximate deviation between the speed of the excluded data sample from column 221b and the average speed listed in column 221d of the other data samples, measured in number of standard deviations. Column 221f indicates whether the given data sample would be eliminated, based on whether the deviation listed in column 221e is greater than 1.5 standard deviations for the purposes of this example. In addition, the average speed 224 for all 10 data samples is shown to be approximately 25.7 miles per hour, and the standard deviation 225 of all 10 data samples is shown to be approximately 14.2.

Thus, for example, row 223a illustrates that the speed of data sample 1 is 26 miles per hour. Next, the average speed of the other data samples 2-10 is calculated as approximately 25.7 miles per hour. The deviation of the speed of data sample 1 from the average speed of the other data samples 2-10 is then calculated as being approximately 0.02 standard deviations. Finally, data sample 1 is determined to not be an outlier since its deviation is below the threshold of 1.5 standard deviations. Further, row 223c illustrates that the speed of data sample 3 is 0 miles per hour and that the average speed of the other data samples 1-2 and 4-10 is calculated as approximately 28.6 miles per hour. Next, the deviation of the speed of data sample 3 from the average speed of the other data samples 1-2 and 4-10 is calculated as approximately 2.44 standard deviations. Finally, data sample 3 is determined to be eliminated as an outlier because its deviation is above the threshold of 1.5 standard deviations.

More formally, given N data samples, $v_0, v_1, v_2, \ldots, v_n$, recorded in a given time period and associated with a given road segment, a current data sample $v_i$ will be eliminated if $$\frac{|v_i - \overline{v_i}|}{\sigma_i} \geq c$$

where $v_i$ is speed of the current data sample being analyzed; $\overline{v_i}$ is the average of the speed of the other data samples $(v_0, \ldots, v_{i-1}, v_{i+1}, \ldots, v_n)$; $\sigma_i$ is the standard deviation of the other data samples; and c is a constant threshold (e.g., 1.5). In addition, as a special case to handle a potential division by zero, the current sample $v_i$ will be eliminated if the standard deviation of the other data samples, $\sigma_i$, is zero and the speed of the current data sample is not equal to the average speed of the other data samples, $\overline{v_i}$.

Note that for each $v_i$, it is not necessary to iterate over all of the other data samples $(v_0, \ldots, v_{i-1}, v_{i+1}, \ldots, v_n)$ in order to compute the average $\overline{v_i}$ and the standard deviation $\sigma_i$. The average $\overline{v_i}$ of the other data samples $v_0, \ldots, v_{i-1}, v_{i+1}, \ldots, v_n$ may be expressed as follows:

$$\bar{v}_i = \frac{N\bar{v} - v_i}{N-1}$$

and the standard deviation $\sigma_i$ of the other data samples $v_0, v_{i-1}, v_{i+1}, \ldots, v_n$ may be expressed as follows:

$$\sigma_i = \sqrt{\frac{1}{N-2}\left[(N-1)\sigma^2 - \frac{N(v_i - \bar{v})^2}{N-1}\right]}$$

where N is the total number of data samples (including the current data sample); $\bar{v}$ is the average of all of the data samples $v_0, v_1, v_2, \ldots, v_n$; $v_i$ is the current data sample, and $\sigma$ is the standard deviation of all of the data samples $v_0, v_1, v_2, \ldots, v_n$. By utilizing the above formulas, the averages and standard deviations may be efficiently calculated, and in particular may be calculated in constant time. Since the above algorithm calculates an average and a standard deviation for each data sample in each road segment, the algorithm runs in O(MN) time, where M is the number of road segments and N is the number of data samples per road segment.

In other embodiments, other outlier detection and/or data elimination algorithms may be used, whether instead of or in addition to the described outlier detection, such as techniques based on neural network classifiers, naïve Bayesian classifiers, and/or regression modeling, as well as techniques in which groups of multiple data samples are considered together (e.g., if at least some data samples are not independent of other data samples).

Figure 2D:
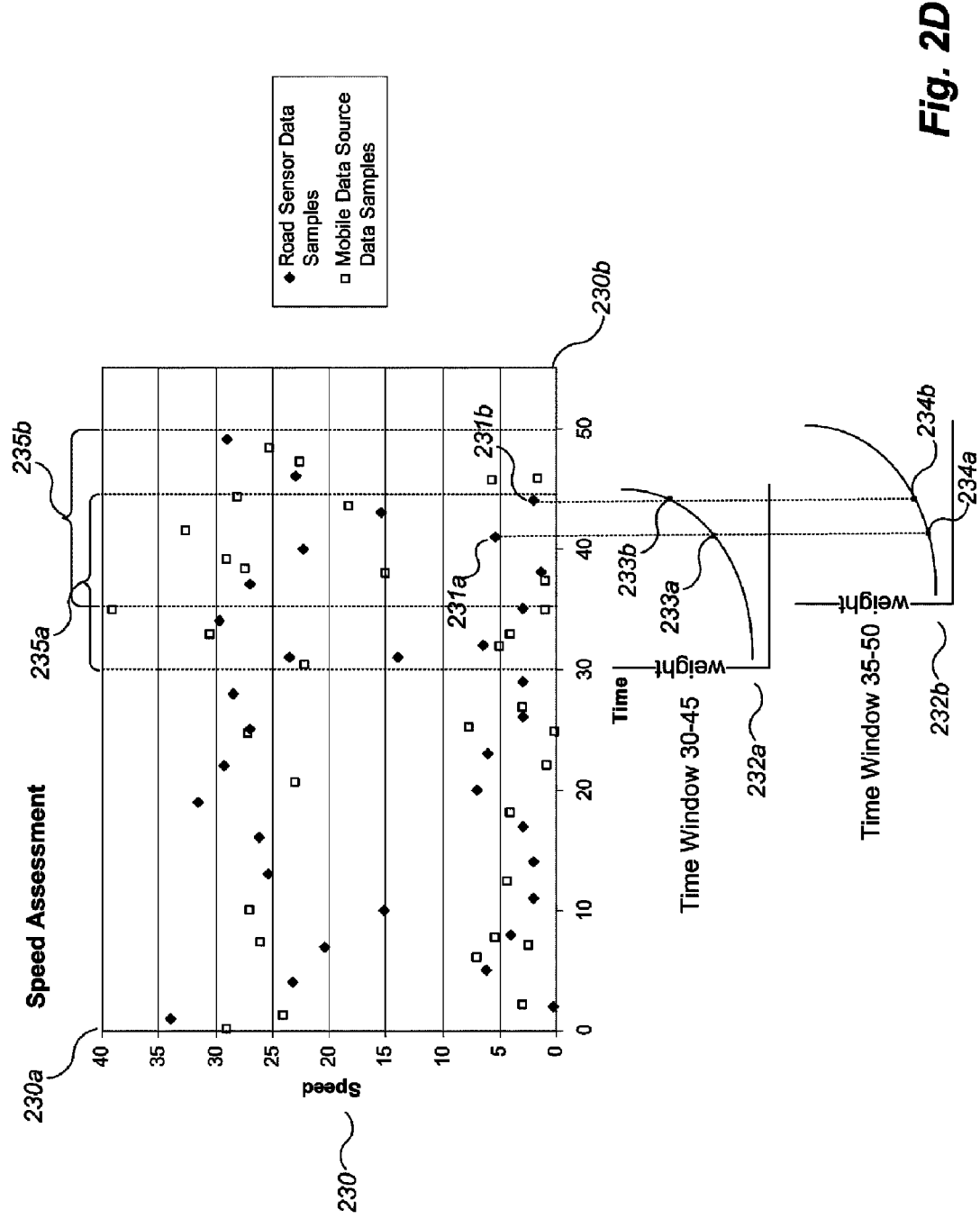

FIG. 2D illustrates an example of performing average speed assessment using data samples, and shows example data samples similar to those depicted in FIG. 2B for a particular road segment and period of time. The data samples have been plotted on a graph 230, with time measured on the x-axis 230b and speed measured on the y-axis 230a. In some embodiments, the average speed for a given road segment may be computed on a periodic basis (e.g. every 5 minutes). Each computation may consider multiple data samples within a predetermined time window (or interval), such as 10 minutes or 15 minutes. If average speeds are computed over such time windows, such as at or near the end of the time windows, data samples within a time window may be weighted in various manners when aggregating the speeds of the data samples, such as to take into account the age of data samples (e.g., to discount older data samples based on the intuition and the expectation that they do not provide as accurate information as to the actual traffic conditions at the end of the time window or other current time as younger data samples recorded relatively nearer the current time due to changing traffic conditions). Similarly, other data sample attributes may be considered in some embodiments when weighting data samples, such as a type of data source or a particular data source for a data sample (e.g., to weight data samples more heavily if they come from a type of data source or a particular data source that is believed to be more accurate than others or to otherwise provide better data than others), as well as one or more other types of weighting factors.

In the illustrated example, an average speed for the example road segment is computed every five minutes over a 15-minute time window. The example depicts the relative weights of two illustrative data samples, 231a and 231b, as they contribute to the computed average speed of each of two time windows, 235a and 235b. The time window 235a includes data samples recorded between times 30 and 45, and the time window 235b includes data samples recorded between times 35 and 50. Data samples 231a and 231b both fall within both time windows 235a and 235b.

In the illustrated example, each data sample in a given time window is weighted in proportion to its age. That is, older data samples weigh less (and therefore contribute less to the average speed) than younger data samples. Specifically, the weight of a given data sample decreases exponentially with age in this example. This decaying weighting function is illustrated by way of two weight graphs 232a and 232b corresponding to time windows 235a and 235b, respectively. Each weight graph 232a and 232b plots data sample recording time on the x-axis (horizontal) against weight on the y-axis (vertical). Samples recorded later in time (e.g., nearer the end of the time window) weigh more than samples recorded earlier in time (e.g., nearer the beginning of the time window). The weight for a given data sample may be visualized by dropping a vertical line downwards from the data sample in graph 230 to where it intersects with the curve of the weight graph corresponding to the time window of interest. For example, weight graph 232a corresponds to time window 235a, and in accordance with the relative ages of data samples 231a (older) and 231b (younger), the weight 233a of data sample 231a is less than the weight 233b of data sample 231b. In addition, weight graph 232b corresponds to time interval 235b, and it similarly can be seen that the weight 234a of data sample 231a is less than the weight 234b of data sample 231b. In addition, it is evident that the weight of a given data sample decays over time with respect to subsequent time windows. For example, the weight 233b of data sample 231b in time window 235a is greater than the weight 234b of the same data sample 231b in the later time window 235b, because data sample 231b is relatively younger during time window 235a compared to time window 235b.

More formally, in one embodiment, the weight of a data sample recorded at time t with respect to a time ending at time T may be expressed as follows:

$$w(t) = e^{-\alpha(T-t)}$$

where e is the well-known mathematical constant and $\alpha$ is a variable parameter (e.g., 0.2). Given the above, a weighted average speed for N data samples $v_0, v_1, v_2, \ldots, v_n$, in a time interval ending at time T may be expressed as follows, with $t_i$ being the time which data sample $v_i$ represents (e.g., the time at which it was recorded):

$$\text{Weighted average speed} = \frac{\sum_i^n v_i e^{-\alpha(T-t_i)}}{\sum_i^n e^{-\alpha(T-t_i)}}$$

Furthermore, an error estimate for the computed average speed may be computed as follows:

$$\text{Error estimate} = \frac{\sigma}{\sqrt{N}}$$

where N is the number of data samples and $\sigma$ is the standard deviation of the samples $v_0, v_1, v_2, \ldots, v_n$ from the average speed. Other forms of confidence values may similarly be determined for computed or generated average speeds in other embodiments.

As noted, data samples may be weighted based on other factors, whether instead of or in addition to recency of the data samples. For example, data samples may be time-weighted as described above but by utilizing different weight functions (e.g., to have the weight of a data sample decrease linearly, rather than exponentially, with age). In addition, data sample weighting may be further based on the total number of data samples in the time interval of interest. For example, the variable parameter α described above may depend or otherwise vary based on the total number of data samples, such that greater numbers of data samples result in higher penalties (e.g., lower weights) for older data samples, to reflect the increased likelihood that there will be more low latency (e.g., younger) data samples available for purposes of computing average speed. Furthermore, data samples may be weighted based on other factors, including type of data source. For example, it may be the case that particular data sources (e.g., particular road traffic sensors, or all traffic sensors of a particular network) are known (e.g., based on reported status information) or expected (e.g., based on historical observations) to be unreliable or otherwise inaccurate. In such cases, data samples obtained from such road traffic sensors (e.g., such as data sample 211a of FIG. 2B) may be weighted less than data samples obtained from mobile data sources (e.g., data sample 212a of FIG. 2B).

Figure 2E:
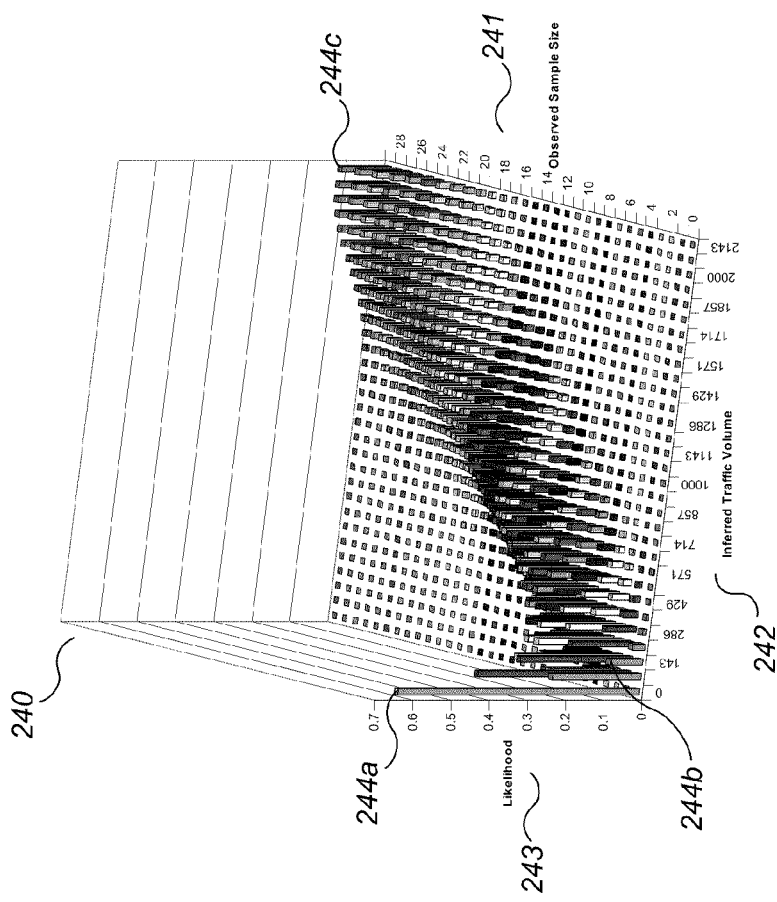

FIG. 2E facilitates an example of performing traffic flow assessment for road segments based on data samples, such as may include inferring traffic volumes, densities, and/or occupancy. In this example, traffic volume of a given road segment is expressed as a total number of vehicles flowing in a given time window over the road segment or a total number of vehicles arriving at the road segment during the time window, traffic density of a given road segment is expressed as a total number of vehicles per unit distance (e.g., miles or kilometers), and traffic occupancy is expressed as an average amount of time that a particular road segment or point on the road segment is occupied by a vehicle.

Given a number of distinct mobile data sources observed to be traveling over a given road segment during a given time window, and a known or expected percentage of total vehicles that are mobile data sources, it is possible to infer a total traffic volume—the total number of vehicles (including the vehicles that are not mobile data sources) traveling over the road segment during the time window. From the inferred total traffic volume, and assessed average speeds for vehicles on the road segment, it is possible to further calculate traffic density as well as road occupancy.

An unsophisticated approach to estimating total traffic volume of a particular road segment during a particular time window would be to simply divide the number of mobile data sample sources for that time window by the percentage of actual vehicles expected to be mobile data sample sources—thus, for example, if mobile data samples are received from 25 mobile data sources during the time window and 10% of the total vehicles on the road segment are expected to be mobile data sample sources, the estimated total volume would be 250 actual vehicles for the amount of time of the time window. However, this approach may lead to large variability of volume estimates for adjacent time windows due to the inherent variability of arrival rates of vehicles, particularly if the expected percentage of mobile data sample sources is small. As one alternative that provides a more sophisticated analysis, total traffic volume of a given road segment may be inferred as follows. Given an observation of a certain number of distinct mobile data sources (e.g., individual vehicles), n, on a road segment of length l, during a given period of time T, Bayesian statistics can be utilized to infer an underlying mean rate of arrival of mobile data sources, λ. The arrival of mobile data sources on the stretch of road corresponding to the road segment may be modeled as a random, discrete process in time, and therefore may be described by Poisson statistics, such that:

$$p(n\mid\lambda) = \frac{\lambda^n e^{-\lambda}}{n!}$$

From the above formula, a likelihood that n mobile data sources will be observed may be calculated, given a mean arrival rate λ and an observed number of vehicles n. For example, suppose a mean arrival rate of λ=10 (vehicles/unit time) and an observation of n=5 vehicles. Substitution yields $$p(n\mid\lambda) = \frac{10^5 e^{10}}{5!} \approx 0.038$$

indicating a 3.8% likelihood of actually observing n=5 vehicles. Similarly, the likelihood of actually observing 10 vehicles arriving (i.e., n=10) if the mean arrival rate is λ=10 (vehicles/unit time) is approximately 12.5%.

The above formula may be utilized in conjunction with Bayes Theorem in order to determine the likelihood of a particular arrival rate λ given an observation of n. As is known, Bayes Theorem is:

$$p(\lambda\mid n) = \frac{p(n\mid\lambda)p(\lambda)}{p(n)}$$

By substitution and constant elimination, the following may be obtained:

$$p(\lambda\mid n) \propto \frac{\lambda^n e^{-\lambda}}{n!}$$

From the above, a proportional or relative likelihood of an arrival rate λ, given an observation of n mobile data sources, may be calculated, providing a probability distribution over possible values of λ given various observed values for n. For a particular value of n, the distribution of likelihoods over various arrival rate values allows a single representative arrival rate value to be selected (e.g., a mean or a median) and a degree of confidence in that value to be assessed.

Furthermore, given a known percentage q of total vehicles on the road that are mobile data sources, also referred to as the "penetration factor", the arrival rate volume of total traffic may be calculated as $$\text{Total traffic volume} = \frac{\lambda}{q}$$

Total traffic volume for a road segment during a time period may in some embodiments alternatively be expressed as a total number of vehicles k flowing in time τ over a length l of the road segment.

FIG. 2E illustrates the probability distribution of various total traffic volumes given observed sample sizes, given an example mobile data source penetration factor of q=0.014 (1.4%). In particular, FIG. 2E depicts a three dimensional graph 240 that plots observed number of mobile data sources (n) on the y-axis 241 against inferred traffic arrival rate volume on the x-axis 242 and against likelihood of each inferred traffic volume value on the z-axis 243. For example, the graph shows that given an observed number of mobile data sources of n=0, the likelihood that the actual traffic volume is near zero is approximately 0.6 (or 60%), as illustrated by bar 244a, and the likelihood that the actual traffic volume is near 143 vehicles per unit time is approximately 0.1, as illustrated by bar 244b. Furthermore, given an observed number of mobile data sources of n=28, the likelihood that the total actual traffic volume is near 2143 vehicles per unit time (corresponding to approximately 30 mobile data sample sources per unit time, given the example penetration factor) is approximately 0.1, as illustrated by bar 244c, which appears to be close to the median value for total actual traffic volume.

In addition, average occupancy and density may be calculated using the inferred total traffic arrival rate volume for a given road segment (representing a number of vehicles k arriving during time τ at the road segment), the assessed average speed v, and an average vehicle length d, as follows:

$$\text{Vehicles per mile, } m = \frac{k}{v\tau}$$

$$\text{Occupancy} = md$$

As previously described, the average speed v of vehicles on the road segment may be obtained by utilizing speed assessment techniques, such as those described with reference to FIG. 2D.

Figure 10B:
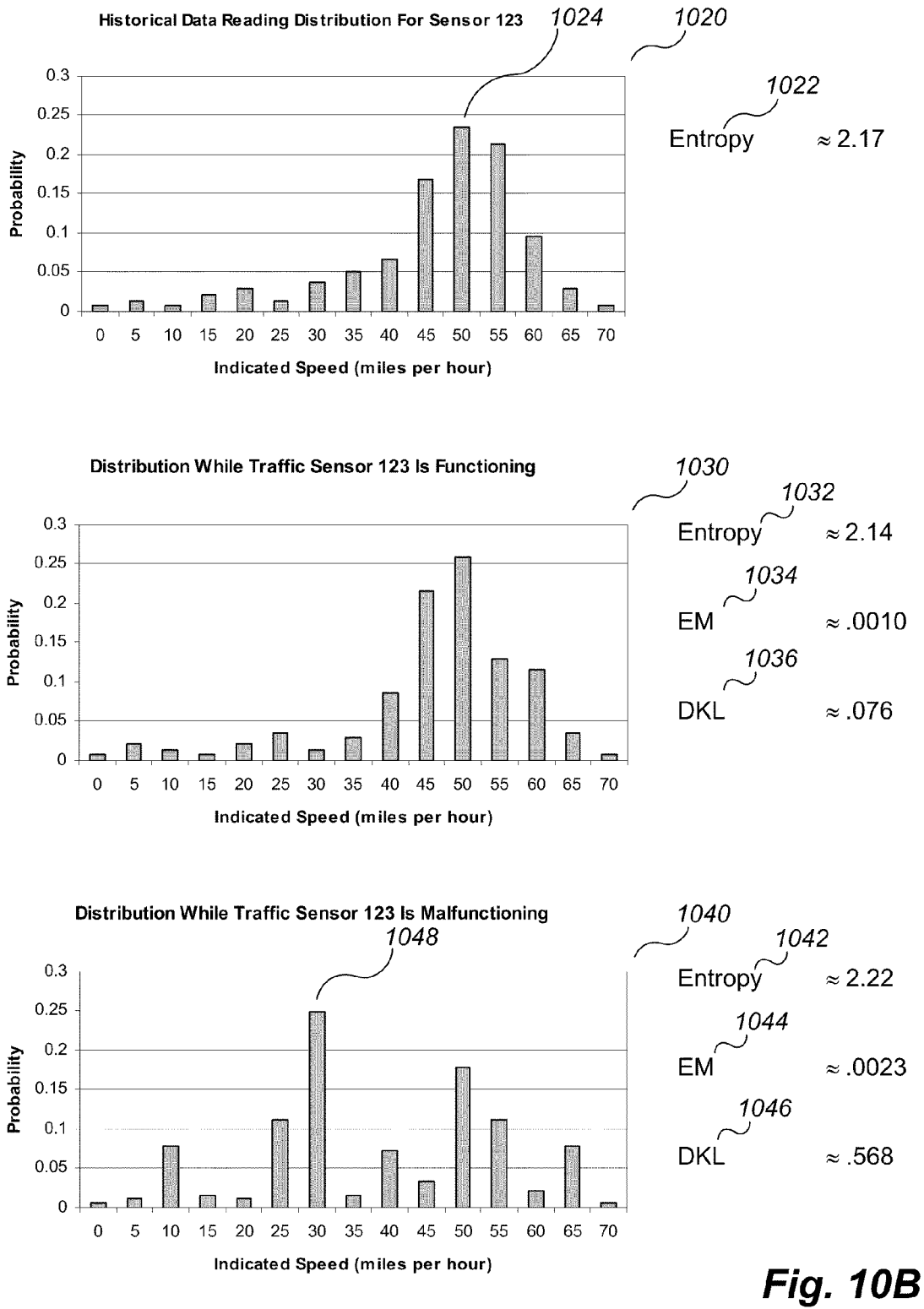

FIGS. 10A-10B illustrate examples of conditioning and otherwise rectifying erroneous data samples from road traffic sensors, such as unreliable and missing data samples. In particular, FIG. 10A shows a number of example data readings obtained from multiple traffic sensors at various times, organized into a table 1000. The table 1000 includes multiple data reading rows 1004a-1004y that each include a traffic sensor ID ("Identifier") 1002a that uniquely identifies the traffic sensor that provided the reading, a traffic sensor data reading value 1002b that includes traffic flow information reported by the traffic sensor, a time of traffic sensor data reading 1002c that reflects the time at which the data reading was taken by the traffic sensor, and a traffic sensor state 1002d that includes an indication of the operational state of the traffic sensor. In this example, only speed information is shown, although in other embodiments additional types of traffic flow information may be reported by traffic sensors (e.g., traffic volume and occupancy), and values may be reported in other formats.

In the illustrated example, the data readings 1004a-1004y have been taken by multiple traffic sensors at various times and recorded as represented in the table 1000. In some cases, data readings may be taken by traffic sensors on a periodic basis (e.g., every minute, every five minutes, etc.) and/or reported by the traffic sensors on such a periodic basis. For example, traffic sensor 123 takes data readings every five minutes, as shown by data readings 1004a-1004d and 1004f-1004i that illustrate a number of data readings taken by traffic sensor 123 between 10:25 AM and 10:40 AM on two separate days (in this example, Aug. 13, 2006 and Aug. 14, 2006).

Each illustrated data reading 1004a-1004y includes a data reading value 1002b that includes traffic flow information observed or otherwise obtained by the data sensor. Such traffic flow information may include the speed of one or more vehicles traveling at, near, or over a traffic sensor. For example, data readings 1004a-1004d show that traffic sensor 123 observed, at four different times, vehicle speeds of 34 miles per hour (mph), 36 mph, 42 mph, and 38 mph, respectively. In addition, traffic flow information may include total or incremental counts of vehicles traveling at, near, or over a traffic sensor, whether instead of or in addition to speed and/or other information. Total counts may be a cumulative count of vehicles observed by a traffic sensor since the sensor was installed or otherwise activated. Incremental counts may be a cumulative count of vehicles observed by a traffic sensor since the traffic sensor took a previous data reading. Data readings 1004w-1004x show that traffic sensor 166 counted, at two different times, 316 cars and 389 cars, respectively. In some cases, recorded data readings may not include data reading values, such as when a given traffic sensor has experienced a sensor malfunction, such that it cannot make or record an observation or report an observation (e.g., due to a network failure). For example, data reading 1004k shows that traffic sensor 129 was unable to provide a data reading value at 10:25 AM on the day of Aug. 13, 2006, as indicated by a "--" in the data reading value column 1002b.

In addition, a traffic sensor state 1002d may be associated with at least some data readings, such as if a traffic sensor and/or corresponding communications network provides an indication of the operational state of the traffic sensor. Operational states in the illustrated embodiment include indications that a sensor is functioning properly (e.g., OK), that a sensor is in a power-off state (e.g. OFF), that a sensor is stuck reporting a single value (e.g., STUCK), and/or that a communications link to the network is down (e.g., COM_DOWN), as illustrated in data readings 1004m, 1004k, 1004o, and 1004s, respectively. In other embodiments, additional and/or different information related to the operational state of a traffic sensor may be provided, or such operational state information may not be available. Other traffic sensors, such as traffic sensors 123 and 166 in this example, are not configured to provide indications of traffic sensor state, as indicated by a "--" in the traffic sensor state column 1002d.

Rows 1004e, 1004j, 1004n, 1004q, 1004v, and 1004y and column 1002e indicate that additional traffic sensor data readings may be recorded in some embodiments and/or that additional information may be provided and/or recorded as part of each data reading. Likewise, in some embodiments, less information than is shown may be utilized as a basis for the techniques described herein.

FIG. 10B illustrates examples of detecting errors in traffic sensor data readings that may be indicative of unhealthy traffic sensors that are operating incorrectly. In particular, because many traffic sensors may not provide an indication of traffic sensor state, and because in some cases such indications of traffic sensor state may be unreliable (e.g., indicating that a sensor is not functioning properly when in fact it is, or indicating that a sensor is functioning properly when in fact it is not), it may be desirable to utilize statistical and/or other techniques to detect unhealthy traffic sensors based on reported data reading values.

For example, in some embodiments, an unhealthy traffic sensor may be detected by comparing a current distribution of data readings reported by a given traffic sensor during a time period (e.g., between 4:00 PM and 7:29 PM) on a particular day to a historical distribution of data readings reported by the traffic sensor during the same time period over multiple past days (e.g., the past 120 days). Such distributions may be generated by, for example, processing multiple data readings obtained from a traffic sensor, such as those shown in FIG. 10A.

FIG. 10B shows three histograms 1020, 1030, and 1040 that each represents a data reading distribution based on data readings obtained from traffic sensor 123 during a time period of interest. The data represented in histograms 1020, 1030, and 1040 is discretized into 5 mile per hour intervals (e.g., 0 to 4 miles per hour, 5 to 9 miles per hour, 10 to 14 miles per hour, etc.) and is normalized, such that each bar (e.g. bar 1024) represents a probability between 0 and 1 that vehicle speeds within the 5 mile per hour bucket for that bar occurred during the time period (e.g., based on a percentage of data readings during the time period that fall within the bucket). For example, bar 1024 indicates that vehicle speeds between 50 and 54 miles per hour were observed by traffic sensor 123 with a probability of approximately 0.23, such as based on approximately 23% of the data readings obtained from traffic sensor 123 having reported speeds between 50 and 54 miles per hour, inclusive. In other embodiments, one or more other bucket sizes may be used, whether in addition to or instead of a 5 mph bucket. For example, a 1 mph bucket may provide a finer granularity of processing, but may also cause high variability between adjacent buckets if sufficient data readings are not available for the time period, while a 10 mph bucket would provide less variability but also less detail. Further, while the current example uses average speed as the measure for analysis and comparison for data readings, one or more other measures may be used in other embodiments, whether instead of or in addition to average speed. For example, traffic volume and/or occupancy may similarly be used in at least some embodiments.

In this example, histogram 1020 represents a historical distribution of data readings taken by traffic sensor 123 between 9:00 AM and 12:29 PM on Mondays over the last 120 days. Histogram 1030 represents a distribution of data readings taken by sensor 123 between 9:00 AM and 12:29 on a particular Monday when traffic sensor 123 was functioning properly. It can be visibly discerned that the shape of histogram 1030 resembles that of histogram 1020, given that traffic patterns on a particular Monday would be expected to be similar to traffic patterns on Mondays in general, and the degree of similarity may be computed in various ways, as discussed below. Histogram 1040 represents a distribution of data readings taken by traffic sensor 123 between 9:00 AM and 12:29 on a particular Monday when traffic sensor 123 was not functioning properly, and was instead outputting data readings that did not reflect actual traffic flows. The shape of histogram 1040 differs markedly from that of histogram 1020, as is visibly discernible, reflecting the erroneous data readings reported by traffic sensor 123. For example, a large spike in the distribution is visible at bar 1048, which may be indicative of sensor 123 being stuck for at least some of the time between 9:00 AM and 12:30 PM and reporting a substantial number of identical readings that were not reflective of actual traffic flows.

In some embodiments, the Kullback-Leibler divergence between two traffic sensor data distributions may be utilized to determine the similarity between the two distributions, although in other embodiments similarities or differences between distributions may be calculated in other manners. The Kullback-Leibler divergence is a convex measure of the similarity of two probability distributions P and Q. It may be expressed as follows, $$D_{KL}(P \| Q) = \sum_i P_i \log\left(\frac{P_i}{Q_i}\right)$$

where $P_i$ and $Q_i$ are values of the discretized probability distributions P and Q (e.g., each $P_i$ and $Q_i$ is the probability that speeds within the i-th bucket occurred). In the illustrated example, the Kullback-Leibler divergence ("DKL") 1036 between the data reading distribution shown in histogram 1020 and the data reading distribution shown in histogram 1030 for the healthy traffic sensor is approximately 0.076, while the Kullback-Leibler divergence 1046 between the data reading distribution shown in histogram 1020 and the data reading distribution shown in histogram 1040 for the unhealthy traffic sensor is approximately 0.568. As one might expect, the DKL 1036 is significantly smaller than the DKL 1046 (in this case, approximately 13% of DKL 1046), reflecting the fact that histogram 1030 (e.g., representing the output of traffic sensor 123 while it was functioning properly) is more similar to histogram 1020 (e.g., representing the average behavior of traffic sensor 123) than histogram 1040 (e.g., representing traffic sensor 123 while it was malfunctioning) is similar to histogram 1020.

In addition, some embodiments may use other statistical measures to detect erroneous data readings provided by traffic sensors, such as statistical information entropy, whether instead of or in addition to a similarity measure such as from the Kullback-Leibler divergence. The statistical entropy of a probability distribution is a measure of the diversity of the probability distribution. Statistical entropy of a probability distribution P may be expressed as follows, $$H(P) = -\sum_i P_i \log P_i$$

where $P_i$ is a value of the discretized probability distributions P (e.g., each $P_i$ is the probability that speeds within the i-th bucket of the histogram for P occurred). In the illustrated example, the statistical entropy 1022 of the distribution shown in histogram 1020 is approximately 2.17, the statistical entropy 1032 of the distribution shown in histogram 1030 is approximately 2.14, and the statistical entropy 1042 of the distribution shown in histogram 1040 is approximately 2.22. As one might expect, the statistical entropy 1042 is greater than both the statistical entropy 1032 and the statistical entropy 1022, reflecting the more chaotic output pattern exhibited by traffic sensor 123 while it was malfunctioning.

In addition, the difference between two statistical entropy measures may be measured by calculating the entropy difference measure. The entropy difference measure between two probability distributions P and Q may be expressed as $$EM = \|H(P) - H(Q)\|^2$$

where H(P) and H(Q) are the entropies of the probability distributions P and Q, respectively, as described above. In the illustrated example, the entropy difference measure ("EM") 1034 between the distribution shown in histogram 1020 and the distribution shown in histogram 1030 is approximately 0.0010, and the entropy difference measure 1044 between the distribution shown in histogram 1020 and the distribution shown in histogram 1040 is approximately 0.0023. As one may expect, the entropy difference measure 1044 is significantly larger than the entropy difference measure 1034 (in this case, more than twice as large), reflecting the greater difference between the statistical entropy of the distribution shown in histogram 1040 and the statistical entropy of the distribution shown in histogram 1020, compared to the difference between the statistical entropy of the distribution shown in histogram 1030 and the statistical entropy of the distribution shown in histogram 1020.

The statistical measures described above may be utilized in various ways in order to detect unhealthy traffic sensors. In some embodiments, various information about a current data reading distribution is provided as input to a sensor health (or data reading reliability) classifier, such as based on a neural network, Bayesian classifier, decision tree, etc. For example, the classifier input information may include, for example, the Kullback-Leibler divergence between a historical data reading distribution for the traffic sensor and the current data reading distribution for the traffic sensor, and the statistical entropy of the current data reading distribution. The classifier then assesses the health of the traffic sensor based on the provided inputs, and provides an output that indicates an unhealthy or healthy sensor. In some cases, additional information may also be provided as input to the classifier, such as an indication of the time-of-day (e.g., a time period from 5:00 AM to 9:00 AM), day or days of week (e.g., Monday through Thursday, Friday, Saturday or Sunday) corresponding to the time-of-day and/or day-of-week to which the current and historical data reading distributions correspond, size of the mph buckets, etc. Classifiers may be trained by utilizing actual prior data readings, such as those that include indications of traffic sensor state, as illustrated in FIG. 10A.

In other embodiments, unhealthy traffic sensors may be identified without the use of a classifier. For example, a traffic sensor may be determined to be unhealthy if one or more statistical measures are above a predetermined threshold value. For instance, a traffic sensor may be determined to be unhealthy if the Kullback-Leibler divergence between a historical data reading distribution for the traffic sensor and a current data reading distribution for the traffic sensor is above a first threshold value, if the statistical entropy of the current data reading distribution is above a second threshold value, and/or if the entropy difference measure between the current data reading distribution and the historical data reading distribution is above a third threshold. In addition, other non-statistical information may be utilized, such as whether the traffic sensor is reporting a sensor state that may be interpreted as healthy or unhealthy.

As previously noted, although the above techniques are described primarily in the context of traffic sensors that report vehicle speed information, the same techniques may be utilized with respect to other traffic flow information, including traffic volume, density, and occupancy.

Figure 3:
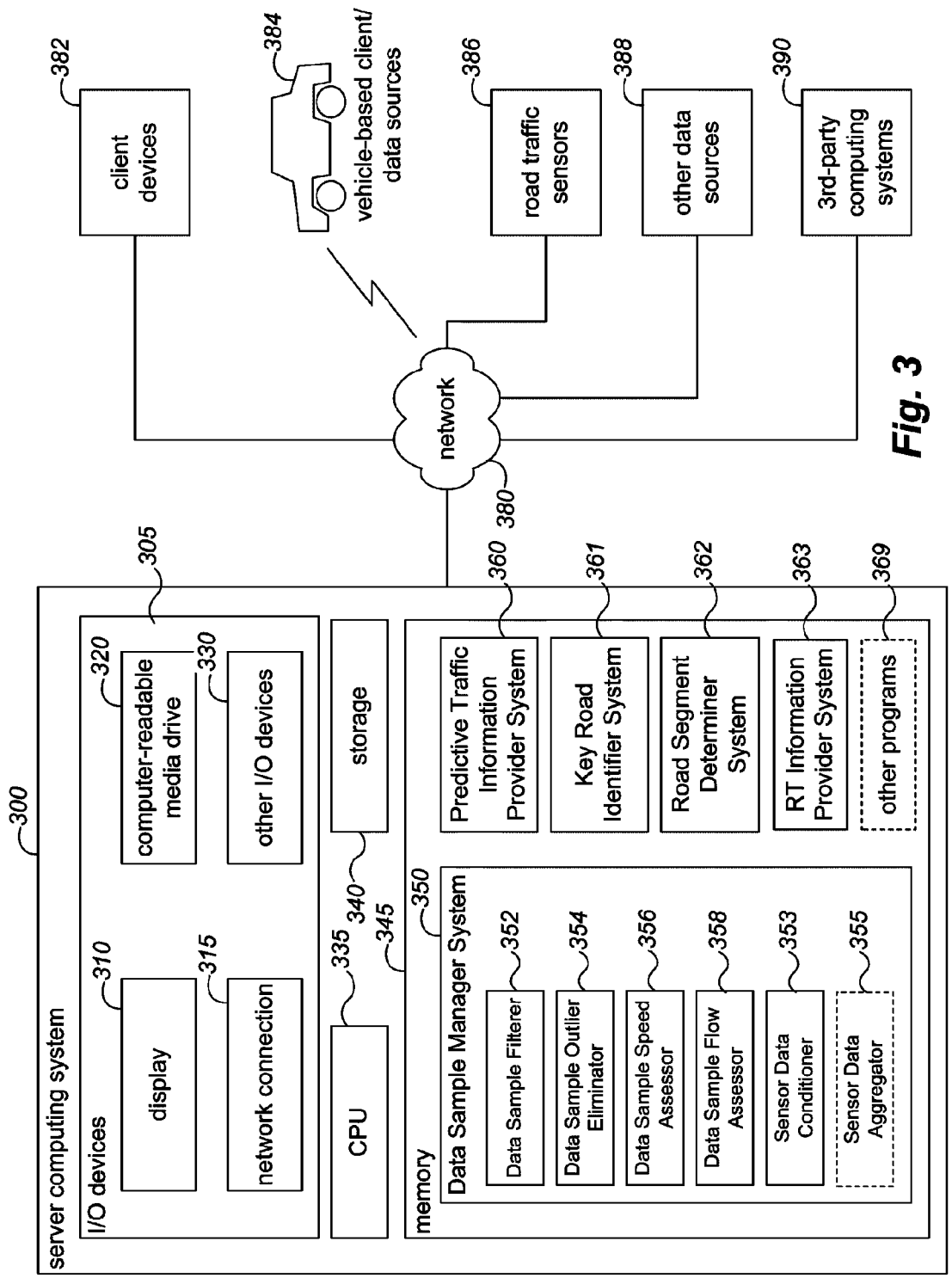
FIG. 3 is a block diagram illustrating a computing system suitable for executing an embodiment of the described Data Sample Manager system.

FIG. 3 is a block diagram illustrating an embodiment of a computing system 300 that is suitable for performing at least some of the described techniques, such as by executing an embodiment of a Data Sample Manager system. The computing system 300 includes a central processing unit ("CPU") 335, various input/output ("I/O") components 305, storage 340, and memory 345, with the illustrated I/O components including a display 310, a network connection 315, a computer-readable media drive 320, and other I/O devices 330 (e.g., keyboards, mice or other pointing devices, microphones, speakers, etc.).

In the illustrated embodiment, various systems are executing in memory 345 in order to perform at least some of the described techniques, including a Data Sample Manager system 350, a Predictive Traffic Information Provider system 360, a Key Road Identifier system 361, a Road Segment Determiner system 362, an RT Information Provider system 363, and optional other systems provided by programs 369, with these various executing systems generally referred to herein as traffic information systems. The computing system 300 and its executing systems may communicate with other computing systems via a network 380 (e.g., the Internet, one or more cellular telephone networks, etc.), such as various client devices 382, vehicle-based clients and/or data sources 384, road traffic sensors 386, other data sources 388, and third-party computing systems 390.

In particular, the Data Sample Manager system 350 obtains various information regarding current traffic conditions and/or previous observed case data from various sources, such as from the road traffic sensors 386, vehicle-based mobile data sources 384 and/or other mobile or non-mobile data sources 388. The Data Sample Manager system 350 then prepares the obtained data for use by other components and/or systems by filtering (e.g., eliminating data samples from consideration) and/or conditioning (e.g., correcting errors) the data, and then assesses road traffic conditions such as traffic flow and/or speed for various road segments using the prepared data. In this illustrated embodiment, the Data Sample Manager system 350 includes a Data Sample Filterer component 352, a Sensor Data Conditioner component 353, a Data Sample Outlier Eliminator component 354, a Data Sample Speed Assessor component 356, a Data Sample Flow Assessor component 358, and an optional Sensor Data Aggregator component 355, with the components 352-358 performing functions similar to those previously described for corresponding components of FIG. 1 (such as the Data Sample Filterer component 104, the Sensor Data Conditioner component 105, the Data Sample Outlier Eliminator component 106, the Data Sample Speed Assessor component 107, the Data Sample Flow Assessor component 108, and the optional Sensor Data Aggregator component 110). In addition, in at least some embodiments the Data Sample Manager system performs its assessment of road traffic conditions in a substantially realtime or near-realtime manner, such as within a few minutes of obtaining the underlying data (which may be itself be obtained in a substantially realtime manner from the data sources).

The other traffic information systems 360-363 and 369 and/or the third-party computing systems 390 may then use data provided by the Data Sample Manager system in various ways. For example, the Predictive Traffic Information Provider system 360 may obtain (either directly, or indirectly via a database or storage device) such prepared data to generate future traffic condition predictions for multiple future times, and provide the predicted information to one or more other recipients, such as one or more other traffic information systems, client devices 382, vehicle-based clients 384, and/or third-party computing systems 390. In addition, the RT Information Provider system 363 may obtain information about assessed road traffic conditions from the Data Sample Manager system, and make the road traffic condition information available to others (e.g., client devices 382, vehicle-based clients 384, and/or third-party computing systems 390) in a realtime or near-realtime manner—when the Data Sample Manager system also performs its assessments in such a realtime or near-realtime manner, the recipients of the data from the RT Information Provider system may be able to view and use information about current traffic conditions on one or more road segments based on contemporaneous actual vehicle travel on those road segments (as reported by mobile data sources traveling on those road segments and/or by sensors and other data sources providing information about actual vehicle travel on those road segments).

The client devices 382 may take various forms in various embodiments, and may generally include any communication devices and other computing devices capable of making requests to and/or receiving information from the traffic information systems. In some cases, the client devices may execute interactive console applications (e.g., Web browsers) that users may utilize to make requests for traffic-related information (e.g., predicted future traffic conditions information, realtime or near-realtime current traffic conditions information, etc.), while in other cases at least some such traffic-related information may be automatically sent to the client devices (e.g., as text messages, new Web pages, specialized program data updates, etc.) from one or more of the traffic information systems.

The road traffic sensors 386 include multiple sensors that are installed in, at, or near various streets, highways, or other roads, such as for one or more geographic areas. These sensors may include loop sensors that are capable of measuring the number of vehicles passing above the sensor per unit time, vehicle speed, and/or other data related to traffic flow. In addition, such sensors may include cameras, motion sensors, radar ranging devices, RFID-based devices, and other types of sensors that are located adjacent to or otherwise near a road and that can sense or otherwise detect passing vehicles. The road traffic sensors 386 may periodically or continuously provide measured data readings via wire-based or wireless-based data link to the Data Sample Manager system 350 via the network 380 using one or more data exchange mechanisms (e.g., push, pull, polling, request-response, peer-to-peer, etc.). In addition, while not illustrated here, in some embodiments one or more aggregators of such road traffic sensor information (e.g., a governmental transportation body that operates the sensors) may instead obtain the raw data and make that data available to the traffic information systems (whether in raw form or after it is processed).

The other data sources 388 include a variety of types of other sources of data that may be utilized by one or more of the traffic information systems to provide traffic-related information to users, customers, and/or other computing systems. Such data sources include map services and/or databases that provide information regarding road networks, such as the connectivity of various roads to one another as well as traffic control information related to such roads (e.g., the existence and location of traffic control signals and/or speed zones). Other data sources may also include sources of information about events and/or conditions that impact and/or reflect traffic conditions, such as short-term and long-term weather forecasts, school schedules and/or calendars, event schedules and/or calendars, traffic incident reports provided by human operators (e.g., first responders, law enforcement personnel, highway crews, news media, travelers, etc.), road work information, holiday schedules, etc.

The vehicle-based clients/data sources 384 in this example may each be a computing system and/or communication system located within a vehicle that provides data to one or more of the traffic information systems and/or that receives data from one or more of those systems. In some embodiments, the Data Sample Manager system 350 may utilize a distributed network of vehicle-based mobile data sources and/or other user-based mobile data sources (not shown) that provide information related to current traffic conditions for use by the traffic information systems. For example, each vehicle or other mobile data source may have a GPS ("Global Positioning System") device (e.g., a cellular telephone with GPS capabilities, a stand-alone GPS device, etc.) and/or other geo-location device capable of determining the geographic location, and possibly other information such as speed, direction, elevation and/or other data related to the vehicle's travel, with the geo-location device(s) or other distinct communication devices obtaining and providing such data to one or more of the traffic information systems (e.g., by way of a wireless link) from time to time. Such mobile data sources are discussed in greater detail elsewhere.

Alternatively, some or all of the vehicle-based clients/data sources 384 may each have a computing system and/or communication system located within a vehicle to obtain information from one or more of the traffic information systems, such as for use by an occupant of the vehicle. For example, the vehicle may contain an in-dash navigation system with an installed Web browser or other console application that a user may utilize to make requests for traffic-related information via a wireless link from one of the traffic information systems, such as the Predictive Traffic Information Provider system and/or RT Information Provider system, or instead such requests may be made from a portable device of a user in the vehicle. In addition, one or more of the traffic information systems may automatically transmit traffic-related information to such a vehicle-based client device based upon the receipt or generation of updated information.

The third-party computing systems 390 include one or more optional computing systems that are operated by parties other than the operator(s) of the traffic information systems, such as parties who receive traffic-related data from one or more of the traffic information systems and who make use of the data in some manner. For example, the third-party computing systems 390 may be systems that receive traffic information from one or more of the traffic information systems, and that provide related information (whether the received information or other information based on the received information) to users or others (e.g., via Web portals or subscription services). Alternatively, the third-party computing systems 390 may be operated by other types of parties, such as media organizations that gather and report traffic conditions to their consumers, or online map companies that provide traffic-related information to their users as part of travel-planning services.

As previously noted, the Predictive Traffic Information Provider system 360 may use data prepared by the Data Sample Manager system 350 and other components in the illustrated embodiment to generate future traffic condition predictions for multiple future times. In some embodiments, the predictions are generated using probabilistic techniques that incorporate various types of input data in order to repeatedly produce future time series predictions for each of numerous road segments, such as in a realtime manner based on changing current conditions for a network of roads in a given geographic area. Moreover, in at least some embodiments one or more predictive Bayesian or other models (e.g., decision trees) are automatically created for use in generating the future traffic condition predictions for each geographic area of interest, such as based on observed historical traffic conditions for those geographic areas. Predicted future traffic condition information may be used in a variety of ways to assist in travel and for other purposes, such as to plan optimal routes through a network of roads based on predictions about traffic conditions for the roads at multiple future times.

Furthermore, the Road Segment Determiner system 362 may utilize map services and/or databases that provide information regarding road networks in one or more geographic areas in order to automatically determine and manage information related to the roads that may be used by other traffic information systems. Such road-related information may include determinations of particular portions of roads to be treated as road segments of interest (e.g., based on traffic conditions of those road portions and other nearby road portions), as well as automatically generated associations or relationships between road segments in a given road network and indications of other information of interest (e.g., physical locations of road traffic sensors, event venues, and landmarks; information about functional road classes and other related traffic characteristics; etc.). In some embodiments, the Road Segment Determiner system 362 may execute periodically and store the information it produces in storage 340 or a database (not shown) for use by other traffic information systems.

In addition, the Key Road Identifier system 361 utilizes a road network representing a given geographic area and traffic condition information for that geographic area to automatically identify roads that are of interest for tracking and assessing road traffic conditions, such as for used by other traffic information systems and/or traffic data clients. In some embodiments, the automatic identification of a road (or of one or more road segments of the road) as being of interest may be based at least in part on factors such as the magnitude of peak traffic volume or other flow, the magnitude of peak traffic congestion, intra-day variability of traffic volume or other flow, intra-day variability of congestion for the road, inter-day variability of traffic volume or other flow, and/or inter-day variability of congestion for the road. Such factors may be analyzed by way of, for example, principal components analysis, such as by first computing a covariance matrix S of traffic condition information for all roads (or road segments) in a given geographic area, and then computing an Eigen decomposition of the covariance matrix S. In descending order of Eigenvalue, the Eigenvectors of S then represent the combinations of roads (or road segments) that independently contribute most strongly to the variance of the observed traffic conditions.

In addition, a realtime traffic information provider or presenter system may be provided by the RT Information Provider system, or instead by one or more of the other programs 369. The information provider system may utilize data analyzed and provided by the Data Sample Manager system 350 and/or other components (such as the Predictive Traffic Information Provider system 360) in order to provide traffic information services to consumers and/or business entities that are operating or otherwise utilizing client devices 382, vehicle-based clients 384, third-party computing systems 390, etc., such as to provide data in a realtime or near-realtime manner based at least in part on data samples obtained from vehicles and other mobile data sources.

It will be appreciated that the illustrated computing systems are merely illustrative and are not intended to limit the scope of the present invention. Computing system 300 may be connected to other devices that are not illustrated, including through one or more networks such as the Internet or via the Web. More generally, a "client" or "server" computing system or device, or traffic information system and/or component, may comprise any combination of hardware or software that can interact and perform the described types of functionality, including without limitation desktop or other computers, database servers, network storage devices and other network devices, PDAs, cellphones, wireless phones, pagers, electronic organizers, Internet appliances, television-based systems (e.g., using set-top boxes and/or personal/digital video recorders), and various other consumer products that include appropriate inter-communication capabilities. In addition, the functionality provided by the illustrated system components may in some embodiments be combined in fewer components or distributed in additional components. Similarly, in some embodiments the functionality of some of the illustrated components may not be provided and/or other additional functionality may be available.

In addition, while various items are illustrated as being stored in memory or on storage while being used, these items or portions of them can be transferred between memory and other storage devices for purposes of memory management and/or data integrity. Alternatively, in other embodiments some or all of the software components and/or modules may execute in memory on another device and communicate with the illustrated computing system via inter-computer communication. Some or all of the system components or data structures may also be stored (e.g., as software instructions or structured data) on a computer-readable medium, such as a hard disk, a memory, a network, or a portable media article to be read by an appropriate drive or via an appropriate connection. The system components and data structures can also be transmitted as generated data signals (e.g., as part of a carrier wave or other analog or digital propagated signal) on a variety of computer-readable transmission mediums, including wireless-based and wired/cable-based mediums, and can take a variety of forms (e.g., as part of a single or multiplexed analog signal, or as multiple discrete digital packets or frames). Such computer program products may also take other forms in other embodiments. Accordingly, the present invention may be practiced with other computer system configurations.

Figure 4:
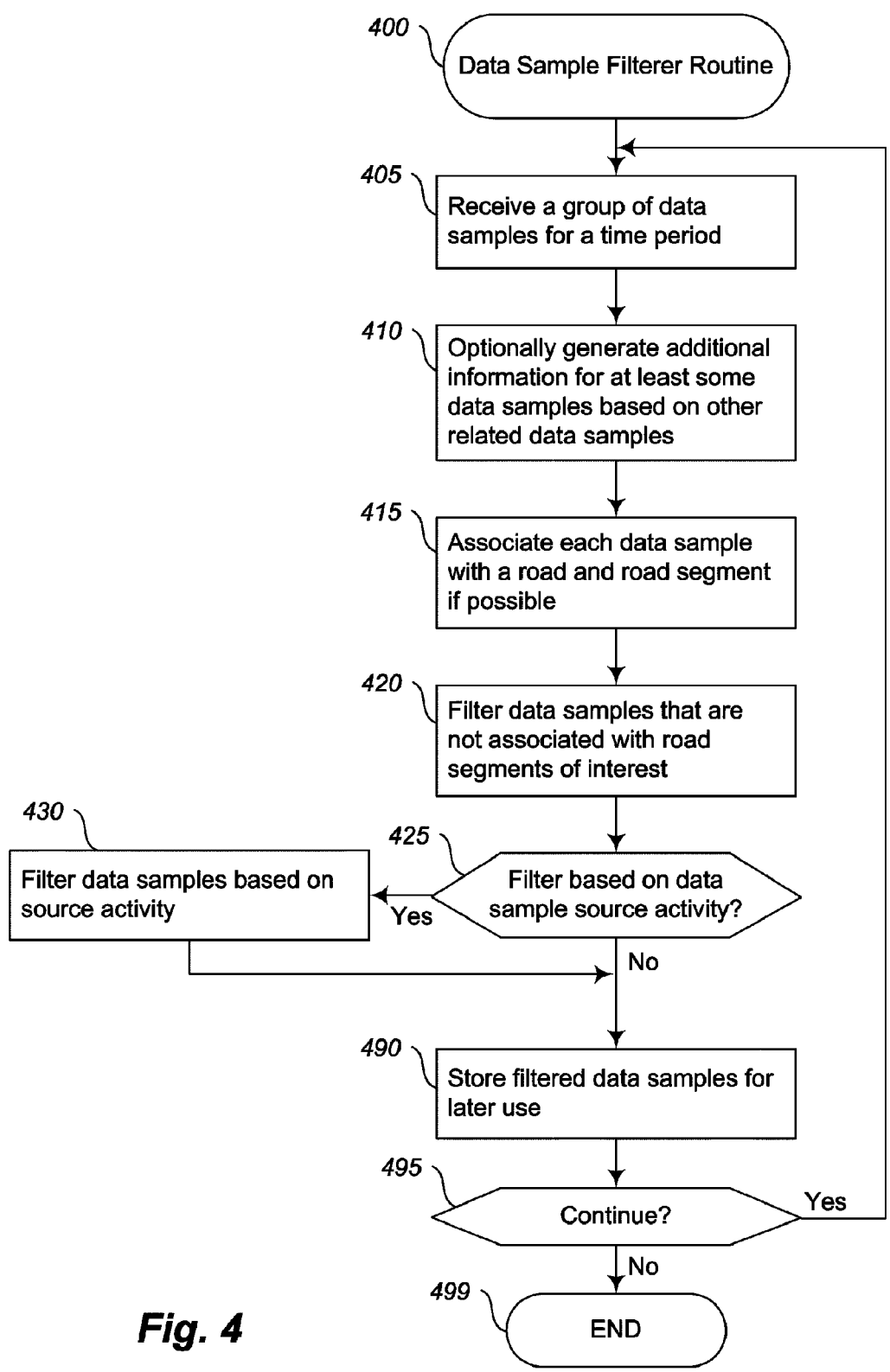
FIG. 4 is a flow diagram of an example embodiment of a Data Sample Filterer routine.

FIG. 4 is a flow diagram of an example embodiment of a Data Sample Filterer routine 400. The routine may be provided by, for example, execution of an embodiment of a Data Sample Filterer component 352 of FIG. 3 and/or Data Sample Filterer component 104 of FIG. 1, such as to receive data samples corresponding to roads in a geographic area and to filter data samples that are not of interest for later assessments. The filtered data samples may then subsequently be used in various ways, such as to use the filtered data samples to calculate average speeds for particular road segments of interest and to calculate other traffic flow-related characteristics for such road segments.

The routine begins in step 405, where a group of data samples is received for a geographic area for a particular period of time. In step 410, the routine then optionally generates additional information for some or all of the data samples based on other related data samples. For example, if a particular data sample for a vehicle or other mobile data source lacks information of interest (such as speed and/or heading or orientation for the mobile data source), such information may be determined in conjunction with one or both of the prior and subsequent data samples for the same mobile data source. In addition, in at least some embodiments information from multiple data samples for a particular mobile data source may be aggregated in order to assess additional types of information regarding the data source, such as to assess an activity of the data source over a period of time that spans multiple data samples (e.g., to determine if a vehicle has been parked for several minutes rather than temporarily stopped for a minute or two as part of the normal flow of traffic, such as at a stop sign or stop light).

After step 410, the routine continues to step 415 to attempt to associate each data sample with a road in the geographic area and a particular road segment of that road, although in other embodiments this step may not be performed or may be performed in other manners, such as if at least an initial association of a data sample to a road and/or road segment is instead received in step 405, or instead if the entire routine is performed at a single time for a single road segment such that all of the data samples received in step 405 as a group correspond to a single road segment. In the illustrated embodiment, the association of a data sample to a road and road segment may be performed in various ways, such as to make an initial association based solely on a geographic location associated with the data sample (e.g., to associate the data sample with the nearest road and road segment). Furthermore, the association may optionally include additional analysis to refine or revise that initial association—for example, if a location-based analysis indicates multiple possible road segments for a data sample (such as multiple road segments for a particular road, or instead multiple road segments for nearby but otherwise unrelated roads), such additional analysis may use other information such as speed and orientation to affect the association (e.g., by combining location information and one or more other such factors in a weighted manner). Thus, for example, if the reported location of a data sample is between a freeway and a nearby frontage road, information about the reported speed of the data sample may be used to assist in associating the data sample with the appropriate road (e.g., by determining that a data sample with an associated speed of 70 miles per hour is unlikely to originate from a frontage road with a speed limit of 25 miles per hour). In addition, in situations in which a particular stretch of road or other road portion is associated with multiple distinct road segments (e.g., for a two-lane road in which travel in one direction is modeled as a first road segment and in which travel in the other direction is modeled as a distinct second road segment, or instead a multi-lane freeway in which an HOV lane is modeled as a separate road segment from one or more adjacent non-HOV lanes), additional information about the data sample such as speed and/or orientation may be used to select the most likely road segment of the road for the data sample.

After step 415, the routine continues to step 420 to filter any data samples that are not associated with road segments that are of interest for later processing, including data samples (if any) that are not associated with any road segment. For example, certain roads or portions of roads may not be of interest for later analysis, such as to exclude roads of certain functional road classes (e.g., if the size of the road and/or its amount of traffic is not sufficiently large to be of interest), or to exclude portions of roads such as a freeway ramp or feeder road or collector/distributor road since the traffic characteristics of such road portions are not reflective of the freeway as a whole. Similarly, in situations in which multiple road segments are associated with a particular portion of road, some road segments may not be of interest for some purposes, such as to exclude an HOV lane for a freeway if only the behavior of the non-HOV lanes are of interest for a particular purpose, or if only one direction of a two-way road is of interest. After step 420, the routine continues to step 425 to determine whether to filter data samples based on activity of the data sources, although in other embodiments such filtering may not be performed or may always be performed. In the illustrated embodiment, if the filtering is to be performed based on the source activity, the routine continues to step 430 to perform such filtering, such as to remove data samples corresponding to data sources whose behavior does not reflect the traffic flow activity of interest to be measured (e.g., to exclude vehicles that are parked with their engines running for an extended period of time, to exclude vehicles that are driving around in a parking lot or parking garage or other small area for an extended period of time, etc.). After step 430, or if it was instead determined in step 425 to not filter based on data source activity, the routine continues to step 490 to store the filtered data for later use, although in other embodiments the filtered data could instead be provided directly to one or more clients. The routine then continues to step 495 to determine whether to continue. If so, the routine returns to step 405, and if not continues to step 499 and ends.

Figure 5:
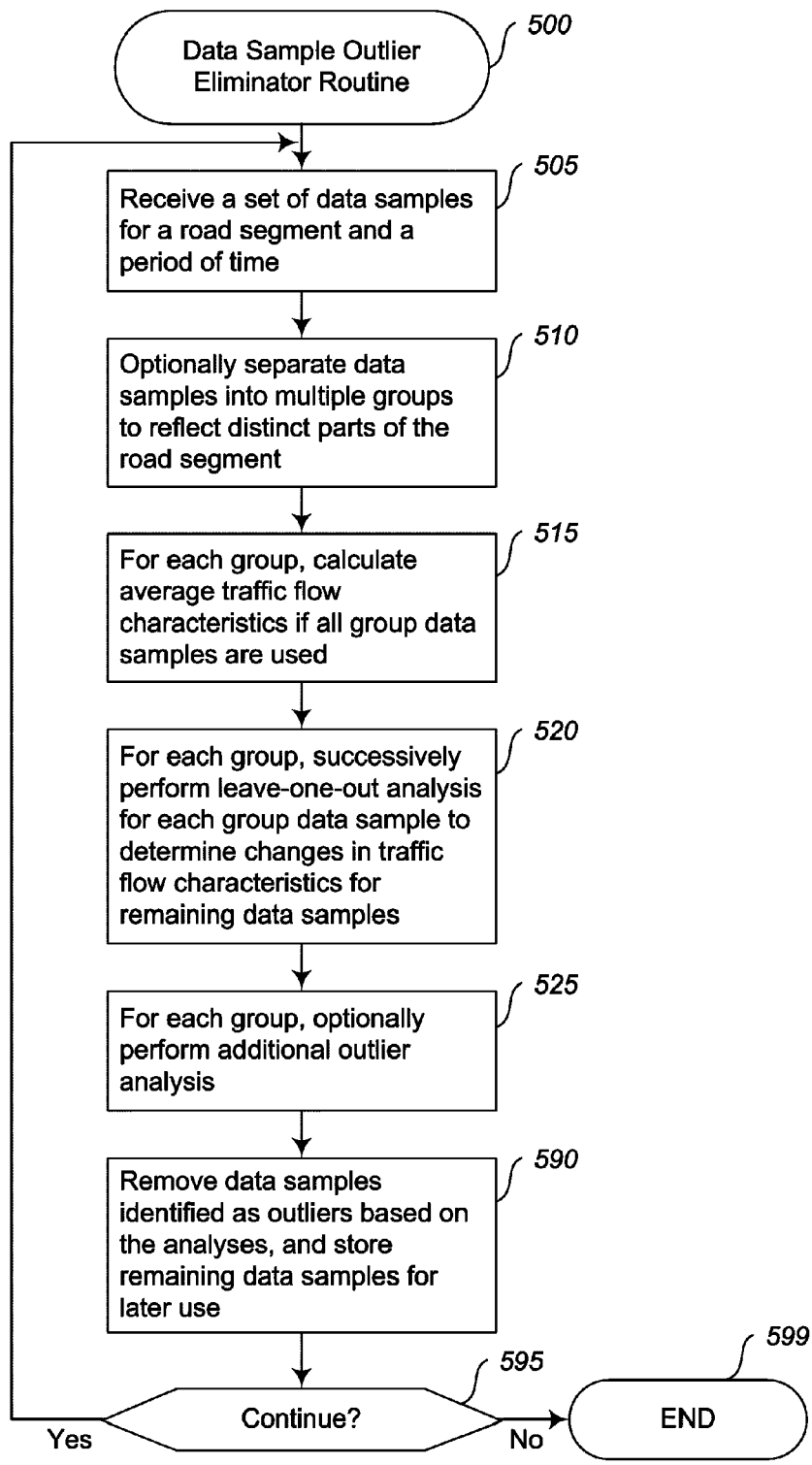
FIG. 5 is a flow diagram of an example embodiment of a Data Sample Outlier Eliminator routine.

FIG. 5 is a flow diagram of an example embodiment of a Data Sample Outlier Eliminator routine 500. The routine may be provided by, for example, execution of an embodiment of a Data Sample Outlier Eliminator component 354 of FIG. 3 and/or Data Sample Outlier Eliminator component 106 of FIG. 1, such as to eliminate data samples for a road segment that are outliers with respect to the other data samples for the road segment.

The routine begins in step 505, where a set of data samples for a road segment and a time period are received. The received data samples may be, for example, filtered data samples obtained from the output of the Data Sample Filterer routine. In step 510, the routine then optionally separates the data samples into multiple groups to reflect distinct parts of the road segment and/or distinct behaviors. For example, if multiple freeway lanes are included together as part of a single road segment and the multiple lanes include at least one HOV lane and one or more non-HOV lanes, the vehicles in the HOV lane(s) may be separated from vehicles in the other lanes if the traffic flow during the time period is significantly different between the HOV and non-HOV lanes. Such grouping may be performed in various ways, such as by fitting the data samples to multiple curves that each represent typical data sample variability within a particular group of data samples (e.g., a normal or Gaussian curve). In other embodiments, such grouping may not be performed, such as if the road segment is instead divided such that all of the data samples for the road segment reflect similar behavior (e.g., if a freeway with an HOV lane and other non-HOV lanes is instead split into multiple road segments).

The routine next continues to step 515 to, for each of the one or more groups of data samples (with all of the data samples being treated as a single group if the data sample separating of step 510 is not performed), calculate average traffic condition characteristics for all of the data samples. Such average traffic condition characteristics may include, for example, an average speed, as well as corresponding statistical information such as a standard deviation from the mean. The routine then continues to step 520 to, for each of the one or more data sample groups, successively perform a leave-one-out analysis such that a particular target data sample is selected to be provisionally left out and average traffic condition characteristics are determined for the remaining traffic condition characteristics. The larger the difference between the average traffic condition characteristics for the remaining data samples and the average traffic condition characteristics for all data samples from step 515, the greater the likelihood that the left-out target data sample is an outlier that does not reflect common characteristics of the other remaining data samples. In step 525, the routine then optionally performs one or more additional types of outlier analysis, such as to successively leave out groups of two or more target data samples in order to assess their joint effect, although in some embodiments such additional outlier analysis may not be performed. After step 522, the routine continues to step 590 to remove data samples that are identified as outliers in steps 520 and/or 525, and stores the remaining data samples for later use. In other embodiments, the routine may instead forward the remaining data samples to one or more clients for use. The routine then continues to step 595 to determine whether to continue. If so, the routine returns to step 505, and if not the routine continues to step 599 and ends.

Figure 6:
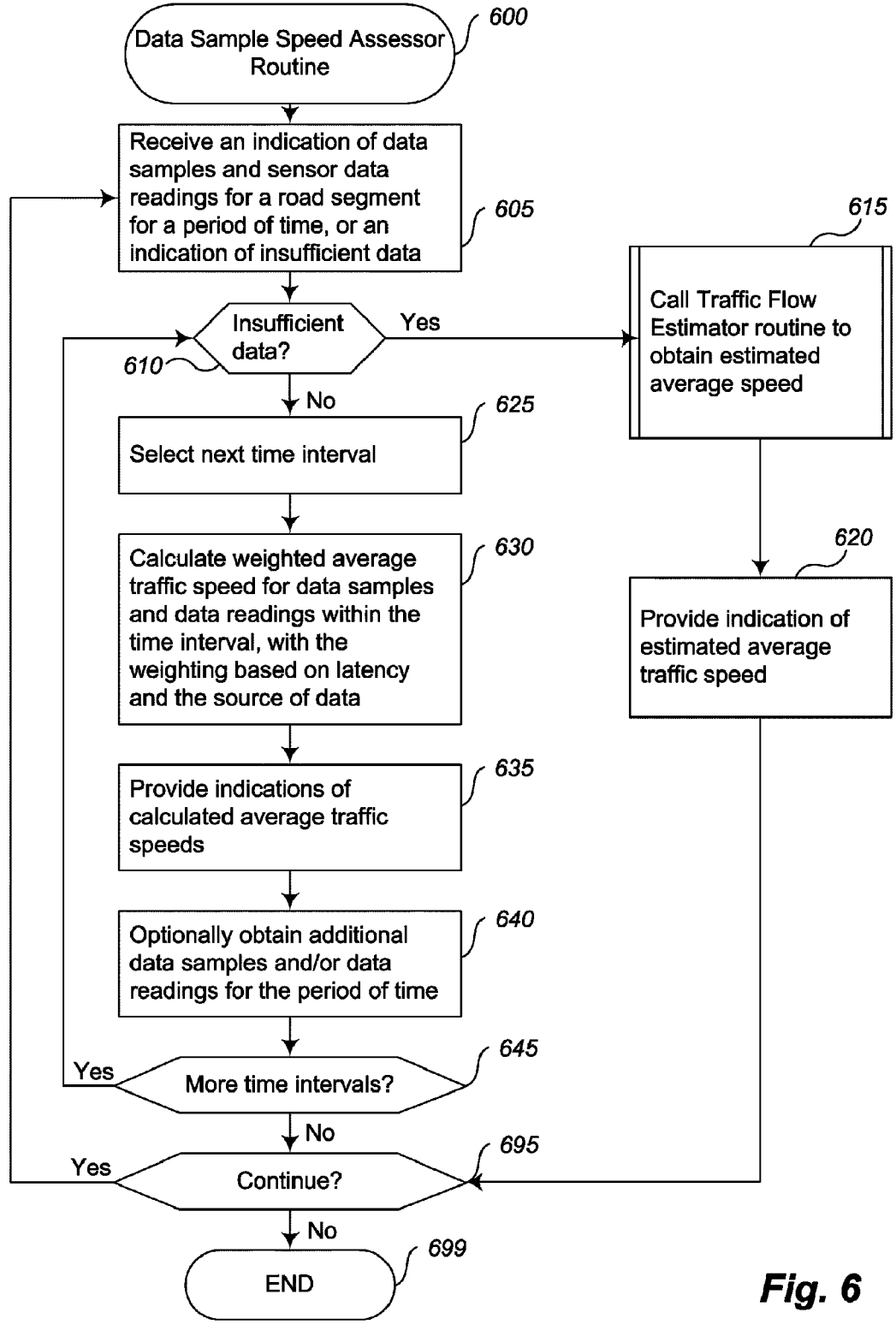
FIG. 6 is a flow diagram of an example embodiment of a Data Sample Speed Assessor routine.

FIG. 6 is a flow diagram of an example embodiment of a Data Sample Speed Assessor routine 600. The routine may be provided by, for example, execution of the Data Sample Speed Assessor component 356 of FIG. 3 and/or the Data Sample Speed Assessor component 107 of FIG. 1, such as to assess a current average speed for a road segment during a period of time based on various data samples for the road segment. In this example embodiment, the routine will perform successive calculations of average speed for the road segment for each of multiple time intervals or windows during the period of time, although in other embodiments each invocation of the routine may instead be for a single time interval (e.g., with multiple time intervals assessed via multiple invocations of the routine). For example, if the time period is thirty minutes, a new average speed calculation may be performed every five minutes, such as with 5-minute time intervals (and thus with each time interval not overlapping with prior or successive time intervals), or with 10-minute time intervals (and thus overlapping with adjacent time intervals).

The routine begins at step 605, where an indication is received of data samples (e.g., data samples from mobile data sources and physical sensor data readings) for a road segment for a period of time, or of insufficient data for a road segment for a period of time, although in some embodiments only one of data samples from mobile data sources and from sensor data readings may be received. The received data samples may be, for example, obtained from the output of the Data Sample Outlier Eliminator routine. Similarly, the indication of insufficient data may be received from the Data Sample Outlier Eliminator routine. In some cases, the indication of insufficient data may be based on having an insufficient number of data samples, such as when there have been no data samples from mobile data sources associated with the road segment for the period of time and/or when some or all sensor data readings for the road segment are missing or have been detected to be erroneous (e.g., by the Sensor Data Conditioner component 105 of FIG. 1). In this example, the routine continues in step 610 to determine whether an indication of insufficient data has been received. If so, the routine continues to step 615, and if not, the routine continues to step 625.

In step 615, the routine executes an embodiment of the Traffic Flow Estimator routine (described with reference to FIG. 14) in order to obtain estimated average traffic speed for the road segment for the period of time. In step 620, the routine then provides an indication of the estimated average speed. In step 625, the routine selects the next time interval or window for which an average speed is to be assessed, beginning with the first time interval. In step 630, the routine then calculates a weighted average traffic speed for the data samples within the time interval, with the weighting of the data samples being based on one or more factors. For example, in the illustrated embodiment, the weighting for each data sample is varied (e.g., in a linear, exponential, or step-wise manner) based on the latency of the data sample, such as to give greater weight to data samples near the end of the time interval (as they may be more reflective of the actual average speed at the end of the time interval). In addition, the data samples may further be weighted in the illustrated embodiment based on the source of the data, such as to weight data readings from physical sensors differently from data samples from vehicles and other mobile data sources, whether more or less heavily. In addition, in other embodiments, various other factors could be used in the weighting, including on a per-sample basis—for example, a data reading from one physical sensor may be weighted differently than a data reading from another physical sensor, such as to reflect available information about the sensors (e.g., that one of the physical sensors is intermittently faulty or has a less accurate data reading resolution than another sensor), and a data sample from one vehicle or other mobile data source may similarly be weighted differently from that of another such vehicle or mobile data source based on information about the mobile data sources. Other types of factors that in some embodiments may be used in the weightings include confidence values or other estimates of the possible error in a particular data sample, a degree of confidence that a particular data sample should be associated with a particular road segment, etc.

After step 630, the routine continues to step 635 to provide an indication of the average calculated traffic speed for the time interval, such as to store the information for later use and/or to provide the information to a client. In step 640, the routine then optionally obtains additional data samples for the time period that have become available subsequent to the receipt of information in step 605. It is then determined in step 645 whether more time intervals are to be calculated for the time period, and if so the routine returns to step 625. If there are instead no more time intervals, or after step 620, the routine continues to step 695 to determine whether to continue. If so, the routine returns to step 605, and if not continues to step 699 and ends.

Figure 7:
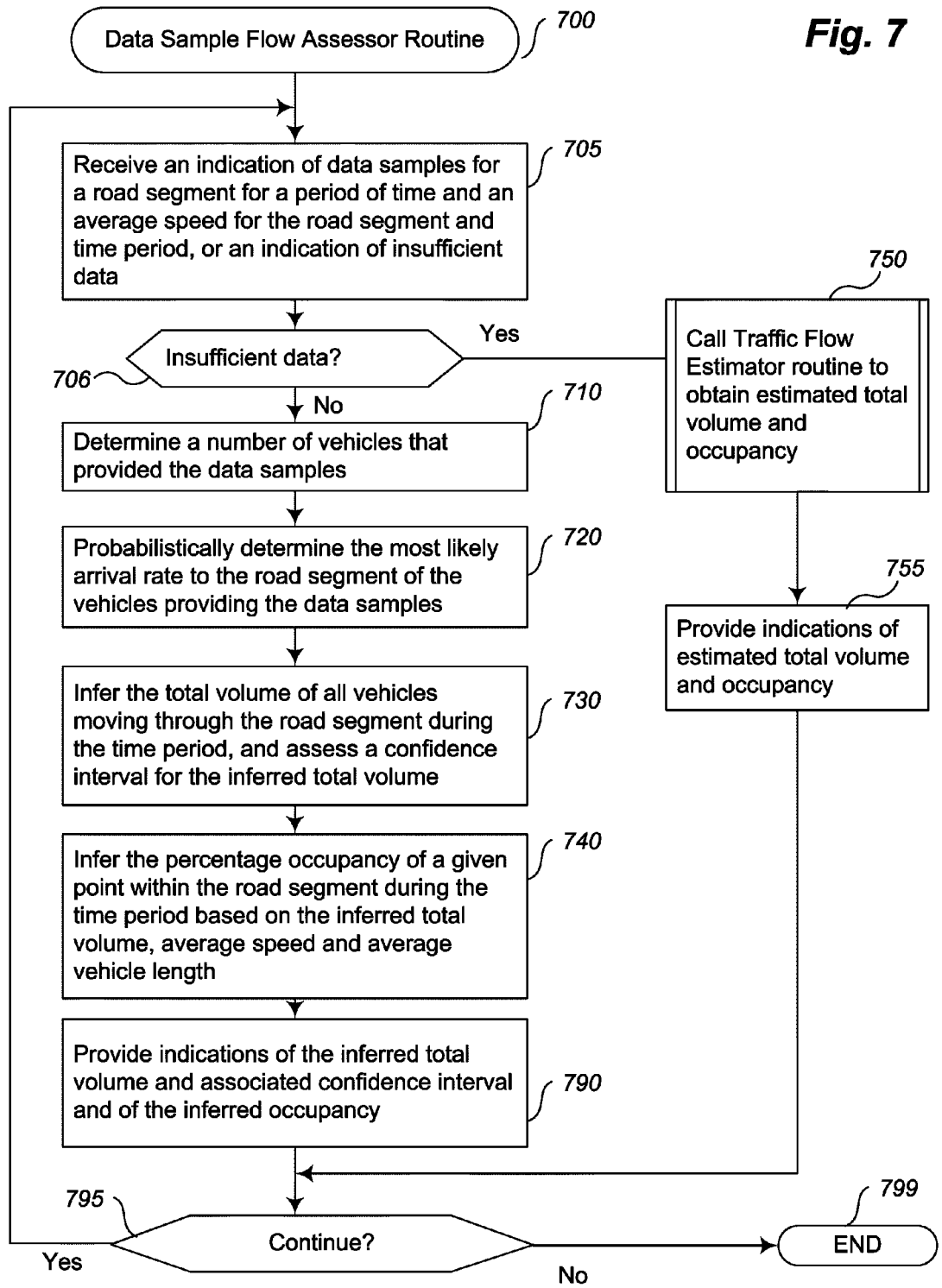
FIG. 7 is a flow diagram of an example embodiment of Data Sample Flow Assessor routine.

FIG. 7 is a flow diagram of an example embodiment of a Data Sample Flow Assessor routine 700. The routine may be provided by, for example, execution of an embodiment of a Data Sample Flow Assessor component 358 of FIG. 3 and/or Data Sample Flow Assessor component 108 of FIG. 1, such as to assess traffic condition flow characteristics other than average speed for a particular road segment during a particular period of time. In this example embodiment, the flow characteristics to be assessed include a total volume of vehicles (or other mobile data sources) arriving at or present on a particular road segment during a period of time, and a percentage occupancy for the road segment during the period of time to reflect the percentage of time that a point on or area of the road segment is covered by a vehicle.

The routine begins at step 705, where an indication is received of data samples for a road segment for a period of time and an average speed for the road segment during the period of time, or of insufficient data for a road segment for a period of time. The data samples may be obtained from, for example, output of the Data Sample Outlier Eliminator routine, and the average speed may be obtained from, for example, output of the Data Sample Speed Assessor routine. The indication of insufficient data may be obtained from, for example, output of the Data Sample Outlier Eliminator routine. In some cases, the indication of insufficient data may be based on having an insufficient number of data samples, such as when there have been no data samples from mobile data sources associated with the road segment for the period of time and/or when some or all sensor data readings for the road segment are missing or have been detected to be erroneous (e.g., by the Sensor Data Conditioner component 105 of FIG. 1). The routine then continues in step 706 to determine whether an indication of insufficient data has been received. If so, the routine continues to step 750, and if not, the routine continues to step 710.

In step 750, the routine executes an embodiment of the Traffic Flow Estimator routine (described with reference to FIG. 14) in order to obtain estimated total volume and occupancy for the road segment for the period of time. In step 755, the routine then provides an indication of the estimated total volume and occupancy.

In step 710, the routine determines a number of vehicles (or other mobile data sources) that provided the data samples, such as by associating each data sample with a particular mobile data source. In step 720, the routine then probabilistically determines the most likely arrival rate to the road segment of the vehicles providing the data samples, based in part on the determined number of vehicles. In some embodiments, the probabilistic determination may further use information about the a priori probability of the number of such vehicles and the a priori probability of a particular arrival rate. In step 730, the routine then infers the total volume of all vehicles passing through the road segment during the period of time, such as based on the determined number of vehicles and information about what percentage of the total number of vehicles are vehicles that provide data samples, and further assesses a confidence interval for the inferred total volume. In step 740, the routine then infers the percentage occupancy for the road segment during the period of time based on the inferred total volume, the average speed, and an average vehicle length. Other types of traffic flow characteristics of interest may similarly be assessed in other embodiments. In the illustrated embodiment, the routine then continues to step 790 to provide indications of the inferred total volume and the inferred percentage occupancy. After steps 755 or 790, if it is then determined in step 795 to continue, the routine returns to step 705, and if not continues to step 799 and ends.

Figure 11:
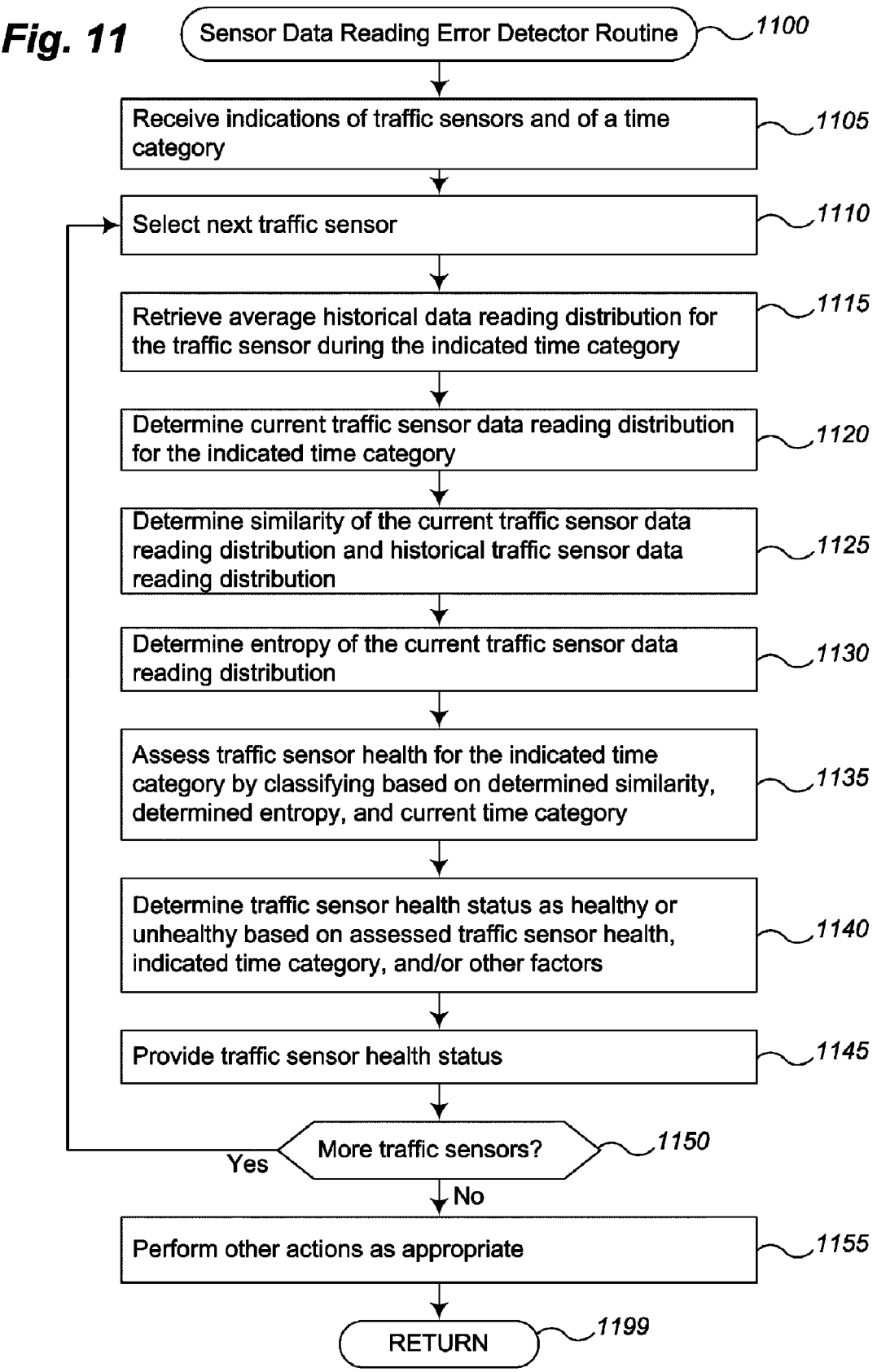
FIG. 11 is a flow diagram of an example embodiment of a Sensor Data Reading Error Detector routine.

FIG. 11 is a flow diagram of an example embodiment of a Sensor Data Reading Error Detector routine 1100. The routine may be provided by, for example, execution of the Sensor Data Conditioner component 353 of FIG. 3 and/or the Sensor Data Conditioner component 105 of FIG. 1, such as to determine the health of one or more traffic sensors. In this example embodiment, the routine is performed at various times of day to determine the health of one or more traffic sensors, based on traffic sensor data readings recently obtained during an indicated time period. In addition, data being output by a traffic sensor for one or more of various types of traffic conditions measures may be analyzed by the routine in various embodiments, such as traffic speed, volume, occupancy, etc. Furthermore, data for at least some of traffic conditions may be measured and/or aggregated in various ways, such as at various levels of granularity (e.g., 5 mph buckets of groups of data for speed information), and the routine may in some embodiments analyze data for a particular traffic sensor at each of one or more levels of granularity (or other level of aggregation) for each of one or more traffic conditions measures.

The routine begins at step 1105 and receives an indication of one or more traffic sensors and of a selected time category (e.g., the most recent time category, if the routine executes after each time category to provide results in a near-realtime manner, or one or more prior time categories selected for analysis), although in other embodiments multiple time categories may instead be indicated. In some embodiments, time may be modeled by way of time categories that each include a time-of-day category (e.g., 12:00 AM to 5:29 AM and 7:30 PM to 11:59 PM, 5:30 AM to 8:59 AM, 9:00 AM to 12:29 PM, 12:30 PM to 3:59 PM, 4:00 PM to 7:29 PM, and 12:00 AM to 11:59 PM) and/or a day-of-week category (e.g., Monday through Thursday, Friday, Saturday and Sunday, or instead with Saturday and Sunday grouped together). Particular time categories may be selected in various ways in various embodiments, including to reflect time periods during which traffic is expected to have similar characteristics (e.g., based on commuting times and patterns, or other consistent activities that affect traffic), such as to group evening and early morning hours together if traffic is typically relatively sparse during those times. In addition, in some embodiments time categories may be selected to differ for different traffic sensors (e.g., by geographic area, road, individual sensor, etc.), whether manually or in an automated manner by analyzing historical data to determine time periods that have similar traffic flow characteristics.

In steps 1110 to 1150, the routine then performs a loop in which it analyzes traffic sensor data readings from each of the indicated one or more traffic sensors for the indicated time categories in order to determine the traffic sensor health status of each of the traffic sensors during that time category. In step 1110, the routine selects the next traffic sensor of the indicated one or more traffic sensors, beginning with the first, and selects the indicated time category (or, if multiple time categories were instead indicated in step 1105, the next combination of traffic sensor and indicated time category). In step 1115, the routine retrieves an average historical data reading distribution for the traffic sensor during the selected time category. In some embodiments, the historical data reading distribution may be based on data readings provided by the traffic sensor during the selected time category (e.g., between 4:00 PM and 7:29 PM on days of the week that include Monday through Thursday) over an extended time period, such as the last 120 days or a recent 120 day period).

In step 1120, the routine determines a target traffic sensor data distribution for the selected traffic sensor and selected time category. In step 1125, the routine then determines the similarity of the target traffic sensor data reading distribution and the historical traffic sensor data reading distribution. As described in more detail elsewhere, in some embodiments, such a similarity measure may be determined by calculating the Kullback-Leibler divergence between the target traffic sensor data reading distribution and the historical traffic sensor data reading distribution. In step 1130, the routine next determines the information entropy of the target traffic sensor data reading distribution, as discussed in greater detail elsewhere.

In step 1135, the routine next assesses the health of the selected traffic sensor for the selected time category by using various information to perform a health classification (e.g., an indication of "healthy" or "unhealthy", or a value on a "health" scale such as from 1 to 100), which in this example includes the determined similarity, determined entropy, and the selected time category (e.g., the selected time-of-day category, such as 4:00 PM to 7:29 PM, and/or the selected day-of-week category, such as Monday to Thursday). In other embodiments, other types of information could be used, such as an indication of a degree of granularity of the data being measured (e.g., 5 mph buckets of groups of data for speed information). In one embodiment, a neural network may be used for the classification, while in other embodiments various other classification techniques may be utilized, including decision trees, Bayesian classifiers, etc.

In step 1140, the routine then determines the traffic sensor health status for the selected traffic sensor and selected time category (in this example as healthy or unhealthy) based on the assessed traffic sensor health and/or other factors. In some embodiments, the health status for a traffic sensor may be determined to be healthy whenever the traffic sensor health for the selected time category is assessed as healthy in step 1135. In addition, the health status for the traffic sensor may be determined to be unhealthy whenever the traffic sensor health for the selected time category is assessed as unhealthy (e.g., in step 1135), and the selected time category has an associated time-of-day category that covers a sufficiently large time period (e.g., at least 12 or 24 hours). Furthermore, in some embodiments information about related time categories (e.g., for one or more prior and/or subsequent time periods) may be retrieved and used, such as to classify traffic sensor health over a longer period of time (e.g., a day). Such logic may reduce the risk of a false negative determination of sensor health status (e.g., determining the traffic sensor health status as unhealthy when in fact the traffic sensor is healthy) based on temporary unusual traffic patterns that the traffic sensor is accurately reporting.

For example, false negative determinations may occur due to substantial intra-day variability in data readings due to external factors (e.g., traffic accidents, weather incidents, etc.). An automobile accident occurring at or near a particular traffic sensor, for example, may result in that traffic sensor providing atypical and erratic data readings for a relatively short time period (e.g., one to two hours). If a determination of sensor health status is solely based on data readings obtained primarily during the time of the disturbance caused by the traffic accident, a false negative determination will likely result. By basing the determination of unhealthy sensor status on data readings obtained over relatively larger time periods (e.g., 12 or 24 hours) the risk of such false negative determinations may be reduced. On the other hand, false positive determinations (e.g., determining the traffic sensor health as healthy when in fact it is unhealthy) may in general be less likely, because malfunctioning traffic sensors are unlikely to provide data readings that are similar to historical data readings (e.g., reflective of ordinary traffic patterns). As such, it may be appropriate to determine a traffic sensor health status as healthy based on relatively smaller time periods.

Some embodiments may effect such differential logic by executing the illustrated routine multiple times per day with time categories reflective of shorter time periods (e.g., executing the routine every three hours with a time category having a time-of-day category extending over the previous three hours) and at least once per day with a time category reflective of the entire previous day (e.g., executing the routine at midnight with a time category having a time-of-day category extending over the previous 24 hours).

In addition, the determination of sensor health status may be based on other factors, such as whether a sufficient number of data readings can be obtained for the selected time category (e.g., because the traffic sensor is intermittently reporting data readings) and/or based on indications of sensor state provided by the traffic sensor (e.g., that the traffic sensor is stuck).

In step 1145, the routine provides the determined traffic sensor health status. In some embodiments, the traffic sensor health status may be stored (e.g., in a database or file system) for later use by other components (e.g., the Sensor Data Aggregator component 110 of FIG. 1) and/or directly provided to other components (e.g., a Data Sample Outlier Eliminator component). In step 1150, the routine determines whether there are more traffic sensors (or combinations of traffic sensors and time categories) to process. If so, the routine continues to step 1110 to continue, and if not continues to step 1155 to perform other actions as appropriate. Such other actions may include, for example, periodically (e.g., once per day, once per week, etc.) recalculating historical data reading distributions (e.g., for the last 120 days) for each of one or more time categories for each of multiple traffic sensors. By periodically recalculating historical data reading distributions, the routine may continue to provide accurate traffic sensor health status determinations in the face of gradually changing traffic conditions (e.g., due to the initiation or completion of road construction projects). After step 1155, the routine continues to step 1199 and returns.

Figure 12:
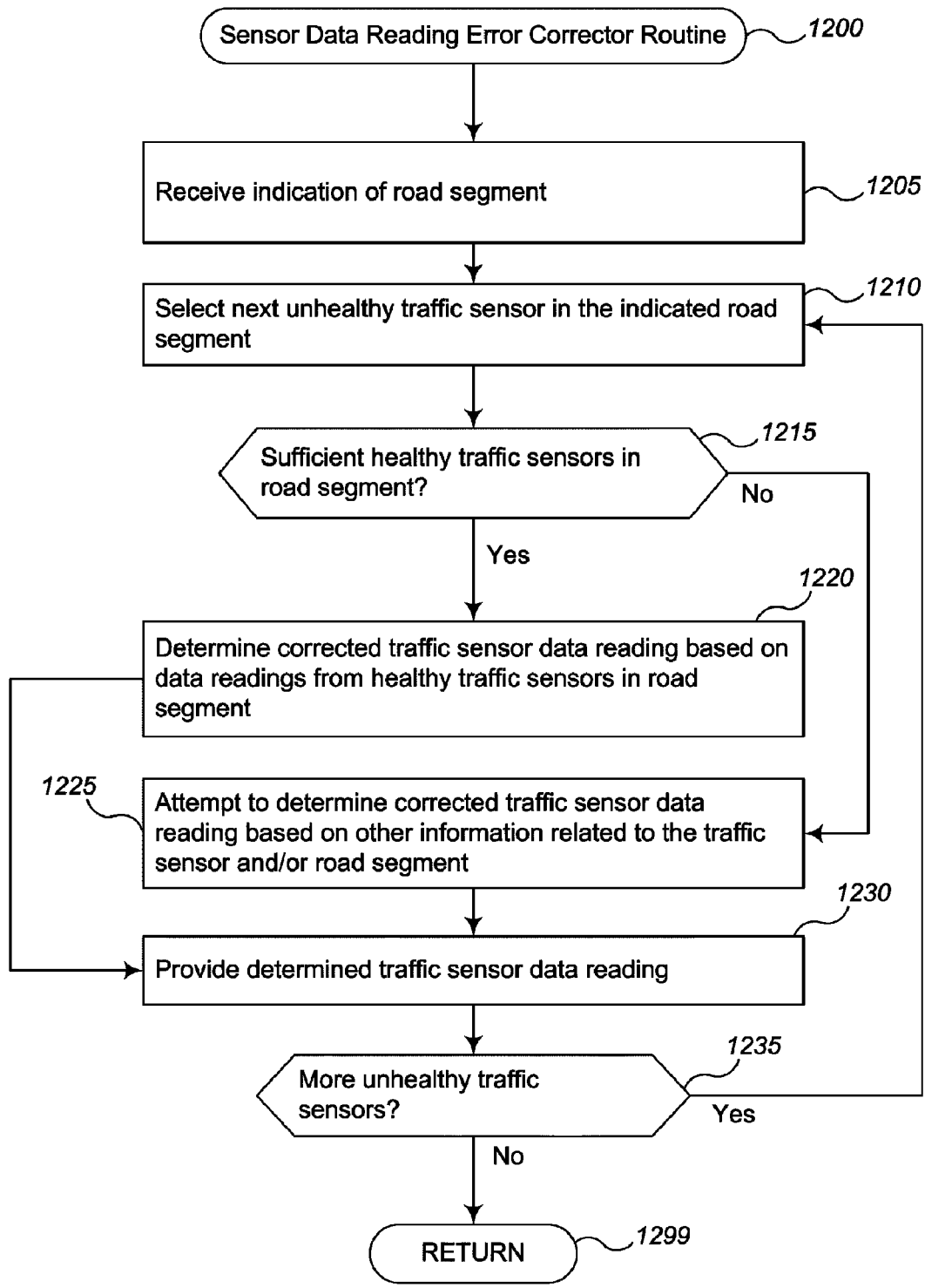
FIG. 12 is a flow diagram of an example embodiment of a Sensor Data Reading Error Corrector routine.

FIG. 12 is a flow diagram of an example embodiment of a Sensor Data Reading Error Corrector routine 1200. The routine may be provided by, for example, execution of the Sensor Data Conditioner component 353 of FIG. 3 and/or the Sensor Data Conditioner component 105 of FIG. 1, such as to determine corrected data readings for one or more traffic sensors associated with a road segment. In the illustrated example embodiment, this routine may be executed periodically (e.g., every 5 minutes) to correct data readings for traffic sensors that have been identified as unhealthy by the Sensor Data Reading Error Corrector routine. In other embodiments, the routine may be executed on demand, such as by the Sensor Data Aggregator routine, in order to obtain corrected data readings for a particular road segment, or instead may not be used in various circumstances. For example, data analysis and correction may be performed more generally by determining if all data samples (e.g., from multiple data sources, such as of multiple types that may include traffic sensors and one or more distinct types of mobile data sources) for a particular road segment provide sufficient data to analyze traffic flow conditions for that road segment, and if so to not perform correction of data from individual traffic sensors.

The routine begins at step 1205, where it receives an indication of a road segment with which one or more traffic sensors are associated (e.g., based on results from the Sensor Data Reading Error Detector routine that one or more of the associated traffic sensors have been classified as unhealthy), and optionally of one or more time categories to be processed (e.g., time categories during which at least one of the associated traffic sensors have been classified as at least potentially being unhealthy). In other embodiments, one or more traffic sensors of interest may be indicated in other manners, such as by directly receiving indications of one or more traffic sensors. In steps 1210 to 1235, the routine performs a loop in which it processes unhealthy traffic sensors in the indicated road segment to determine and provide corrected data readings for those traffic sensors during one or more time categories (e.g., the time categories indicated in step 1205).

In step 1210, the routine selects the next unhealthy traffic sensor in the indicated road segment, beginning with the first. The routine also selects a time category to use, such as one of one or more time categories indicated in step 1205, by selecting one of one or more time categories during which the traffic sensor was previously designated to be unhealthy, etc. In step 1215, the routine determines whether there are sufficient other traffic sensors in the indicated road segment that are healthy and may be used to assist in the correction of the readings for the unhealthy traffic sensor for the selected time category. This determination may be based on whether there are at least a predetermined number (e.g., at least two) and/or a predetermined percentage (e.g., at least 30%) of healthy traffic sensors in the indicated road segment during the selected time category, and may further consider the relative location of the healthy traffic sensors in the indicated road segment (e.g., neighboring or otherwise nearby traffic sensors may be preferred to traffic sensors that are farther away from the unhealthy traffic sensor). If it is determined in step 1215 that there are sufficient healthy traffic sensors, the routine continues to step 1220, where it determines a corrected data reading for the unhealthy traffic sensor based on data readings from other healthy traffic sensors in the road segment for the selected time category. A corrected data reading may be determined in various ways, such as by calculating the average of two or more data readings obtained from healthy traffic sensors in the indicated road segment for the selected time category. In some embodiments, all healthy traffic sensors may be used for the averaging, while in other embodiments only selected healthy traffic sensors may be used. For example, if a predetermined percentage (e.g., at least 30%) of traffic sensors in the indicated road segment are healthy during the selected time category, all healthy traffic sensors may be used for the averaging, and otherwise only a predetermined number (e.g., at least two) of the nearest healthy traffic sensors may be used.

If it is instead determined in step 1215 that there are not sufficient healthy traffic sensors in the indicated road segment for the selected time category, the routine continues to step 1225, where it attempts to determine a corrected data reading for the unhealthy traffic sensor based on other information related to the traffic sensor and/or the road segment. For example, such information may include predicted traffic condition information for the road segment and/or unhealthy traffic sensor, forecast traffic condition information for the road segment and/or unhealthy traffic sensor, and/or historical average traffic condition information for the road segment and/or the unhealthy traffic sensor. Various logic may be implemented to reflect the relative reliability of various types of information. For example, in some embodiments, predicted traffic condition information may be used in preference to (e.g., so long as it is available) to forecast traffic condition information, which may in turn be used in preference to historical average traffic condition information. Additional details related to predicting and forecasting future traffic flow conditions and using the resulting information are discussed elsewhere, including with respect to FIGS. 15A-21J. In other embodiments, steps 1215 and 1225 may not be performed, such as if the data reading correction in step 1220 is always performed based on the best data that is available from other healthy traffic sensors during the selected time category and/or related time categories. For example, the data reading correction may be based on all healthy traffic sensors in the indicated road segment for the selected time category if at least a predetermined percentage (e.g., at least 30%) of those traffic sensors are healthy, or otherwise on the nearest neighbor healthy traffic sensors in the indicated and/or nearby road segments during the selected time category and/or related time categories.

After steps 1220 or 1225, the routine proceeds to step 1230 and provides the determined traffic sensor data reading for use as a corrected reading for the traffic sensor during the selected time category. In some embodiments, the determined traffic sensor data reading may be stored (e.g., in a database or file system) for later use by other components (e.g., the Sensor Data Aggregator component 110 of FIG. 1). In step 1235, the routine determines whether there are additional combinations of traffic sensor and time category to process. If so, the routine returns to step 1210, and if not proceeds to step 1299 and returns.

Figure 13:
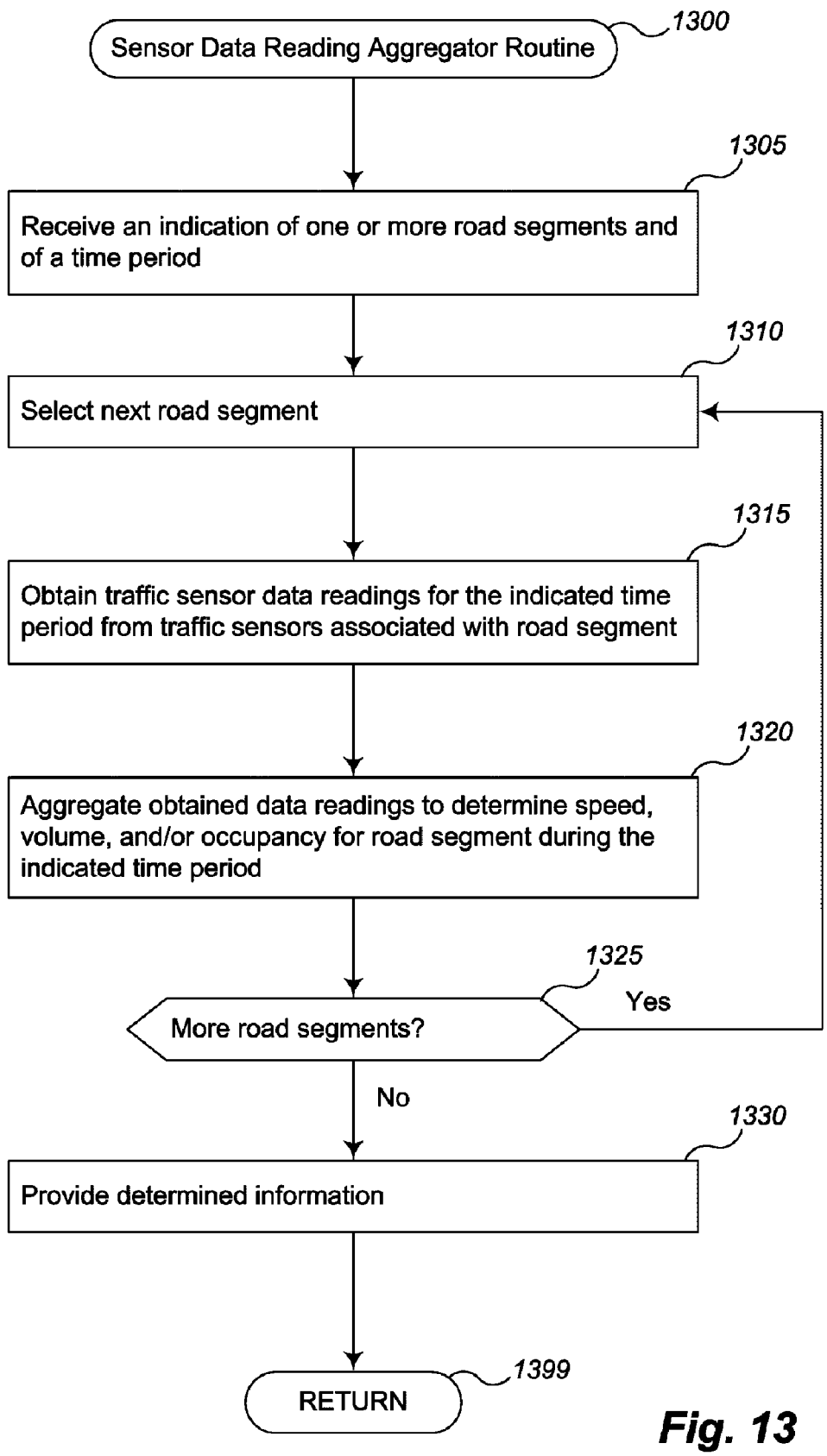
FIG. 13 is a flow diagram of an example embodiment of a Sensor Data Reading Aggregator routine.

FIG. 13 is a flow diagram of an example embodiment of a Sensor Data Reading Aggregator routine 1300. The routine may be provided by, for example, execution of the Sensor Data Aggregator component 355 of FIG. 3 and/or the Sensor Data Aggregator component 110 of FIG. 1, such as to determine and provide traffic condition information for multiple traffic sensors during a particular time category or other time period, such as for multiple traffic sensors associated with a particular road segment. In the illustrated example embodiment, the routine is performed for particular road segments, but in other embodiments may aggregate information from other types of groups of multiple traffic sensors. In addition, this routine may provide traffic condition information that is complementary to information provided by other routines that perform assessments of traffic condition information (e.g., the Data Sample Flow Assessor routine), such as to provide traffic condition information in situations in which other routines cannot provide accurate assessments (e.g., due to insufficient data).

The routine begins at step 1305 and receives an indication of one or more road segments and of one or more time categories or other time periods. In step 1310, the routine selects the next road segment of the one or more indicated road segments, beginning with the first. In step 1315, the routine obtains some or all available traffic sensor data readings taken during the indicated time period(s) by all traffic sensors associated with the road segment. Such information may be obtained from, for example, the Sensor Data Conditioner component 105 of FIG. 1 and/or the Sensor Data Conditioner component 353 of FIG. 1. In particular, the routine may in some cases obtain traffic sensor data readings for traffic sensors determined to be healthy and/or corrected traffic sensor data readings for traffic sensors determined to be unhealthy, such as those provided or determined by the Sensor Data Reading Error Corrector routine of FIG. 12.

In step 1320, the routine then aggregates the obtained data readings in one or more of various ways, such as to determine average speed, volume, and/or occupancy for the road segment during the indicated time period(s). The average speed may, for example, be determined by averaging data readings that reflect the speed of vehicles passing over one or more traffic sensors. The traffic volume may be determined with reference to data readings that report vehicle counts. For example, given a loop sensor that reports a cumulative number of vehicles that have passed over the sensor since the sensor was activated, a traffic volume may be inferred simply by subtracting two data readings obtained during the indicated time period and dividing the result by the time interval between the data readings. In addition, the density may be determined based on the determined average speed, volume, and an average vehicle length, as described in more detail elsewhere. In some cases, data readings may be weighted in various ways (e.g., by age), such that more recent data readings have a greater impact than older data readings on an average flow determination.

In step 1325, the routine then determines whether there are more road segments (or other groups of multiple traffic sensors) to process. If so, the routine returns to step 1310, and otherwise proceeds to step 1330 to provide the determined traffic flow information. In some embodiments, the determined flow information may be stored (e.g., in a database or file system) for later provision to traffic data clients 109 of FIG. 1 and/or the RT Information Provider system 363 of FIG. 3. Next, the routine continues to step 1339 and returns.

Figure 14:
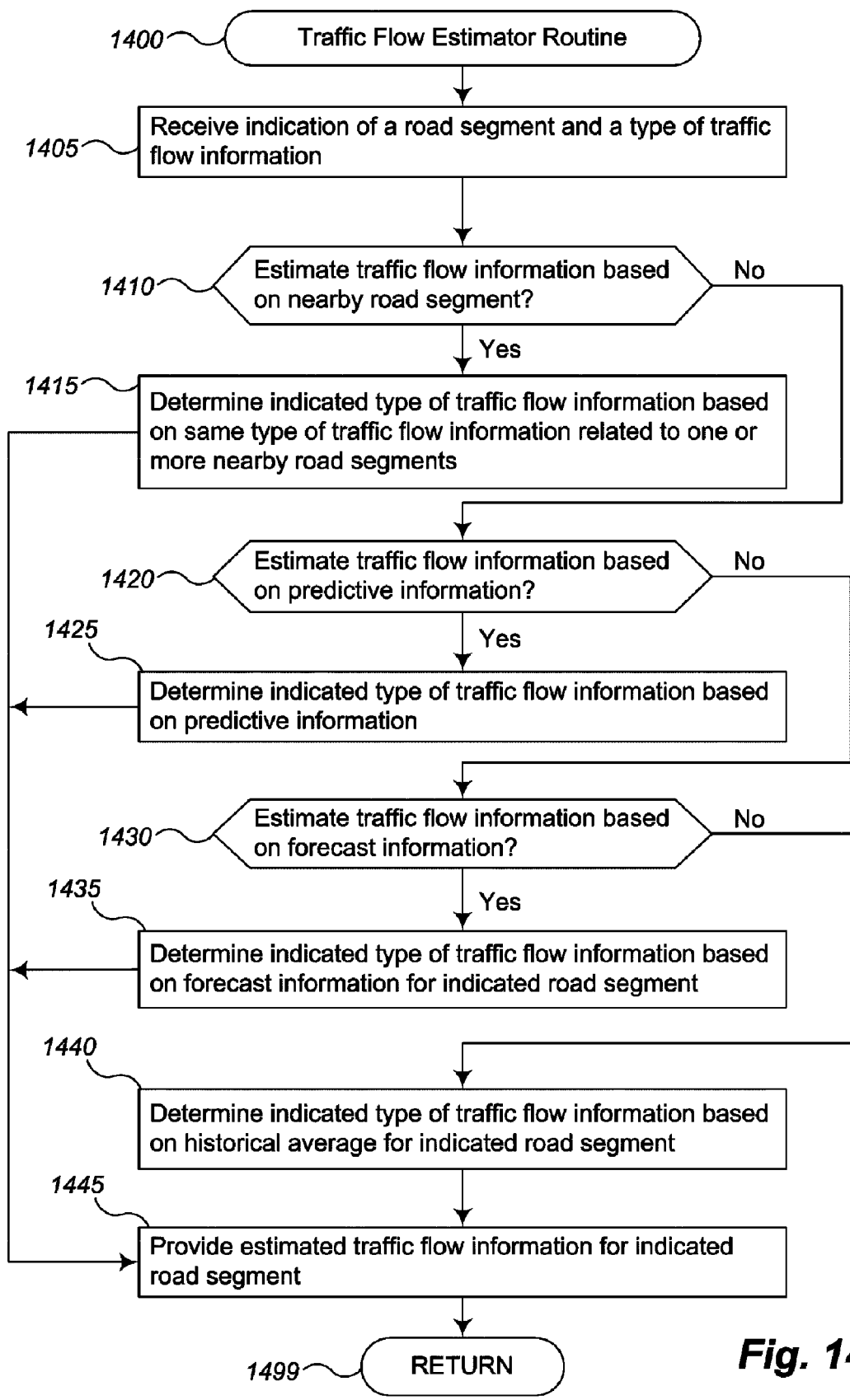
FIG. 14 is a flow diagram of an example embodiment of a Traffic Flow Estimator routine.

FIG. 14 is a flow diagram of an example embodiment of a Traffic Flow Estimator routine 1400. The routine may be provided by, for example, execution of a Traffic Flow Estimator component (not shown), such as to estimate various types of traffic flow information for a road segment in various ways. In this example embodiment, the routine may be invoked by the Data Sample Speed Assessor routine of FIG. 6 to obtain estimates of average speed and/or by the Data Sample Flow Assessor routine of FIG. 7 to obtain estimates of volume and/or occupancy, such as in situations when those routines are unable to obtain sufficient data for otherwise accurately performing their respective assessments.

The routine begins at step 1405 and receives an indication of a road segment, one or more time categories or other time periods, and of one or more types of traffic flow information, such as speed, volume, density, occupancy, etc. In step 1410, the routine determines whether to estimate the indicated type of traffic flow information based on one or more related road segments, such as based on whether such road segments have accurate information for the one or more types of traffic flow information during the one or more indicated time periods. Related road segments may be identified in various ways. For example, in some cases, information about road segments may include information about relationships between road segments, such as a first road segment typically having similar traffic patterns to a second (e.g., neighboring) road segment, such that traffic flow information for the second road segment may be utilized to estimate traffic flow on the first road segment. In some cases, such relationships may be determined automatically, such as based on a statistical analysis of the respect traffic flow patterns on the two road segments (e.g., in a manner similar to that discussed previously with respect to identifying similar data distributions for a given traffic sensor at different times, but instead analyzing similarity between two or more different traffic sensors, such as at the same time), whether an analysis that was previously and/or dynamically performed. Alternatively, one or more neighboring road segments may be selected as being related for an indicated road segment without any determination of a particular relationship between road segments having been performed. If it is determined to estimate traffic flow information based on related road segments, the routine proceeds to step 1415 and estimates value(s) for the indicated type(s) of traffic flow information based on the same type(s) of traffic flow information for the one or more related road segments. For example, average speed of the road segment may be determined based on the average traffic speed of one or more neighboring road segments (e.g., by using the traffic speed from one neighboring road segment, or averaging the traffic speeds from two or more neighboring road segments).

If it is instead determined in step 1410 not to estimate traffic flow information for the indicated road segment based on related road segments, the routine continues to step 1420 and determines whether to estimate traffic flow information for the indicated road segment during the one or more indicated time periods based on predicted information for the indicated road segment and indicated time periods. In some embodiments, such predicted information may only be available under certain conditions, such as if predictions are repeatedly made for multiple future times (e.g. every 15 minutes for the next three hours) while accurate current data is available. As such, if accurate input data for generating predictions becomes available for an extended time (e.g., for more than three hours), it may not be possible to obtain future traffic condition information predictions that may be utilized by this routine. Alternatively, in some embodiments such predicted future traffic condition information may not be available for other reasons, such as due to not being used in that embodiment. If it is determined in step 1420 to estimate traffic flow information based on predicted information, the routine proceeds to step 1425 and estimates the indicated type(s) of traffic flow information for the indicated road segment and indicated time period(s) based on predicted information obtained from, for example, the Predictive Traffic Information Provider system 360 of FIG. 3. Additional details related to predicting and forecasting future traffic flow conditions are discussed elsewhere.

If it is instead determined in step 1420 not to estimate traffic flow information for the indicated segment based on predicted information (e.g., due to that information not being available), the routine continues to step 1430 and determines whether to estimate traffic flow information for the indicated road segment during the one or more indicated time periods based on forecast information for that road segment and time period(s). In some embodiments, traffic conditions may be forecast for future times beyond those for which traffic conditions are predicted, such as in a manner that does not use at least some current condition information. As such, if predicted information is not available (e.g., because accurate input data for generating predictions has not been available for more than three hours), it still may be possible to utilize forecast information, such as information generated significantly in advance. If it is determined in step 1430 to estimate traffic flow information based on forecast information, the routine proceeds to step 1435 and estimates the indicated type(s) of traffic flow information for the indicated road segment and time period(s) based on forecast information obtained from, for example, the Predictive Traffic Information Provider system 360.

If it is instead determined in step 1430 not to estimate traffic flow information for the indicated road segment based on forecast information (e.g., due to the information not being available), the routine continues to step 1440 and estimates the indicated type(s) of traffic flow information for the indicated road segments and time period(s) based on historical average flow information for the indicated road segment (e.g., for the same or corresponding time periods, such as based on time categories that include a time-of-day category and/or day-of-week category). For example, if forecast information is unavailable (e.g., because input data has been unavailable for longer than the period for which the most recent prediction and forecast was generated, such that neither new predictions nor new forecasts can be generated), the routine may use historical average flow information for the indicated road segment. Additional details related to generating historical average flow information are available in U.S. patent application Ser. No. 60/838,761, filed Aug. 18, 2006 and entitled "Generating Representative Road Traffic Flow Information From Historical Data," which is hereby incorporated by reference in its entirety.

After steps 1415, 1425, 1435, or 1440, the routine proceeds to step 1445 and provides estimated traffic flow information of the indicated type(s) for the indicated road segment and indicated time period(s). The provided information may, for example, be returned to a routine (e.g., the Data Sample Flow Assessor routine) that called the routine and/or be stored (e.g., in a database or file system) for later utilization. After step 1445, the routine continues to step 1499 and returns.

FIGS. 9A-9C illustrate examples of actions of mobile data sources in obtaining and providing information about road traffic conditions. Information about road traffic conditions may be obtained from mobile devices (whether vehicle-based devices and/or user devices) in various ways, such as by being transmitted using a wireless link (e.g., satellite uplink, cellular network, WI-FI, packet radio, etc.) and/or physically downloaded when the device reaches an appropriate docking or other connection point (e.g., to download information from a fleet vehicle once it has returned to its primary base of operations or other destination with appropriate equipment to perform the information download). While information about road traffic conditions at a first time that is obtained at a significantly later second time provides various benefits (e.g., verifying predictions about the first time, for use as observed case data in later improving a prediction process, etc.), such as may be the case for information that is physically downloaded from a device, such road traffic condition information provides additional benefits when obtained in a realtime or near-realtime manner. Accordingly, in at least some embodiments mobile devices with wireless communication capabilities may provide at least some acquired information about road traffic conditions on a frequent basis, such as periodically (e.g., every 30 seconds, 1 minute, 5 minutes, etc.) and/or when a sufficient amount of acquired information is available (e.g., for every acquisition of a data point related to road traffic condition information; for every N acquisitions of such data, such as where N is a configurable number; when the acquired data reaches a certain storage and/or transmission size; etc.). In some embodiments, such frequent wireless communications of acquired road traffic condition information may further be supplemented by additional acquired road traffic condition information at other times (e.g., upon a subsequent physical download from a device, via less-frequent wireless communications that contain a larger amount of data, etc.), such as to include additional data corresponding to each data point, to include aggregated information about multiple data points, etc.

While various benefits are provided by obtaining acquired road traffic condition information from mobile devices in a realtime or other frequent manner, in some embodiments such wireless communications of acquired road traffic condition information may be restricted in various ways. For example, in some cases the cost structure of transmitting data from a mobile device via a particular wireless link (e.g., satellite uplink) may be such that transmissions occur at less-frequent intervals (e.g., every 15 minutes), or the mobile devices may have been pre-programmed to transmit at such intervals. In other cases, a mobile device may temporarily lose an ability to transmit data over a wireless link, such as due to a lack of wireless coverage in an area of the mobile device (e.g., due to no nearby cellphone receiver station), due to other activities being performed by the mobile device or a user of the device, or due to a temporary problem with the mobile device or an associated transmitter.

Accordingly, in some embodiments at least some such mobile devices may be designed or otherwise configured to store multiple data samples (or to cause such multiple data samples to be stored on another associated device) so that at least some information for the multiple data samples may be transmitted together during a single wireless transmission. For example, in some embodiments at least some mobile devices are configured to store acquired road traffic condition information data samples during periods when the mobile device is unable to transmit data over a wireless link (e.g., such as for a mobile device that typically transmits each data sample individually, such as every 30 seconds or 1 minute), and to then transmit those stored data samples together (or a subset and/or aggregation of those samples) during the next wireless transmission that occurs. Some mobile devices may also be configured to perform wireless transmissions periodically (e.g., every 15 minutes, or when a specified amount of data is available to be transmitted), and in at least some embodiments may further be configured to acquire and store multiple data samples of road traffic condition information (e.g., at a pre-determined sampling rate, such as 30 seconds or a minute) over the time interval between wireless transmissions and to then similarly transmit those stored data samples together (or a subset and/or aggregation of those samples) during the next wireless transmission. As one example, if a wireless transmission of up to 1000 units of information costs $0.25 and each data sample is 50 units in size, it may be advantageous to sample every minute and send a data set comprising 20 samples every 20 minutes (rather than sending each sample individually each minute). In such embodiments, while data samples may be delayed slightly (in the example of the periodic transmissions, by on average half of the time period between transmissions, assuming regular acquisitions of the data samples), the road traffic condition information obtained from the transmissions still provides near-realtime information. Moreover, in some embodiments additional information may be generated and provided by a mobile device based on multiple stored data samples. For example, if a particular mobile device is able to acquire only information about a current instant position during each data sample, but is not able to acquire additional related information such as speed and/or direction, such additional related information may be calculated or otherwise determined based on multiple subsequent data samples.

In particular, FIG. 9A depicts an example area 955 with several interconnected roads 925, 930, 935 and 940, and a legend indication 950 indicates the direction of North for the roads (with roads 925 and 935 running in a north-south direction, and with roads 930 and 940 running in an east-west direction). While only a limited number of roads are indicated, they may represent a large geographic area, such as interconnected freeways over numerous miles, or a subset of city streets spanning numerous blocks. In this example, a mobile data source (e.g., a vehicle, not shown) has traveled from location 945a to 945c over a period of 30 minutes, and is configured to acquire and transmit a data sample indicating current traffic conditions each 15 minutes. Accordingly, as the mobile data source begins to travel, it acquires and transmits a first data sample at location 945a (as indicated in this example by an asterisk "*"), acquires and transmits a second data sample 15 minutes later at location 945b, and acquires and transmits a third data sample a total of 30 minutes later at location 945c. In this example, each data sample includes an indication of current position (e.g., in GPS coordinates), current direction (e.g., northbound), current speed (e.g., 30 miles per hour), and current time, as represented for the 945a transmission using data values $P_a$, $D_a$, $S_a$ and $T_a$, and may optionally include other information as well (e.g., an identifier to indicate the mobile data source). While such acquired and provided current traffic conditions information provides some benefit, numerous details cannot be determined from such data, including whether the route from location 945b to 945c occurred in part along road 930 or along 940. Moreover, such sample data does not allow, for example, portions of road 925 between locations 945a and 945b to be treated as distinct road segments for which distinct traffic conditions can be reported and predicted.

In a manner similar to FIG. 9A, FIG. 9B depicts an example 905 with a mobile data source traveling over the interconnected roads 925, 930, 935 and 940 from location 945a to 945c over a period of 30 minutes, and with the mobile data source transmitting information about traffic conditions each 15 minutes (as indicated by the asterisks shown at locations 945a, 945b and 945c). However, in this example the mobile data source is configured to acquire and store data samples every minute, with a subsequent transmission including data from each of the data samples during the prior 15 minutes. Accordingly, as the mobile data source travels between location 945a and 945b, the mobile data source acquires a set 910b of 15 data samples 910b1-910b15, with each data sample indicated in this example with an arrow pointed in the direction of the mobile data source at the time of the data sample. In this example, each data sample similarly includes an indication of current position, current direction, current speed, and current time, and the subsequent transmission at location 945b includes those data values for each of the data samples 910b. Similarly, as the mobile data source travels between location 945b and 945c, the mobile data source acquires 15 data samples 910c1-910c15, and the subsequent transmission at location 945c includes the acquired data values for each of those 15 data samples. By providing such additional data samples, various additional information may be obtained. For example, it is now easily determined that the route from location 945b to 945c occurred in part along road 930 rather than road 940, allowing corresponding traffic condition information to be attributed to road 930. In addition, particular data samples and their adjacent data samples may provide various information about smaller sections of roads, such as to allow road 925 between locations 945a and 945b to be represented as, for example, up to 15 distinct road segments (e.g., by associating each data sample with a distinct road segment) that each has potentially distinct road traffic conditions. For example, it can be visually observed that the average speed for data samples 910b1-910b6 is approximately static (since the data samples are approximately equally spaced), that the average speed increased for data samples 910b7 and 910b8 (since the data samples correspond to locations that are farther apart, reflecting that greater distance was traveled during the given 1-minute interval between data samples for this example), and that the average speed decreased for data samples 910*b*11-910*b*15. While the data samples in this example provide information about such speed directly, in other embodiments such speed information may be derived from data sample information that includes only current position.

FIG. 9C depicts a third example 990 with a mobile data source traveling over a portion of the interconnected roads from location 965*a* to 965*c* over a period of 30 minutes, and with the mobile data source transmitting information about traffic conditions each 15 minutes (as indicated by the asterisks shown at locations 965*a*, 965*b* and 965*c*). As in FIG. 9C, the mobile data source is configured in this example to acquire and store data samples every minute, with a subsequent transmission including data from each of at least some of the data samples during the prior 15 minutes. Accordingly, as the mobile data source travels between location 965*a* and 965*b*, the mobile data source acquires a set 960*b* of 15 data samples 960*b*1-960*b*15. However, as is illustrated by co-located data samples 960*b*5-*b*13 (with circles used in this instance rather than arrows because no movement was detected for these data samples, but shown separately rather than on top of each other for the purposes of clarity), in this example the mobile data source has stopped for approximately 9 minutes at a location to the side of road 925 (e.g., to stop at a coffee shop). Accordingly, when the next transmission at location 965*b* occurs, the transmission may in some embodiments include all of the information for all of the data samples, or may instead omit at least some such information (e.g., to omit information for data samples 960*b*6-960*b*12, since in this situation they do not provide additional useful information if it is known that the mobile data source remained immobile between data samples 960*b*5 and 960*b*13). Moreover, while not illustrated here, in other embodiments in which the information for one or more such data samples is omitted, the subsequent transmission may be delayed until 15 data samples to be transmitted are available (e.g., if the periodic transmissions are performed based on amount of data to send rather than time). Moreover, as the mobile data source travels between location 965*b* and 965*c*, the mobile data source acquires data samples 960*c*13 and 960*c*14 in an area in which wireless communications are not currently available (as indicated in this example with open circles rather than arrows). In other embodiments in which each data sample is individually transmitted when acquired but is not otherwise saved, these data samples would be lost, but in this example are instead stored and transmitted along with the other data samples 960*c*1-960*c*12 and 960*c*15 at location 965*c*. While not shown here, in some situations a mobile data source may further temporarily lose the ability to obtain one or more data samples using a primary means of data acquisition (e.g., if a mobile data source loses the ability to obtain GPS readings for a few minutes)—if so, the mobile data source may in some embodiments report the other obtained data samples without further action (e.g., such as to allow the recipient to interpolate or otherwise estimate those data samples if so desired), while in other embodiments may attempt to obtain data samples in other manners (e.g., by using a less accurate mechanism to determine location, such as cellphone tower triangulation, or by estimating current location based on a prior known location and subsequent average speed and heading, such as via dead reckoning), even if those data samples have less precision or accuracy (e.g., which may be reflected by including a lesser degree of confidence or higher degree of possible error to those data samples, or by otherwise including an indication of how those and/or other data samples were generated).

While the example data samples in each of FIGS. 9B and 9C are illustrated for a single vehicle or other mobile data source for the purposes of clarity, in other embodiments the multiple data samples for a particular mobile data source may not be used to determine a particular route taken by that mobile data source, and more generally may not even be associated with each other (e.g., if the source of each mobile data sample is anonymous or otherwise undifferentiated from other sources). For example, if multiple data samples from a particular mobile data source are not used by a recipient to generate aggregate data related to those data samples (e.g., to generate speed and/or direction information based on successive data samples that provide only location information), such as when such aggregate data is included with each data sample or is not used, such a recipient may not be provided in some embodiments with identifying data related to the source of the mobile data samples and/or with indications that the multiple data samples are from the same mobile data source (e.g., based on a design decision to increase privacy related to the mobile data sources).

Instead, in at least some such embodiments, multiple mobile data sources are used together to determine road condition information of interest, such as to use multiple data samples from all mobile data sources for a particular road segment (or other portion of a road) to determine aggregate information for that road segment. Thus, for example, during a period of time of interest (e.g., 1 minute, 5 minutes, 15 minutes, etc.), numerous unrelated mobile data sources may each provide one or more data samples related to their own travel on a particular road segment during that time period, and if each such data sample includes speed and direction information (for example), an average aggregate speed may be determined for that time period and that road segment for all mobile data sources that are generally moving in the same direction, such as in a manner similar to a road sensor that aggregates information for multiple vehicles passing the sensor. A particular data sample may be associated with a particular road segment in various ways, such as by associating the data sample location with the road (or road segment) having the nearest location (whether for any road, or only for roads meeting specified criteria, such as being of one or more indicated functional road classes) and then selecting the appropriate road segment for that road, or by using an indication provided by a mobile data source along with a data sample of an associated road (or road segment). In addition, in at least some embodiments roads other than 1-way roads will be treated as distinct roads for the purposes of assigning data samples to roads and for other purposes (e.g., to treat the northbound lanes of a freeway as being a distinct road from the southbound lanes of the freeway), and if so the direction for a mobile data sample may further be used to determine the appropriate road with which the data sample is associated—in other embodiments, however, roads may be modeled in other manners, such as to treat a two-way city street as a single road (e.g., with average traffic conditions being reported and predicted for vehicles moving in both directions), to treat each lane of a multiple lane freeway or other road as a distinct logical road, etc.

In some embodiments, to facilitate the use of multiple mobile data sources to determine road condition information of interest, fleet vehicles may be configured in various ways to provide data samples of use. For example, if a large fleet of vehicles will each leave the same origination point at a similar time each day, various of the fleet vehicles may be configured differently regarding how soon and how often to begin providing data samples, such as to minimize a very large number of data points all near the single origination point and/or to provide variability in when data samples will be acquired and transmitted. More generally, a mobile data source device may be configured in various ways regarding how and when to acquire data samples, including based on total distance covered since a starting point (e.g., an origination point for a group of fleet vehicles), distance covered since a last data sample acquisition and/or transmission, total time elapsed since a starting time (e.g., a departure time of a fleet vehicle from an origination point), time elapsed since a last data sample acquisition and/or transmission, an indicated relationship having occurred with respect to one or more indicated locations (e.g., passing by, arriving at, departing from, etc.), etc. Similarly, a mobile data source device may be configured in various ways regarding how and when to transmit or otherwise provide one or more acquired data samples, such as when predefined conditions are satisfied, including based on total distance covered since a starting point, distance covered since a last data sample acquisition and/or transmission, total time elapsed since a starting time, time elapsed since a last data sample acquisition and/or transmission, an indicated relationship having occurred with respect to one or more indicated locations, an indicated number of data samples having been gathered, an indicated amount of data having been gathered (e.g., an amount such as to fill or substantially fill a cache used to store the data samples on the mobile device, or an amount such as to fill or substantially fill an indicated amount of time for a transmission), etc.

Figure 8:
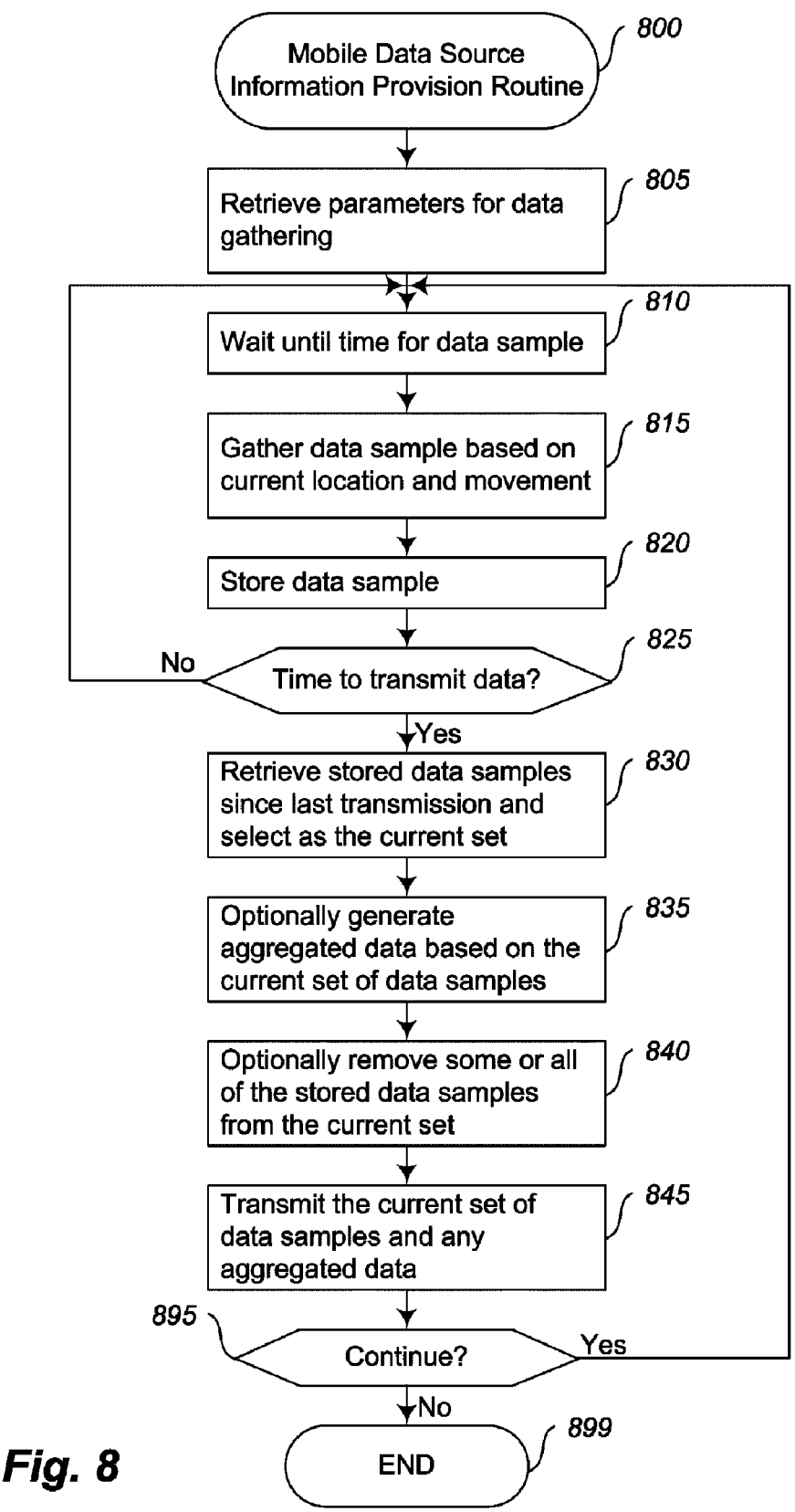
FIG. 8 is a flow diagram of an example embodiment of a Mobile Data Source Information Provision routine.

FIG. 8 is a flow diagram of an example embodiment of a Mobile Data Source Information Provision routine 800, such as may be provided by, for example, operation of a mobile data source device for each of one or more of the vehicle-based data sources 384 of FIG. 3 and/or other data sources 388 (e.g., user devices) of FIG. 3 and/or vehicle-based data sources 101 of FIG. 1 and/or other data sources 102 of FIG. 1. In this example, the routine acquires data samples for a particular mobile data source to indicate current traffic conditions, and stores the data samples as appropriate such that a subsequent transmission may include information for multiple data samples.

The routine begins at step 805, where parameters are retrieved that will be used as part of the data sample acquisition and providing, such as configurable parameters to indicate when data samples should be acquired and when transmissions should occur with information corresponding to one or more data samples. The routine continues to step 810 to wait until it is time to acquire a data sample, such as based on the retrieved parameters and/or other information (e.g., an indicated amount of time having passed since a prior data sample acquisition, an indicated distance having been traveled since a prior data sample acquisition, an indication to acquire data samples in a substantially continuous manner, etc.). The routine then continues to step 815 to acquire a data sample based on the current location and movement of the mobile data source, and stores the data sample in step 820. If it is determined in step 825 that it is not yet time to transmit data, such as based on the retrieved parameters and/or other information (e.g., an indicated amount of time having passed since a prior transmission, an indicated distance having been traveled since a prior transmission, an indication to transmit data samples as soon as they become available or in a substantially continuous manner, etc.), the routine returns to step 810.

Otherwise, the routine continues to step 830 to retrieve and select any stored data samples since the prior transmission (or since startup, for the first transmission). The routine then optionally in step 835 generates aggregated data based on multiple of the selected data samples (e.g., an overall average speed for all of the data samples, an average speed and a direction for each data sample if the acquired information provides only location information, etc.), although in other embodiments such aggregated data generation may not be performed. In step 840, the routine then optionally removes some or all of the acquired information for some or all of the data samples from the selected set of data samples (e.g., to transmit only selected types of data for each data sample, to remove data samples that appear to be outliers or otherwise erroneous, to remove data samples that do not correspond to actual movement of the mobile data source, etc.), although in other embodiments such information removal may not be performed. In step 845, the routine then transmits the current information in the current set of data samples and any aggregated information to a recipient that will use the data in an appropriate manner. In step 895, the routine determines whether to continue (e.g., whether the mobile data source continues to be in use and mobile), and if so returns to step 810. Otherwise, the routine continues to step 899 and ends. In embodiments and situations in which a mobile data source is not able to transmit data, whether due to temporary conditions or instead to reflect configuration of or limitations of the mobile data source, the steps 830-845 may not be performed until such time as the mobile data source is able to transmit or otherwise provide (e.g., via physical download) some or all of the data samples that have been acquired and stored since a prior transmission.

As previously noted, once information about road traffic conditions has been obtained, such as from one or more mobile data sources and/or one or more other sources, the road traffic conditions information may be used in various ways, such as to report current road traffic conditions in a substantially realtime manner, or to use past and current road traffic condition information to predict future traffic conditions at each of multiple future times. In some embodiments, the types of input data used to generate predictions of future traffic conditions may include a variety of current, past, and expected future conditions, and outputs from the prediction process may include the generated predictions of the expected traffic conditions on each of multiple target road segments of interest for each of multiple future times (e.g., every 5, 15 or 60 minutes in the future) within a pre-determined time interval (e.g., three hours, or one day), as discussed in greater detail elsewhere. For example, types of input data may include the following: information about current and past amounts of traffic for various target road segments of interest in a geographic area, such as for a network of selected roads in the geographic area; information about current and recent traffic accidents; information about current, recent and future road work; information about current, past and expected future weather conditions (e.g., precipitation, temperature, wind direction, wind speed, etc.); information about at least some current, past and future scheduled events (e.g., type of event, expected start and end times of the event, and/or a venue or other location of the event, etc., such as for all events, events of indicated types, events that are sufficiently large, such as to have expected attendance above an indicated threshold (for example, 1000 or 5000 expected attendees), etc.); and information about school schedules (e.g., whether school is in session and/or the location of one or more schools). In addition, while in some embodiments the multiple future times at which future traffic conditions are predicted are each points in time, in other embodiments such predictions may instead represent multiple time points (e.g., a period of time), such as by representing an average or other aggregate measure of the future traffic conditions during those multiple time points. Furthermore, some or all of the input data may be known and represented with varying degrees of certainty (e.g., expected weather), and additional information may be generated to represent degrees of confidence in and/or other metadata for the generated predictions. In addition, the prediction of future traffic conditions may be initiated for various reasons and at various times, such as in a periodic manner (e.g., every five minutes), when any or sufficient new input data is received, in response to a request from a user, etc.

Some of the same types of input data may be used to similarly generate longer-term forecasts of future traffic conditions (e.g., one week in the future, or one month in the future) in some embodiments, but such longer-term forecasts may not use some of the types of input data, such as information about current conditions at the time of the forecast generation (e.g., current traffic, weather, or other conditions). In addition, such longer-term forecasts may be generated less frequently than shorter-term predictions, and may be made so as to reflect different future time periods than for shorter-term predictions (e.g., for every hour rather than every 15 minutes).

The roads and/or road segments for which future traffic condition predictions and/or forecasts are generated may also be selected in various manners in various embodiments. In some embodiments, future traffic condition predictions and/or forecasts are generated for each of multiple geographic areas (e.g., metropolitan areas), with each geographic area having a network of multiple inter-connected roads—such geographic areas may be selected in various ways, such as based on areas in which current traffic condition information is readily available (e.g., based on networks of road sensors for at least some of the roads in the area) and/or in which traffic congestion is a significant problem. In some such embodiments, the roads for which future traffic condition predictions and/or forecasts are generated include those roads for which current traffic condition information is readily available, while in other embodiments the selection of such roads may be based at least in part on one or more other factors (e.g., based on size or capacity of the roads, such as to include freeways and major highways; based on the role the roads play in carrying traffic, such as to include arterial roads and collector roads that are primary alternatives to larger capacity roads such as freeways and major highways; based on functional class of the roads, such as is designated by the Federal Highway Administration; etc.). In other embodiments, future traffic condition predictions and/or forecasts may be made for a single road, regardless of its size and/or inter-relationship with other roads. In addition, segments of roads for which future traffic condition predictions and/or forecasts are generated may be selected in various manners, such as to treat each road sensor as a distinct segment; to group multiple road sensors together for each road segment (e.g., to reduce the number of independent predictions and/or forecasts that are made, such as by grouping specified numbers of road sensors together); to select road segments so as to reflect logically related sections of a road in which traffic conditions are typically the same or sufficiently similar (e.g., strongly correlated), such as based on traffic condition information from traffic sensors and/or from other sources (e.g., data generated from vehicles and/or users that are traveling on the roads, as discussed in greater detail elsewhere); etc.

In addition, future traffic condition prediction and/or forecast information may be used in a variety of ways in various embodiments, as discussed in greater detail elsewhere, including to provide such information to users and/or organizations at various times (e.g., in response to requests, by periodically sending the information, etc.) and in various ways (e.g., by transmitting the information to cellular telephones and/or other portable consumer devices; by displaying information to users, such as via Web browsers and/or application programs; by providing the information to other organizations and/or entities that provide at least some of the information to users, such as third parties that perform the information providing after analyzing and/or modifying the information; etc.). For example, in some embodiments, the prediction and/or forecast information is used to determine suggested travel routes and/or times, such as an optimal route between a starting location and an ending location over a network of roads and/or an optimal time to perform indicated travel, with such determinations based on predicted and/or forecast information at each of multiple future times for one or more roads and/or road segments.

In addition, various embodiments provide various mechanisms for users and other clients to interact with one or more of the traffic information systems (e.g., the Data Sample Manager system 350, RT Information Provider system 363, and/or Predictive Traffic Information Provider system 360 of FIG. 3, etc.). For example, some embodiments may provide an interactive console (e.g. a client program providing an interactive user interface, a Web browser-based interface, etc.) from which clients can make requests and receive corresponding responses, such as requests for information related to current and/or predicted traffic conditions and/or requests to analyze, select, and/or provide information related to travel routes. In addition, some embodiments provide an API ("Application Programmer Interface") that allows client computing systems to programmatically make some or all such requests, such as via network message protocols (e.g., Web services) and/or other communication mechanisms.

As previously noted, in at least some embodiments, predictions of future traffic conditions may be generated and used in various ways. For illustrative purposes, some embodiments are described below in which specific types of predictions are generated in specific ways using specific types of input, and in which generated prediction information is used in various specific ways. However, it will be understood that such future traffic predictions may be generated in other manners and using other types of input data in other embodiments, that the described techniques can be used in a wide variety of other situations, that future traffic forecasts may similarly be generated and used in various ways, and that the invention is thus not limited to the exemplary details provided.

Figure 15A:
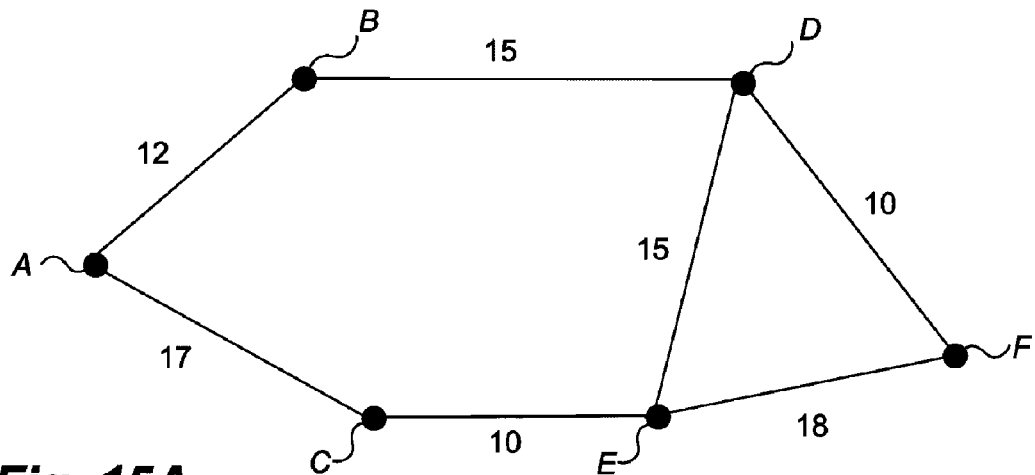
FIGS. 15A-15F illustrate examples of travel route selection based on predicted future traffic conditions.

FIGS. 15A-15F illustrate examples of performing travel route selection based on predicted future traffic conditions. In particular, FIG. 15A illustrates multiple potential travel routes between a starting point A and a destination point F in the form of an undirected graph, with intermediate nodes labeled B-E—for example, listing nodes in order along a route, one potential route is ABDF, while other potential routes are ABDEF, ACEF and ACEDF. In addition, the edges between the nodes in FIG. 15A are each labeled with a predicted time to travel between the two nodes connected by the edge. For example, at a starting time T1 represented by the graph, the predicted time to travel between node A and node B is 12 minutes and the predicted time to travel between node A and node C is 17 minutes. Similarly, for someone departing node B at starting time T1 and heading toward node D along edge BD (with an edge being represented by the node labels at the two ends of the edge), the predicted time for travel is 15 minutes. In other embodiments, other types of predicted information may instead be used as part of such travel route selection, such as predicted traffic congestion or predicted average speed.

Figure 15B:
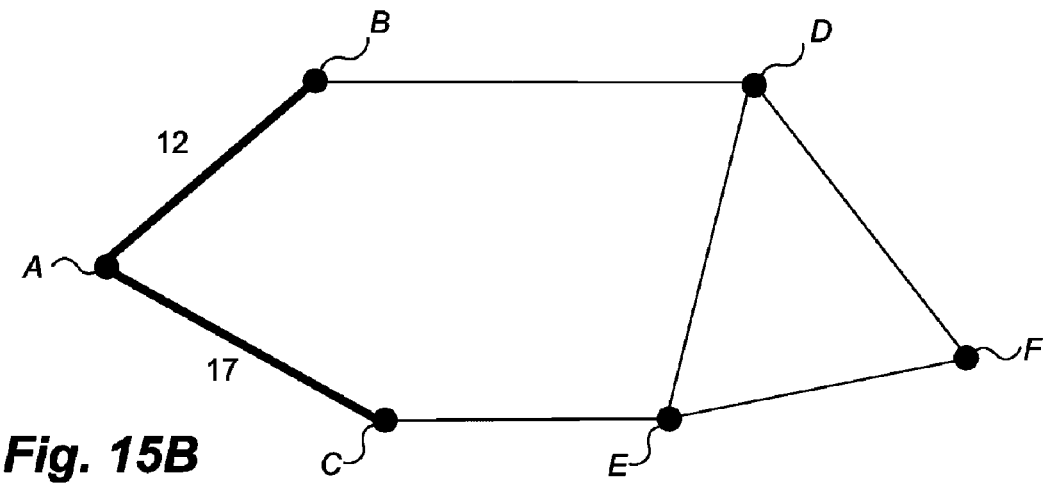
Figure 15C:
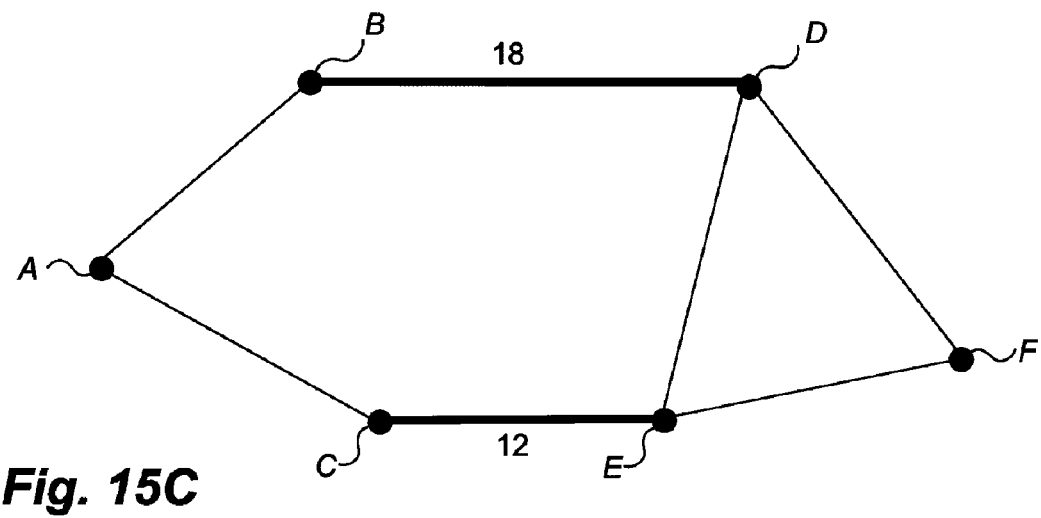
Figure 15D:
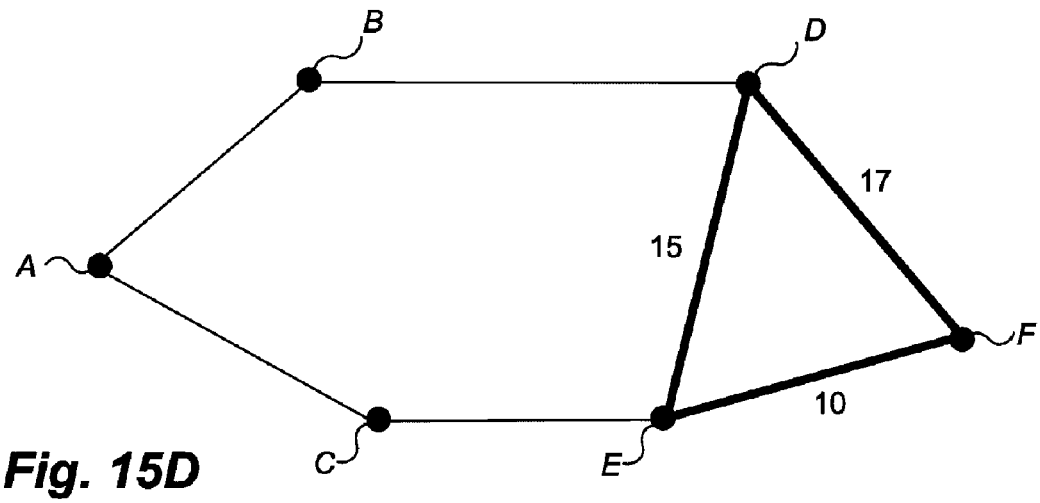

Thus, FIG. 15A illustrates the entire route graph at a single starting time T1 (e.g., 5 PM), such as for edges traveled by vehicles starting at any of the graph nodes at that starting time. Conversely, FIGS. 15B-15E illustrate various views showing predicted traffic condition information for multiple future times for use by the route selection process from node A to node F, with the intervals between each of the future times in this example being 15 minutes. For example, FIG. 15B illustrates a portion of the route graph based on predicted travel times for time T1 that are for use during a first time period beginning at starting time T1 and continuing until time T2, which in this example is a 15-minute time period from 5 PM until 5:15 PM, but shows only predicted time information that is relevant during that first time period for the route selection process, which in this example is for edges AB and AC. In particular, since edges beyond nodes B and C will not be reached in this example until the first time period is complete or substantially complete, the predicted traffic information at time T1 5 pm for edge CE (for example) is not of use since a vehicle would not reach that edge until a second time period of 5:15 pm-5:30 pm. Accordingly, FIG. 15C illustrates predicted travel information for the route graph during the second time period, such as based on predicted travel times for time T2 5:15 PM, with only predicted travel times for edges BD and CE shown since those edges correspond to road segments that would possibly be traveled by a vehicle that left node A at 5 pm. Similarly, FIG. 15D illustrates the route graph during a third time period between 5:30 and 5:45 PM, such as based on predicted travel times for time T3 5:30 PM, with the predicted travel times for edges DF, DE, and EF shown since those edges correspond to road segments that could be traveled by a vehicle that left node A at 5 pm. For purposes of simplification for this example, predicted travel times during a fourth time period between 5:45 PM and 6 PM (such as based on predicted travel times for time T4 5:45 PM) for edges DF, DE, and EF are the same as the predicted travel times for those edges during the third period, and the fourth time period times are not illustrated separately.

Figure 15E:
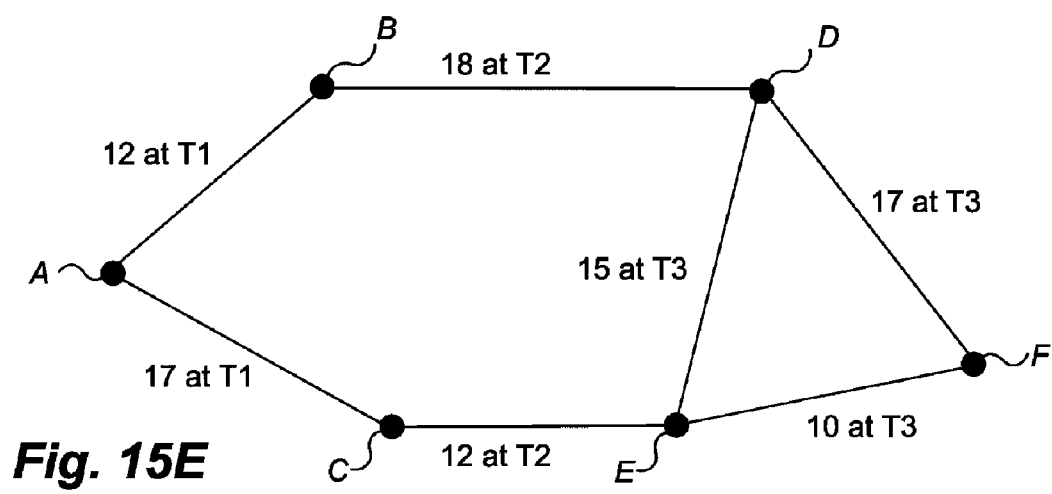

FIG. 15E illustrates a combined view of the information displayed in FIGS. 15B-15D, with predicted travel times for multiple future times being displayed. In particular, the edges are labeled with the predicted travel times that correspond to the time periods during which a vehicle traveling from source node A to destination node F would be expected to be traversing the route segments corresponding to the graph edges, with information displayed from left to right in the graph generally reflecting predictions relating to successively later time periods. Thus, the graph shows that the predicted travel time from A to B during the first time period is 12 minutes; from A to C during the first time period is 17 minutes; from B to D during the second time period is 18 minutes; from C to E during the second time period is 12 minutes; from D to E during the third time period is 15 minutes; from D to F during the third time period (and the fourth time period) is 17 minutes; and from E to F during the third time period (and the fourth time period) is 10 minutes.

Using the predicted travel times for these multiple time periods shown in FIG. 15E, it is possible to select the optimal route (in this example, the fastest route) from source node A to destination node F. In this simple example, total travel times for possible routes between the source and destination nodes are as follows (not counting routes in which a vehicle backtracks over a previously traveled edge): ABDF (total time=47); ABDEF (total time=55); ACEF (total time=39); and ACEDF (total time=61). Thus, based on the predictions made at the current time for the multiple future time periods, route ACEF will be the fastest route between source node A and destination node F, with an expected travel time of 39 minutes.

Returning to FIG. 15A, in which the predicted times for the entire route graph during the first time period are shown, this route group illustrates how a non-optimal route would be selected using this information since predicted travel times for future time periods are not considered. In particular, the predicted travel times for the same 4 routes using only the predicted first time period travel times are as follows: ABDF (travel time=37); ABDEF (travel time=60); ACEF (travel time=45); and ACEDF (travel time=52). Thus, this less-accurate information would have erroneously indicated that route ABDF would be the fastest route between source node A and destination node F with a time of 37 minutes, rather than the 47 minutes for that route that are indicated by using the predicted travel times indicated in FIG. 15E. Such inaccuracies may have arisen, for example, due to predicted increases in traffic congestion after the first time period, such as due to a scheduled event that causes traffic to significantly increase during the second and third time periods.

Figure 15F:
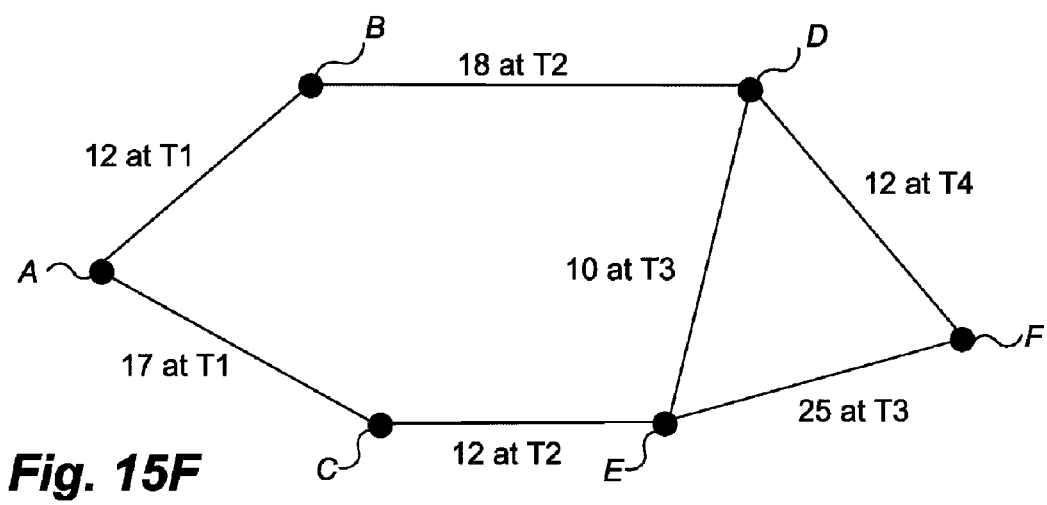

FIG. 15F shows a revised view of the information shown in FIG. 15E, and in particular shows updated predicted travel times for the third and fourth time periods with respect to edges DF, DE and EF. In this example, the updated predicted travel information is generated during the second time period based on new input information that became available at that time (e.g., an accident that occurred along a road corresponding to edge EF, thus significantly increasing predicted travel time for that edge), which may alter optimal routes between nodes in the graph. Such updated information may be particularly beneficial if it can be rapidly provided to users that are affected by changes in the predicted travel information. For example, a user who had begun traveling along route ACEF based on the predicted travel information shown in FIG. 15E would be traveling along a road corresponding to edge CE when the updated information becomes available, but the updated information indicates that traveling edge EF is no longer the optimal choice from node E—instead, traveling a revised route ED and DF is now predicted to take less time than the original edge EF route. If the user can be quickly notified while in transit, the user can thus dynamically adjust the route being taken to reflect the new predicted traffic information at multiple future time periods. Moreover, if the updated travel information had become available early in the first time period before a user had departed from node A, the user could be directed toward a new optimal route of ABDF.

Thus, FIGS. 15B-15F illustrate examples of using predicted future traffic conditions at multiple future times to provide benefits with respect to route planning.

FIGS. 16A-16F illustrate various graphical representations of example predictive models for representing knowledge about traffic conditions in a given geographic area. In some embodiments, such predictive models are automatically generated, maintained, and utilized to make predictions and/or forecasts regarding future traffic conditions at multiple future times, such as to predict future time series data for each road segment of interest. Such predictive models may include, but are not limited to, Bayesian or belief networks, decision trees, hidden Markov models, autoregressive trees, and neural networks. Some such predictive models may be probabilistic models, such as Bayesian network models, and such predictive models may be stored as part of one or more data structures on one or more computer-readable media.

FIGS. 16A-16D illustrate an example of the generation of a Bayesian network for representing probabilistic knowledge about traffic conditions. A Bayesian network is a directed acyclic graph ("DAG") consisting of nodes and edges. The nodes in the graph represent random variables, which may have discrete or continuous values that represent states in the domain being modeled. The edges in the graph represent dependence relationships between the variables. Nodes with no parents are root nodes. The probability distributions of root nodes are unconditional on any other nodes in the graph. A node with one or more parents has a probability distribution that is conditional on the probabilities of its parent nodes. By specifying the prior probabilities of the root nodes and the conditional probabilities of the non-root nodes, a Bayesian network graph can represent the joint probability distribution over all of the variables represented by nodes in the graph.

Figure 16A:
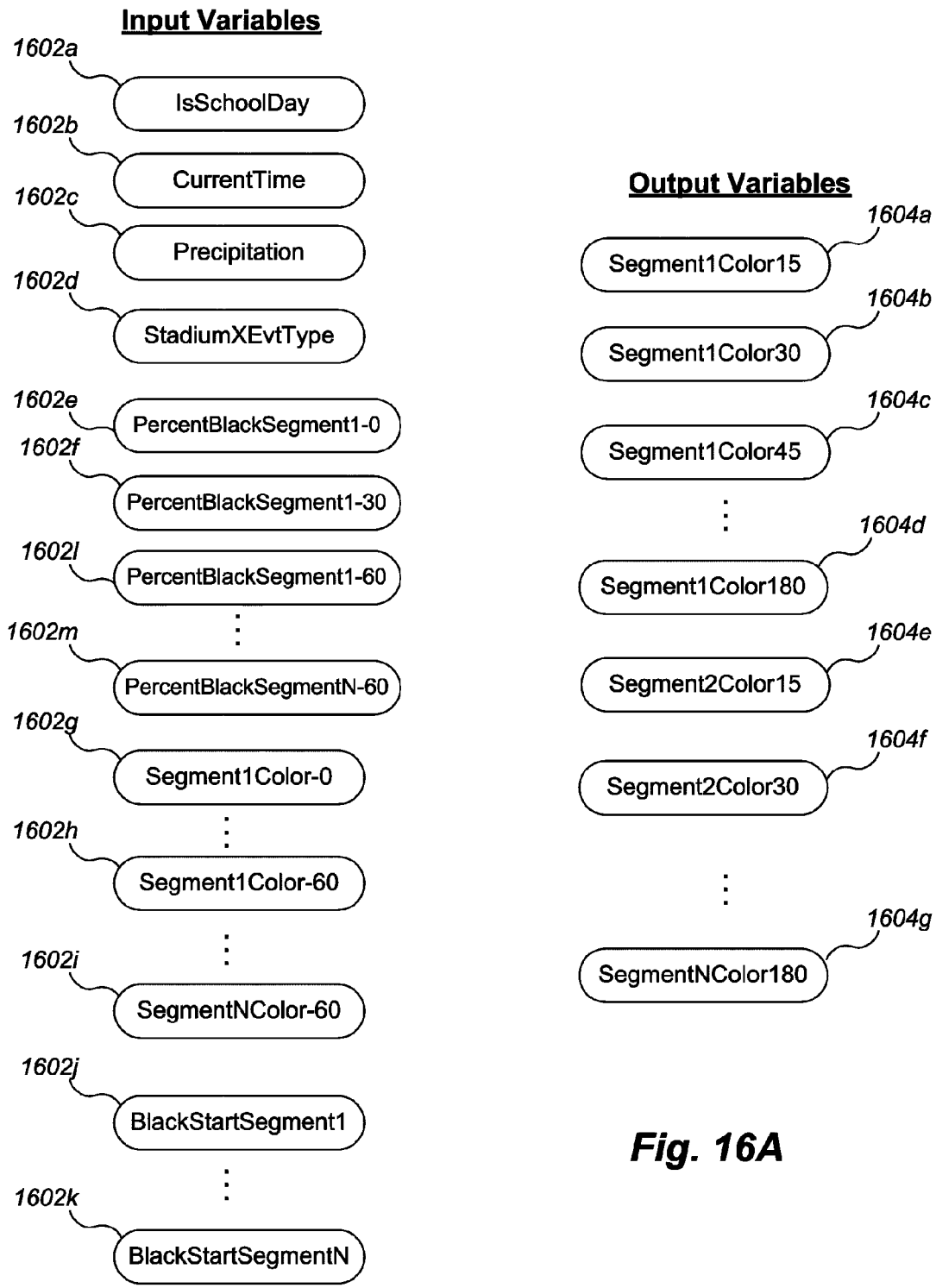

FIG. 16A illustrates an example collection of nodes that may be used to generate a Bayesian network predictive model for use in predicting traffic conditions. The illustrated nodes correspond to variables for which observed input data may be received, and to traffic conditions predictions that may be output with respect to a particular geographic area. In particular, nodes 1602*a-m* represent various input variables for use in the predictive model, which in this example will correspond to root nodes in the Bayesian network that will be generated. The example input variables are as follows. Node 1602*a* labeled IsSchoolDay may be used to represent whether school is in session on a particular day. Node 1602*b* labeled CurrentTime may be used to represent the time of day. Node 1602*c* labeled Precipitation may be used to represent an amount of precipitation over a particular time interval (e.g., the past 6 hours) or alternatively a current rate of precipitation. Node 1602*d* labeled StadiumXEvtType may be used to represent the type of event (if any) that is scheduled for or currently taking place at stadium X. Nodes 1602*e*, 1602*f* and 1602*l-m* may each be used to represent the traffic conditions on a particular road segment at the present time or at some time in the past, and in particular to represent the percentage of individual data sources (e.g., traffic sensors or other data sources) for that road segment that are reporting black (e.g., highly congested) traffic conditions at the time being represented—as previously noted, each road segment may be associated with one or more traffic sensors and/or with one or more other sources of traffic condition information for that road segment, as described in greater detail elsewhere. In some embodiments, traffic congestion level data for road segments is represented using colors (e.g., green, yellow, red, black) corresponding to enumerated increasing levels of traffic congestion, with green thus corresponding to the lowest level of traffic congestion and black corresponding to the highest level of traffic congestion. These nodes in this example are labeled PercentBlackSegmentX-Y, where X refers to a particular road segment and Y refers to a time in the past (e.g., in minutes, or other unit of time measurement) for which the percentage level of highly congested traffic on that road segment is being reported. For example, node 1602*f* labeled PercentBlackSegment1-30 may be used to represent the percentage of black-level congestion for road segment Segment1 30 minutes ago.

Nodes 1602*g-i* may each be used to represent the average or most common traffic conditions on a particular road segment at the present time or at some time in the past. These nodes are labeled SegmentXColor-Y in this example, where X refers to a particular road segment and Y refers to a time in the past (e.g., in minutes, or other unit of time measurement) at which a particular level of traffic congestion on that road segment has been identified (with the traffic congestion level represented here with its corresponding color). For example, node 1602*h* labeled Segment1Color-60 may be used to represent the traffic conditions 60 minutes ago on road segment Segment1, with the level of traffic congestion at that time being illustrated with the appropriate congestion color. Nodes 1602*j-k* may each be used to represent how long the levels of traffic congestion for a particular road segment have been continuously reported as being black. For example, node 1602*j* labeled BlackStartSegment1 may be used to represent how long the level of traffic congestion on road segment Segment1 has been continuously reported as being black. A variety of other input variables may be used in other embodiments, such as to provide additional details related to various of the types of conditions shown or to represent other types of conditions, as discussed in greater detail below.

Nodes 1604*a-g* in FIG. 16A represent output variables in the predictive model, and in particular correspond to predictions regarding traffic conditions that may be made given prior probabilities assigned to input nodes 1602*a-m* and any current input information for those input nodes. Each output node 1604*a*-1604*g* in this example is labeled SegmentX-ColorY, where X refers to a particular road segment and Y refers to a time in the future for which a particular color corresponding to a level of traffic congestion on that road segment is predicted. For example, node 1604*a* labeled Segment1Color15 may be used to represent the predicted traffic conditions on road segment Segment1 at 15 minutes in the future. For each road segment, traffic conditions are represented for a number of future times. For example, nodes 1604*a*-1604*d* represent the predicted traffic conditions on road segment Segment1 at 15-minute intervals over a three hour-long window into the future. In the illustrated embodiment, traffic conditions on N road segments are represented, each having 12 nodes corresponding to the twelve 15-minute time intervals over which traffic conditions are to be predicted. In other embodiments, larger or smaller future time windows and/or more or less time intervals may be represented.

FIG. 16B illustrates the possible values that may be taken by the variables corresponding to nodes depicted in FIG. 16A. In table 1610, column 1612*a* lists the variable name and column 1612*b* lists the possible values the corresponding variable may take, which may be either continuous or discrete. Rows 1614*a-g* each list an individual variable name and its corresponding range of values. For example, row 1614*a* illustrates that the IsSchoolDay input variable may take the values true or false, corresponding to the observation that the current day is a school day or not, while row 1614*b* illustrates that the Precipitation input variable may take one of the enumerated values of none, low, medium, or high. In this example, precipitation is measured as a discretized quantity over a fixed time interval for the sake of simplicity, although in other embodiments precipitation may be represented instead in other manners (e.g., as a continuous quantity of rain over a fixed time interval, as a current rate of rainfall, etc.). Row 1614*c* illustrates that the StadiumXEvtType input variable may take one of the values none, football, concert, soccer, or other, although in other embodiments the event type may take on a greater or lesser number of possible values (e.g., a Boolean value indicating whether or not there is an event). Row 1614*d* illustrates that each PercentBlackSegmentX-Y input variable may take a real numbered value in the closed interval from 0.0 to 1.0, representing the percentage of data points (e.g., road sensor readings, mobile data source values, etc.) or other sub-segments for the road segment SegmentX on which black traffic congestion level conditions are being reported at the corresponding time Y minutes in the past. Row 1614*e* illustrates that each BlackStartSegmentX input variable may take one of the values notblack, 0, 5, 10, 15, . . . 30, with the "notblack" value indicating that the road segment SegmentX has not had a black traffic congestion level condition in the last 30 minutes, and with the other values indicating the closest number of minutes during the last 30 minutes that black traffic conditions have been continuously reported on the road segment SegmentX prior to the current time. For example, a value of 10 means that black traffic conditions have been continuously reported for approximately the last 10 minutes, and a value of 0 means that black traffic conditions have been continuously reported for zero minutes (or for less than 2½ minutes if time is rounded down) but that black conditions have previously been present during the last 30 minutes (otherwise, the notblack value would be used). Row 1614f illustrates that the SegmentX-ColorY output variable may take one of the enumerated values green, yellow, red, or black, corresponding to increasing levels of traffic congestion reported on road segment X at Y minutes in the future. Row 1614g illustrates that additional possible values for additional variables may be represented.

FIG. 16C illustrates a collection of example data corresponding to observations made regarding traffic conditions in a given geographic area. Each row represents an observation record consisting of related observations for each of multiple of the variables in the predictive model, such as to reflect a particular time or situation. In table 1620, columns 1622a-1622f correspond to input variables represented by nodes 1602a-m in FIG. 16A and columns 1622g-1622j correspond to output variables represented by nodes 1604a-g in FIG. 16A, with some nodes not represented for the sake of clarity. For example, row 1624a illustrates a first observation record corresponding to an observation at a time at which school was in session; no precipitation had been measured; a soccer event was scheduled to be occurring in stadium X; black traffic congestion level conditions were reported for 22 percent of road segment SegmentX at a time Y minutes ago; and black traffic congestion level conditions were continuously reported on road segment SegmentN for approximately zero minutes. In addition, 15 minutes after the above observations were made, red traffic congestion level conditions were reported on road segment Segment1; black traffic congestion level conditions were reported on road segment Segment1 30 minutes after those observations; and yellow traffic congestion level conditions were reported on road segment SegmentN 180 minutes after those observations. Rows 1624b-g similarly illustrate additional observation records, and it will be appreciated that actual observation data may include very large numbers of such observations.

Figure 16D:
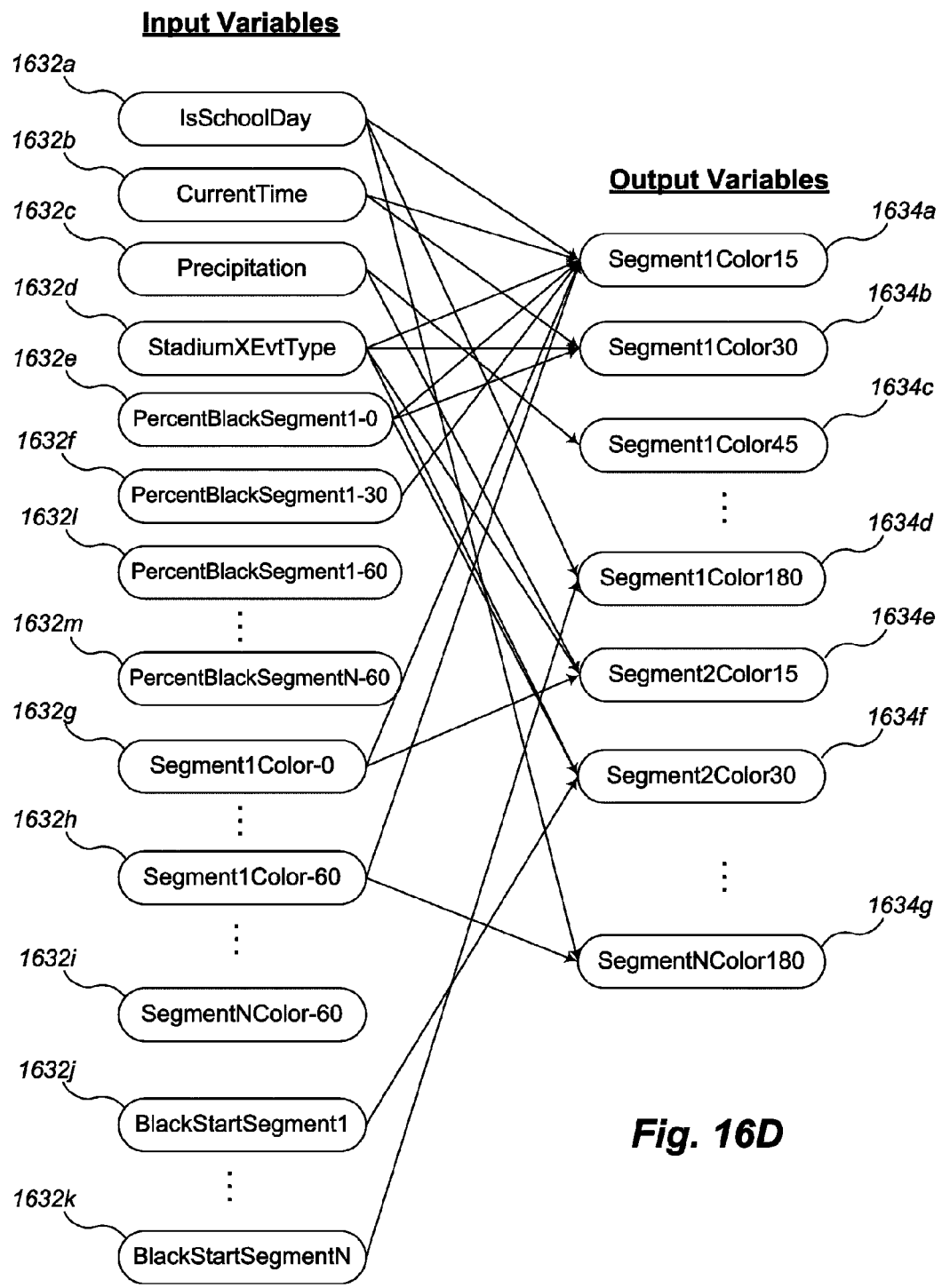

FIG. 16D illustrates an example Bayesian network that may be generated based on observation data such as that illustrated in FIG. 16C, and that may be used as a predictive model for generating future traffic conditions predictions. As is shown, the nodes depicted in FIG. 16D represent the same input and output variables as the nodes as in FIG. 16A, but arcs now connect the input variable nodes 1632a-m to the output variable nodes 1634a-g such that each of the output nodes is now the child of one or more of the input nodes 1632a-m corresponding to input variables. Each arc directed from a parent node to a child node represents dependence between the child node and the parent node, meaning that the observed data from which the Bayesian network structure was generated indicates that the probability of the child node is conditional on the prior probability of its parent node. For example, node 1634c in this example has a single parent node 1632c, which can be understood to mean that the probability of the output variable Segment1Color45 represented by node 1634c is conditional on the prior probability of the Precipitation input variable represented by node 1632c. Thus, when input information is currently obtained for the Precipitation input variable, a predicted value for the traffic congestion level color of road segment Segment1 at future time 45 minutes can be determined. If a child node has multiple parent nodes, its probability is conditional on the probabilities of all combinations of its multiple parent nodes. For example, output node 1634a has seven parent nodes in this example, those being input nodes 1632a, 1632b, 1632d, 1632e, 1632f, 1632g and 1632h, which can be understood to mean that the probability of the output variable Segment1Color15 represented by node 1634a is conditional on the prior probabilities of the input variable IsSchoolDay represented by node 1632a, the input variable CurrentTime represented by node 1632b, the input variable StadiumXEvtType represented by node 1632d, the input variable PercentBlackSegment1-0 represented by node 1632e, the input variable PercentBlackSegment1-30 represented by node 1632f, the input variable Segment1Color-0 represented by node 1632g, and the input variable Segment1Color-60 represented by node 1632h.

Intuitively, the Bayesian network may be understood to represent causal relationships. For example, the illustrated Bayesian network expresses causal relationships between input factors such as school schedules, stadium events, weather, and current and past traffic conditions (as represented by input nodes 1632a-m) and output future traffic conditions on various road segments (as represented by output nodes 1634a-g). As one specific example, the traffic conditions reported 60 minutes ago on road segment Segment1 and whether it is a school day may influence the traffic conditions 180 minutes in the future on road segment SegmentN, such as if road segments Segment1 and SegmentN are related (e.g., are nearby to each other) and if significant traffic reported on road segment Segment1 on school days has a later impact on road segment SegmentN. This relationship is depicted in FIG. 16D by way of arcs from each of node 1632a labeled IsSchoolDay and node 1632h labeled Segment1Color-60 to node 1634g labeled SegmentNColor180.

The structure and probability distributions of a Bayesian network such as that depicted in FIG. 16D may be generated from observation data via learning algorithms that determine the corresponding relationships and values, such as to determine a network structure that best matches the given observation data. In addition, at least some such learning algorithms can proceed with incomplete data (e.g., such as where some of the observation records are missing some data elements), and may further in some embodiments generate more complicated network structures (e.g., by identifying and representing one or more levels of intermediate nodes between the input nodes and output nodes, such as to reflect high-level relationships between groups of input nodes and/or output nodes). Additional details related to one set of example techniques for use in some embodiments for generating a Bayesian network based on observed case information are included in "A Tutorial on Learning Bayesian Networks," David Heckerman, March 1995, Technical Report MSR-TR-95-06 from the Microsoft Research Advanced Technology Division of Microsoft Corporation and available at ftp://ftp.research.microsoft.com/pub/tr/tr-95-06.pdf, which is hereby incorporated by reference in it entirety.

FIGS. 16E-J depict example decision trees that may each be generated based on observation data, such as that illustrated in FIG. 16C and in conjunction with the example Bayesian network illustrated in FIG. 16D, and that may each be used as part of a predictive model for generating future traffic conditions predictions for a particular road segment at a particular future time. As previously noted, a Bayesian network such as the one depicted in FIG. 16D indicates probabilistic relationships between various variables. A decision tree allows a subset of such relationships to be encoded in a manner that may be used to efficiently compute a predicted value for an output variable given a set of input values. In particular, a decision tree includes numerous decisions arranged in a tree structure, such that possible answers to a decision each lead to a different sub-tree based on that answer, and with the decisions and answers arranged so as to quickly split multiple cases with different outcomes into different sub-trees. Given a set of observation data such as that shown in FIG. 16C, decision trees such as those shown in FIGS. 16E-J may be automatically generated via learning algorithms that determine the best decisions and answers to include in the decision tree and the best structure of the tree to facilitate rapid decisions based on input data to reflect current conditions. Additional details related to one set of example techniques for use in some embodiments for generating decision trees based on observed case information and/or a corresponding Bayesian network are included in "Scalable Classification over SQL Databases," Surajit Chaudhuri et al., Microsoft Research Division of Microsoft Corporation, March 1999, Proceedings of 15th International Conference on Data Engineering, Sydney, Australia and available at ftp://ftp.research.microsoft.com/users/AutoAdmin/icde99.pdf, which is hereby incorporated by reference in its entirety.

In the illustrated embodiment, each decision tree is used to generate the predicted traffic congestion level conditions on a single road segment at a single future time given current condition information for input variables. As described in more detail with reference to FIGS. 16A-D, in some embodiments, at each of one or more successive current times, traffic conditions for multiple future times are modeled based on the information available at the current time of the modeling, such as every 15 minutes of a three-hour time interval, resulting in twelve decision trees per modeled road segment. In FIGS. 16E-J, the decision tree nodes are each labeled with a variable name corresponding to one of the input variables described with reference to FIGS. 16A-D, and the arcs emanating from a given node representing an input variable are each labeled with one or more of the possible values that may be taken by the variable. A path is determined by starting at the root node of the tree, using the value in the set of input data corresponding to the variable represented by that node to determine which arc to follow to a child node, and repeating the process for each successive children along the path until a leaf node is reached. In FIGS. 16E-J, leaf nodes are rectangular in shape, and each represent a most likely future traffic congestion level prediction for the given set of input data.

Figure 16E:
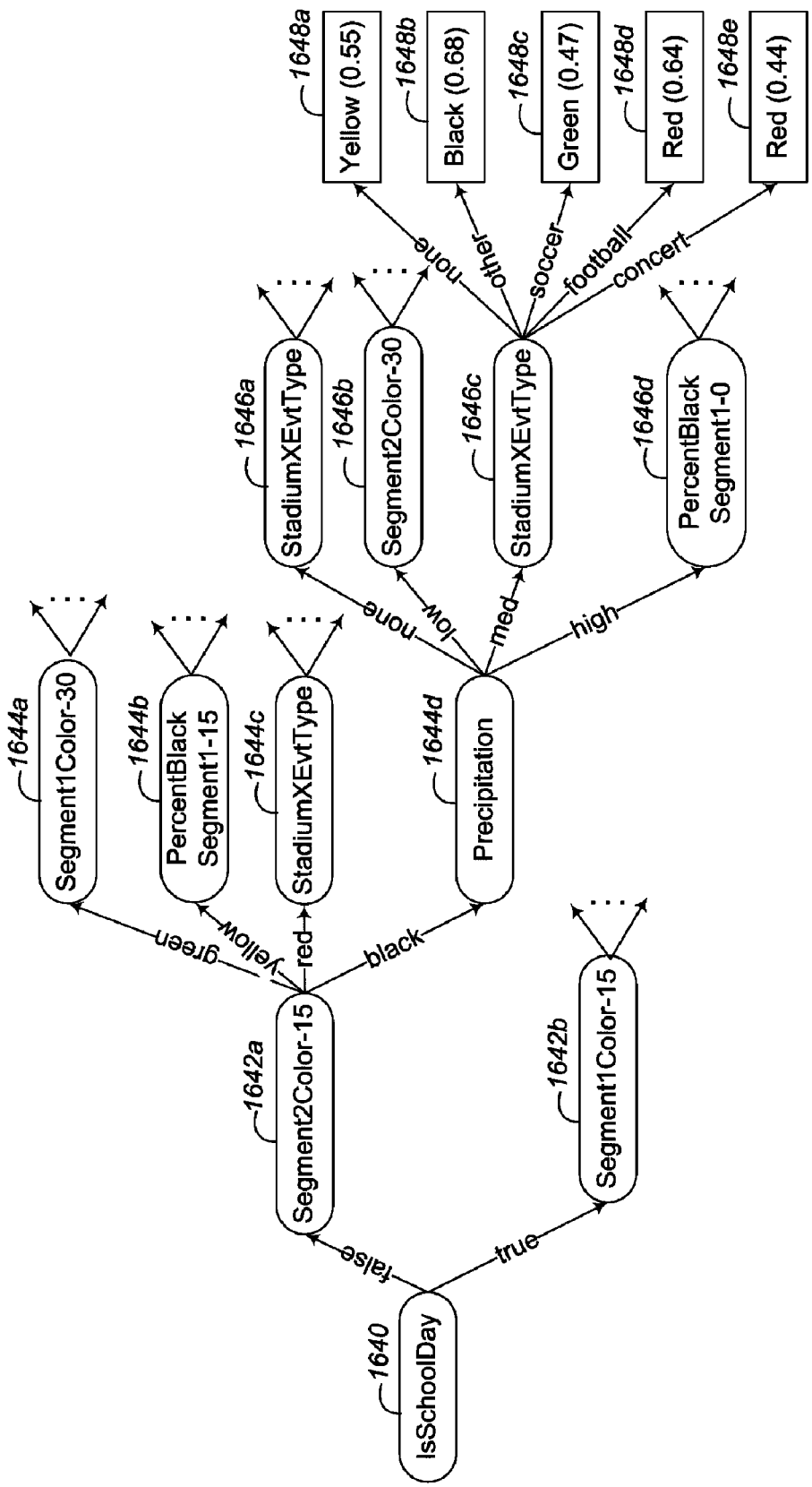

FIG. 16E shows a portion of an example decision tree for predicting future traffic congestion levels for road segment Segment1 at a future time of 15 minutes, and in particular illustrates a single path from the root node to possible leaf nodes, although it will be understood that in an actual decision tree numerous other paths will similarly lead to other such possible leaf nodes. In this example, the root node 1640 of the illustrated decision tree corresponds to the IsSchoolDay input variable, with the path leading to node 1642*b* being followed if it is currently a school day and with the path leading to node 1642*a* being followed otherwise. Node 1642*a* represents the Segment2Color-15 input variable, with possible values of the traffic congestion color (e.g., green, yellow, red, black) of road segment Segment2 fifteen minutes in the past leading to nodes 1644*a-d* as shown. For example, if it is currently determined that black was reported 15 minutes ago on this road segment, the path to node 1644*d* is followed, which represents the Precipitation input variable. Possible values of the Precipitation input variable from node 1644*d* lead to nodes 1646*a-d* as shown. For example, if the current measured precipitation is medium, the path to node 1646*c* is followed, which represents the StadiumXEvtType input variable. Possible values of the StadiumXEvtType input variable lead to leaf nodes 1648*a-e* as shown, with each of these leaf nodes representing an associated predicted future traffic congestion level on road segment Segment1 at a future time of 15 minutes. In this example, each leaf node is also labeled with a confidence level associated with the predicted future traffic congestion level (as shown by the value in parenthesis), such as may be determined in various ways. As one example, node 1648*d* indicates that if a football game is currently scheduled, then a red traffic congestion level condition on road segment Segment1 is predicted for future time 15 minutes with a confidence level of 64%, while node 1648*c* indicates that if a soccer game is instead currently scheduled then green traffic congestion level conditions are predicted on road segment Segment1 for future time 15 minutes with a confidence level of 47%. This difference may be attributed, for example, to the relative attendance and corresponding traffic for events of the two sports within the given geographic area, to different schedules (e.g., start, duration or end times) for such types of events, and/or to different patterns of traffic flow before and/or after the event (e.g., concert attendees may tend to arrive and/or depart en masse, whereas sporting event attendees may tend to arrive and/or depart more sporadically over larger time intervals).

Figure 16F:
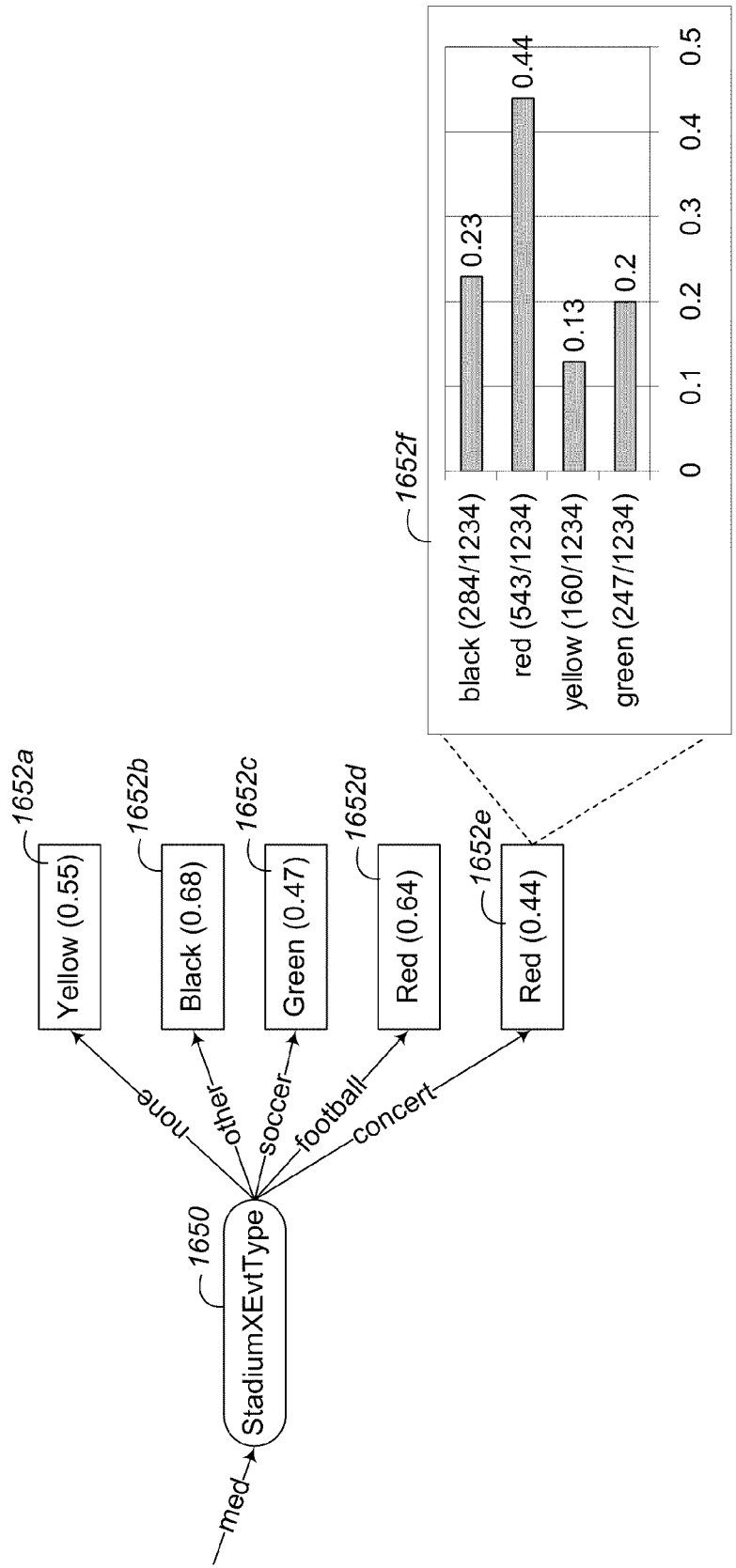

FIG. 16F shows a detailed view of one example leaf node of the example decision tree of FIG. 16E. In particular, a detailed view of leaf node 1652*e* is shown, which corresponds to the leaf node 1648*e* of FIG. 16E. FIG. 16F shows a histogram 1652*f* for node 1652*e*, which illustrates a probability distribution over all possible outcomes for node 1652*e* in the observed data used to generate the decision tree. In this example, the histogram 1652*f* shows the four possible traffic congestion level values (e.g., black, red, yellow, green) and the associated frequency of each value from the observed data. As can be seen from the histogram, the outcome with the highest frequency is a red traffic congestion level, with a frequency of 44% of the observed cases (shown as being the outcome in 543 of 1234 observed cases). In this example, the highest frequency outcome will be selected as the predicted outcome at a particular leaf node, and the frequency of that particular outcome in the observed data will be selected as the confidence value for the prediction. In other embodiments, confidence values may be determined in other manners, such as based on a relationship of the highest frequency outcome to an overall mean, median, or other statistical aggregate measure of the outcomes.

Figure 16G:
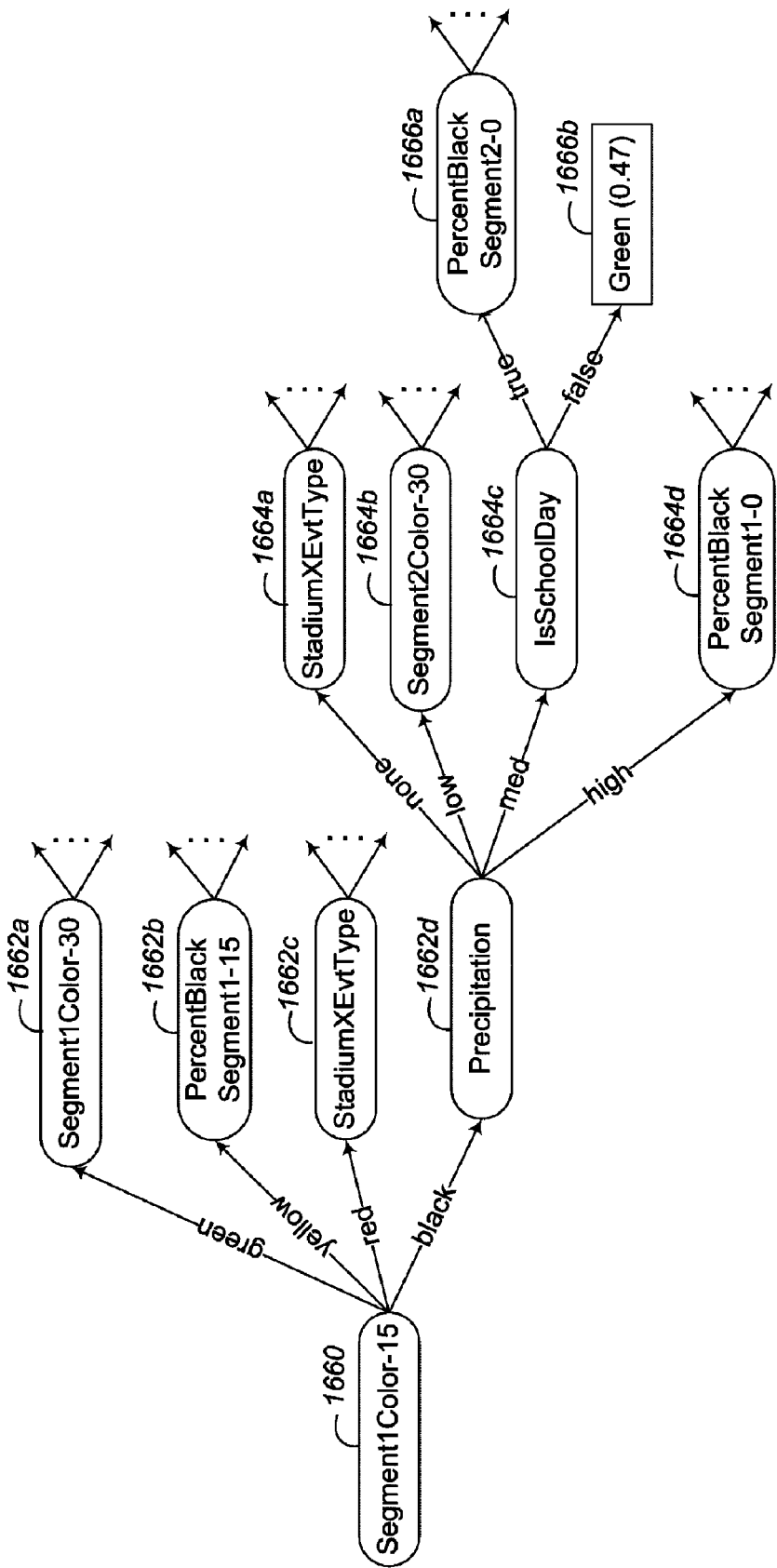

In a manner similar to that of FIG. 16E, FIG. 16G shows a portion of another example decision tree for road segment Segment1, with this decision tree representing predicted future traffic congestion levels for road segment Segment1 at a future time of 30 minutes. In particular, this decision tree illustrates a path from root node 1660 to a leaf node 1666*b*, which results in a most likely prediction of green traffic congestion level conditions with an associated confidence value of 47% based on input conditions corresponding to that path. In this example, the structure of the decision tree of FIG. 16G differs from that of the decision tree of FIG. 16E, even though it is used to compute predictions for the same road segment, based on the observed data reflecting different relevant factors for 30-minute future predictions than for 15-minute future predictions. For example, the decision tree of FIG. 16G begins with node 1660 that corresponds to the input variable Segment1Color-15, whereas the decision tree of FIG. 16E begins with node 1640 that corresponds to the input variable IsSchoolDay.

Figure 16H:
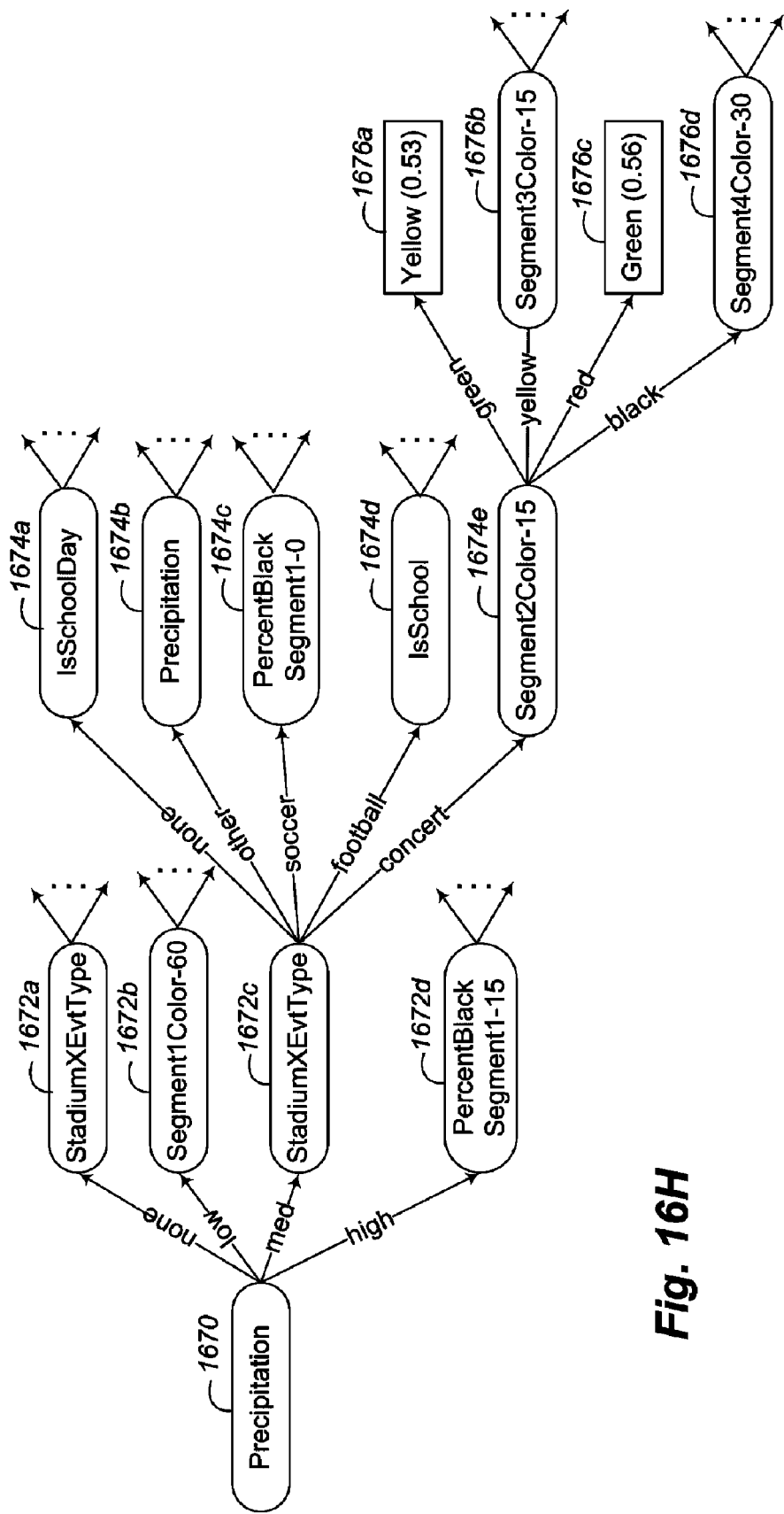

FIG. 16H shows a portion of an example decision tree for predicting future traffic congestion levels for road segment Segment1 at a future time of 60 minutes. In a similar manner to that of FIG. 16G, the structure of this decision tree differs from that of the tree in FIG. 16E, as well as that of FIG. 16G. This decision tree shows a path from root node 1670 to a leaf node 1676*a* that yields a most likely prediction of yellow traffic congestion level conditions with an associated confidence value of 53%. In addition, this decision tree shows a second path from root node 1670 to a leaf node 1676*c* that yields a most likely prediction of green traffic congestion level conditions with an associated confidence value of 56%.

Figure 16I:
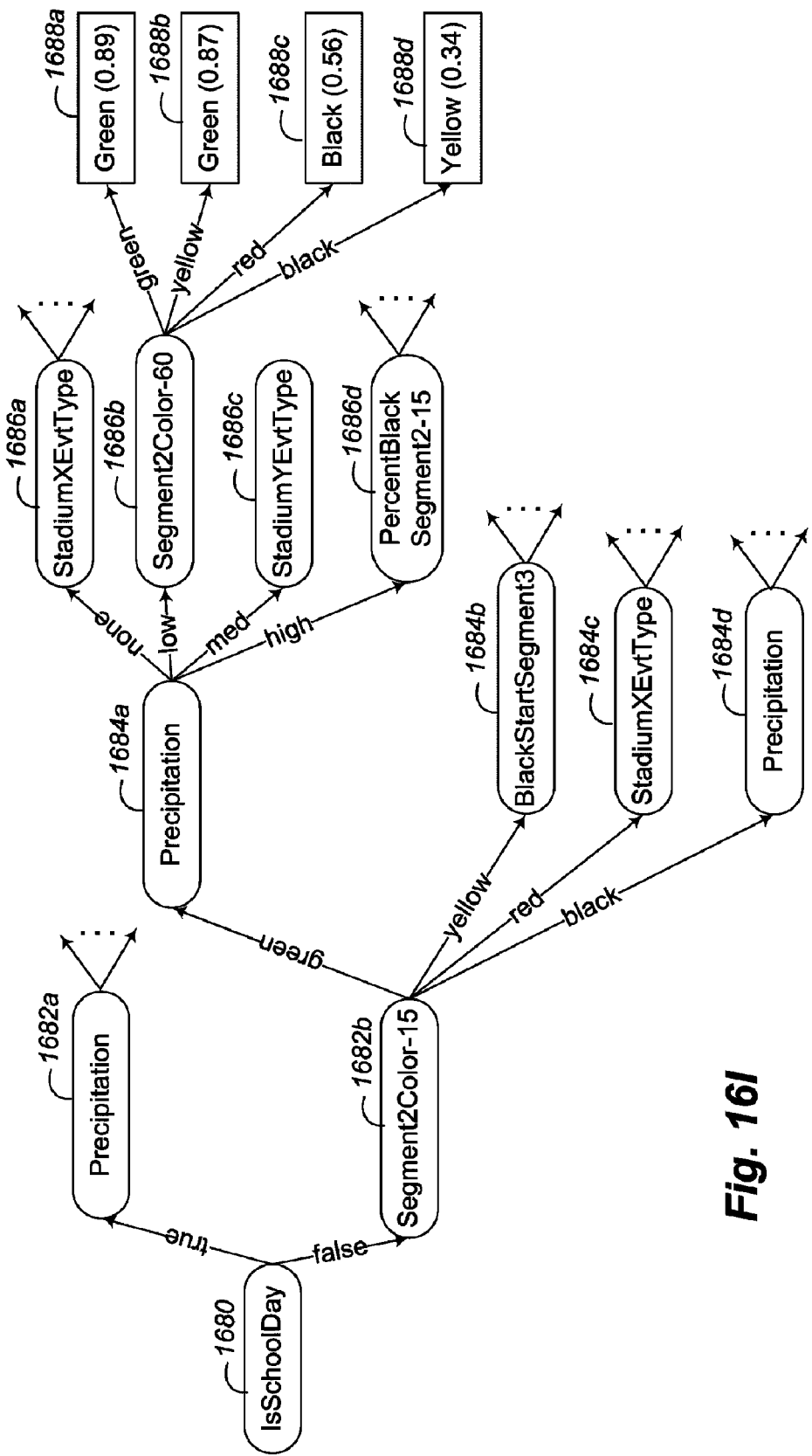

FIG. 16I shows a portion of an example decision tree for predicting future traffic congestion levels for road segment Segment2 at a future time of 30 minutes. This decision tree may be used to predict traffic conditions for road segment Segment2, as opposed to road segment Segment1 as depicted in FIGS. 16E, 16G, and 16H, but otherwise has a similar structure and use as the previously discussed decision trees. This decision tree shows four paths from root node 1680 to leaf nodes 1688*a-d*, which result in most likely predictions of green, green, black, and yellow traffic congestion level conditions with associated confidence values of 89%, 87%, 56%, and 34%, respectively.

Figure 16J:
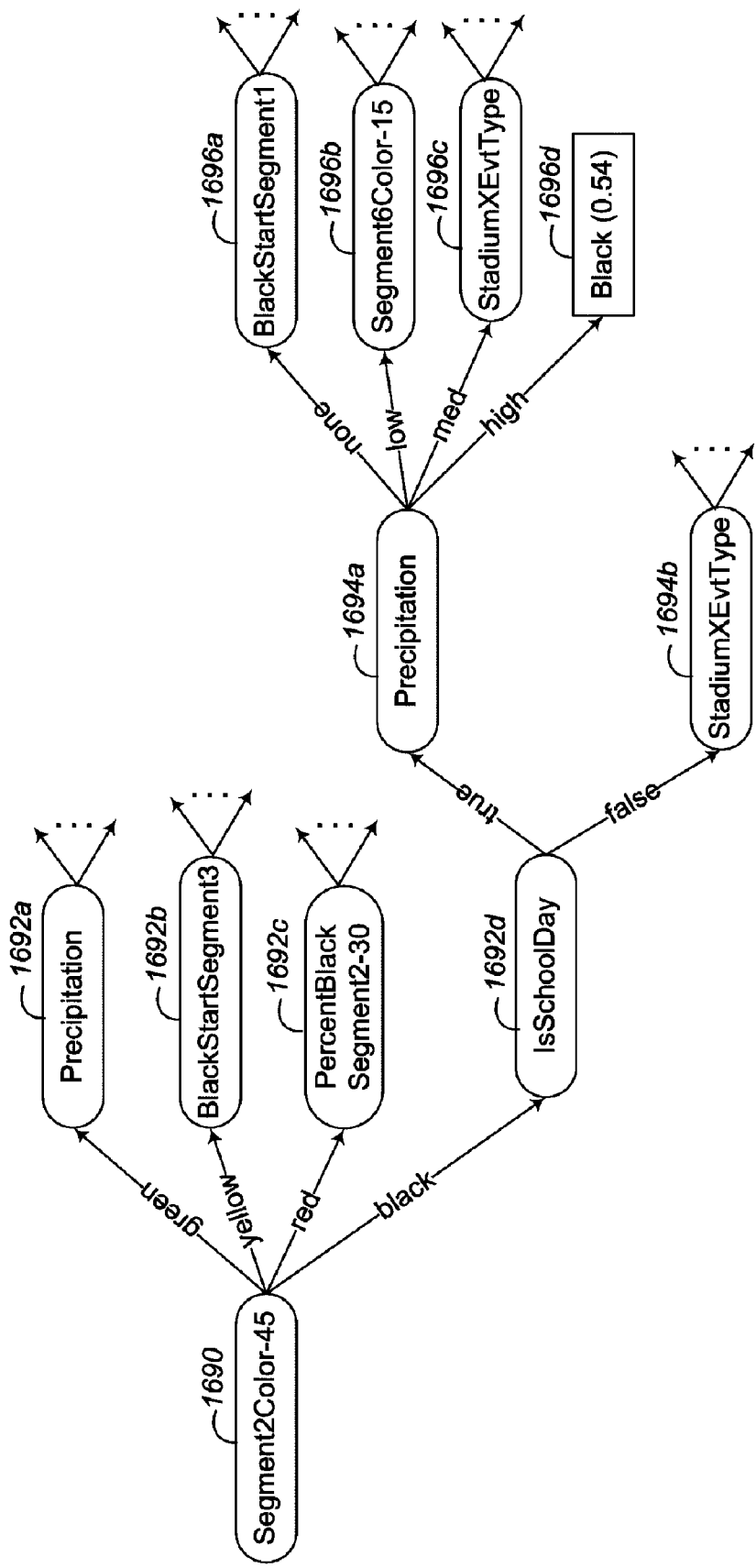

FIG. 16J shows a portion of an updated example decision tree for road segment Segment1 at a future time of 60 minutes, with a particular path illustrated from root node 1690 to a leaf node 1696*d* that yields a most likely prediction of black traffic congestion level conditions with an associated confidence value of 54%. As described in more detail elsewhere, in some embodiments such decision trees and/or the associated Bayesian network prediction models are updated and/or re-created when new observed case information becomes available. These updates may occur at various times, such as on a periodic basis (e.g., weekly, monthly, etc.), upon request, and/or upon the accumulation of sufficient new observed case data. In addition, in some embodiments the new observed case data may merely be used to update the predicted values for existing leaf nodes (e.g., with respect to histogram 1652*f* of FIG. 16F, to update that black is now the most frequent outcome for node 1652*e* given the new observed data based on 1284 of 2334 total occurrences), while in other embodiments the new observed case data is used to generate new decision trees with potentially different structures. In this example, the new decision tree depicted in FIG. 16J differs in structure from that shown in FIG. 16H, even though both decision trees predict future traffic congestions levels for road segment Segment1 at a future time of 60 minutes, based on the changes in the observed case data.

Figure 17:
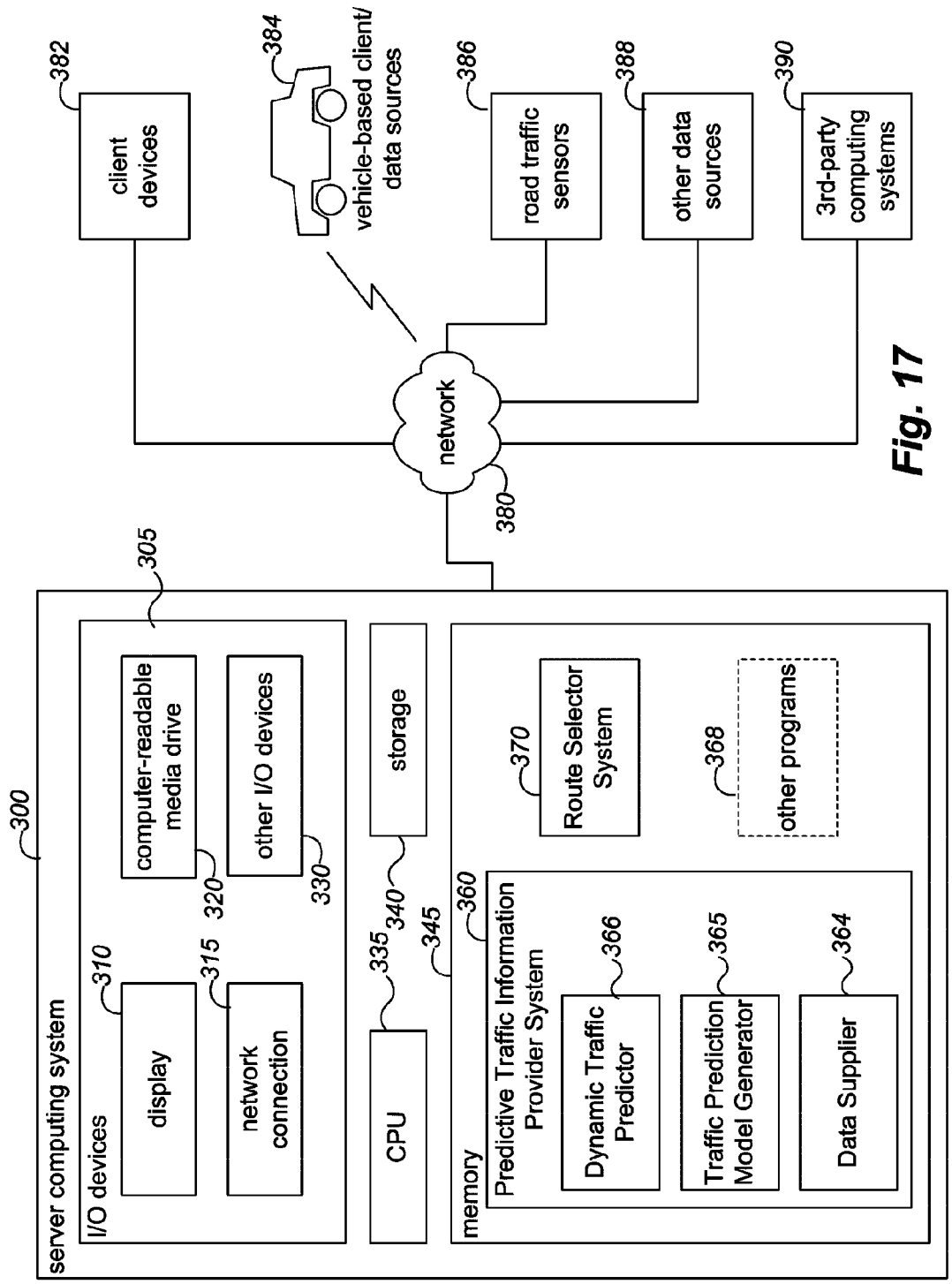
FIG. 17 is a block diagram illustrating a computing system suitable for executing an embodiment of the described Predictive Traffic Information Provider system.

FIG. 17 is a block diagram similar to that of FIG. 3, with the illustrated embodiment of the Predictive Traffic Information Provider system 360 being illustrated in greater detail, and an additional Route Selector system 370 being shown. Other previously illustrated systems are shown in this example embodiment only as part of other programs 368, such as the Data Sample Manager system 350, the Key Road Identifier system 361, the Road Segment Determiner system 362, and the RT Information Provider system 363.

In the illustrated embodiment, the Predictive Traffic Information Provider system 360 and Route Selector system 370 are executing in memory 345 in order to perform at least some of the described techniques, with these various executing systems generally referred to herein as predictive traffic information systems. One or more of the predictive traffic information systems or other systems 368 receives various information regarding current conditions and/or previous observed case data from various sources, such as from the road traffic sensors, vehicle-based data sources and other data sources. The Predictive Traffic Information Provider system then uses the received data to generate future traffic condition predictions for multiple future times, and provides the predicted information to the Route Selector system and optionally to one or more other recipients, such as one or more predictive traffic information systems, other systems 368, client devices, vehicle-based clients, third-party computing systems, and/or users. The Route Selector system uses the received predicted future traffic condition information to generate route-related information, such as for frequently used routes and/or upon request for indicated routes, and similarly provides such route-related information to one or more other predictive traffic information systems, client devices, vehicle-based clients, and/or third-party computing systems.

The client devices 382 may take various forms in various embodiments, and may generally include any communication devices and other computing devices capable of making requests to and/or receiving information from the predictive traffic information systems. In some cases, the client devices may run interactive console applications (e.g., Web browsers) that users may utilize to make requests for traffic-related information based on predicted future traffic information, while in other cases at least some such traffic-related information may be automatically sent to the client devices (e.g., as text messages, new Web pages, specialized program data updates, etc.) from one or more of the predictive traffic information systems.

The road traffic sensors 386 include multiple sensors that are installed in, at, or near various streets, highways, or other roadways, such as for one or more geographic areas. These sensors include loop sensors that are capable of measuring the number of vehicles passing above the sensor per unit time, vehicle speed, and/or other data related to traffic flow. In addition, such sensors may include cameras, motion sensors, radar ranging devices, and other types of sensors that are located adjacent to a roadway. The road traffic sensors 386 may periodically or continuously provide measured data via wire-based or wireless-based data link to the Predictive Traffic Information Provider system 360 via the network 380 using one or more data exchange mechanisms (e.g., push, pull, polling, request-response, peer-to-peer, etc.). In addition, while not illustrated here, in some embodiments one or more aggregators of such road traffic sensor information (e.g., a governmental transportation body that operates the sensors) may instead obtain the raw data and make that data available to the predictive traffic information systems (whether in raw form or after it is processed).

The other data sources 388 include a variety of types of other sources of data that may be utilized by one or more of the predictive traffic information systems to make predictions related to traffic flow and/or to make selections of traffic routes. Such data sources include, but are not limited to, sources of current and past weather conditions, short and long term weather forecasts, school schedules and/or calendars, event schedules and/or calendars, traffic incident reports provided by human operators (e.g., first responders, law enforcement personnel, highway crews, news media, travelers, etc.), road work information, holiday schedules, etc.

The vehicle-based clients/data sources 384 in this example may each be a computing system located within a vehicle that provides data to one or more of the predictive traffic information systems and/or that receives data from one or more of those system. In some embodiments, the Predictive Traffic Information Provider system may utilize a distributed network of vehicle-based data sources that provide information related to current traffic conditions for use in traffic prediction. For example, each vehicle may include a GPS ("Global Positioning System") device (e.g., a cellular telephone with GPS capabilities, a stand-alone GPS device, etc.) and/or other geo-location device capable of determining the geographic location, speed, direction, and/or other data related to the vehicle's travel, and one or more devices on the vehicle (whether the geo-location device(s) or a distinct communication device) may from time to time obtain such data and provide it to one or more of the predictive traffic information systems (e.g., by way of a wireless link)—such vehicles may include a distributed network of individual users, fleets of vehicles (e.g., for delivery companies, transportation companies, governmental bodies or agencies, vehicles of a vehicle rental service, etc.), vehicles that belong to commercial networks providing related information (e.g., the OnStar service), a group of vehicles operated in order to obtain such traffic condition information (e.g., by traveling over pre-defined routes, or by traveling over roads as dynamically directed, such as to obtain information about roads of interest), etc. Moreover, while not illustrated here, in at least some embodiments other mobile data sources may similarly provide actual data based on travel on the roads, such as based on computing devices and other mobile devices of users who are traveling on the roads (e.g., users who are operators and/or passengers of vehicles on the roads). In addition, such vehicle-based information may be generated in other manners in other embodiments, such as by cellular telephone networks, other wireless networks (e.g., a network of Wi-Fi hotspots) and/or other external systems (e.g., detectors of vehicle transponders using RFID or other communication techniques, camera systems that can observe and identify license plates and/or users' faces) that can detect and track information about vehicles passing by each of multiple transmitters/receivers in the network. Such generated vehicle-based travel-related information may then be used for a variety of purposes, such as to provide information similar to that of road sensors but for road segments that do not have functioning road sensors (e.g., for roads that lack sensors, such as for geographic areas that do not have networks of road sensors and/or for arterial roads that are not significantly large to have road sensors, for road sensors that are broken, etc.), to verify duplicative information that is received from road sensors or other sources, to identify road sensors that are providing inaccurate data (e.g., due to temporary or ongoing problems), etc. The wireless links may be provided by a variety of technologies known in the art, including satellite uplink, cellular network, WI-FI, packet radio, etc., although in at least some embodiments such information about road traffic conditions may be obtained from mobile devices (whether vehicle-based devices and/or user devices) via physically download when the device reaches an appropriate docking or other connection point (e.g., to download information from a fleet vehicle once it has returned to its primary base of operations or other destination with appropriate equipment to perform the information download). In some cases, various factors may cause it to be advantageous for a mobile device to store multiple data samples that are acquired over a determined period of time (e.g., data samples taken at a pre-determined sampling rate, such as 30 seconds or a minute) and/or until sufficient data samples are available (e.g., based on a total size of the data), and to then transmit the stored data samples together (or an aggregation of those samples) after the period of time—for example, the cost structure of transmitting data from a vehicle-based data source via a particular wireless link (e.g., satellite uplink) may be such that transmissions occur only after determined intervals (e.g., every 15 minutes), one or more of the geo-location and/or communication devices may be configured or designed to transmit at such intervals, an ability of a mobile device to transmit data over a wireless link may be temporarily lost (e.g., such as for a mobile device that typically transmits each data sample individually, such as every 30 seconds or 1 minute, and possibly due to factors such as a lack of wireless coverage in an area of the mobile device, other activities being performed by the mobile device or a user of the device, or a temporary problem with the mobile device or an associated transmitter) such that storage of data samples will allow later transmission or physical download, etc. For example, if a wireless transmission of up to 1000 units of information costs $0.25 cents, and each data sample is 50 units in size, the it may be advantageous to sample every minute and send a data set comprising 20 samples every 20 minutes, rather than sending samples more frequently (e.g., every minute). Moreover, in some embodiments additional information may be generated and provided by a mobile device based on multiple stored data samples. For example, if a particular mobile device is able to acquire only information about a current instant position during each data sample, but is not able to acquire additional related information such as speed and/or direction, such additional related information may be calculated or otherwise determined based on multiple subsequent data samples.

Alternatively, some or all of the vehicle-based clients/data sources 384 may each have a computing system located within a vehicle to obtain information from one or more of the predictive traffic information systems, such as for use by an occupant of the vehicle. For example, the vehicle may contain an in-dash navigation system with an installed Web browser or other console application that a user may utilize to make requests for traffic-related information via a wireless link from the Predictive Traffic Information Provider system or the Route Selector system, or instead such requests may be made from a portable device of a user in the vehicle. In addition, one or more of the predictive traffic information systems may automatically transmit traffic-related information to such a vehicle-based client device (e.g., updated predicted traffic information and/or updated route-related information) based upon the receipt or generation of updated information.

The third-party computing systems 390 include one or more optional computing systems that are operated by parties other than the operator(s) of the predictive traffic information systems, such as parties who receive traffic-related data from one or more of the predictive traffic information systems and who make use of the data in some manner. For example, the third-party computing systems 390 may be systems that receive predicted traffic information from one or more of the predictive traffic information systems, and that provide related information (whether the received information or other information based on the received information) to users or others (e.g., via Web portals or subscription services). Alternatively, the third-party computing systems 390 may be operated by other types of parties, such as media organizations that gather and report predicted traffic condition and route information to their consumers, or online map companies that provide predicted traffic-related information to their users as part of travel-planning services.

In this illustrated embodiment, the Predictive Traffic Information Provider system 360 includes a Data Supplier component 364, a Traffic Prediction Model Generator component 365, and a Dynamic Traffic Predictor component 366. The Data Supplier component obtains current condition data that may be used by one or more of the other components or other predictive traffic information systems, such as from the data sources previously discussed, and makes the information available to the other components and predictive traffic information systems. In some embodiments, the Data Supplier component may optionally aggregate obtained data from a variety of data sources, and may further perform one or more of a variety of activities to prepare data for use, such as to place the data in a uniform format; to detect and possibly correct errors or missing data (e.g., due to sensor outages and/or malfunctions, network outages, data provider outages, etc.); to filter out extraneous data, such as outliers; to discretize continuous data, such as to map real-valued numbers to enumerated possible values; to sub-sample discrete data (e.g., by mapping data in a given range of values to a smaller range of values); to group related data (e.g., a sequence of multiple traffic sensors located along a single segment of road that are aggregated in an indicated manner); etc. Information obtained by the Data Supplier component may be provided to other predictive traffic information systems and components in various ways, such as to notify others when new data is available, to provide the data upon request, and/or to store the data in a manner that is accessible to others (e.g., in one or more databases on storage, not shown). In other embodiments, some or all of the functionality of the Data Supplier component may instead by performed by the Data Sample Manager system 350 of FIG. 3.

In the illustrated embodiment, the Traffic Prediction Model Generator component uses obtained observation case data to generate predictive models used to make predictions about traffic conditions, as previously discussed. In some embodiments, the Traffic Prediction Model Generator component utilizes historical observation case data to automatically learn the structure of a Bayesian network for a given group of one or more roads, and further automatically learns multiple decision tree models that each may be used to make predictions of future traffic flow on a particular road segment for a particular future time. The created predictive models may then be provided to other predictive traffic information systems and components in various ways, such as to notify others when the new models are available, to provide the models upon request, and/or to store the models in a manner that is accessible to others (e.g., in one or more databases on storage, not shown).

The Dynamic Traffic Predictor component utilizes the predictive models generated by the Traffic Prediction Model Generator component to generate predictions of future traffic conditions for multiple future times, such as based on real-time and/or other current condition information. Such predictions may be made at various times, such as periodically (e.g., every five or ten minutes), when new and/or anomalous data (e.g., a traffic accident incident report) has been received, upon request, etc. The generated predicted future traffic condition information may then be provided to other predictive traffic information systems and components and/or to others in various ways, such as to notify others when new information is available, to provide the information upon request, and/or to store the information in a manner that is accessible to others (e.g., in one or more databases on storage, not shown).

The Route Selector system selects travel route information based on predicted future traffic condition information, and provides such route information to others in various ways. In some embodiments, the Route Selector system receives a request from a client to provide information related to one or more travel routes between a starting and ending location in a given geographic area at a given date and/or time. In response, the Route Selector system obtains predictions of future road conditions for the specified area during the specified time period from, for example, the Predictive Traffic Information Provider system, and then utilizes the predicted future road condition information to analyze various route options and to select one or more routes based on indicated criteria (e.g., shortest time). The selected route information may then be provided to other predictive traffic information systems and components and/or to others in various ways, such as to notify others when information is available, to provide the information upon request, and/or to store the information in a manner that is accessible to others (e.g., in one or more databases on storage, not shown).

It will be appreciated that the illustrated computing systems and their software systems and components are merely illustrative and are not intended to limit the scope of the present invention. For example, the functionality provided by the illustrated system components may in some embodiments be combined in fewer components or distributed in additional components. Similarly, in some embodiments the functionality of some of the illustrated components may not be provided and/or other additional functionality may be available. Note also that while various items are illustrated as being stored in memory or on storage while being used, these items or portions of them can be transferred between memory and other storage devices for purposes of memory management and/or data integrity. Alternatively, in other embodiments some or all of the software components and/or modules may execute in memory on another device and communicate with the illustrated computing system/device via inter-computer communication. Some or all of the system components or data structures may also be stored (e.g., as software instructions or structured data) on a computer-readable medium, such as a hard disk, a memory, a network, or a portable media article to be read by an appropriate drive or via an appropriate connection. The system components and data structures can also be transmitted as generated data signals (e.g., as part of a carrier wave or other analog or digital propagated signal) on a variety of computer-readable transmission mediums, including wireless-based and wired/cable-based mediums, and can take a variety of forms (e.g., as part of a single or multiplexed analog signal, or as multiple discrete digital packets or frames). Such computer program products may also take other forms in other embodiments. Accordingly, the present invention may be practiced with other computer system configurations.

Figure 18:
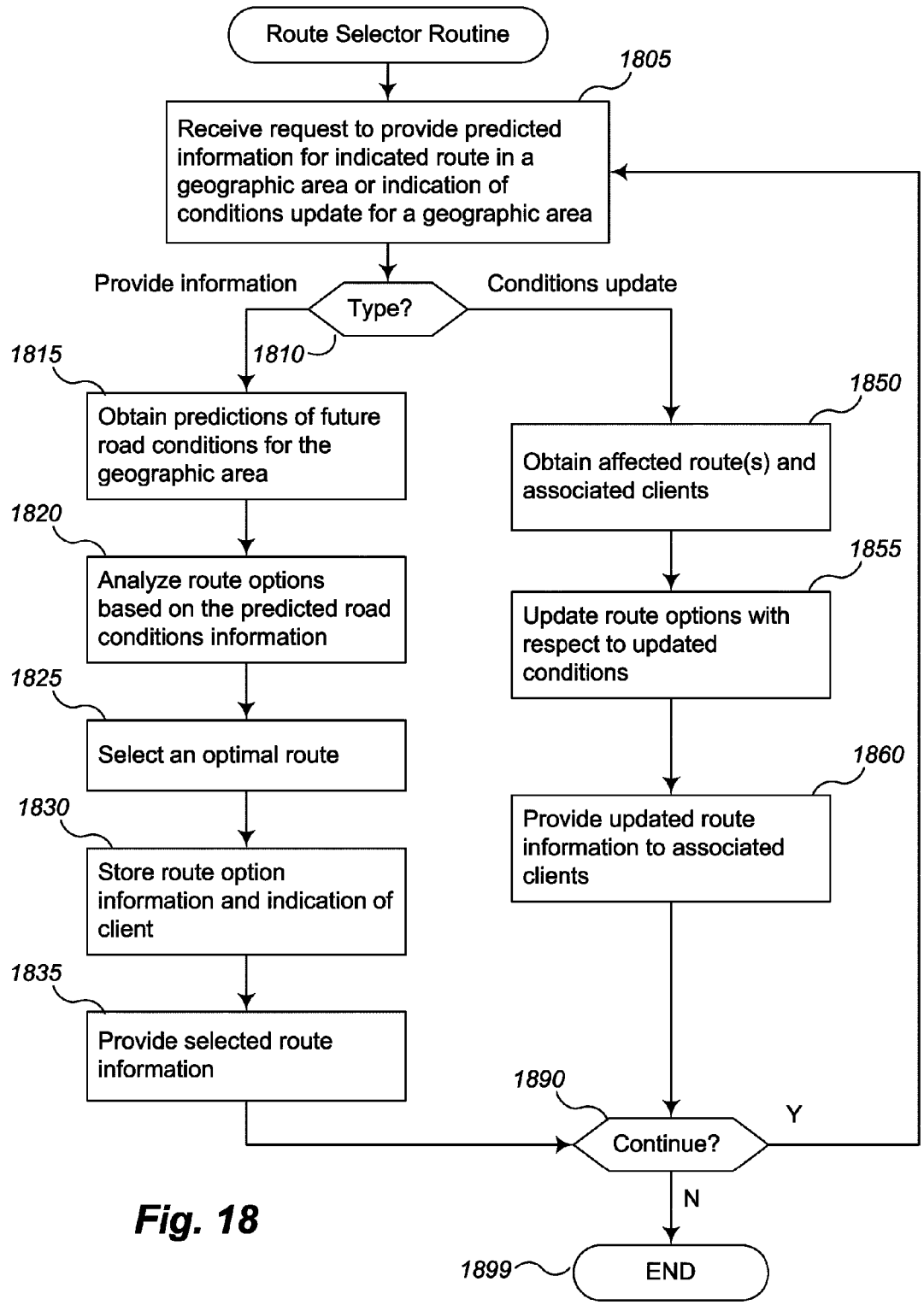
FIG. 18 is a flow diagram of an embodiment of a Route Selector routine.

FIG. 18 is a flow diagram of an embodiment of a Route Selector routine. This routine may be provided, for example, by execution of the Route Selector system 370 of FIG. 17. The routine uses predicted future traffic conditions at multiple future times to plan routes through a network of roads, such as to determine one or more routes that are predicted to be optimal, near-optimal, or otherwise preferred.

The routine begins in step 1805 and receives a request to provide predicted information for an indicated route in a geographic area (e.g., a route indicated with a starting location, an ending location, a preferred arrival time, a preferred departure time and/or other indicated criteria for use in identifying or evaluating route options) or receives an indication of an update in relevant conditions for a geographic area. In step 1810, the route determines the type of input received, and if a request to provide route information has been received, the routine proceeds to step 1815 and obtains predictions of future road conditions at one or more future times for the geographic area, such as for future times that correspond to the preferred travel time (if any). The routine may obtain this information from, for example, the Predictive Traffic Information Provider system 360 described with reference to FIGS. 3 and 17, such as in an interactive manner or instead by retrieving previously generated prediction information. In step 1820, the routine then analyzes route options based on the obtained predicted future road conditions information, such as to determine predicted travel times for each of the route options. The route options may include a number of alternative routes to travel from the indicated starting location (if any) to the indicated ending location (if any), such as a set of pre-determined route options or instead all route options that satisfy indicated criteria (e.g., using roads of a certain size or class, using any roads for which predicted future information is available, using all possible route options, using domain-specific heuristics to constrain the number of possible routes in order to reduce the search space, etc.). In step 1825, the routine then optionally selects a predicted optimal route from the set of route options, or in some embodiments more generally ranks the route options (e.g., in a relative or absolute manner) using one or more criteria (e.g., the minimum travel time, minimum travel distance, minimum travel speed, minimum travel speed variability, maximum confidence in a route that otherwise satisfies such criteria, etc. or combinations thereof) and selects some or all of those route options. In step 1830, the routine stores the route option information, optionally with an indication of the client that requested the route information (e.g., to enable later provision of updated information to the client should conditions change), and in step 1835 provides at least some of the selected route information to the client (e.g., only information for the predicted optimal or top-ranked route, information for a specified number of routes and/or all route options, etc.).

If it is instead decided in step 1810 that an indication of a conditions update for a geographic area has been received (e.g., an indication of a traffic incident along a particular roadway), the routine proceeds to step 1850 and identifies any affected route(s) whose associated clients are known. In step 1855, the routine updates route options with respect to the updated conditions for the identified routes, with the updated conditions possibly including real-time traffic data and/or updated predictions information from the Predictive Traffic Information Provider system, and with the updated route options possibly resulting in a different predicted optimal or top-ranked route option. In step 1860, the routine then optionally provides updated route information to the associated clients, such as if the updated route options information would result in different client behavior. For example, the updated route information may be provided to vehicle-based clients that may be traveling on or near the affected routes, or more generally to client devices 382 that had previously been used to obtain information regarding one or more of the affected routes.

After steps 1835 or 1860, the routine continues to step 1890 to determine whether to continue. If so, the routine returns to step 1805, and if not continues to step 1899 and ends.

Figure 19A:
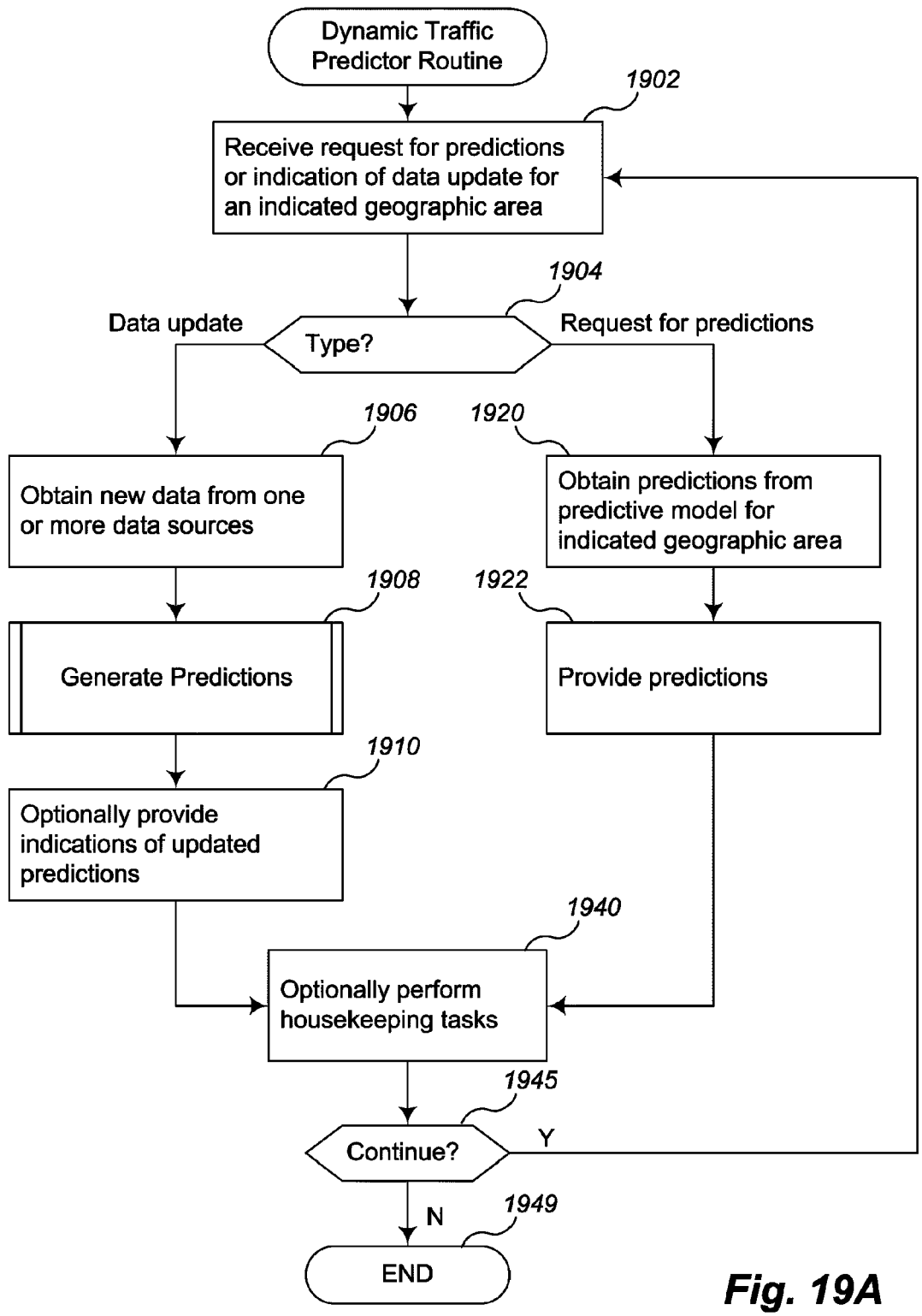
FIGS. 19A-19B are flow diagrams of embodiments of a Dynamic Traffic Predictor routine and an associated Generate Predictions subroutine.
Figure 19B:
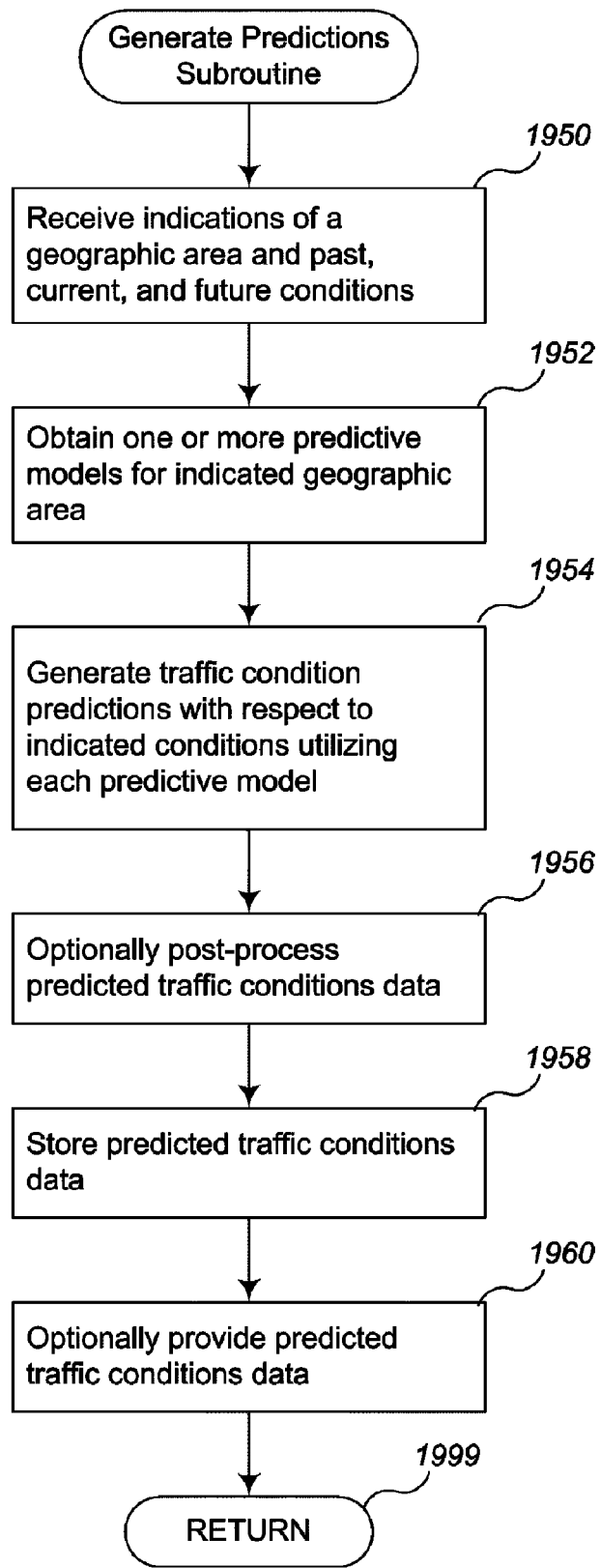

FIGS. 19A-19B are flow diagrams of embodiments of a Dynamic Traffic Predictor routine and an associated Generate Predictions subroutine. The routine of FIG. 19A may be provided, for example, by execution of the Dynamic Traffic Predictor component 366 in FIG. 17, such as to generate predictions of future traffic conditions at multiple future times for each of one or more roads or road segments in one or more geographic areas. In this illustrated embodiment, the routine generates predictions when new current condition input information is received or upon request (e.g., based on periodic requests to generate new predictions, such as every five minutes), but in other embodiments could generate such predictions at other times (e.g., periodically, such as by retrieving any available current condition input information at that time).

The routine begins in step 1902 and receives a request for prediction information (e.g., for an indicated road or road segment at an indicated time, or for all roads and road segments in a geographic area based on current conditions) or an indication of a data update for an indicated geographic area. In step 1904, the routine determines whether a data update or a predictions request was received, and if it is determined that a data update was received, the routine proceeds to step 1906 and obtains new current conditions data from one or more data sources for use as input in the prediction generations (e.g., from the Data Supplier component 364 in FIG. 17, from appropriate stored information, from other sources, etc.). In step 1908, the routine executes a Generate Predictions subroutine that generates an updated set of predictions with respect to the newly obtained data, as discussed in greater detail with respect to FIG. 19A, with the generated prediction information stored for later use. In step 1910, the routine optionally provides indications of the updated prediction information obtained in step 1908 to one or more clients, such as to users who have previously expressed an interest in such information, to third-party entities who may use such prediction information, etc.

If it was instead determined in step 1904 that a request for predictions was received, the routine proceeds to step 1920 and obtains previously generated predictions from one or more predictive models for the indicated geographic area, such as predictions generated in step 1908. In step 1922, the routine provides the obtained predictions to the client. After steps 1910 and 1922, the routine proceeds to step 1940 and optionally performs any housekeeping tasks. In step 1945, the routine determines whether to continue. If so, the routine returns to step 1902, and if not continues to step 1949 and ends.

FIG. 19B is a flow diagram of an embodiment of a Generate Predictions subroutine that generates predictions of future traffic conditions at multiple future times for each of one or more roads or road segments in one or more geographic areas, such as for use by the Dynamic Traffic Predictor routine illustrated in FIG. 19A. In this example embodiment, the subroutine generates the future traffic conditions predictions for a geographic area using probabilistic techniques via generated predictive models that include a Bayesian network and multiple corresponding decision trees, such as is previously discussed, but in other embodiments this or a related subroutine could instead generate future traffic conditions predictions in other manners.

The subroutine begins in step 1950 and receives indications of a geographic area and of past, current, and future conditions for use as input information. As described in greater detail elsewhere, such conditions may include information about current and past weather conditions, weather forecasts, event schedules, school schedules, current and past traffic conditions, etc. In step 1952, the subroutine obtains one or more generated predictive models for the indicated geographic area that include a Bayesian network and one or more decision trees, such as by retrieving previously generated models or by requesting the models from a Traffic Prediction Model Generator component. In step 1954, the subroutine generates future traffic condition predictions based on the current conditions input information by using the predictive models, such as to generate predictions at each of multiple future times for each road or road segment in the indicated geographic area. In step 1956, the subroutine then optionally performs post-processing of the predicted future traffic conditions information, such as to include merging, averaging, aggregating, selecting, comparing, or otherwise processing one or more sets of output data from the one or more predictive models. In step 1958, the subroutine stores the predicted future traffic conditions information, and in step 1960 optionally provides the predicted traffic conditions information to one or more clients. In step 1999 the subroutine returns.

Figure 20:
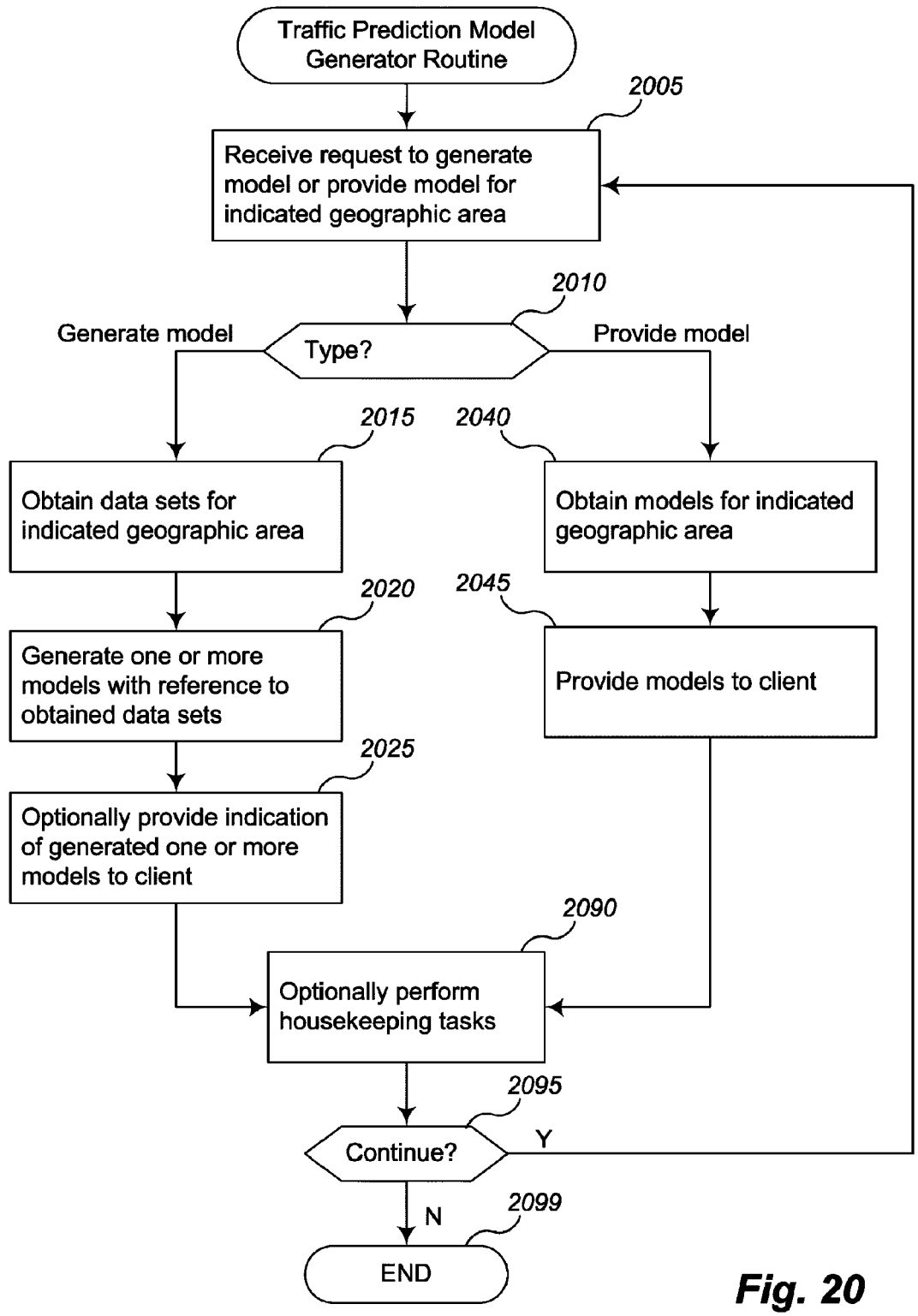
FIG. 20 is a flow diagram of an embodiment of a Traffic Prediction Model Generator routine.

FIG. 20 is a flow diagram of an embodiment of a Traffic Prediction Model Generator routine. The routine may be provided, for example, by execution of the Traffic Prediction Model Generator component 365 of FIG. 17, such as to generate predictive models based on observed case information for later use in generating future traffic conditions predictions.

The routine begins in step 2005 and receives a request to generate predictive models for an indicated geographic area or to provide previously generated predictive models for an indicated geographic area. In step 2010, the routine determines the type of received request, and if a request to generate a model was received, the routine proceeds to step 2015 to obtain observed data for the indicated geographic area, such as from the Data Supplier component 364 or from stored data. In step 2020, the routine then generates one or more predictive models with reference to the obtained observed data, as discussed in greater detail elsewhere. In step 2025, the routine then optionally provides an indication of the generated one or more models to a client from whom the request was received and/or to others (e.g., the Dynamic Traffic Predictor component 366 of FIG. 17), or otherwise stores the generated models for later use.

If it was instead determined in step 2010 that a request to provide a model was received, the routine continues to step 2040 where one or more models previously generated predictive models for the indicated geographic area are retrieved. In step 2045, the routine then provides those models to the client who requested the models or to another indicated recipient, such as the Dynamic Traffic Predictor component 366 and/or a third-party computing system that utilizes the models to perform its own predictions.

After steps 2025 and 2045, the routine proceeds to step 2090 and optionally performs any housekeeping tasks. In step 2095, the routine then determines whether to continue. If so, the routine returns to step 2005, and if not continues to step 2099 and ends.

In some embodiments, the selection of routes may be based on a variety of types of indicated information, such as when information is requested for fully or partially specified travel routes (with a partially specified route not specifying every road segment between a given starting and ending location), when a starting and ending location are specified (optionally with one or more intermediate locations), when one or more desired times for travel are indicated (e.g., on a particular day; between a first and second time; with an indicated arrival time; etc.); when one or more criteria for assessing route options are specified (e.g., travel time, travel distance, stopping time, speed, etc.), etc. In addition, varying amounts of information related to travel routes may be provided in various embodiments, such as to provide clients with only a predicted optimal selected route or to provide clients with a variety of details about multiple route options analyzed (e.g., in a ranked or otherwise ordered manner, such as by increasing travel time). In addition, some embodiments may represent travel routes in various manners, including human-readable, textual representations using common street and road names and/or machine-readable representations such as series of GPS waypoints.

Various embodiments may also employ various conventions for representing and providing current and predicted traffic condition information. For example, in some embodiments a data feed may be provided for each geographic area of interest to indicate predicted future traffic condition information for each of multiple future times. The data feed format may, for example, be defined by an XML schema that defines an element type with one or more attributes that each contain information related to a predicted traffic congestion level conditions for a single road segment for each of multiple future times, with a fragment of an example such XML stream or file as follows:

```
<Segment id="423" speed="55" abnormality="0" color="3"
    next3hours="3,3,3,3,2,1,1,0,0,0,1,1"
    confidence="2,2,2,1,1,0,0,1,1,1,0,0"/>
```

The above XML fragment represents the current and predicted future traffic conditions for an example road segment 423 (which may represent a single physical sensor, a group of physical sensors that correspond to a logical road segment, one or more data sources other than traffic sensors, etc.). In this example, the current average speed is indicated to be 55 MPH, no abnormalities exist with respect to the current average speed (in this example, abnormalities indicate a difference in the actual current average speed with respect to what would be expected for the current average speed, such as by using a baseline average speed for that time of day, day of week, week of month, and/or month of year); and the current traffic congestion level is indicated to be 3 (in this example, congestion levels are expressed as integers between 0 and 3, with 3 corresponding to the lowest level of traffic congestion and thus being equivalent to a value of green, and with 0 being equivalent to a value of black). In addition, in this example the comma-delimited list labeled "next3hours" indicates predicted future traffic congestion levels for the next twelve future times at 15 minute intervals. In this example, confidence level information is also provided for each of the twelve predicted future traffic congestion levels, with the comma-delimited list labeled "confidence" indicating such confidence levels, although in other embodiments such confidence levels may not be generated and/or provided. In this example, confidence levels are expressed as integers between 0 and 2, with 2 corresponding to the highest level of confidence and 0 being the lowest level of confidence, although other means of representing predicted future traffic congestion levels and associated confidence levels may be used in other embodiments.

In addition, various embodiments provide various means for users and other clients to interact with one or more of the predictive traffic information systems. For example, some embodiments may provide an interactive console (e.g. a client program providing an interactive user interface, a Web browser-based interface, etc.) from which clients can make requests and receive corresponding responses, such as requests for information related to current and/or predicted traffic conditions and/or requests to analyze, select, and/or provide information related to travel routes. In addition, some embodiments provide an API ("Application Programmer Interface") that allows client computing systems to programmatically make some or all such requests, such as via network message protocols (e.g., Web services) and/or other communication mechanisms.

FIGS. 21A-21J illustrate example displays of various traffic-related information based on current traffic conditions (e.g., generated and displayed in a near realtime or substantially realtime manner) and/or predictions of future traffic conditions. In some embodiments, some or all of such traffic-related information may be provided by an embodiment of a Data Sample Manager system, an RT Information Provider system, a Predictive Traffic Information Provider system and/or a Route Selector system, or may instead by provided by one or more third parties based at least in part on related traffic information supplied to those third parties by one or more of the systems. In addition, such traffic-related information may be provided to users in various ways in various embodiments, such as by a Web-based client on a desktop computing system that displays the information to one or more users or via cellular telephones, or vehicle-based or other mobile devices that display or otherwise provide the information to a user.

Figure 21A:
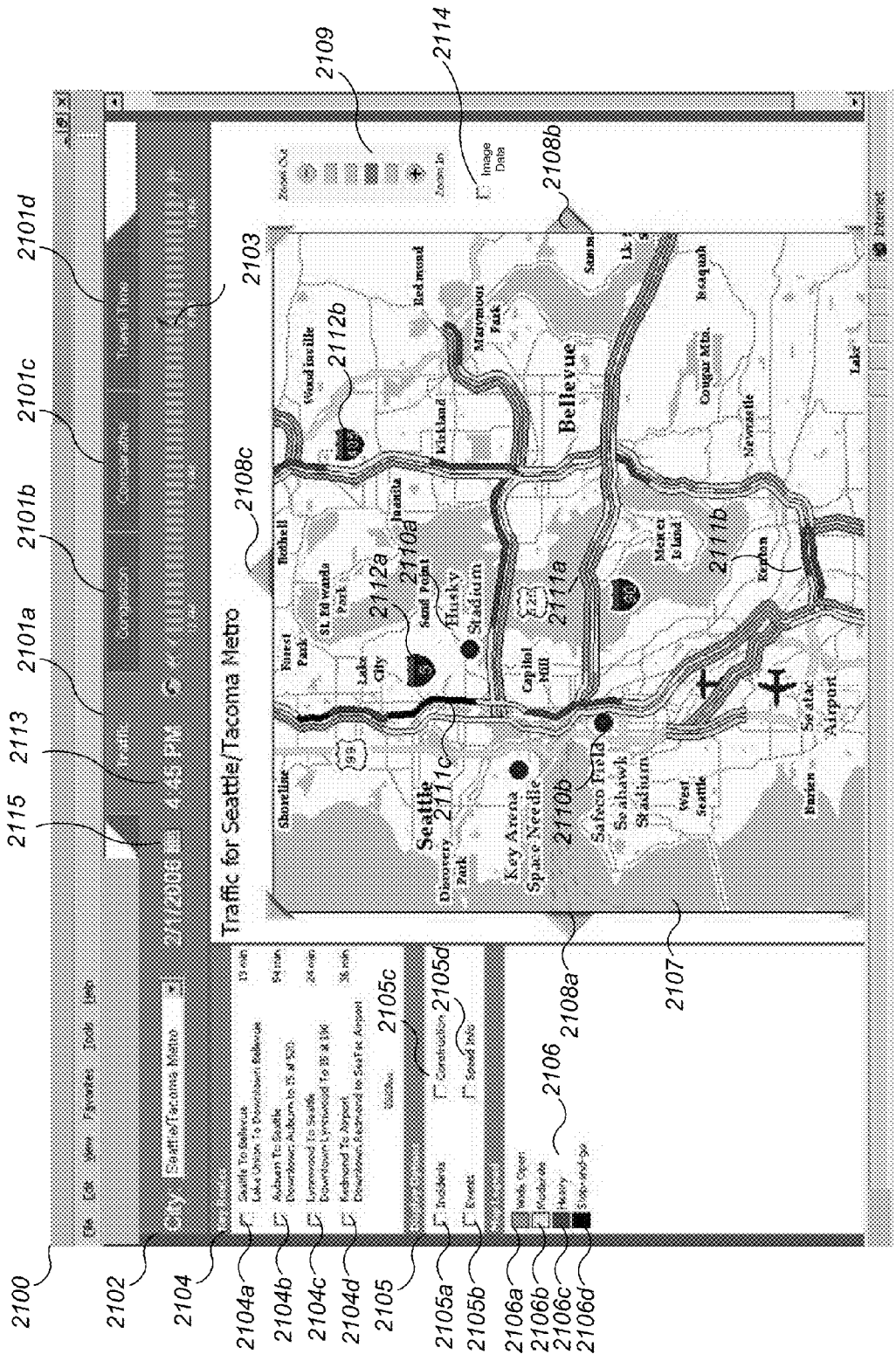
FIGS. 21A-21J illustrate example displays of various traffic-related information and user-selected controls, including using predictions of future traffic conditions and comparisons to normal traffic conditions.

FIG. 21A illustrates an example display 2100 showing current traffic conditions for a network of roads in the Seattle/Tacoma Metro geographic area of the state of Washington. In this example, the display includes user-selectable navigation tab controls 2101a-d, a user-selectable geographic area selection menu control 2102, a user-selectable time slider control 2103, a date selector calendar control 2115, a key route selection area 2104, a display option selection area 2105, a map legend area 2106, a map display area 2107, a user-selectable map data selector control 2114, user-selectable pan button controls 2108a-c, a user-selectable zoom tool control 2109, and currently selected time indicator information 2113 (to correspond to the user-manipulatable time indicator illustrated on the time slider control as a small triangle pointing downward).

In this example, a view of road traffic information is currently selected (based on selection of the "Traffic" navigation tab 2101a), the geographic area currently selected is the Seattle/Tacoma Metro area (via control 2102), and the time currently selected is 4:45 PM on Feb. 1, 2006 (via slider 2103 and/or the calendar date selector control 2115), with the various displayed information reflecting those selections. As is shown in the map display area 2107 and described in the map legend area 2106, traffic road congestion level condition information is currently shown for a selection of major roads in the currently visible portion of the Seattle/Tacoma Metro geographic area. For current or past times for which actual road congestion level condition information is available, the displayed information reflects that actual information, and for future times the displayed information reflects predicted future traffic conditions at those times. In this example, the displayed major roads are divided into logical road segments which are each displayed using a level of grayscale shading to indicate a corresponding level of road congestion of that road segment for the selected time, such as with a road segment 2111c of the northbound portion of the Interstate 5 road being illustrated with "Stop-and-go" traffic conditions (shown in black in this example), with the adjacent road segment to the south being illustrated with "Moderate" traffic conditions, and with the adjacent road segment to the north also being illustrated with "Stop-and-go" traffic conditions before the next road segment to the north changes to "Heavy" traffic conditions. Road segment 2111a along the Interstate 90 road is currently shown with "Wide Open" traffic conditions, road segment 2111b along the Interstate 405 road currently is shown with "Heavy" traffic conditions, and numerous other road segments are similarly shown with corresponding traffic congestion level condition information. While illustrated in grayscale here, in other embodiments the map may be displayed instead in color, such as to show "Stop-and-go" traffic conditions in black, "Heavy" traffic conditions in red, "Moderate" traffic conditions in yellow, and "Wide Open" traffic conditions in green.

The display of traffic-related information may be modified by a user (not shown) in various ways in this example embodiment. For example, the geographic area selection menu control 2102 can be used to select from one of a number of different geographic areas for which traffic-related information is available. The time slider control 2103 can be used to modify the time that is currently selected for which traffic information is shown, such as to view predicted traffic conditions at future times. The key route selection area 2104 includes various user-selectable option controls 2104a-d that may be selected in order to highlight routes on the displayed map, such as to highlight a route from Seattle to Bellevue by selecting option 2104a. User-selectable display option controls 2105a-d include information about incidents 2105a, events 2105b, construction 2105c, and speed info 2105d, such as with corresponding information for one or more selected options being overlaid on the displayed map. Pan button controls 2108a-c can be used to scroll or pan the map frame 2107 to obtain a different view of the current geographic area, with an additional southern pan button control 2108d not currently shown due to the scrolling of the window. The zoom tool control 2109 may be used to increase or decrease the display scale of the map. The map data selector control 2114 may be used to select an alternate source of map data, such as actual satellite or other imagery of the geographic area (e.g., over which labels or other indications of the roads of interest are displayed). Various other user-selectable controls may be provided in other embodiments, and some or all of the illustrated controls may not be available.

In this example, the map currently displays various information in addition to the traffic conditions for the selected network of roads, such as to indicate venues and other locations that may correspond to events and other areas of traffic concentration (such as Husky Stadium 2110a in which college football and other events may occur, Safeco Field 2110b in which professional baseball and other events may occur, Seahawk Stadium in which professional football and soccer and other events may occur, the Space Needle tourist attraction, the SeaTac Airport, popular parks such as Marymoor Park and Discovery Park, etc.), cities and neighborhoods, and highway labels such as 2112a-b. Various other types of information may similarly be shown, such as at all times or instead in a user-selectable manner.

Figure 21B:
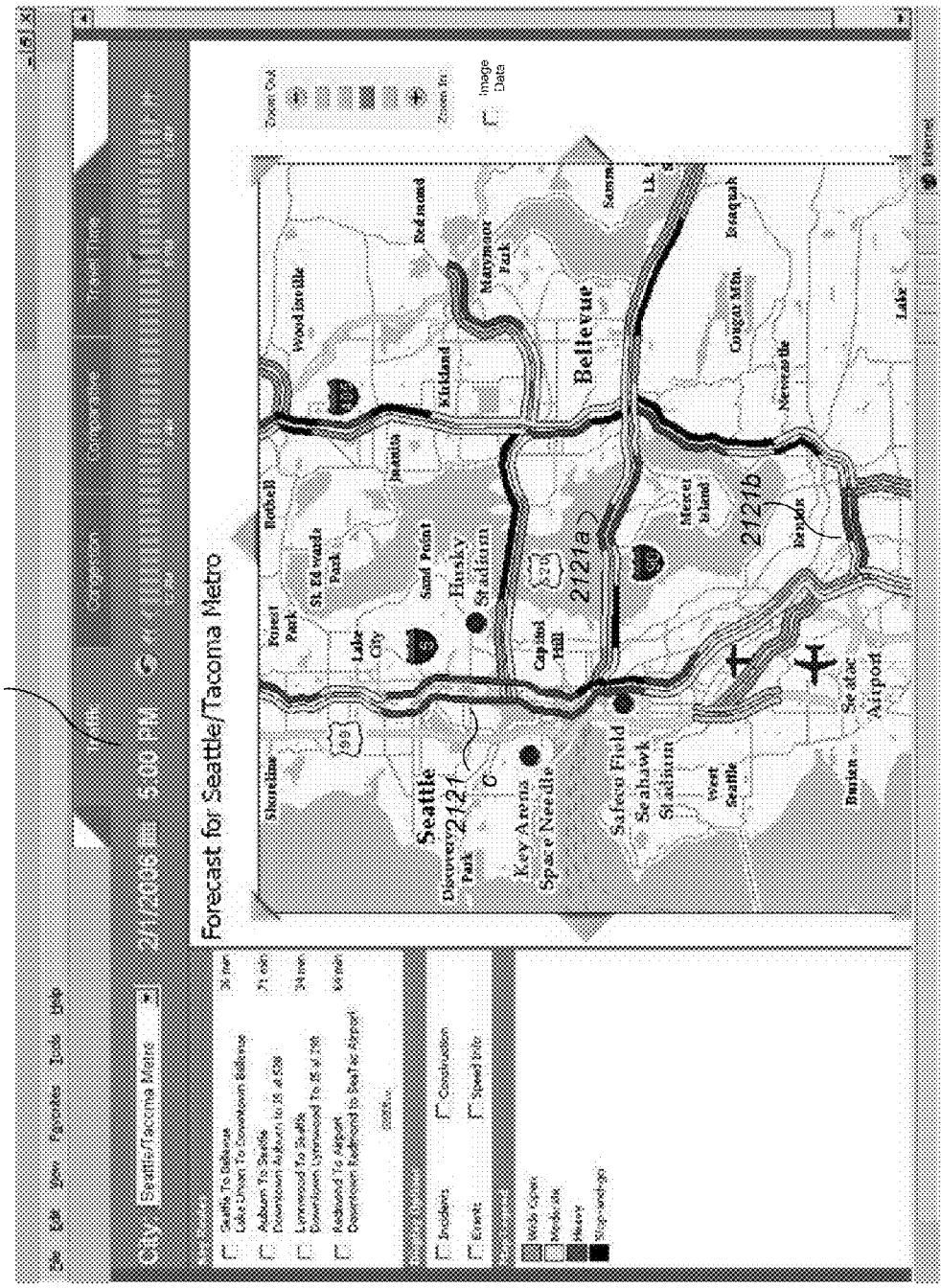

FIG. 21B illustrates an example display showing predicted traffic conditions at a currently selected future time 2123 of 5:00 PM, such as based on user modification at 4:45 PM of the slider control 2103 of FIG. 21A. Overall, the illustrated predicted traffic congestion level conditions in FIG. 21B for the road network appear to be more congested than the traffic congestion level conditions for 4:45 PM in FIG. 21A. As one example, road segment 2121a has a different predicted level of road traffic congestion condition than the respective corresponding road segment 2111a of FIG. 21A, with heavy traffic congestion conditions now being illustrated.

Figure 21C:
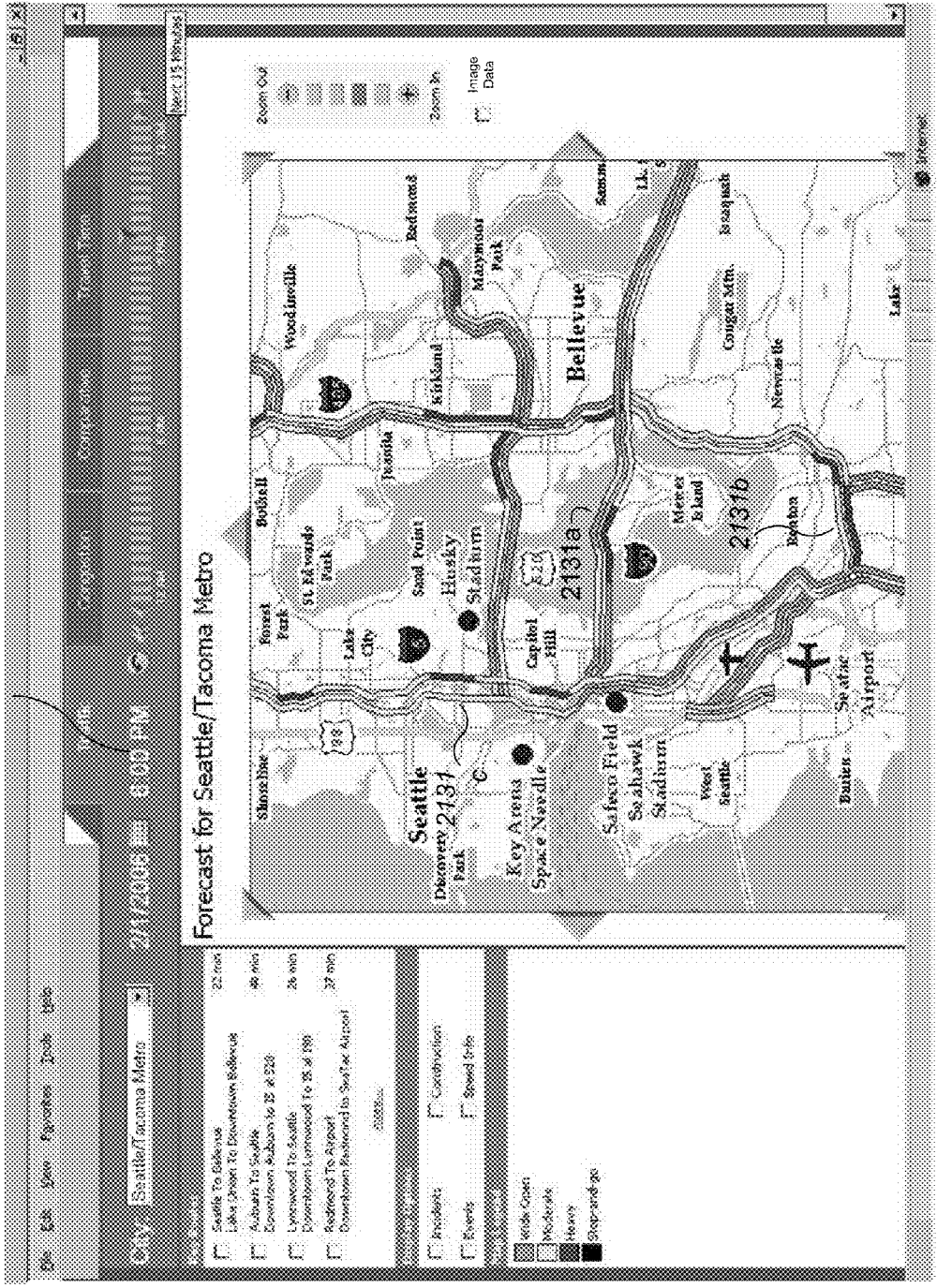

FIG. 21C illustrates an example display showing predicted traffic conditions at a currently selected future time 2133 of 6:00 PM, such as based on user modification at 4:45 PM of the slider control 2103 of FIG. 21A. Overall, the illustrated predicted traffic congestion level conditions in FIG. 21C for the road network appear to be less congested than the predicted traffic congestion level conditions for 5:00 PM in FIG. 21B. For example, road segment 2131a is shown as being wide open at 6 PM, while traffic for the same segment 2121a in FIG. 21B was predicted to be heavy at 5:00 PM. In addition, road segment 2131b has changed from heavy to moderate levels of traffic congestion between 5:00 and 6:00 PM, as shown by the corresponding segment 2121b in FIG. 21B.

Figure 21D:
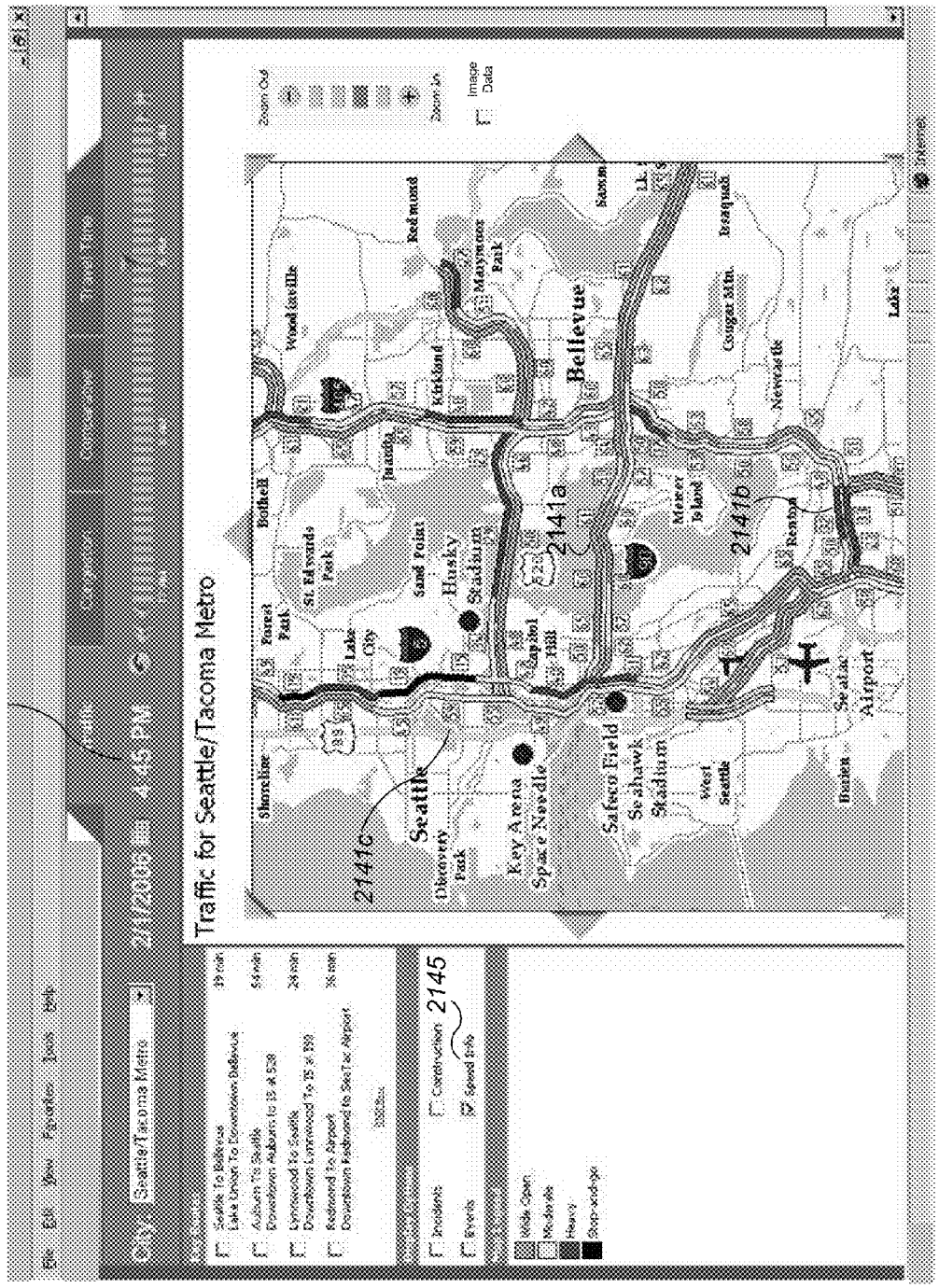

FIG. 21D illustrates an example display similar to that shown in FIG. 21A, but with the map being augmented with roadway speed information. In particular, in this view the user has selected the display option 2145 (labeled "Speed Info") in order to cause current average traffic speeds to be illustrated. For example, road segment 2141*a* (with wide open traffic congestion) is labeled with a numeric 61 indicator that reflects an average speed of 61 miles per hour for traffic on that segment at the currently selected time 2143 of 4:45 PM. In contrast, road segment 2141*b* (with heavy traffic congestion) is labeled with a numeric 32 indicator that reflects an average speed of only 32 miles per hour for vehicles on that road segment. In some embodiments such speed information indicators may be displayed for only current and/or past times, while in other embodiments predicted future traffic condition speed information may similarly be displayed for future times. Furthermore, in embodiments in which color is used to reflect absolute or relative levels of congestion or speed, the speed information indicators may further be displayed using colors corresponding to the speed, such as to display the numeric 61 indicator for road segment 2141*a* in green (corresponding to wide open traffic) and to display the number 32 indicator for road segment 2141*b* in red (corresponding to heavy traffic congestion). Techniques other than color or shading may further be used in some embodiments to indicate information such as absolute or relative levels of congestion or speed, whether for roads and/or information indicators, such as thickness and styles (e.g., dashing) of lines, using various font and other text attributes for alphanumeric information, etc.

Figure 21E:
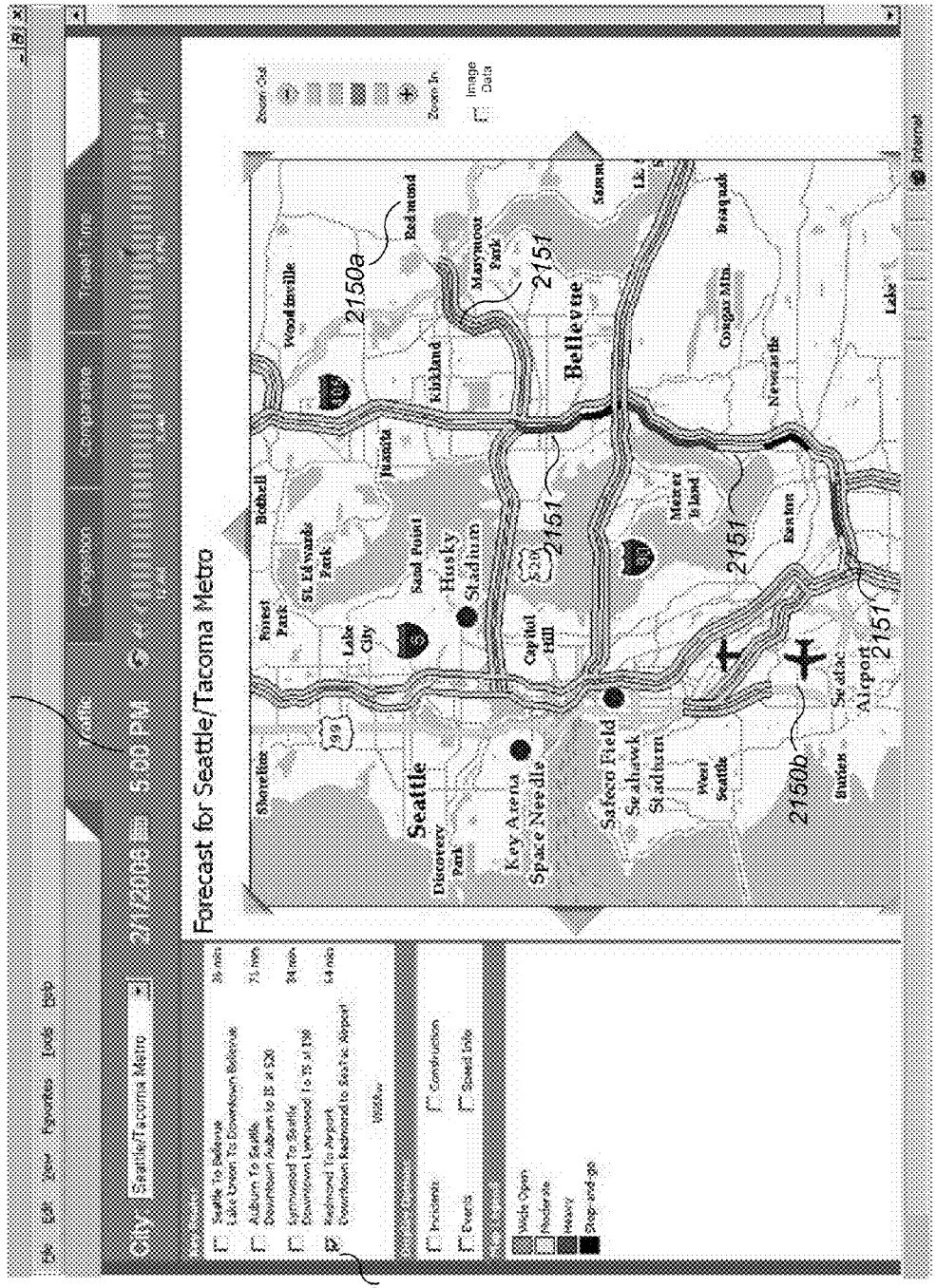

FIG. 21E illustrates an example display similar to that shown in FIG. 21B, but with the map showing predicted travel conditions on a particular travel route at the currently selected future time 2153 of 5:00 PM. In this example, the user has selected key route option control 2152 labeled "Redmond to Airport," and in response information about predicted traffic conditions relevant to the route between Redmond 2150*a* and SeaTac Airport 2150*b* is shown for the currently selected future time. In particular, in this example traffic condition information at the currently selected time is shown for each of the road segments on the route 2151 through the road network corresponding to the selected route option 2152, and traffic condition information is shown only for the route 2151, such as by displaying other roads in a de-emphasized fashion (e.g., in embodiments in which road congestion levels are shown in color, by showing the other roads in gray). In other embodiments, information about a route may be shown in other manners, such as by removing all visual representations of other roads and road segments that are not part of the route, and/or by representing the road segments of the route in an abstract manner without displaying any geographic information.

Figure 21F:
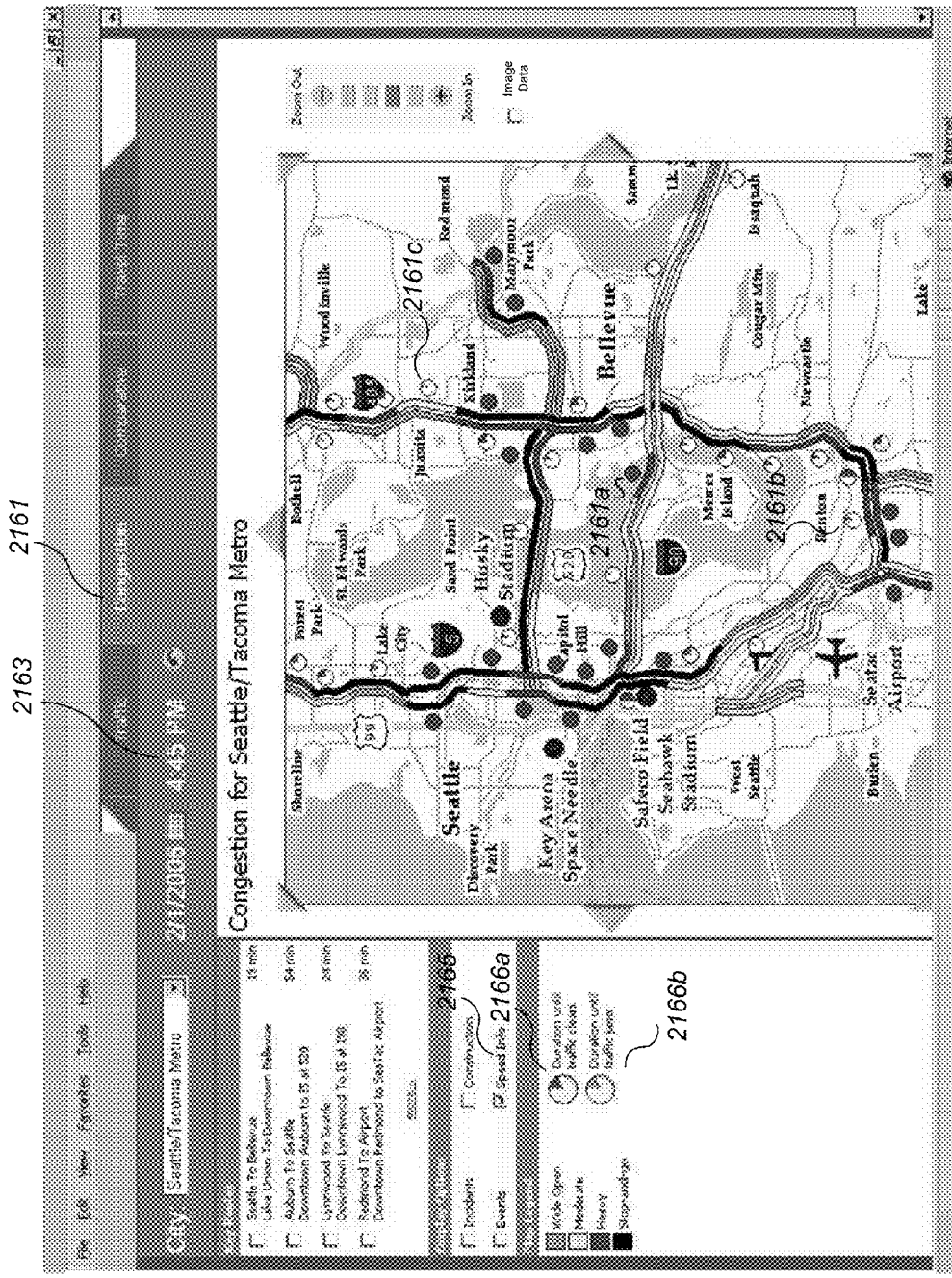

FIG. 21F illustrates an example display similar to that shown in FIG. 21A, but with the map showing a congestion-oriented view of current traffic conditions at the currently selected time 2163 of 4:45 PM. In this view, the user has selected the "Congestion" navigation tab control 2161 and the speed information display option 2165 in order to obtain information about predicted times until current traffic conditions are expected to change from their current state. In this example, a time slider is not shown because the predicted information provided is relative to a current time of 4:45 PM, although in other embodiments similar predicted change information may additionally be available for user-selected future times. In this view, road segments are annotated with circular clock icons, such as icons 2166*a* and 2166*b*. The clock icon 2166*a* with darker shading in this example indicates an amount of time until traffic on a given road segment clears or otherwise improves by a designated amount (e.g., changes from "Stop-and-go" or "Heavy" to "Moderate" or "Wide Open"), while the clock icon 2166*b* with lighter shading in this example indicates an amount of time until traffic on a given road segment becomes congested or otherwise worsens by a designated amount (e.g., changes from "Wide Open" or "Moderate" to "Heavy" or "Stop-and-go"). For example, clock icon 2161*a* is all dark, indicating that the corresponding adjoining road segment is expected to remain in a congested state for at least the next hour. In contrast, clock icon 2161*b* is only approximately one-eighth dark, indicating that the adjoining road segment is expected to clear in approximately one-eighth of an hour, and clock icon 2161*c* is approximately one-eighth light, indicating that traffic on the adjoining road segment is expected to become congested soon.

Figure 21G:
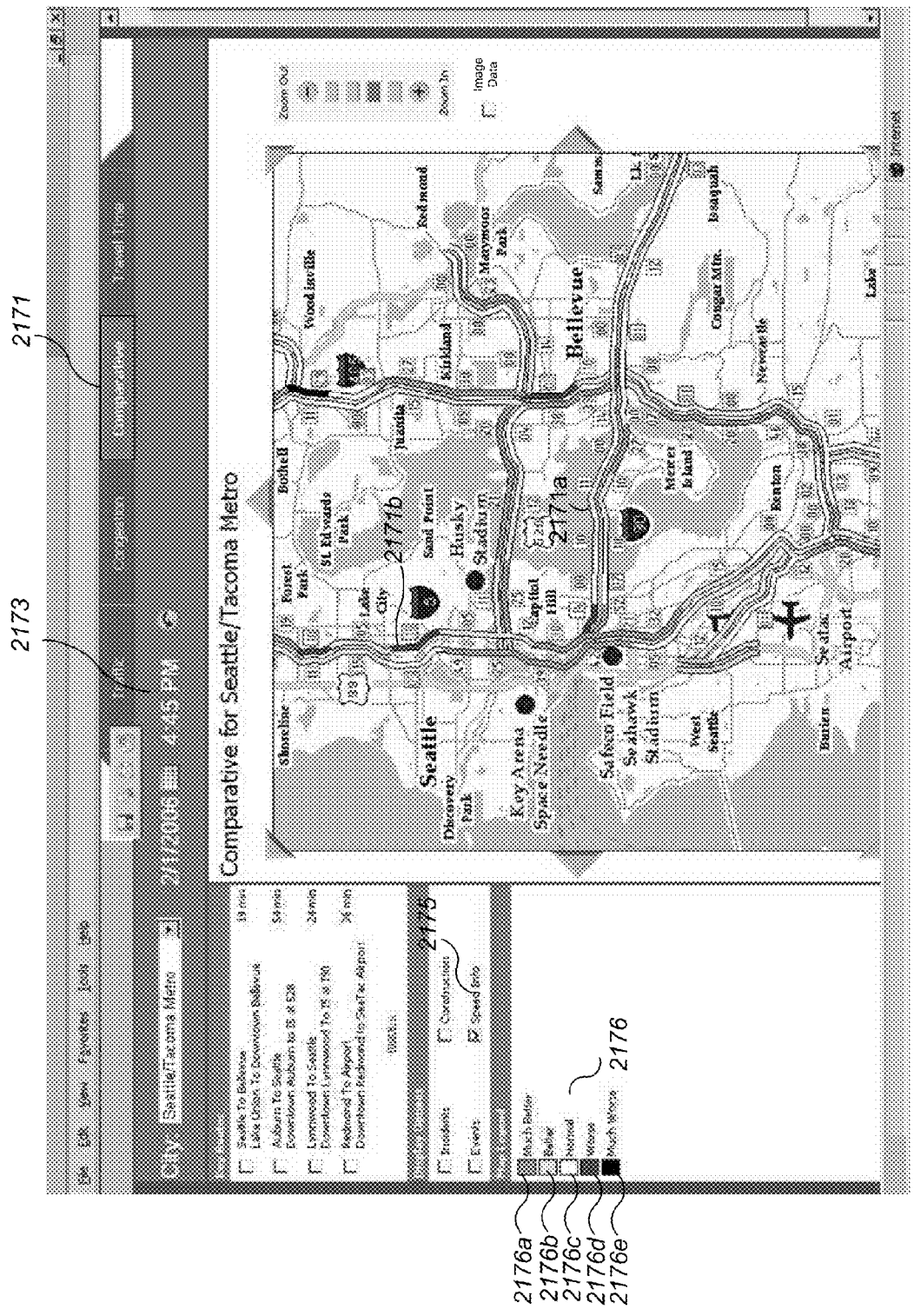
Figure 21H:
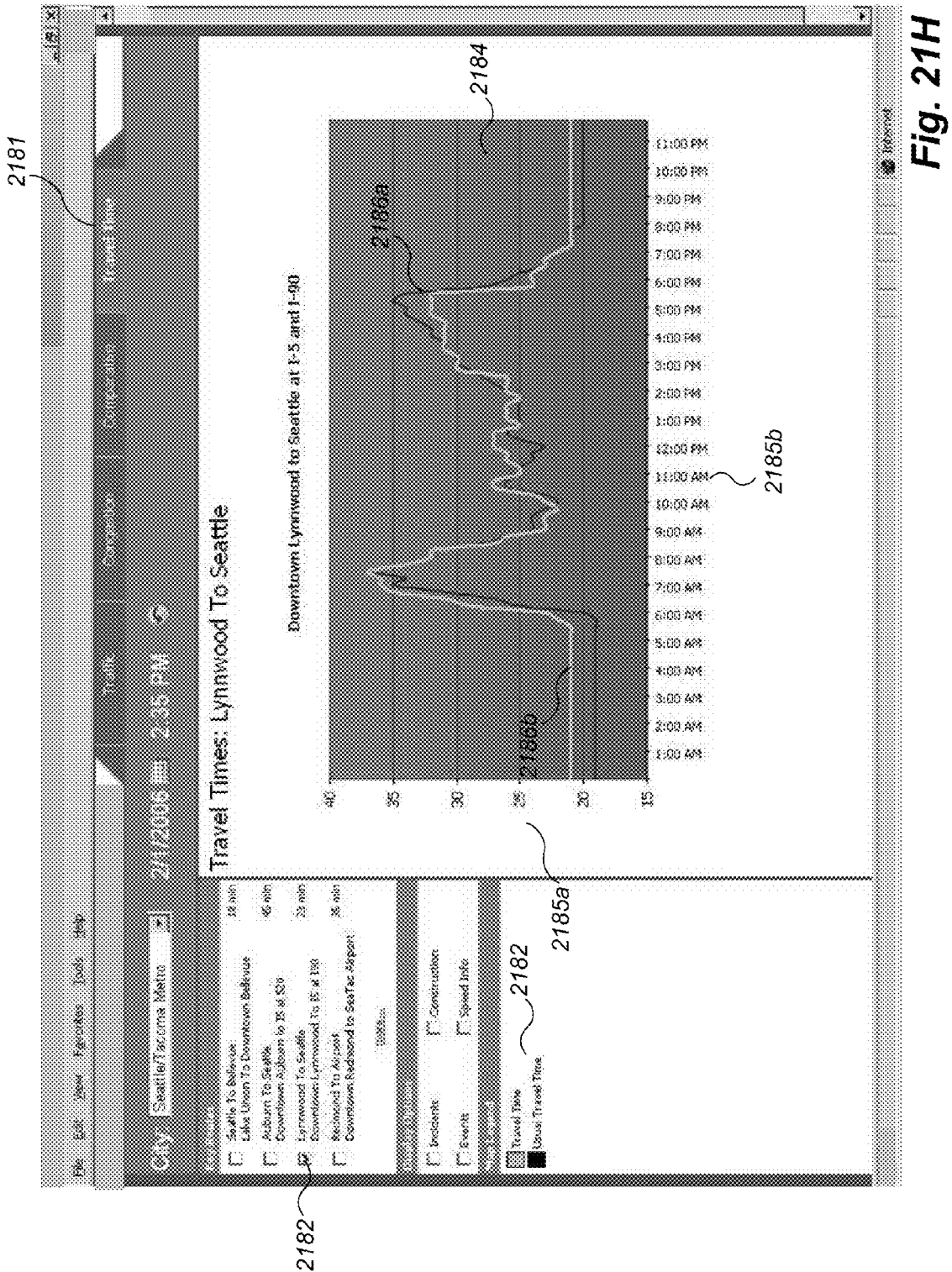
Figure 21I:
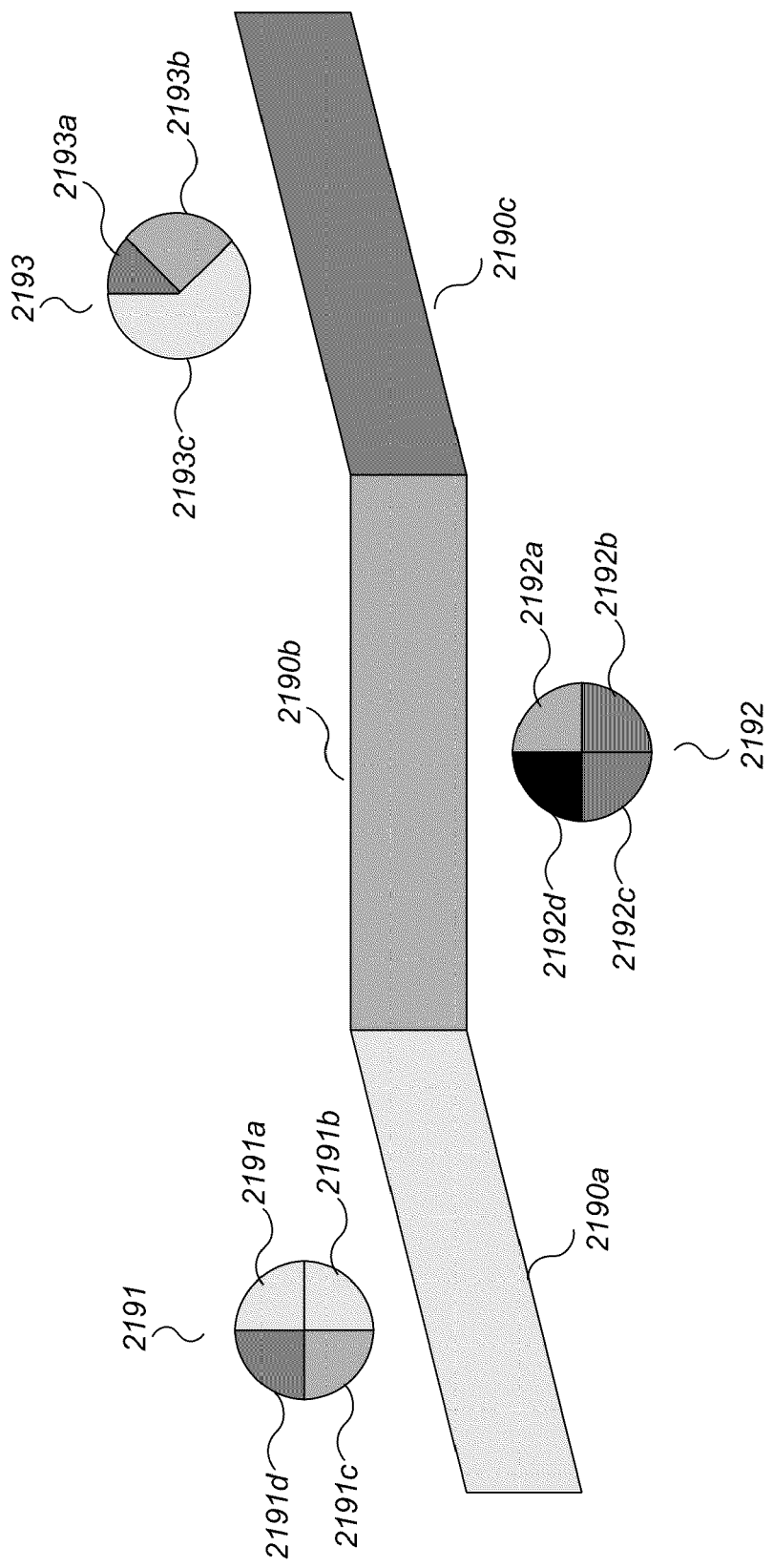

FIG. 21I illustrates an example display similar to that shown in FIG. 21F, but with only a portion of one road illustrated and with icons that each visually present information about predicted traffic conditions for multiple future times. In this example, three road segments 2190*a-c* are shown and each displayed with a degree of predicted traffic congestion level at a particular currently selected time, not shown (although in embodiments in which the currently selected time is a past time, at least some of the information displayed may reflect actual traffic congestion levels corresponding to the past time rather than predicted information). In this example, road segment 2190*a* has wide-open traffic conditions at the currently selected time, road segment 2190*b* has moderate traffic conditions at the currently selected time, and road segment 2190*c* has heavy traffic conditions at the currently selected time.

In addition, each road segment has an adjoining clock icon that can display multiple areas each corresponding to a portion of the hour following the currently selected time, although in other embodiments the clock may represent a period of time other than an hour, or such information may alternatively be displayed in manners other than a clock or a circle. For example, clock 2191 adjoins road segment 2190*a* and has four portions 2191*a-d*, with each portion for this clock being a 15-minute quadrant, and with each clock portion being filled with the level of grayscale for the traffic congestion level represented by that portion. Thus, portion 2191*a* represents the 15 minutes following the currently selected time and is shaded to indicate that wide-open traffic conditions are predicted for road segment 2190*a* during those 15 minutes, and portion 2191*b* represents the period of time from 15 to 30 minutes after the currently selected time and also indicates predicted wide-open traffic congestion level conditions. While the portions of example clock 2191 are evenly spaced in 15-minute segments (e.g., to reflect predictions made at each of 15-minute time intervals), in other embodiments each distinct portion of time within a clock may instead correspond to a different predicted or actual traffic congestion level—if so, the two portions 2191*a* and 2191*b* that both represent the same level of traffic congestion would instead by combined into a single portion, which in this example would be a portion that fills the first half of the clock. In this example, portion 2191*c* indicates predicted moderate traffic conditions for the road segment during the next period of time (which in this example is 30 to 45 minutes after the currently selected time), and portion 2191*d* indicates predicted heavy traffic conditions for the road segment during the last 15 minutes of the hour. Thus, in contrast to the clock icons illustrated in FIG. 21F that each represent a single predicted future traffic condition (the future point in time when the level of traffic congestion will change), the clock icon 2191 illustrates predicted future traffic conditions for each of multiple future times, and provides significantly more information to the user regarding predicted future conditions in a compact and easy-to-understand manner.

In a similar manner to clock icon 2191, clock icon 2192 adjoins road segment 2190b and has four portions 2192a-d that in this example are each 15-minute quadrants. Quadrants 2192a-d represent, respectively, moderate, heavy, heavy, and stop-and-go predicted traffic congestion level conditions for road segment 2190b at the periods of time corresponding to the portions. Conversely, clock icon 2193 has only three portions that each represents a traffic congestion level distinct from any other portions adjacent in time. Thus, with respect to adjoining road segment 2190c, portion 2193a of clock 2193 indicates predicted heavy traffic congestion level conditions for the road segment during a first approximately 7 minutes following the currently selected time, portion 2193b indicates predicted moderate traffic congestion level conditions for the road segment during the following approximately 15 minutes, and portion 2193c indicates predicted wide open traffic congestion level conditions for the road segment during the remainder of the hour. While three portions of time are illustrated here, in will be appreciated that more or less portions could be displayed, that each portion can represent any amount of time down to the difference in times between distinct future time predictions, and that different portions of such a clock may represent the same predicted level of traffic congestion (e.g., if one or more intervening portions have one or more different predicted traffic congestion levels).

FIG. 21G illustrates an example display similar to that shown in FIG. 21A, but with the map showing a comparative view of current traffic conditions at the currently selected time 2173 of 4:45 PM so as to indicate differences from normal conditions. In this view, the user has selected the "Comparative" navigation tab control 2171 and the speed information display option control 2175 in order to obtain information describing a degree of difference (e.g., a numeric amount of difference and/or one of multiple predefined enumerated levels of difference) between current traffic conditions as compared to normal expected conditions for the currently selected time, with normal traffic conditions being determined in this example by reference to a predictive model that can be used to determine expected default long-term traffic condition forecasts based on historical observations and some current conditions such as scheduled events but not on transient or temporary situations such as accidents and other road incidents, short-term road construction, weather, etc. More generally, in other embodiments the "normal" data against which the comparison is made may be determined or selected in other manners, such as by purely using historical averages, by allowing a user to designate the types of information to be considered for the "normal" data (e.g., to use school calendar information but not events), by allowing a user or other operator to designate a particular set of data to be used for the comparison (e.g., by supplying a particular set of data, by indicating a particular past date to use, such as last Wednesday at 5 PM, etc.), etc. In this example, a time slider is not shown because the predicted information provided is relative to a current time of 4:45 PM, although in other embodiments similar predicted difference information may additionally be available for user-selected future times, such as is described in more detail with respect to FIG. 21J. In this view, the road segments are again marked to reflect information of interest, but the map legend 2176 indicates different meanings for the markings, such as to indicate varying degrees or levels of difference from normal in various shades of gray (or in other embodiments to instead using various colors, such as green to indicate that current or predicted traffic conditions are much better than normal 2176a, yellow to indicate that the traffic conditions are better than normal 2176b, white to indicate that the traffic conditions are substantially normal 2176c, red to indicate that the traffic conditions are worse than normal 2176d, and black to indicate that the traffic conditions are much worse than normal 2176e). In addition, in this example the selection of the speed information control 2175 prompts road segments to be annotated with numbers in boxes to indicate a numeric difference of the number of miles per hour faster or slower than normal that traffic is flowing on a given road segment (e.g., for embodiments in which colors are used, boxes displayed in one of two colors to indicate better than normal speeds and worse than normal speeds, such as green for better and red for worse). For example, road segment 2171a is displayed with a level of grayscale indicating better-than-normal traffic and is annotated with the number "11" in a box (e.g., a green box) to indicate that traffic is flowing 11 miles per hour faster than normal on that road segment. In contrast, road segment 2171b is displayed with a level of grayscale indicating worse-than-normal traffic and is annotated with the number "10" in a box (e.g., a red box) to indicate that traffic is flowing 10 miles per hour slower than normal on that road segment.

Other types of comparative traffic conditions information may be displayed in other manners in other embodiments. For example, in some embodiments, comparative traffic conditions information may be determined and displayed in a manner other than on a per-road segment basis, such as to determine and display aggregate comparative traffic conditions information for multiple road segments (e.g., multiple road segments along a particular route, or in a particular geographic area), whether in addition to or instead of displayed comparative traffic information on a per-road segment basis. In addition, other types of comparative information may be determined and displayed in other embodiments, such as differences in an average amount of time to travel from one end of a road segment to another, differences in average traffic volume or occupancy, etc.

Furthermore, anomalous road traffic conditions may be automatically detected in various ways, and information about the detected anomalies may be presented or otherwise provided in various ways, such as to facilitate travel on roads of interest. The detection of anomalous road traffic conditions is performed in at least some embodiments for each of one or more segments of roads at each of one or more selected times with respect to target traffic conditions that are identified to be analyzed for a particular road segment at a particular selected time, such as to identify target traffic conditions that reflect actual traffic conditions for a current or past selected time, and/or to identify target traffic conditions that reflect predicted future traffic conditions for a future selected time. The analysis of target traffic conditions for a selected segment of road at a selected time to detect anomalous road traffic conditions may include comparing the target traffic conditions for the road segment at the selected time to distinct expected road traffic conditions for the road segment at the selected time, with the expected conditions reflecting road traffic conditions that are typical or normal for the road segment at the selected time. When the target traffic conditions have sufficiently large differences from the expected conditions, corresponding anomalous conditions may be identified, and information about the anomalous conditions may be provided in various ways.

Traffic conditions data that is analyzed to detect anomalous conditions may reflect one or more of various types of traffic flow measurements in various embodiments (e.g., average traffic speeds, average traffic volume over a period of time, average traffic occupancy that reflects the average percentage of time that vehicles are occupying a particular location, etc.). In addition, a particular type of traffic flow data may be detected as being anomalous based on differing in one or more ways from expected traffic flow data of that type, such as to be abnormal, atypical, unusual, or otherwise sufficiently different (e.g., so as to exceed a predetermined or dynamically determined threshold). Information related to detected anomalous traffic conditions may be provided to users and/or other computer systems or applications in various ways in various embodiments. For example, as previously noted, users may be provided with graphically displayed maps that indicate degrees or levels to which target traffic conditions differ from expected traffic conditions. In other embodiments, alerts or other notifications may be sent to client devices and/or client applications that are used or operated by users when specified circumstances occur, so that the client applications/devices may notify the users if appropriate that traffic is likely to differ from normal or other expectations. Furthermore, in some embodiments such information related to detected anomalous traffic conditions may be provided to other entities or systems that may use the information in various ways, including by making some or all of the provided information to customers or other users of the other entities and systems.

In at least some embodiments, at least some of the described techniques for detecting anomalous road traffic conditions and providing information about the detected anomalies are automatically provided by an Anomalous Traffic Conditions Detector system. Additional details related to such detecting and providing of information about anomalous road traffic conditions are included in U.S. patent application Ser. No. 11/556,648, filed Nov. 3, 2006 and entitled "Detecting Anomalous Road Traffic Conditions," which is hereby incorporated by reference in its entirety.

Figure 21J:
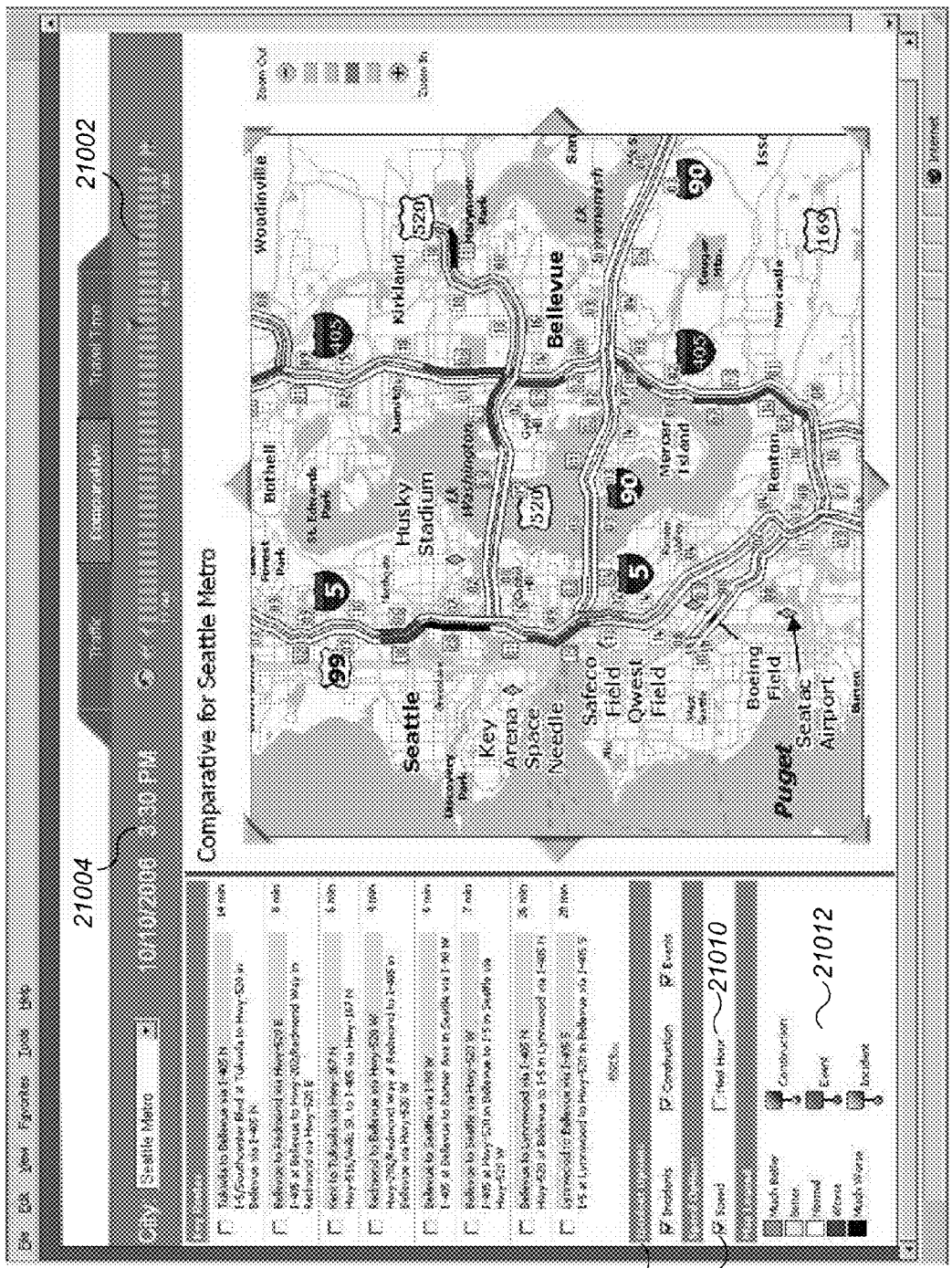

FIG. 21J illustrates an example user interface display with comparative traffic condition information similar to that shown in FIG. 21G, but with the display further including a user-manipulatable time slider control 21002 similar to control 2103 of FIG. 21A. In this example, the current time is 1:00 PM, but a user has manipulated the time slider 21002 such that the position of the triangle-shaped time indicator on the slider control reflects a currently selected time 21004 of 3:30 PM. In response, the displayed map is updated so that the displayed traffic conditions information corresponds to a comparative view of traffic conditions at the selected time, such as to indicate differences between target traffic conditions for 3:30 PM and expected traffic conditions for 3:30 PM. By using the example user interface display of FIG. 21J, the user may obtain information related to anomalous traffic conditions at selected times of interest. Although not specifically illustrated in FIG. 21J, in some embodiments the user may select times of interest by using time sequence manipulation playback controls, such as controls similar to those of a virtual VCR or DVD device. The target and expected traffic conditions data that is used as a basis for comparison for a particular selected time may be selected in various ways, such as based on the difference between the current time and the selected time. In this example, the user is requesting comparative information for a time two and one-half hours in the future, which may be within the time interval for which short-term predicted information is available. As such, target traffic conditions may be obtained from a predictive model that provides short-term predictive information based on current conditions (e.g., current traffic conditions, current weather, traffic incidents, etc.) as well as future conditions corresponding to the selected time (e.g., event schedules, school schedules, forecast weather, scheduled traffic construction or other work, etc.). The expected traffic conditions may be obtained from a predictive model that provides longer-term default forecast information based primarily on conditions and other inputs that may be considered by the user as part of their subjective understanding of "normal" traffic conditions (e.g., not based on current conditions, such as current weather and traffic incidents). In other embodiments and situations, target and expected traffic conditions may be determined in various other ways.

The illustrated user interface display of FIG. 21J also includes an incident display options control area 21006 that includes various user-selectable controls that a user may modify in order to display or not display indications of various types of information affecting traffic conditions via one or more corresponding markers 21012. In this example, the user-selectable controls allow control over display of information about traffic incidents, locations of road construction or other road work, and scheduled events. In addition, the user interface display of FIG. 21J also includes a speed options control area that includes user-selectable controls 21008 and 21010 to modify how speed-related information is displayed on the map. In the illustrated example, in response to the user's selection of the Speed control 21008, the map has been annotated with a number in a box for each road segment to numerically indicate information about average speed for the associated road segment, and in particular in this example to display a comparative number of how many miles per hour faster or slower that the target traffic conditions speed for the selected time is relative to the expected traffic conditions speed for the selected time. By selecting the Next Hour control 21010, the map would instead or in addition be annotated with clock icons similar to those described with reference to FIG. 21I, so as to provide the user with an indication of predicted traffic information for each road segment during a future time period beyond the selected time, such as the next hour. The predicted future information may be displayed as comparative predicted future traffic conditions information and/or as non-comparative absolute predicted future traffic conditions information. Thus, for example, if comparative predicted future traffic conditions information is displayed, a particular clock icon for a particular road segment may indicate distinct predicted traffic information for each of multiple distinct future times during the future time period, such as that traffic conditions will be much better than normal in 15 minutes from the selected time, will be somewhat better than normal in 30 minutes, will be normal in 35 minutes, etc.).

FIG. 21H illustrates an example display similar to that shown in FIG. 21A, but with the map showing a graphical view of total travel time for a particular travel route over the course of a day based on the currently selected day of Feb. 1, 2006. In this view, the user has selected the "Travel Time" navigation tab 2181 in order to obtain the usual and actual/expected total travel times for a selected route, such as a route between Lynnwood and Seattle based on selection of the Lynnwood to Seattle route option control 2182. In particular, a graph 2184 is displayed that plots time of day on the x-axis 2185*b* and total travel time in minutes on the y-axis 2185*a*. The dark line 2186*a* graphs the usual total travel time for the given travel route at the various times during the day, and the light line 2186*b* graphs the current and/or predicted travel times (based on whether the currently selected day is in the past, is today, or is in the future), thus enabling easy comparison of the differences in the total travel time lines. As with respect to FIG. 21G, the usual total travel times for a route in FIG. 21H may be determined in various ways in various embodiments, including based on historical averages, by reference to a predictive model that can be used to determine expected long-term traffic condition forecasts based on historical observations and some current conditions (such as scheduled events) but not on transient or temporary situations (such as accidents and other road incidents, short-term road construction, etc.), by allowing a user to designate the types of information to be considered for the "usual" data (e.g., to use school calendar information but not events), by allowing a user or other operator to designate a particular set of data to be used for the comparison (e.g., by supplying a particular set of data, by indicating a particular past date to use, such as last Wednesday at 5 PM, etc.), etc. In addition, a time slider is not shown in this example because the predicted information provided is relative to the day of a currently selected time, although in other embodiments similar predicted difference information may be available for user-selected future times via a slider or other mechanism to select a date.

In other embodiments, similar and/or additional information may be displayed in different ways. For example, comparative information for multiple future times may be displayed by way of a clock icon or other mechanisms. In addition, other measures of traffic conditions, such as traffic volumes and/or vehicle occupancy may be displayed. Furthermore, other embodiments may combine various other described user interface aspects, such as a time slider control, which may be utilized by a user to specify a currently selected time for which travel information is to be displayed.

Additional details related to types of displays and providing of predictive traffic information and other information are included in U.S. patent application Ser. No. 11/556,670, filed Nov. 3, 2006 and entitled "Displaying Road Traffic Condition Information and User Controls;" which is hereby incorporated by reference in its entirety.

Various embodiments may further utilize various input information and provide various output information for the predictive models used to make future traffic conditions predictions. In some embodiments, inputs to the predictive models related to date and time information include the following variables: MarketId (an identifier for a geographic region); DateTimeUtc (the time of day in Universal Time); DateTimeLocal (the time of day in local time); DateTimeKey, DateDayOfWeekLocal (the day of the week); DateMonthLocal (the month of the year); DateDayLocal; DateHourLocal (the hour of the day); DatePeriod15MinutesLocal (the 15 minute interval of the day); and HolidayLocal (whether the day is a holiday). In some embodiments, inputs to the predictive models related to current and past traffic conditions information include the following variables: RoadSegmentId (an identifier for a particular road segment); SpeedX (the current reported speed of traffic on road segment X); BlackStartLocalX (the length of time that black traffic congestion level conditions have been reported for road segment X); PercentBlackX (the percentage of sensors or other data sources associated with road segment X that are reporting black traffic congestion level conditions); PercentBlackX-N, where X is a particular road segment and N is a member of {15, 30, 45, 60} and where the value corresponds to the percentage of a road segment X (e.g., percent of sensors associated with the road segment) for which black traffic conditions were reported N minutes ago; RawColorX (the current color corresponding to a level of traffic congestion on road segment X); RawColorX-N, where X is a particular road segment and N is a member of {15, 30, 45, 60}, and where the value is a color corresponding to a level of traffic congestion on road segment X N minutes ago; SinceBlackX (the length of time since black traffic congestion levels have been reported for road segment X); HealthX; and AbnormalityX. In some embodiments, inputs to the predictive models related to weather conditions information include the following variables: Temperature (current temperature); WindDirection (current wind direction); WindSpeed (current wind speed); SkyCover (current level of cloud or haze); PresentWeather (current weather state); and RainNHour, where N is a member of {1, 3, 6, 24} and represents precipitation accumulation in the previous N hour(s); and MetarId. In some embodiments, inputs to the predictive models related to event and school schedules information include the following variables: EventVenueId (a venue identifier); EventScheduleId (a schedule identifier); DateDayLocal (the day of a given event); StartHourLocal (the start hour of a given event); EventTypeId (an event type identifier); EventVenueId (a venue identifier); SchoolLocationId (a school location identifier); and IsSchoolDay (whether or not the current day is a school day).

In some embodiments, outputs to the predictive models related to traffic conditions include the following variables: RawColorXN, where X is a particular road segment and N is a member of {15, 30, 45, 60, 75, 90, 105, 120, 135, 150, 165, 180}, and where the value is a color corresponding to an expected level of traffic congestion on road segment X in N minutes time; and PredRawColorXNProb to indicate confidence in given predictions, where X and N are defined as above with reference to the RawColorXN variables and the value is the confidence level in prediction for road segment X in N minutes time (e.g., based on the level of historical support from observed data for the decision tree path taken to make the prediction).

The following illustrates one example of possible values or ranges of values that may be taken by various of the variables described above, with the indicator ". . ." between two numbers indicating that any integer between and including those two numbers are possible values (e.g., "1 . . . 4" represents {1, 2, 3, 4}), and with possible values of 0 and 1 indicating true and false for appropriate variables (e.g., casedata.HolidayLocal). In other embodiments, other input and/or output variables may be used, and their values may be represented in other manners.

| Variable Name | Example Possible Values |
| --- | --- |
| eventschedule.EventScheduleId | Integer |
| eventschedule.EventVenueId | Integer |
| eventschedule.Name | "Seattle Mariners Game" |
| eventschedule.DateDayLocal | 1 . . . 31 |
| eventschedule.StartHourLocal | 0 . . . 23 |
| eventschedule.EventTypeId | Integer |
| eventvenue.EventVenueId | Integer |
| eventvenue.Name | "Safeco Field" |
| eventvenue.MarketId | Integer |
| casedata.DateTimeUtc | 02/13/2006 12:15:00 |
| casedata.DateTimeLocal | 02/13/2006 04:15:00 |
| casedata.DateDayOfWeekLocal | 1 . . . 7 |
| casedata.DateMonthLocal | 1 . . . 12 |
| casedata.DateHourLocal | 0 . . . 23 |
| casedata.HolidayLocal | 0, 1 |
| roadsegmentdata.RoadSegmentId | Integer |
| roadsegmentdata.SpeedX | 0 . . . 100 (mph) |
| roadsegmentdata.BlackStartLocalX | Before 0745, 0745-0759, 0800-0814, 0815-0829, 0830-0844, 0845-0859, . . . , 1915-1929, After 1930 |
| roadsegmentdata.SinceBlackX | Integer (minutes) |
| roadsegmentdata.PercentBlackX | none, 0-15, 15-30, 30-50, 50-75, 75-100 |
| roadsegmentdata.PercentBlackX-N | none, 0-15, 15-30, 30-50, 50-75, 75-100 |
| roadsegmentdata.RawColorX | 0, 1, 2, 3 |
| roadsegmentdata.RawColorXN | 0, 1, 2, 3 |
| roadsegmentdata.RawColorX-N | 0, 1, 2, 3 |
| roadsegmentdata.ColorX | 0, 1, 2, 3 |
| roadsegmentdata.HealthX | 0, 1 |
| roadsegmentdata.AbnormalityX | 0, 1 |

-continued

| Variable Name | Example Possible Values |
|---|---|
| roadsegmentdata.PredRawColorXN | 0, 1, 2, 3 |
| roadsegmentdata.PredRawColorXNProb | Real [0, 1] |
| weather.MetarId | Integer |
| weather.MarketId | Integer |
| weather.Temperature | 32-40 F, 40-80 F, Extreme Heat, Freezing, Hot, Unknown |
| weather.WindDirection | N, NE, E, SE, S, SW, W, NW |
| weather.WindSpeed | Breezy, Calm, Windy, Heavy, Unknown |
| weather.SkyCover | Broken Clouds, Clear Skies, Few Clouds, Obscured Cover, Overcast, Scattered Clouds, Unknown |
| weather.PresentWeather | Blowing Snow, Clear or Fair, Cloudy, Fog, Haze, Mist, Rain, Snow, Thunderstorms, Unknown, Windy |
| weather.RainNHour | Extreme Rain, Hard Rain, No Rain, Soft Rain, Trace Rain, Unknown |
| schoollocation.SchoolLocationId | Integer |
| schoollocation.Name | "Lake Washington" |
| schoollocation.MarketId | Integer |
| schoolschedule.IsSchoolDay | 0, 1 |

In addition, in at least some embodiments, the described techniques include techniques for automatically determining how to value data samples and/or providers or other sources of data samples in various ways. For example, in at least some embodiments, the techniques for valuing data samples and/or data sample sources may be used to determine whether and how much to pay for data samples from a data sample source, such as a third-party data sample provider that makes data samples available for a fee. In at least some embodiments, additional data samples that correspond to one or more road segments are valued in an incremental and/or relative manner with respect to other data samples that are already available for those road segments, such as to determine a value that corresponds to an increase (if any) in accuracy or other assessment measure of current and/or future road traffic condition information that results from use of the additional data samples. Similarly, in at least some embodiments, additional data samples that correspond to one or more road segments for which other data samples are not available are valued in an incremental and/or relative manner with respect to other road segments for which data samples are available, such as to determine a value that corresponds to an increase (if any) in coverage of traffic condition information for road segments that are of interest (e.g., based on being key roads, having a minimum amount of traffic, having a minimum amount of congestion, having a minimum amount of variability in traffic conditions, being of a particular road class of interest, etc.).

A particular value to be assigned to a group of one or more data samples may be determined in various ways in various embodiments. For example, particular monetary or other values may be assigned to particular groups of one or more data samples by a traffic information provider system so as to reflect additional revenue that may be received by the traffic information provider system based on traffic flow information that results from the data samples, in a proportional manner relative to an amount of improvement in traffic flow information that results from the data samples, by using fixed value amounts for particular amounts of additional road segment coverage and/or improvement or increase in traffic flow information that results from the data samples, etc. In addition, in at least some embodiments, data samples may be valued based at least in part on a type of the data samples (e.g., readings from any or a particular type of road traffic sensor, data samples from any or a particular type of mobile data source, etc.) and/or based on information regarding indications of accuracy or reliability or other assessment of the information provided by the data samples (e.g., based on confidence values or uncertainty information provided by the source of the data samples). Various other factors may additionally be used as part of assessing a value of data samples, such as contractual terms or other restrictions on use of the data samples, timeliness of the availability of the data samples, reliability of the source of the data samples in providing the data samples in an agreed-upon manner, particular times to which the data samples correspond, variability in the data samples with respect to associated times and/or geographical locations, etc.

Furthermore, in at least some embodiments, previously disclosed techniques for assessing data samples may be used to evaluate data samples to be valued, including techniques for filtering data samples, conditioning data samples, identifying and eliminating outlier data samples and other unrepresentative data samples, assessing traffic speeds based on data samples, and/or assessing non-speed traffic flow information based on data samples. For example, when determining incremental and/or relative value of additional data samples, one or more of those types of techniques may be applied to a first group of data samples that does not include the additional data samples and to a second group of data samples that does include the additional data samples (e.g., in addition to some or all of the data samples of the first group), with a comparison of the results from the two groups being used to identify additional benefits (if any) that result from the additional data samples. In addition, in some embodiments an amount of similarity between the additional data samples and previously available data samples may be directly assessed in various ways, such as by comparing temporal and/or geographical distributions of the information from the previously available data samples to temporal and/or geographical distributions of the information from the additional data samples. Data samples may be automatically evaluated or otherwise assessed in a variety of other manners in other embodiments.

Those skilled in the art will also appreciate that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are discussed in certain claim forms, the inventors contemplate the various aspects of the invention in any available claim form. For example, while only some aspects of the invention may currently be recited as being embodied in a computer-readable medium, other aspects may likewise be so embodied.

What is claimed is:

1. A computer-implemented method for providing information related to vehicle travel on roads, the method comprising:

for each of one or more roads, providing information related to vehicle travel during a period of time on the road, by:

obtaining multiple data samples that are each of one of multiple types and that reflect travel characteristics of vehicles traveling on the road during the period of time, the obtained multiple data samples including multiple road traffic sensor readings that are each generated by one of one or more road traffic sensors associated with the road, the obtained multiple data samples further including multiple mobile data source data samples that are each reported by one of one or more mobile devices moving along the road;

automatically assessing the obtained data samples to identify a group of multiple data samples of multiple types to represent actual vehicle travel on the road during the period of time, the identifying of the group including excluding one or more data samples that are identified as being unrepresentative of actual vehicle travel on the road, the automatic assessing being performed by one or more programmed computing systems;

automatically analyzing the identified group of multiple data samples in order to determine one or more estimated measurements of actual traffic flow during the period of time on the road, the automatic analyzing being performed by the one or more programmed computing systems; and providing one or more indications of the determined estimated actual traffic flow measurements for use in facilitating travel on the road.

2. The method of claim 1 wherein the providing of information related to vehicle travel during the period of time on a road is performed in at least one of a realtime and a near-realtime manner.

3. The method of claim 2 wherein the period of time is a current period of time, and wherein the providing of the information related to the vehicle travel in the at least one realtime and near-realtime manner includes providing during the current period of time the one or more indications of the determined estimated actual traffic flow measurements.

4. The method of claim 3 wherein the period of time is a period of 15 minutes or less.

5. The method of claim 2 wherein the providing of information related to vehicle travel during a period of time on a road is performed for each of multiple distinct periods of time, so as to repeatedly provide information related to the vehicle travel on the road in the at least one realtime and near-realtime manner.

6. The method of claim 1 wherein the providing of the one or more indications of the determined estimated actual traffic flow measurements includes providing the determined estimated actual traffic flow measurements to each of one or more users for display to the one or more users.

7. The method of claim 6 wherein the providing of information related to vehicle travel during the period of time is performed for each of multiple distinct segments of multiple distinct roads that are part of a network of roads in a geographic area, and wherein the providing of the determined estimated actual traffic flow measurements to each of one or more users for display includes providing to each of the users a graphical representation of the geographic area that includes graphical representations of the multiple roads and that includes graphical representations for each of multiple road segments of corresponding determined estimated actual traffic flow measurements for that road segment.

8. The method of claim 1 further comprising, for each of at least one of the one or more roads, automatically generating one or more predicted measurements of future traffic flow during each of one or more future periods of times on the road, and providing one or more indications of the generated predicted future traffic flow measurements for use in facilitating future travel on the at least one roads.

9. The method of claim 8 wherein the period of time for which the estimated actual traffic flow measurements are determined is a current period of time, and wherein the predicted future traffic flow measurements for the one or more future periods of times are generated during the current period of time and are based in part on the determined estimated actual traffic flow measurements for the current period of time.

10. The method of claim 9 wherein the predicted future traffic flow measurements for a road for the one or more future periods of times are further based in part on current conditions that include multiple of current weather, current events that are scheduled to occur, current school sessions that are scheduled to occur, current traffic accidents on the road, and current construction activities on the road.

11. The method of claim 1 wherein the period of time is a future period of time, and wherein the determining of the one or more estimated measurements of actual traffic flow on a road during the period of time includes predicting the one or more estimated actual traffic flow measurements so as to reflect actual traffic that will occur on the road during the future period of time.

12. The method of claim 1 wherein the automatic assessing of the obtained data samples for a road includes analyzing the mobile data source data samples of the obtained data samples to determine information about at least one of speed and direction of movement of the one or more mobile devices moving along the road.

13. The method of claim 1 wherein the one or more road traffic sensors associated with each of the one or more roads each include at least one of an embedded loop sensor, a camera, a radar ranging device, a motion sensor, and an RFID-based sensor to detect RFID-based tags in vehicles.

14. The method of claim 1 wherein the one or more mobile devices moving along the one or more roads each include at least one of a device with GPS capabilities and of a device with cellular telephone transmission capabilities.

15. The method of claim 1 wherein the one or more road traffic sensors associated with each of the one or more roads include one or more embedded loop sensors, one or more cameras, one or more radar ranging devices, one or more motion sensors, and one or more RFID-based sensors to detect RFID-based tags in vehicles.

16. The method of claim 15 wherein the one or more mobile devices moving along the one or more roads include one or more devices with GPS capabilities and one or more devices with cellular telephone transmission capabilities.

17. The method of claim 1 wherein the one or more mobile devices moving along the one or more roads each include at least one of a device with GPS capabilities and of a device with cellular telephone transmission capabilities.

18. The method of claim 1 wherein the determined estimated actual traffic flow measurements for a road during the period of time include one or more estimates of speeds of vehicles traveling on the road during the period of time.

19. The method of claim 18 wherein the determined estimated actual traffic flow measurements for a road during the period of time further include multiple of one or more estimates of a traffic arrival rate volume for the road during the period of time, of one or more estimates of traffic density for the road during the period of time, and of one or more estimates of percentage traffic occupancy of at least one point on the road during the period of time.

20. The method of claim 1 wherein the providing of the information related to vehicle travel during the period of time on a road is performed by an automated traffic information system as part of a fee-based service.

21. A non-transitory computer-readable medium whose contents configure a computing device to provide information related to vehicle travel on a road, by performing a method comprising:
   receiving an indication of multiple data samples of multiple types that reflect travel characteristics of vehicles traveling on a road, the multiple data samples being based on at least one of data readings that are each generated by a traffic sensor associated with the road to indicate one or more measurements of traffic conditions on the road at an associated time and of information reported by one or more mobile devices moving along the road at one or more times;
   automatically analyzing the multiple data samples of the multiple types in order to determine one or more estimated measurements of traffic conditions on the road during a period of time, the automatic analyzing being performed by the configured computing device; and
   providing one or more indications of the determined estimated traffic conditions measurements.

22. The computer-readable medium of claim 21 wherein the multiple types include multiple types of traffic sensors associated with the road.

23. The computer-readable medium of claim 22 wherein the multiple types of traffic sensors include multiple of embedded loop sensors, cameras, radar ranging devices, motion sensors, and RFID-based sensors.

24. The computer-readable medium of claim 21 wherein the multiple types include multiple types of mobile devices moving along the road.

25. The computer-readable medium of claim 24 wherein the multiple types of mobile devices include devices with GPS capabilities and devices with cellular telephone transmission capabilities.

26. The computer-readable medium of claim 24 wherein the multiple types of mobile devices include multiple types of devices with GPS capabilities.

27. The computer-readable medium of claim 21 wherein the multiple types include one or more embedded loop sensors, one or more devices with GPS capabilities, and one or more devices with cellular telephone transmission capabilities.

28. The computer-readable medium of claim 21 wherein the providing of the one or more indications of the determined estimated traffic conditions measurements includes providing information about the determined estimated traffic conditions measurements to one or more users for use in facilitating travel by the one or more users on the road.

29. The computer-readable medium of claim 21 wherein the method further comprises automatically determining to replace the determined estimated traffic condition measurements from the automatic analyzing with other determined estimated traffic condition measurements for the road during the period of time that are based at least in part on historical information about traffic conditions related to the road, and wherein the provided one or more indications are of the other determined estimated traffic condition measurements.

30. The computer-readable medium of claim 29 wherein the historical information is based on at least one of historical traffic sensor readings from one or more traffic sensors associated with the road and of historical mobile data source data samples reported by one or more mobile devices that previously moved along the road.

31. The computer-readable medium of claim 29 wherein the multiple data samples of the multiple types include data samples from one or more types of mobile devices with GPS capabilities, and wherein the multiple data samples are received in a near-realtime manner after generation of those data samples by mobile devices of the one or more types.

32. The computer-readable medium of claim 29 wherein the multiple data samples of the multiple types include data samples from one or more types of devices with cellular telephone capabilities, and wherein the multiple data samples are received in a near-realtime manner after generation of those data samples by mobile devices of the one or more types.

33. The computer-readable medium of claim 21 wherein the method further comprises:
   automatically determining estimated traffic condition measurements for the road during a second period of time based at least in part on historical information about prior traffic conditions for the road; and
   providing one or more indications of the determined estimated traffic condition measurements for the road during the second period of time.

34. The computer-readable medium of claim 21 wherein the computer-readable medium is a memory of the configured computing device.

35. The computer-readable medium of claim 21 wherein the contents are instructions that when executed program the configured computing device to perform the method.

36. A computing device configured to provide information related to vehicle travel on a road, comprising:
   a processor;
   a first module configured to, when executed by the processor, and for each of multiple roads and multiple periods of time, automatically analyze multiple data samples that reflect vehicles traveling on the road during the period of time in order to determine one or more estimated measurements of traffic conditions on the road during the period of time, the multiple data samples including at least one data sample based on one or more data readings generated by one or more traffic sensors associated with the road and including at least one other data sample based on information reported by one or more mobile devices moving along the road during the period of time; and
   a second module configured to, when executed by the processor, provide one or more indications of at least some of the determined estimated traffic conditions measurements.

37. The computing device of claim 36 wherein at least one of the multiple periods of time is a future period of time, and wherein the determining of the estimated traffic conditions measurements for the roads during each of the at least one future periods of time includes predicting future traffic conditions on the roads for the future period of time based in part on current traffic conditions on the roads.

38. The computing device of claim 36 wherein the first and second modules each include software instructions for execution by the processor.

39. The computing device of claim 36 wherein the providing of the one or more indications of the at least some determined estimated traffic conditions measurements includes providing the at least some determined estimated traffic conditions measurements to each of one or more users for display to the one or more users.

40. The computing device of claim 39 wherein the providing of the at least some determined estimated traffic conditions measurements to each of the one or more users for display includes providing to each of the users a graphical representation of a geographic area that includes at least some of the multiple roads, the provided graphical representation of the geographic area including graphical representations of the at least some roads and including graphical representations of determined estimated traffic condition measurements for one or more of the at least some roads.

41. The computing device of claim 36 wherein at least one of the multiple periods of time is a current period of time, and wherein the computing device further comprises a module configured to automatically generate one or more predicted traffic conditions on one or more of the roads for a future period of time based in part on the determined estimated traffic conditions measurements for the current period of time for at least one of the roads.

42. The computing device of claim 41 wherein the predicted traffic conditions are further based in part on current conditions that include multiple of current weather, current events that are scheduled to occur, current school sessions that are scheduled to occur, current traffic accidents on one or more of the multiple roads, and current construction activities on one or more of the multiple roads.

43. The computing device of claim 36 wherein at least one of the multiple periods of time is a current period of time, and wherein the computing device further comprises a module configured to automatically generate one or more predicted traffic conditions on one or more other roads that are distinct from the multiple roads for the current period of time based at least in part on the determined estimated traffic conditions measurements for the current period of time for at least one of the multiple roads.

44. The computing device of claim 43 wherein the predicted traffic conditions are further based in part on current conditions that include multiple of current weather, current events that are scheduled to occur, current school sessions that are scheduled to occur, current traffic accidents on one or more of the multiple roads, and current construction activities on one or more of the multiple roads.

45. The computing device of claim 36 wherein the one or more traffic sensors associated with each of the multiple roads each includes at least one of an embedded loop sensor, a camera, a radar ranging device, a motion sensor, and an RFID-based sensor to detect RFID-based tags in vehicles.

46. The computing device of claim 36 wherein the one or more mobile devices moving along each of the multiple roads each includes at least one of a device with GPS capabilities and of a device with cellular telephone transmission capabilities.

47. The computing device of claim 36 wherein the determined estimated traffic conditions measurements for one of the multiple roads during one of the multiple periods of time include one or more estimates of speeds of vehicles traveling on the one road during the one period of time.

48. The computing device of claim 36 wherein the determined estimated traffic conditions measurements for one of the multiple roads during one of the multiple periods of time further include at least one of one or more estimates of a traffic arrival rate volume for the one road during the one period of time, of one or more estimates of traffic density for the one road during the one period of time, and of one or more estimates of percentage traffic occupancy of at least one point on the one road during the one period of time.

49. The computing device of claim 36 further comprising a module configured to automatically determine to replace the determined estimated traffic condition measurements for one of the multiple roads and one of the multiple periods of time with alternative determined estimated traffic condition measurements for the one road during the one period of time that are based at least in part on historical information about traffic conditions related to the one road, and wherein the provided one or more indications of the at least some determined estimated traffic conditions measurements include the alternative determined estimated traffic condition measurements.

50. The computing device of claim 49 wherein the historical information is based on at least one of historical traffic sensor readings from one or more traffic sensors associated with the one road and of historical mobile data source data samples reported by one or more mobile devices that previously moved along the one road.

51. The computing device of claim 36 further comprising a module configured to automatically determine estimated traffic condition measurements for one of the multiple roads during a second period of time distinct from the multiple periods of time based at least in part on historical information about prior traffic conditions for the one road, and to provide one or more indications of the determined estimated traffic condition measurements for the one road during the second period of time.

52. The computer-readable medium of claim 21 wherein the providing of the one or more indications of the determined estimated traffic conditions measurements includes providing to each of one or more users a graphical representation of a geographic area that includes at least some of the road, the provided graphical representation of the geographic area including graphical representations of the at least some of the road and of determined estimated traffic conditions measurements for the at least some of the road.

53. The computer-readable medium of claim 21 wherein the period of time is a future period of time, and wherein the determining of the estimated traffic conditions measurements on the road during the period of time includes predicting future traffic conditions on the road for the future period of time based in part on current traffic conditions on the road.

54. The computer-readable medium of claim 21 wherein the period of time is a current period of time, and wherein the method further comprises automatically generating one or more predicted traffic conditions on the road for a future period of time based in part on the determined estimated traffic conditions measurements for the current period of time.

55. The computer-readable medium of claim 54 wherein the predicted traffic conditions are further based in part on current conditions that include multiple of current weather, current events that are scheduled to occur, current school sessions that are scheduled to occur, current traffic accidents on the road, and current construction activities on the road.

56. The computer-readable medium of claim 21 wherein the period of time is a current period of time, and wherein the method further comprises automatically generating one or more predicted traffic conditions on one or more other roads that are distinct from the road for the current period of time based at least in part on the determined estimated traffic conditions measurements for the current period of time for the road.

57. The computer-readable medium of claim 56 wherein the predicted traffic conditions are further based in part on current conditions that include multiple of current weather, current events that are scheduled to occur, current school sessions that are scheduled to occur, current traffic accidents on the road, and current construction activities on the road.

58. The computer-readable medium of claim 21 wherein the determined estimated traffic conditions measurements for the road during the period of time include one or more estimates of speeds of vehicles traveling on the road during the period of time.

59. The computer-readable medium of claim 21 wherein the determined estimated traffic conditions measurements for the road during the period of time further include at least one of one or more estimates of a traffic arrival rate volume for the road during the period of time, of one or more estimates of traffic density for the road during the period of time, and of one or more estimates of percentage traffic occupancy of at least one point on the road during the period of time.

* * * * *